United States Patent
King et al.

(10) Patent No.: US 12,057,669 B1
(45) Date of Patent: *Aug. 6, 2024

(54) CONTROL ATTACHMENT CONFIGURED TO CONTROL AN APPLICATION OF POWER TO A LOAD AND A METHOD OF IMPLEMENTING A CONTROL ATTACHMENT

(71) Applicant: Smart Power Partners LLC, Wheaton, IL (US)

(72) Inventors: John Joseph King, Wheaton, IL (US); Stephen DeLano, Milton, MA (US)

(73) Assignee: Smart Power Partners LLC, Wheaton, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/683,130

(22) Filed: Feb. 28, 2022

Related U.S. Application Data

(63) Continuation of application No. 16/661,875, filed on Oct. 23, 2019, now Pat. No. 11,264,769, which is a
(Continued)

(51) Int. Cl.
*H02G 3/08* (2006.01)
*H01R 31/06* (2006.01)
(Continued)

(52) U.S. Cl.
CPC ........... *H01R 33/90* (2013.01); *H01R 31/065* (2013.01); *H01R 33/945* (2013.01); *H02G 3/083* (2013.01)

(58) Field of Classification Search
CPC .... H01R 33/90; H01R 31/065; H01R 33/945; H01R 13/703; H01R 2107/00;
(Continued)

(56) References Cited

U.S. PATENT DOCUMENTS 2,997,691 A  8/1961 Stoll
3,588,489 A  6/1971 Gaines
(Continued)

FOREIGN PATENT DOCUMENTS

AU  2019203136  5/2019
AU  2019100956  10/2019
(Continued)

OTHER PUBLICATIONS

GE Smart Digital Timer, published Jul. 2010.
(Continued)

*Primary Examiner* — Ahmed M Saeed

(57) ABSTRACT

A control attachment configured to control an application of power to a load is described. The control attachment may comprise a body portion adapted to be received by a power adapter; a plurality of contact elements extending from the control attachment, wherein the plurality of contact elements is adapted to be inserted into corresponding contact elements of the power adapter, and comprises a first contact element adapted to receive a first power signal from the power adapter and a second contact element adapted to receive a neutral signal from the power adapter, wherein the first power signal comprises a line power signal from the power adapter; and an actuator element extending from the body portion, wherein the actuator element is adapted to engage a corresponding switch element of the power adapter.

20 Claims, 48 Drawing Sheets

Related U.S. Application Data continuation-in-part of application No. 16/560,723, filed on Sep. 4, 2019, now Pat. No. 11,232,921.

(60) Provisional application No. 62/877,784, filed on Jul. 23, 2019, provisional application No. 62/869,002, filed on Jun. 30, 2019.

(51) Int. Cl.
*H01R 33/90* (2006.01)
*H01R 33/945* (2006.01)

(58) Field of Classification Search
CPC ...... H02G 3/083; H05B 47/19; H05B 47/185; H05B 47/10; H05B 47/11; H05B 45/10; H05B 45/37; H05B 47/105; H05B 45/00; H01H 2300/03
See application file for complete search history.

(56) References Cited

U.S. PATENT DOCUMENTS

| | | |
|---|---|---|
| 3,609,647 A | 9/1971 | Castellano |
| 3,663,865 A | 5/1972 | Stanback |
| 3,879,101 A | 4/1975 | McKissic |
| 3,895,225 A | 7/1975 | Prior |
| 4,117,258 A | 9/1978 | Shanker |
| 4,165,443 A | 8/1979 | Figart et al. |
| 4,166,934 A | 9/1979 | Marrero |
| 4,485,282 A | 11/1984 | Lee |
| 4,522,455 A | 6/1985 | Johnson |
| 4,546,418 A | 10/1985 | Baggio et al. |
| 4,546,419 A | 10/1985 | Johnson |
| 4,636,914 A | 1/1987 | Belli |
| 4,780,088 A | 10/1988 | Means |
| 4,839,477 A | 6/1989 | Orosz et al. |
| 4,893,062 A | 1/1990 | D'Aleo et al. |
| 5,064,386 A | 11/1991 | Dale et al. |
| 5,164,609 A | 11/1992 | Poppe et al. |
| 5,207,317 A | 5/1993 | Bryde et al. |
| 5,229,925 A | 7/1993 | Spencer et al. |
| 5,264,761 A | 11/1993 | Johnson |
| 5,357,170 A | 10/1994 | Luchaco et al. |
| 5,397,929 A | 3/1995 | Hogarth et al. |
| 5,399,806 A | 3/1995 | Olson |
| 5,471,012 A | 11/1995 | Opel |
| 5,473,517 A | 12/1995 | Blackman |
| 5,486,725 A | 1/1996 | Keizer et al. |
| 5,550,342 A | 8/1996 | Danek et al. |
| 5,574,256 A | 11/1996 | Cottone |
| 5,637,930 A | 6/1997 | Rowen et al. |
| 5,675,194 A | 10/1997 | Domigan |
| 5,735,710 A | 4/1998 | Blaauboer et al. |
| 5,735,714 A | 4/1998 | Orlando et al. |
| 5,813,873 A | 9/1998 | McBain et al. |
| 5,844,763 A | 12/1998 | Grace et al. |
| 5,915,984 A | 6/1999 | Rupert et al. |
| 5,957,564 A | 9/1999 | Bruce et al. |
| 5,990,635 A | 11/1999 | Ference |
| 6,000,807 A | 12/1999 | Moreland |
| 6,005,308 A | 12/1999 | Bryde et al. |
| 6,010,228 A | 1/2000 | Blackman et al. |
| 6,011,755 A | 1/2000 | Mulhall et al. |
| 6,045,232 A | 4/2000 | Buckmaster |
| 6,064,448 A | 5/2000 | Feng |
| 6,082,894 A | 7/2000 | Batko et al. |
| 6,087,588 A | 7/2000 | Soules |
| 6,154,774 A | 11/2000 | Furlong et al. |
| 6,169,377 B1 | 1/2001 | Bryde et al. |
| 6,211,581 B1 | 4/2001 | Farrant |
| 6,218,787 B1 | 4/2001 | Murcko et al. |
| 6,309,248 B1 | 10/2001 | King |
| 6,349,981 B1 | 2/2002 | King |
| 6,376,770 B1 | 4/2002 | Hyde |
| 6,423,900 B1 | 7/2002 | Soules |
| 6,424,096 B1 | 7/2002 | Lowe et al. |
| 6,530,806 B2 | 3/2003 | Nelson |
| 6,540,536 B1 | 4/2003 | Young |
| 6,540,554 B2 | 4/2003 | McCarthy |
| 6,545,587 B1 | 4/2003 | Hatakeyama et al. |
| 6,547,588 B1 | 4/2003 | Hsu et al. |
| 6,553,433 B1 | 4/2003 | Chang |
| 6,616,005 B1 | 9/2003 | Pereira et al. |
| 6,617,511 B2 | 9/2003 | Schultz et al. |
| 6,630,800 B2 | 10/2003 | Weng |
| 6,660,948 B2 | 12/2003 | Clegg et al. |
| 6,664,468 B2 | 12/2003 | Jarasse et al. |
| 6,666,712 B1 | 12/2003 | Kramer |
| 6,755,676 B2 | 6/2004 | Milan |
| 6,767,245 B2 | 7/2004 | King |
| 6,794,575 B1 | 9/2004 | McBain et al. |
| 6,797,900 B2 | 9/2004 | Hoffman |
| 6,798,341 B1 | 9/2004 | Eckel et al. |
| 6,805,469 B1 | 10/2004 | Barton |
| 6,843,680 B2 | 1/2005 | Gorman |
| 6,870,099 B1 | 3/2005 | Schultz et al. |
| 6,884,111 B2 | 4/2005 | Gorman |
| 6,894,221 B2 | 5/2005 | Gorman |
| 6,909,921 B1 | 6/2005 | Bilger |
| 6,940,016 B1 | 9/2005 | Cornett et al. |
| 6,945,815 B1 | 9/2005 | Mullally |
| 6,962,505 B1 | 11/2005 | Savicki, Jr. et al. |
| 6,965,801 B2 | 11/2005 | Hall |
| 6,989,489 B1 | 1/2006 | Savicki, Jr. |
| 7,045,975 B2 | 5/2006 | Evans |
| 7,081,009 B2 | 7/2006 | Gorman |
| 7,139,716 B1 | 11/2006 | Gaziz |
| 7,160,147 B1 | 1/2007 | Stephan |
| 7,161,313 B2 | 1/2007 | Piepgras et al. |
| 7,192,289 B2 | 3/2007 | Kowalski |
| 7,202,613 B2 | 4/2007 | Morgan et al. |
| 7,202,789 B1 | 4/2007 | Stilp |
| 7,223,122 B2 | 5/2007 | Mori |
| 7,232,336 B1 | 6/2007 | Evans |
| 7,257,465 B2 | 8/2007 | Perez et al. |
| 7,273,392 B2 | 9/2007 | Fields |
| 7,285,721 B1 | 10/2007 | Savicki, Jr. |
| 7,360,912 B1 | 4/2008 | Savicki, Jr. |
| 7,365,964 B2 | 4/2008 | Donahue |
| 7,367,121 B1 | 5/2008 | Gorman |
| 7,391,297 B2 | 6/2008 | Cash et al. |
| 7,400,239 B2 | 7/2008 | Kiko et al. |
| 7,480,534 B2 | 1/2009 | Bray et al. |
| 7,549,893 B1 | 6/2009 | Walker et al. |
| 7,576,285 B1 | 8/2009 | Savicki, Jr. |
| 7,614,893 B2 | 11/2009 | Khodorkovsky et al. |
| 7,641,491 B2 | 1/2010 | Altonen et al. |
| 7,649,472 B1 | 1/2010 | Paterno |
| 7,687,940 B2 | 3/2010 | Mosebrook et al. |
| 7,734,038 B2 | 6/2010 | Martich et al. |
| 7,767,905 B2 | 8/2010 | Meyer |
| 7,772,717 B2 | 8/2010 | Kitamura et al. |
| 7,791,282 B2 | 9/2010 | Yu et al. |
| 7,815,332 B1 | 10/2010 | Smith |
| 7,818,906 B2 | 10/2010 | Hansen et al. |
| 7,851,704 B2 | 12/2010 | Fitch et al. |
| 7,862,350 B2 | 1/2011 | Richter et al. |
| 7,873,062 B2 | 1/2011 | Binder |
| 7,906,873 B1 | 3/2011 | Roosli et al. |
| 7,964,989 B1 | 6/2011 | Puschnigg et al. |
| 7,976,338 B1 | 7/2011 | Webster et al. |
| 7,994,654 B2 | 8/2011 | Lee et al. |
| 7,998,312 B2 | 8/2011 | Nishida et al. |
| 8,011,937 B2 | 9/2011 | Oddsen et al. |
| 8,052,485 B2 | 11/2011 | Lee et al. |
| 8,058,552 B2 | 11/2011 | Kruse et al. |
| 8,067,906 B2 | 11/2011 | Null |
| 8,160,838 B2 | 4/2012 | Ramin et al. |
| 8,221,158 B2 | 7/2012 | Liao |
| 8,232,745 B2 | 7/2012 | Chemel et al. |
| 8,238,755 B2 | 8/2012 | Yamamoto et al. |
| 8,243,918 B2 | 8/2012 | Hazani et al. |
| 8,267,719 B1 | 9/2012 | Benoit et al. |
| 8,339,054 B2 | 12/2012 | Yu et al. |

(56) References Cited

U.S. PATENT DOCUMENTS

| | | |
|---|---|---|
| 8,344,667 B1 | 1/2013 | King |
| 8,360,810 B2 | 1/2013 | Binder |
| 8,384,241 B2 | 2/2013 | Chen et al. |
| 8,445,826 B2 | 5/2013 | Verfuerth |
| 8,471,480 B2 | 6/2013 | Kinderman et al. |
| 8,496,342 B2 | 7/2013 | Misener |
| 8,558,129 B2 | 10/2013 | Elliott et al. |
| 8,602,799 B2 | 12/2013 | Ganta et al. |
| 8,629,617 B2 | 1/2014 | Richards et al. |
| 8,658,893 B1 | 2/2014 | Shotey et al. |
| 8,668,347 B2 | 3/2014 | Ebeling |
| 8,710,770 B2 | 4/2014 | Woytowitz |
| 8,758,031 B2 | 6/2014 | Cheng et al. |
| 8,872,438 B2 | 10/2014 | Zhou et al. |
| 8,886,785 B2 | 11/2014 | Apte et al. |
| 8,963,437 B2 | 2/2015 | Wu |
| 8,965,411 B1 | 2/2015 | Busch-Sorensen et al. |
| 9,007,186 B1 | 4/2015 | Krummey et al. |
| 9,024,800 B2 | 5/2015 | Altonen et al. |
| 9,030,789 B2 | 5/2015 | Benoit et al. |
| 9,035,572 B1 | 5/2015 | Dolan |
| 9,095,053 B2 | 7/2015 | Trolese et al. |
| 9,112,319 B2 | 8/2015 | Liao et al. |
| 9,167,660 B2 | 10/2015 | Birch et al. |
| 9,184,590 B2 | 11/2015 | Testani |
| 9,214,773 B2 | 12/2015 | Misener |
| 9,293,376 B2 | 3/2016 | Su et al. |
| 9,312,673 B2 | 4/2016 | Byrne et al. |
| 9,320,162 B2 | 4/2016 | Kawamura et al. |
| 9,325,132 B2 | 4/2016 | Hsu |
| 9,351,353 B2 | 5/2016 | Recker et al. |
| 9,368,025 B2 | 6/2016 | Carmen |
| 9,368,982 B2 | 6/2016 | Jansen et al. |
| 9,380,685 B2 | 6/2016 | Shet et al. |
| 9,386,668 B2 | 7/2016 | Knapp et al. |
| 9,389,769 B1 | 7/2016 | O'Keeffe |
| 9,419,435 B2 | 8/2016 | Testani |
| 9,437,978 B2 | 9/2016 | Green |
| 9,451,745 B1 | 9/2016 | O'Shaughnessy et al. |
| 9,490,086 B2 | 11/2016 | Lagree et al. |
| 9,520,671 B2 | 12/2016 | Misener |
| 9,537,266 B1 | 1/2017 | Leach |
| 9,544,975 B2 | 1/2017 | Giltaca et al. |
| 9,581,342 B2 | 2/2017 | Daniels et al. |
| 9,589,461 B1 | 3/2017 | Byrne et al. |
| 9,603,223 B2 | 3/2017 | Patel et al. |
| 9,607,786 B2 | 3/2017 | Haines et al. |
| 9,608,418 B1 | 3/2017 | Elberbaum |
| 9,620,945 B2 | 4/2017 | Rohmer et al. |
| 9,633,584 B2 | 4/2017 | Underwood |
| 9,635,773 B1 | 4/2017 | Marshall |
| 9,640,962 B2 | 5/2017 | Hernandez Ramirez et al. |
| 9,680,656 B2 | 6/2017 | Rivera |
| 9,681,513 B2 | 6/2017 | Dadashnialehi et al. |
| 9,692,236 B2 | 6/2017 | Wootton et al. |
| 9,693,428 B2 | 6/2017 | Wagner et al. |
| 9,699,863 B2 | 7/2017 | Weightman et al. |
| 9,769,420 B1 | 9/2017 | Moses |
| 9,781,245 B2 | 10/2017 | Miller |
| 9,782,509 B2 | 10/2017 | Murahari et al. |
| 9,793,697 B1 | 10/2017 | Colao et al. |
| 9,799,469 B2 | 10/2017 | Bailey et al. |
| 9,826,604 B2 | 11/2017 | Karc et al. |
| 9,762,056 B1 | 12/2017 | Miller et al. |
| 9,837,753 B1 | 12/2017 | Chen |
| 9,837,813 B2 | 12/2017 | Newell et al. |
| 9,842,584 B1 | 12/2017 | Hart et al. |
| 9,866,990 B2 | 1/2018 | Cairns et al. |
| 9,964,447 B2 | 5/2018 | Fadell et al. |
| 10,048,653 B2 | 8/2018 | Ostrovsky et al. |
| 10,050,393 B1 | 8/2018 | Calabrese |
| 10,062,533 B2 | 8/2018 | Qureshi et al. |
| 10,063,002 B2 | 8/2018 | Richardson et al. |
| 10,069,235 B2 | 9/2018 | Blase et al. |
| 10,070,539 B2 | 9/2018 | Gates et al. |
| 10,078,786 B2 | 9/2018 | Richardson et al. |
| 10,084,272 B1 | 9/2018 | Hayes et al. |
| 10,096,951 B1 | 10/2018 | Hodge |
| 10,136,292 B2 | 11/2018 | Bosua et al. |
| 10,153,113 B2 | 12/2018 | Richardson et al. |
| 10,161,806 B2 | 12/2018 | Lermann |
| 10,175,996 B2 | 1/2019 | Byrne et al. |
| 10,188,300 B2 | 1/2019 | Tanaka |
| 10,193,285 B1 | 1/2019 | Satyanarayanan et al. |
| 10,225,005 B1 | 3/2019 | Elberbaum |
| 10,249,998 B2 | 4/2019 | Irons et al. |
| 10,381,792 B2 | 4/2019 | Hsu et al. |
| 10,349,536 B2 | 7/2019 | Li |
| 10,359,298 B2 | 7/2019 | Quady et al. |
| 10,375,803 B2 | 8/2019 | Dimberg et al. |
| 10,412,206 B2 | 9/2019 | Liang et al. |
| 10,418,813 B1 | 9/2019 | King |
| 10,425,236 B2 | 9/2019 | Bryne et al. |
| 10,431,940 B1 | 10/2019 | Walma, Jr. |
| 10,530,597 B1 | 1/2020 | King |
| 10,554,059 B1 | 2/2020 | Hemingway et al. |
| 10,587,147 B2 | 3/2020 | Carmen, Jr. |
| 10,621,113 B2 | 4/2020 | Bryne et al. |
| 10,667,347 B2 | 5/2020 | Fadell et al. |
| 10,699,131 B2 | 6/2020 | Richardson et al. |
| 10,700,477 B1 | 6/2020 | Richardson et al. |
| 10,716,194 B2 | 7/2020 | Chema et al. |
| 10,720,764 B2 | 7/2020 | Misener et al. |
| 10,726,835 B2 | 7/2020 | Chua et al. |
| 10,727,731 B1 | 7/2020 | King |
| 10,741,984 B2 | 8/2020 | Chin |
| 10,917,956 B1 | 2/2021 | King et al. |
| 10,938,168 B2 | 3/2021 | King et al. |
| 10,944,220 B1 | 3/2021 | Richardson et al. |
| 10,958,020 B1 | 3/2021 | King et al. |
| 10,958,026 B1 | 3/2021 | King et al. |
| 10,965,068 B1 | 3/2021 | King et al. |
| 10,996,645 B1 | 5/2021 | King |
| 11,005,247 B1 | 5/2021 | Booyse et al. |
| 11,043,768 B1 | 6/2021 | King |
| 11,050,254 B2 | 6/2021 | King |
| 11,050,340 B2 | 6/2021 | King |
| 11,121,513 B2 | 9/2021 | Chien |
| 11,189,948 B1 | 11/2021 | King |
| 11,189,975 B1 | 11/2021 | Baldwin |
| 11,190,918 B1 | 11/2021 | Lingle et al. |
| 11,201,444 B1 | 12/2021 | King |
| 11,219,108 B1 | 1/2022 | King |
| 11,231,730 B1 * | 1/2022 | King ................... H01R 31/065 |
| 11,264,769 B1 | 3/2022 | King et al. |
| 11,456,584 B1 | 9/2022 | Taylor et al. |
| 11,460,874 B1 | 10/2022 | King et al. |
| 11,502,461 B1 | 11/2022 | King et al. |
| 11,521,472 B1 | 12/2022 | Rintz et al. |
| 11,564,320 B1 | 1/2023 | Zaharchuk et al. |
| 11,715,917 B1 | 8/2023 | Baldwin et al. |
| 2002/0052138 A1 | 5/2002 | Janik |
| 2002/0086567 A1 | 7/2002 | Cash |
| 2003/0021104 A1 | 1/2003 | Tsao |
| 2004/0009700 A1 | 1/2004 | Patel |
| 2004/0051485 A1 | 3/2004 | Chansky et al. |
| 2004/0075401 A1 | 4/2004 | Segan et al. |
| 2004/0077212 A1 | 4/2004 | Pulizzi |
| 2004/0177986 A1 | 9/2004 | Gorman |
| 2004/0218379 A1 | 11/2004 | Barton |
| 2004/0218411 A1 | 11/2004 | Luu et al. |
| 2005/0040772 A1 | 2/2005 | Guzman et al. |
| 2005/0055106 A1 | 3/2005 | Beutler et al. |
| 2005/0075741 A1 | 4/2005 | Altmann et al. |
| 2005/0104533 A1 | 5/2005 | Barthelmess |
| 2005/0122718 A1 | 6/2005 | Kazar et al. |
| 2005/0125083 A1 | 6/2005 | Kiko |
| 2005/0136972 A1 | 6/2005 | Smith et al. |
| 2005/0194243 A1 | 9/2005 | Prineppi |
| 2005/0252753 A1 | 11/2005 | Leo |
| 2005/0275981 A1 | 12/2005 | Power et al. |
| 2006/0025012 A1 | 2/2006 | Fields |
| 2006/0065510 A1 | 3/2006 | Kiko et al. |
| 2006/0066151 A1 | 3/2006 | Hatemata |

(56) References Cited

U.S. PATENT DOCUMENTS

| | | |
|---|---|---|
| 2006/0066510 A1 | 3/2006 | Takahashi |
| 2006/0262462 A1 | 11/2006 | Barton |
| 2007/0072476 A1 | 3/2007 | Milan |
| 2007/0099491 A1 | 5/2007 | Pyrros |
| 2007/0197262 A1 | 8/2007 | Smith et al. |
| 2007/0216318 A1 | 9/2007 | Altonen et al. |
| 2007/0217404 A1 | 9/2007 | Kawamata |
| 2007/0247366 A1 | 10/2007 | Smith et al. |
| 2008/0012423 A1 | 1/2008 | Mimran |
| 2008/0020632 A1 | 1/2008 | Gorman |
| 2008/0079568 A1 | 4/2008 | Primous et al. |
| 2008/0093100 A1 | 4/2008 | Bhakta |
| 2008/0104533 A1 | 5/2008 | List |
| 2008/0111501 A1 | 5/2008 | Dobbins et al. |
| 2008/0156510 A1 | 7/2008 | Yan |
| 2009/0039706 A1 | 2/2009 | Kotlyar et al. |
| 2009/0045817 A1 | 2/2009 | Savicki, Jr. et al. |
| 2009/0058707 A1 | 3/2009 | Craze et al. |
| 2009/0103228 A1 | 4/2009 | Elderbaum |
| 2009/0107693 A1 | 4/2009 | Meyer |
| 2009/0194311 A1 | 4/2009 | Merrill |
| 2009/0137163 A1 | 5/2009 | Schoettle |
| 2009/0180261 A1 | 7/2009 | Angelides et al. |
| 2009/0189542 A1 | 7/2009 | Wu et al. |
| 2009/0247006 A1 | 10/2009 | Thompson |
| 2009/0251127 A1 | 10/2009 | Kim |
| 2009/0261661 A1 | 10/2009 | Finneran |
| 2009/0278479 A1 | 11/2009 | Platner et al. |
| 2010/0006648 A1 | 1/2010 | Grant et al. |
| 2010/0026194 A1 | 2/2010 | Paton |
| 2010/0066484 A1 | 3/2010 | Hanwright et al. |
| 2010/0070100 A1 | 3/2010 | Finlinson et al. |
| 2010/0084996 A1 | 4/2010 | Van De Sluis et al. |
| 2010/0130053 A1 | 5/2010 | Ziobro |
| 2010/0201267 A1 | 8/2010 | Bourquin et al. |
| 2010/0308735 A1 | 12/2010 | Liu et al. |
| 2011/0021040 A1 | 1/2011 | Garb et al. |
| 2011/0031819 A1 | 2/2011 | Gunwall |
| 2011/0035029 A1 | 2/2011 | Yianni et al. |
| 2011/0043034 A1 | 2/2011 | Pien |
| 2011/0124350 A1 | 5/2011 | Sukovic |
| 2011/0140548 A1 | 6/2011 | Hakkarainen et al. |
| 2011/0148309 A1 | 6/2011 | Reid et al. |
| 2011/0178650 A1 | 7/2011 | Picco |
| 2011/0211425 A1 | 9/2011 | Liu |
| 2011/0287665 A1 | 11/2011 | Chien |
| 2012/0021623 A1 | 1/2012 | Gorman |
| 2012/0025717 A1 | 2/2012 | Klusmann et al. |
| 2012/0049639 A1 | 3/2012 | Besore et al. |
| 2012/0060044 A1 | 3/2012 | Jonsson |
| 2012/0063486 A1 | 3/2012 | Yamawaku et al. |
| 2012/0066168 A1 | 3/2012 | Fadell et al. |
| 2012/0088399 A1 | 4/2012 | Perritt |
| 2012/0088493 A1 | 4/2012 | Chen et al. |
| 2012/0094511 A1 | 4/2012 | Sil |
| 2012/0112666 A1 | 5/2012 | Bennette |
| 2012/0139348 A1 | 6/2012 | DuBose |
| 2012/0161973 A1 | 6/2012 | Hsu |
| 2012/0195045 A1 | 8/2012 | King |
| 2012/0239773 A1 | 9/2012 | Blustein et al. |
| 2012/0274219 A1 | 11/2012 | Woytowitz et al. |
| 2012/0286940 A1 | 11/2012 | Carmen et al. |
| 2012/0292174 A1 | 11/2012 | Mah et al. |
| 2012/0302219 A1 | 11/2012 | Vang |
| 2012/0318657 A1 | 12/2012 | Hoffknecht et al. |
| 2013/0010018 A1 | 1/2013 | Economy |
| 2013/0026947 A1 | 1/2013 | Economy et al. |
| 2013/0026953 A1 | 1/2013 | Woytowitz |
| 2013/0040471 A1 | 2/2013 | Gervais |
| 2013/0040489 A1 | 2/2013 | Fang |
| 2013/0045624 A1 | 2/2013 | Snyder |
| 2013/0063042 A1 | 3/2013 | Bora et al. |
| 2013/0147367 A1 | 6/2013 | Cowburn |
| 2013/0155723 A1 | 6/2013 | Coleman |
| 2013/0196535 A1 | 8/2013 | Utz |
| 2013/0226354 A9 | 8/2013 | Ruff et al. |
| 2013/0234534 A1 | 9/2013 | Lin |
| 2013/0240235 A1 | 9/2013 | Higashihama et al. |
| 2013/0257315 A1 | 10/2013 | Restrepo et al. |
| 2013/0260613 A1 | 10/2013 | Misener |
| 2013/0264997 A1 | 10/2013 | Lee et al. |
| 2013/0267116 A1 | 10/2013 | Tin |
| 2013/0270097 A1 | 10/2013 | Cheng |
| 2014/0006660 A1 | 1/2014 | Frei et al. |
| 2014/0028287 A1 | 1/2014 | Brookes |
| 2014/0070959 A1 | 3/2014 | Bhargava et al. |
| 2014/0090865 A1 | 4/2014 | Potucek et al. |
| 2014/0126118 A1 | 5/2014 | Ewing et al. |
| 2014/0166447 A1 | 6/2014 | Thea et al. |
| 2014/0180487 A1 | 6/2014 | Bull |
| 2014/0239843 A1 | 8/2014 | Hoang |
| 2014/0244040 A1 | 8/2014 | Alberth, Jr. et al. |
| 2014/0265883 A1 | 9/2014 | Mortun |
| 2014/0266287 A1 | 9/2014 | Reeder, III |
| 2014/0273618 A1* | 9/2014 | King ................. H01R 43/20 439/535 |
| 2014/0285095 A1 | 9/2014 | Chemel et al. |
| 2014/0308853 A1 | 10/2014 | Colahan et al. |
| 2014/0320312 A1 | 10/2014 | Sager et al. |
| 2014/0334648 A1 | 11/2014 | Wang |
| 2014/0368977 A1 | 12/2014 | Lenny |
| 2015/0035476 A1 | 2/2015 | Frid et al. |
| 2015/0115728 A1 | 4/2015 | Yamamoto et al. |
| 2015/0115801 A1 | 4/2015 | King |
| 2015/0136437 A1 | 5/2015 | Hitchman |
| 2015/0163867 A1 | 6/2015 | Recker et al. |
| 2015/0168931 A1 | 6/2015 | Jin |
| 2015/0189726 A1 | 7/2015 | Spira |
| 2015/0228426 A1 | 8/2015 | Romano et al. |
| 2015/0229026 A1 | 8/2015 | Lindmark |
| 2015/0249337 A1 | 9/2015 | Raneri et al. |
| 2015/0253364 A1 | 9/2015 | Hieda et al. |
| 2015/0255932 A1 | 9/2015 | Dicks et al. |
| 2015/0256355 A1 | 9/2015 | Pera et al. |
| 2015/0256665 A1 | 9/2015 | Pera et al. |
| 2015/0295438 A1 | 10/2015 | Herr et al. |
| 2015/0303724 A1 | 10/2015 | Lin et al. |
| 2015/0334676 A1 | 11/2015 | Hart et al. |
| 2015/0351187 A1 | 12/2015 | McBryde et al. |
| 2015/0357133 A1 | 12/2015 | Keirstead et al. |
| 2015/0366039 A1 | 12/2015 | Noori et al. |
| 2015/0373796 A1 | 12/2015 | Bahrehmand |
| 2015/0382436 A1 | 12/2015 | Kelly et al. |
| 2016/0006202 A1 | 1/2016 | Dupuis et al. |
| 2016/0007288 A1 | 1/2016 | Samardzija et al. |
| 2016/0036819 A1 | 2/2016 | Zehavi et al. |
| 2016/0041573 A1 | 2/2016 | Chen et al. |
| 2016/0044447 A1 | 2/2016 | Tetreault et al. |
| 2016/0050695 A1 | 2/2016 | Bichot et al. |
| 2016/0066130 A1 | 3/2016 | Bosua et al. |
| 2016/0125733 A1 | 5/2016 | Sallas et al. |
| 2016/0126031 A1 | 5/2016 | Wootton et al. |
| 2016/0126950 A1 | 5/2016 | Lucantonio |
| 2016/0172808 A1 | 6/2016 | Lauby et al. |
| 2016/0209899 A1 | 7/2016 | Brantner et al. |
| 2016/0212832 A1 | 7/2016 | King |
| 2016/0219728 A1 | 7/2016 | Balyan |
| 2016/0233605 A1 | 8/2016 | Hernandez Ramirez et al. |
| 2016/0233707 A1 | 8/2016 | Kidakarn |
| 2016/0255697 A1 | 9/2016 | Bhide |
| 2016/0255702 A1 | 9/2016 | Thompson |
| 2016/0276946 A1 | 9/2016 | Fuchs et al. |
| 2016/0322754 A1 | 11/2016 | Green |
| 2016/0323972 A1 | 11/2016 | Bora et al. |
| 2016/0337801 A1 | 11/2016 | Houri |
| 2017/0023963 A1 | 1/2017 | Davis et al. |
| 2017/0025845 A1 | 1/2017 | Platise |
| 2017/0025854 A1 | 1/2017 | Willis et al. |
| 2017/0033566 A1 | 2/2017 | Jursch |
| 2017/0033942 A1 | 2/2017 | Koeninger |
| 2017/0054315 A1 | 2/2017 | Chien |
| 2017/0063008 A1 | 3/2017 | Goyal et al. |
| 2017/0070090 A1 | 3/2017 | Miller |
| 2017/0093105 A1 | 3/2017 | Belinksky et al. |

(56) References Cited

U.S. PATENT DOCUMENTS

| | | |
|---|---|---|
| 2017/0105176 A1 | 4/2017 | Finnegan et al. |
| 2017/0108236 A1 | 4/2017 | Guan et al. |
| 2017/0148443 A1 | 5/2017 | Hadier et al. |
| 2017/0149180 A1 | 5/2017 | Siegler |
| 2017/0162985 A1 | 6/2017 | Randall et al. |
| 2017/0188442 A1 | 6/2017 | King |
| 2017/0221654 A1 | 8/2017 | Danowski et al. |
| 2017/0223807 A1 | 8/2017 | Recker et al. |
| 2017/0229937 A1 | 8/2017 | Pedersen |
| 2017/0236766 A1 | 8/2017 | Read et al. |
| 2017/0237198 A1 | 8/2017 | Sathyanarayana et al. |
| 2017/0238401 A1 | 8/2017 | Sadwick et al. |
| 2017/0250550 A1 | 8/2017 | Miftakhov et al. |
| 2017/0257096 A1 | 9/2017 | Lark et al. |
| 2017/0257930 A1 | 9/2017 | Lark et al. |
| 2017/0271921 A1 | 9/2017 | Lombardi et al. |
| 2017/0273203 A1 | 9/2017 | Iaconis |
| 2017/0295623 A1 | 10/2017 | Pennycooke |
| 2017/0295624 A1 | 10/2017 | Lark et al. |
| 2017/0295625 A1 | 10/2017 | Lark et al. |
| 2017/0295630 A1 | 10/2017 | Lark et al. |
| 2017/0295631 A1 | 10/2017 | Lark et al. |
| 2017/0310049 A1 | 10/2017 | Derousse |
| 2017/0328777 A1 | 11/2017 | Zeckendorf et al. |
| 2018/0012710 A1 | 1/2018 | Lark et al. |
| 2018/0013428 A1 | 1/2018 | Lark |
| 2018/0014381 A1 | 1/2018 | Lark |
| 2018/0014384 A1 | 1/2018 | Charlton |
| 2018/0014388 A1 | 1/2018 | Pennycooke et al. |
| 2018/0014390 A1 | 1/2018 | Aylward et al. |
| 2018/0014391 A1 | 1/2018 | Lark et al. |
| 2018/0014392 A1 | 1/2018 | Charlton et al. |
| 2018/0014393 A1 | 1/2018 | Cheung et al. |
| 2018/0048710 A1 | 2/2018 | Altin |
| 2018/0070424 A1 | 3/2018 | Lark et al. |
| 2018/0070429 A1 | 3/2018 | Lark |
| 2018/0070430 A1 | 3/2018 | Edwards et al. |
| 2018/0070431 A1 | 3/2018 | Charlton et al. |
| 2018/0107187 A1 | 4/2018 | Singh |
| 2018/0109999 A1 | 4/2018 | Finnegan |
| 2018/0168900 A1 | 6/2018 | McNeely et al. |
| 2018/0175600 A1 | 6/2018 | Holloway |
| 2018/0210538 A1 | 7/2018 | Aimone |
| 2018/0233006 A1 | 8/2018 | Koniarek et al. |
| 2018/0302235 A1 | 10/2018 | Cregg et al. |
| 2018/0316189 A1 | 11/2018 | Mozayeny |
| 2018/0337495 A1 | 11/2018 | Martinez |
| 2018/0356964 A1 | 12/2018 | Morris |
| 2018/0359873 A1 | 12/2018 | Shemirani |
| 2018/0375313 A1 | 12/2018 | Misener et al. |
| 2018/0375342 A1 | 12/2018 | Sultenfuss et al. |
| 2019/0027876 A1 | 1/2019 | Murahari et al. |
| 2019/0069419 A1 | 2/2019 | Li |
| 2019/0081445 A1 | 3/2019 | Kuhn et al. |
| 2019/0171413 A1 | 6/2019 | Beatty et al. |
| 2019/0199545 A1 | 6/2019 | Ard et al. |
| 2019/0229478 A1 | 7/2019 | Iaconis et al. |
| 2019/0252814 A1 | 8/2019 | Richardson et al. |
| 2019/0282016 A1 | 9/2019 | Long et al. |
| 2019/0386468 A1 | 12/2019 | Ewing et al. |
| 2020/0006023 A1 | 1/2020 | Qureshi et al. |
| 2020/0006886 A1 | 1/2020 | Chen |
| 2020/0006948 A1 | 1/2020 | Wootton et al. |
| 2020/0036141 A1 | 1/2020 | Smith et al. |
| 2020/0044381 A1 | 2/2020 | Stremlau et al. |
| 2020/0143667 A1 | 5/2020 | Zimmer |
| 2020/0144007 A1 | 5/2020 | Shivell |
| 2020/0194980 A1 | 6/2020 | Roosli et al. |
| 2020/0195015 A1 | 6/2020 | Chien |
| 2020/0203905 A1 | 6/2020 | Parks |
| 2020/0220292 A1 | 7/2020 | Audy |
| 2020/0227998 A1 | 7/2020 | King |
| 2020/0228954 A1 | 7/2020 | Bosua et al. |
| 2020/0249785 A1 | 8/2020 | Anadasu |
| 2020/0328586 A1 | 10/2020 | Ericksen et al. |
| 2021/0048910 A1 | 2/2021 | Anadasu et al. |
| 2021/0104855 A1 | 4/2021 | Bayard et al. |
| 2021/0164227 A1 | 6/2021 | Zhou et al. |
| 2021/0173364 A1 | 6/2021 | Telefus et al. |
| 2021/0184443 A1 | 6/2021 | Rohmer |
| 2021/0212185 A1 | 7/2021 | Diesel et al. |
| 2021/0263111 A1 | 8/2021 | Magno |
| 2021/0285258 A1 | 9/2021 | Leigh |
| 2021/0288434 A1 | 9/2021 | Ramsey et al. |
| 2021/0305759 A1 | 9/2021 | Bhakta et al. |
| 2021/0313733 A1 | 10/2021 | Martin et al. |
| 2021/0344182 A1 | 11/2021 | Fernandez |
| 2021/0211121 A1 | 12/2021 | Petry |
| 2021/0391803 A1 | 12/2021 | Martinez et al. |
| 2021/0399574 A1 | 12/2021 | Wiggins et al. |
| 2022/0037861 A1 | 2/2022 | McKimmey |
| 2022/0045464 A1 | 2/2022 | Leahy |
| 2022/0149571 A1 | 5/2022 | Codreanu et al. |
| 2022/0171355 A1 | 6/2022 | Jahan et al. |
| 2022/0201825 A1 | 6/2022 | Cohen et al. |
| 2022/0209821 A1 | 6/2022 | Eriksen et al. |
| 2022/0232689 A1 | 7/2022 | Shurte et al. |
| 2022/0247408 A1 | 8/2022 | Bacchin et al. |
| 2022/0279665 A1 | 9/2022 | McDonald |
| 2022/0297558 A1 | 9/2022 | Daoura et al. |
| 2022/0313370 A1 | 10/2022 | Morgan et al. |
| 2022/0320808 A1 | 10/2022 | Armstrong |
| 2022/0342373 A1 | 10/2022 | Ho et al. |
| 2022/0344883 A1 | 10/2022 | Misener et al. |
| 2022/0385063 A1 | 12/2022 | Protzman et al. |
| 2022/0408169 A1 | 12/2022 | Ebeling et al. |
| 2023/0034501 A1 | 2/2023 | Pinkowski et al. |
| 2023/0070789 A1 | 3/2023 | Kearney et al. |
| 2023/0075542 A1 | 3/2023 | Padro et al. |
| 2023/0209756 A1 | 6/2023 | Brower et al. |
| 2023/0231410 A1 | 7/2023 | Nakada et al. |
| 2023/0236554 A1 | 7/2023 | Godfrey et al. |
| 2023/0297048 A1 | 9/2023 | Larson |

FOREIGN PATENT DOCUMENTS

| | | |
|---|---|---|
| CN | 104934796 | 9/2015 |
| DE | 102011054357 | 4/2013 |
| IN | 1960CHE2012 | 11/2013 |
| IN | 201914042059 | 4/2020 |
| JP | 2014053239 | 3/2014 |
| KR | 100801042 | 11/2006 |
| KR | 101174730 | 8/2012 |
| KR | 10-1790779 | 11/2017 |
| KR | 20170068580 | 11/2017 |
| KR | 101995664 | 2/2019 |
| WO | 09832208 | 7/1998 |
| WO | 2002052703 | 7/2002 |
| WO | 2005078871 | 8/2005 |
| WO | 2013012170 | 1/2013 |
| WO | 2014047634 | 3/2014 |
| WO | 2017178680 | 4/2017 |
| WO | 2018219748 | 6/2018 |
| WO | 2020144669 | 7/2020 |
| WO | 2020146046 | 7/2020 |
| WO | 2021056100 | 4/2021 |
| WO | 2022046860 | 3/2022 |
| WO | 2022266230 | 12/2022 |
| WO | 3033266230 | 12/2022 |

OTHER PUBLICATIONS

GE Digital Time Switch, published Nov. 24, 2009.
SmartLink-INSTEON Smarthome, published Aug. 27, 2008.
Schlage LiNK RP200 Light Module User Manual, published Mar. 2009.
Brinks 44-1074 Timer User Manual, published 2010.
Swidget outlet WiFi-USB Charger, published Jul. 2017.
Swidget Switch First Modular Dimmable Wall Switch, published Jul. 2019.
Intermatic SS8 User Manual, published Sep. 13, 2002.
Intermatic EJ500C User Manual, published Aug. 3, 2004.

(56) References Cited

OTHER PUBLICATIONS

Lutron Caseta Discover the Power of Smart Lighting, published Nov. 2017.
Sylvania Model SA135, published 2010.
GE SunSmart Digital Timer published 2010.
A System for Smart-Home Control of Appliances Based on Timer and Speech Interaction, Jan. 2006.
GE Touchsmart In-Wall Digital Timer, published 2014.
Noon home Lighting System, published Oct. 2017.
Leviton Split Duplex Receptacle, published 2017.
Leviton Plug-in Outlet with Z-Wave Technology, published 2017.
Heath/Zenith Motion Sensor Light Control, published 2012.
Leviton Load Center Brochure, published 2019.
Sylvania SA 170 User Manual, published Aug. 17, 2005.
GE Wireless Lighting Control 45631 Keypad Controller User Manual, published Apr. 2010.
Decora Preset Slide & Rotary Controls, published 2014.
Philips Hue Wall Switch Module, Personal Wireless Lighting, Mar. 2021.
Anchor by Panasonic, Vision Product Brochure, 2013.
PowerTech Smart Wall CES 2020 Innovation Awards, 2019.
Himel Click Series Catalog, 2016.
Himel Click Series 2 Gang Socket brochure, 2016.
U.S. Appl. No. 16/805,717, entitled "A Power Switch Having a Voice Activated User Interface," filed Feb. 29, 2020 and having a priority date of Nov. 28, 2016.
Leviton Voice Dimmer with Amazon Alexa Built-in. published Mar. 2020.
Deako Switch Brochure, published 2015.
Amazon Echo Flex Sales Brochure, published 2019.
U.S. Appl. No. 15/645,699, filed Jul. 10, 2017.
My Q Chamberlain Smart Light Switch Brochure, published 2017.
Ecobee Switch Brochure, Lighting that's so Smart, It's Brilliant, published 2019.
U.S. Appl. No. 16/125,866, CEIC501P1D1, filed Sep. 10, 2018.
Lutron Installation Instructions For Receptacles For Dimming Use, published 2007.
Intermatic Ascend Timer Installation and Operation Manual, published 2018.
Brinks Home Office 441074B Timer, published Mar. 2010.
Control4 Squared Wired Configurable Keypad V2, published 2016.
Decora Wired Keypad Data Sheet Control C4-KCB, published 2014.
Legrand AlphaRex 3 The New Generation, published May 2016.
Legrand Pass & Seymour Specification Grade Self-test GFCIs, published Dec. 2015.
Legrand Pass & Seymour Tamper-Resistant Duplex Outlet with Nightlight, published May 2014.
Legrand Time Switches and Modular Control Devices, published May 2016.
Leviton Renu Color Change Instructions, published 2010.
Lutron Energi TriPak, published Nov. 2014.
WiFi Smart Plug, Mini Outlets Smart Socket No Hub Required Timing Function Control Your Electric Devices from Anywhere, published 2017.
WiFi Smart Power Strip, Conico Smart Surge Protector with 4 USB Ports and 4 Smart AC Plugs, published 2017.
Jasco GE Enbrighten Add-On Switch P/N 46199, date 2019.
Feit Smart Wi-Fi Dimmer P/N Dim/Wifi, date 2022.
Leviton Motion Sensor Remote P/N IPVOR, date 2017.
Jasco GE Enbrighten Zigbee Smart Dimmer P/N 46203, date 2019.
Scene_Controller_Guides_Deako_Support, published 2018.
Leviton Decore Matching Remote P/N Door-Dl, date 2019.
Deako_Backplate and Simple Switch Instruction Guide, published 2020.
Backplate_Wiring_Instructions_Deako_Support, published 2018.
Smart_Dimmer_Guides_Deako_Support, published 2018.
Smart_Switch_Guides_Deako_Support, published 2018.
Motion_Sensor_Timer_Guide_Deako_support, published 2018.
Decora Universal Dimmer Frequently Asked Questions, published 2017.
Lutron Maestro Cl Pro Dimmer, P/N 0301946 Rev A, 2019.
Leviton Decora 3-Way Dimmer and Universal Matching Remote (DDROOR-DLZ) Installation Instructions, 2019.
Leviton Decora Slide Dimmer, Cat. No. IPL06 Installation Instructions, published 2011.
Leviton Decora Smart Second Generation Dimmer, Cat. No. D26HD Getting Started Guide, published 2021.
Leviton Single Pole, 3-Way Slide Dimmer, Cat. No.6674-P Install Instructions, published 2011.
Leviton Decora Single Pole and 3-Way LED Dimmer Cat. No. DDM06-1L Installation Instructions, 2020.
PCT Communication in Cases for which No Other Form is Applicable, PCT/US2022/048393, Dec. 13, 2023.
Leviton Decora Single Pole and 3 Way Wide View Motion Activated Light Control, Cat. No. IPS15, IPV15 published 2012.
Jasco GE Enbrighten Smart Switch P/N 46201, date 2019.

\* cited by examiner

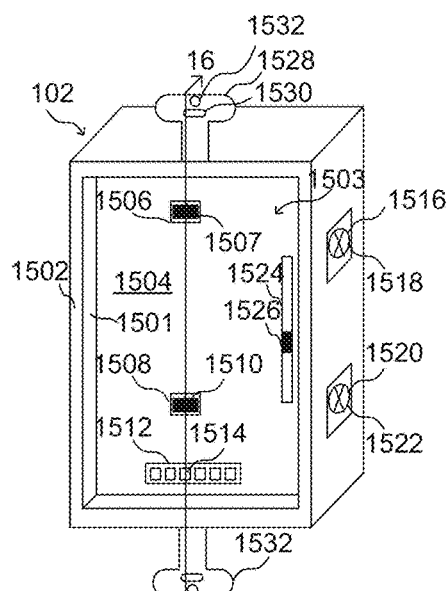
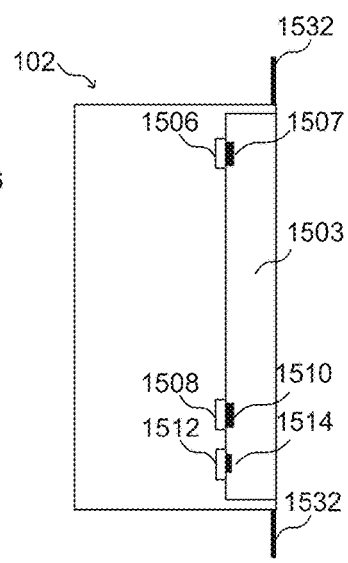
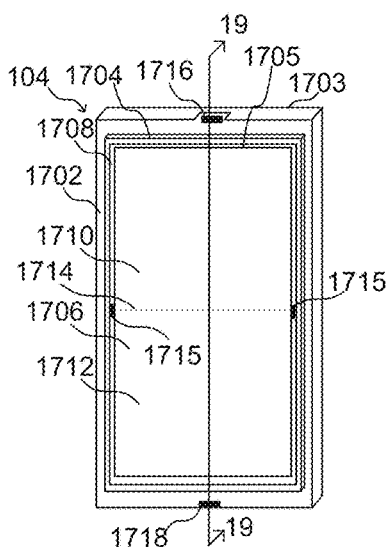
FIG. 15    FIG. 16    FIG. 17
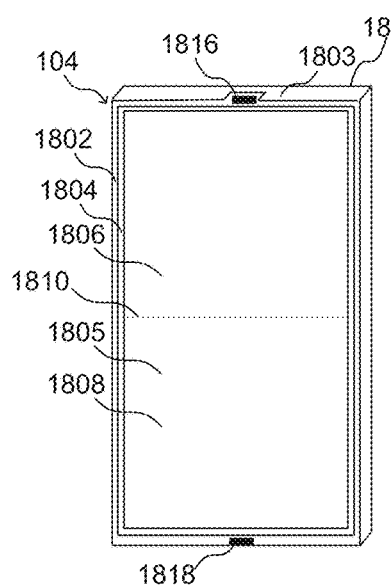
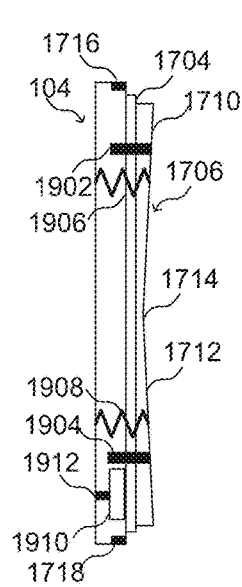
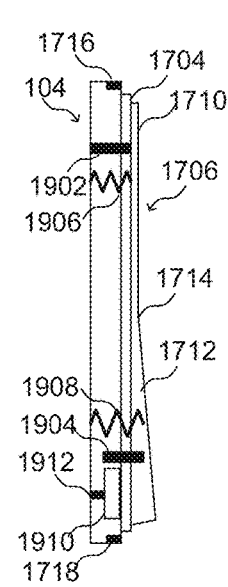
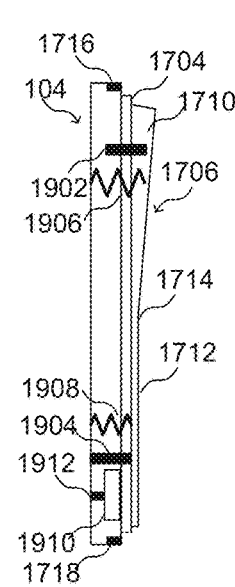
FIG. 18    FIG. 19    FIG. 20    FIG. 21

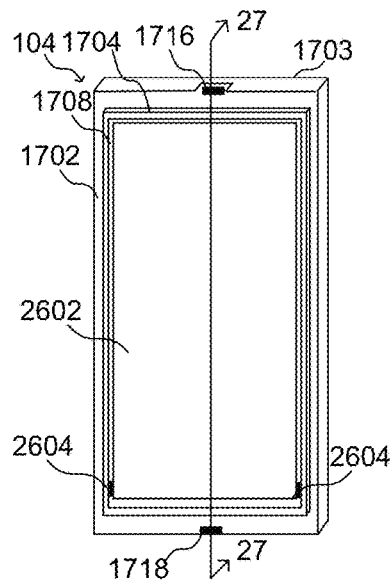
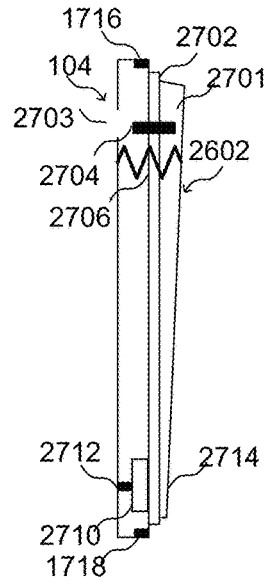
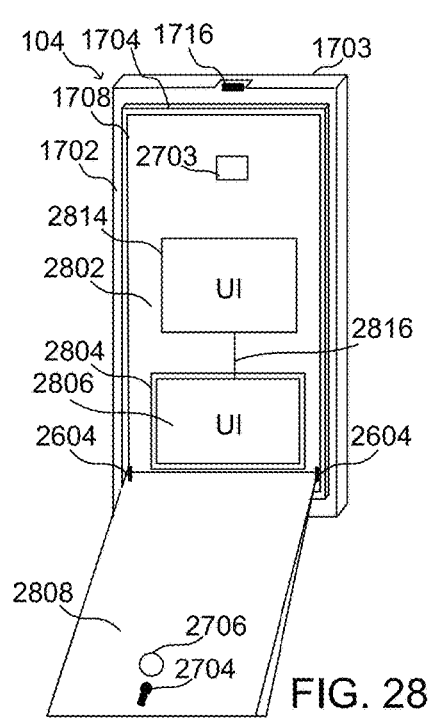
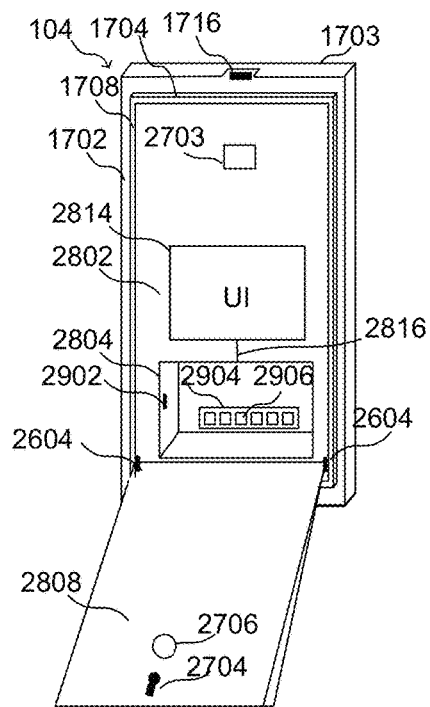
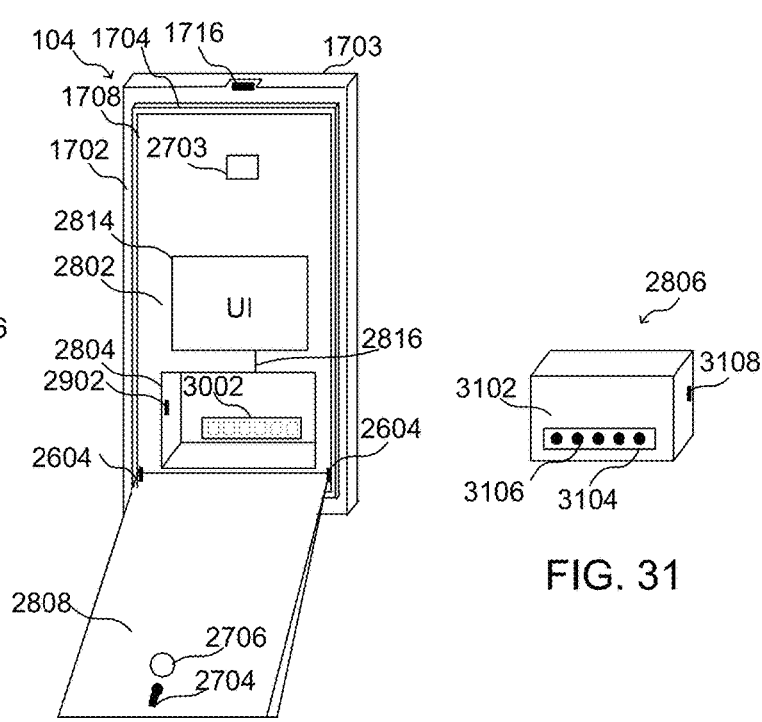
FIG. 26
FIG. 27
FIG. 28
FIG. 29
FIG. 30
FIG. 31

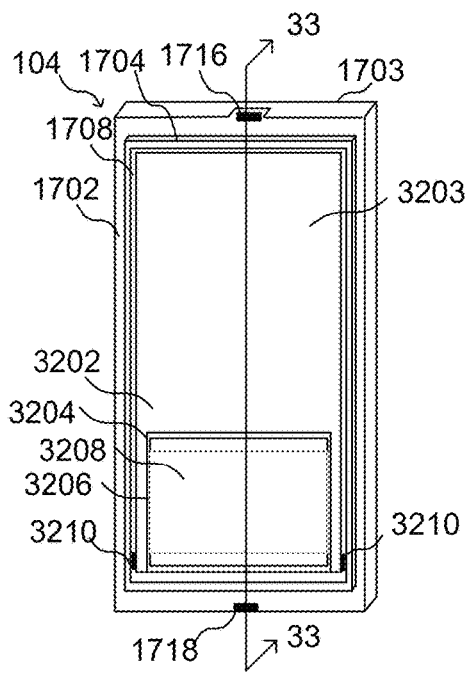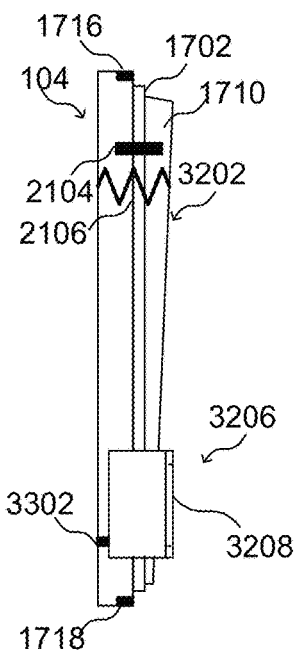
FIG. 32      FIG. 33
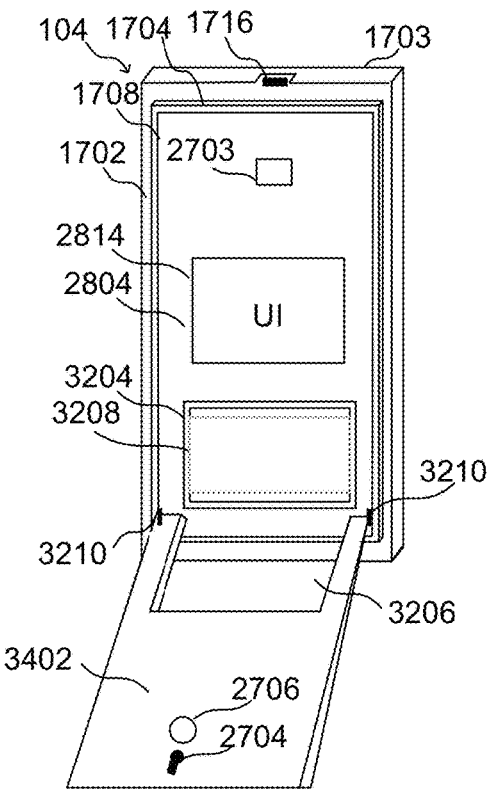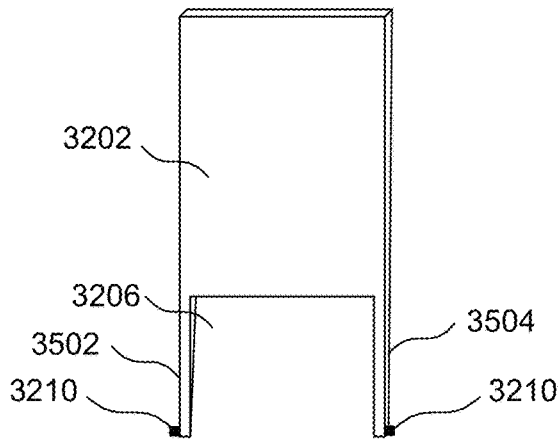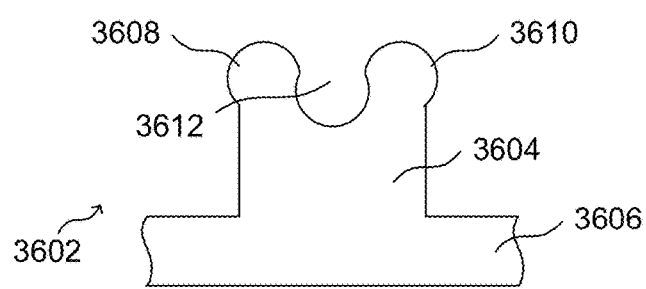
FIG. 34      FIG. 35      FIG. 36

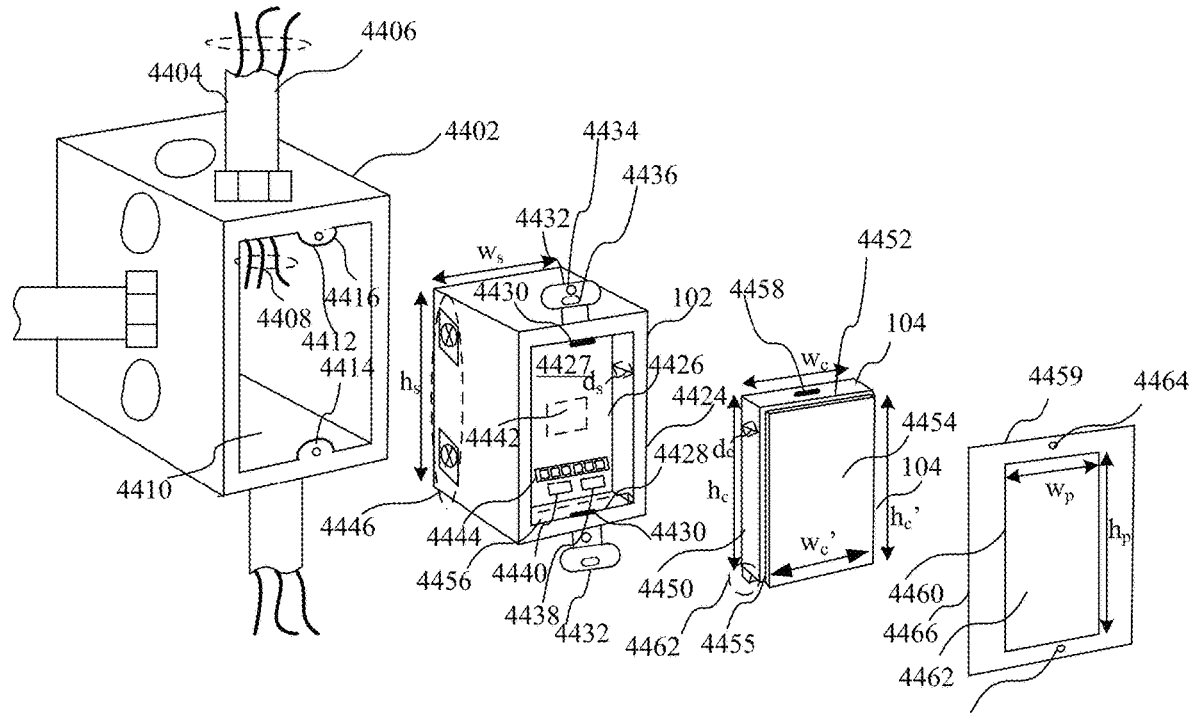
FIG. 44
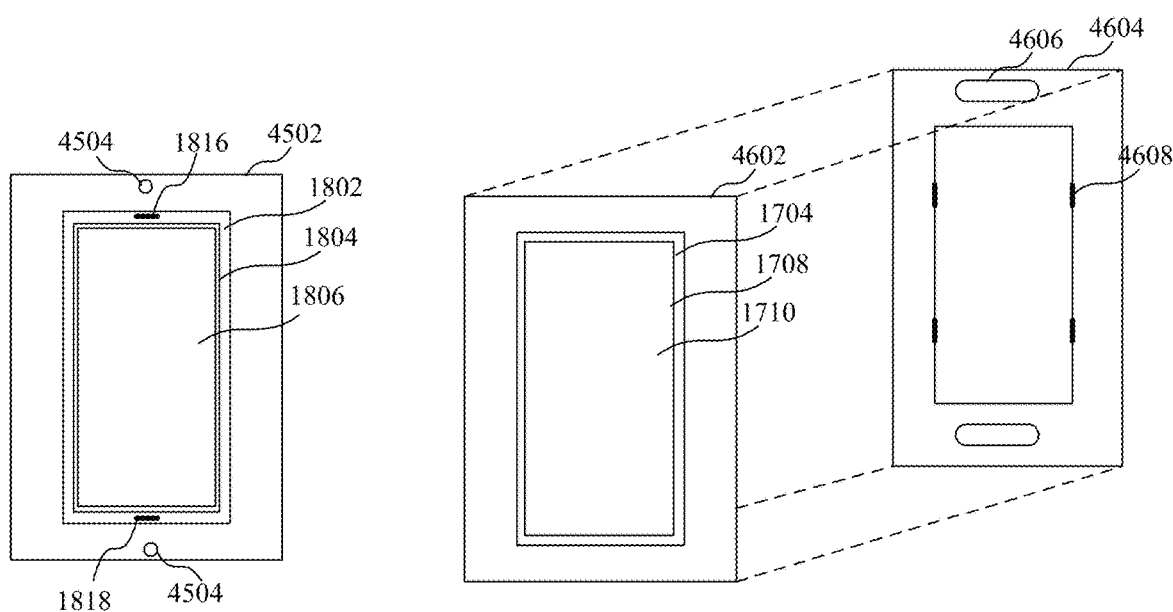
FIG. 45
FIG. 46

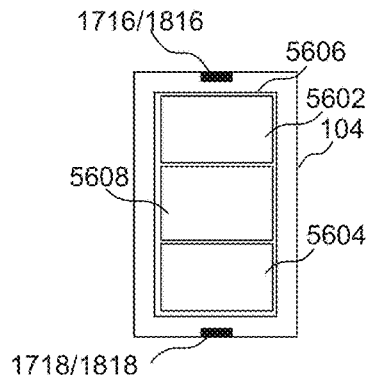
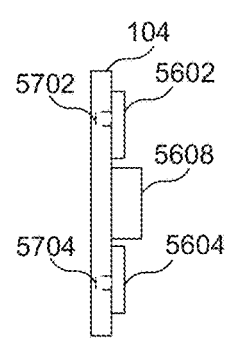
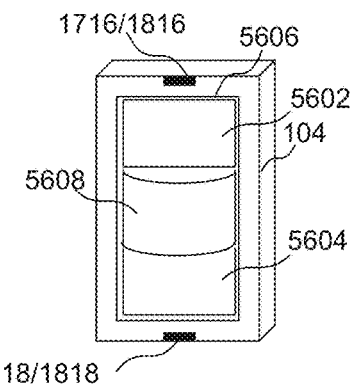
FIG. 56            FIG. 57            FIG. 58
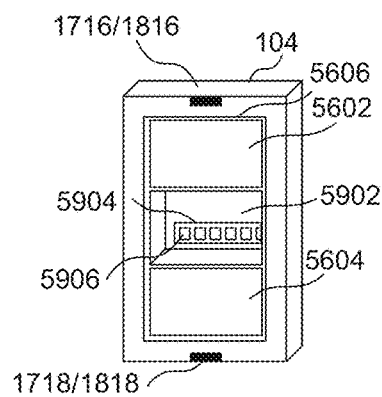
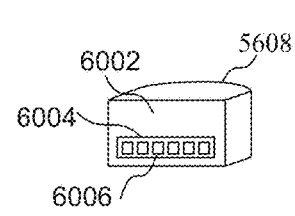
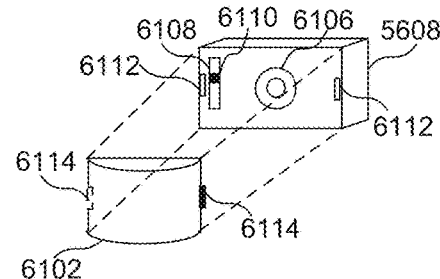
FIG. 59            FIG. 60            FIG. 61
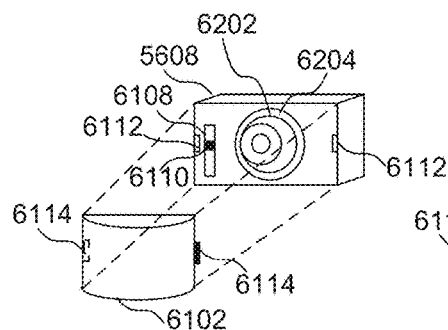
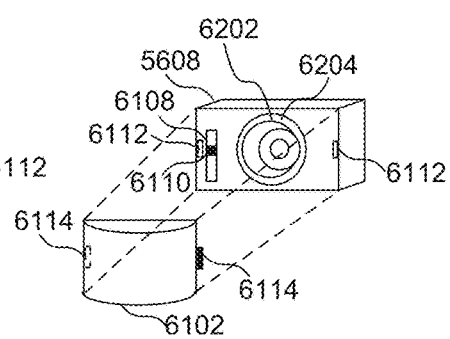
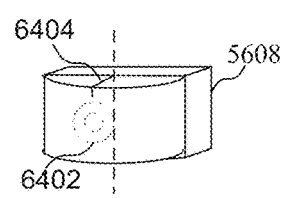
FIG. 62            FIG. 63            FIG. 64

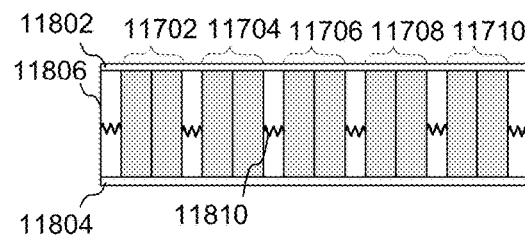
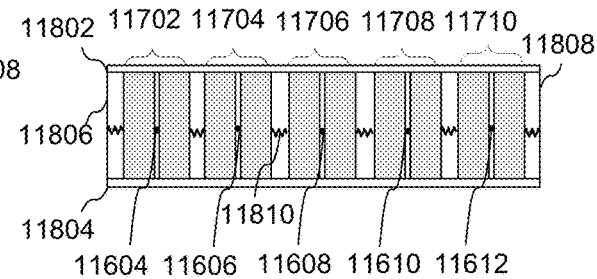
FIG. 118        FIG. 119
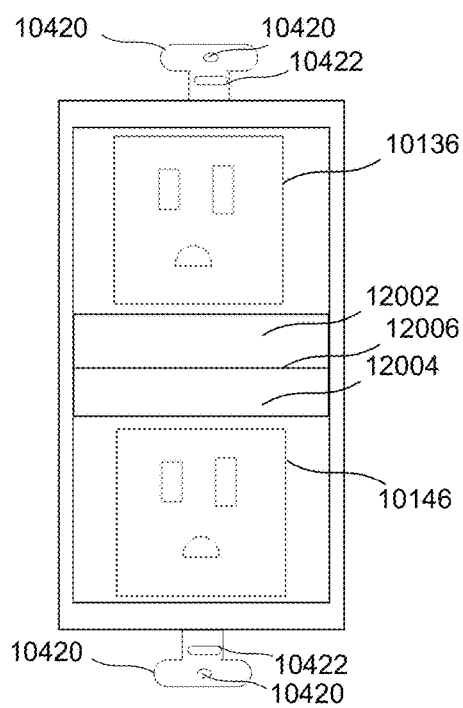
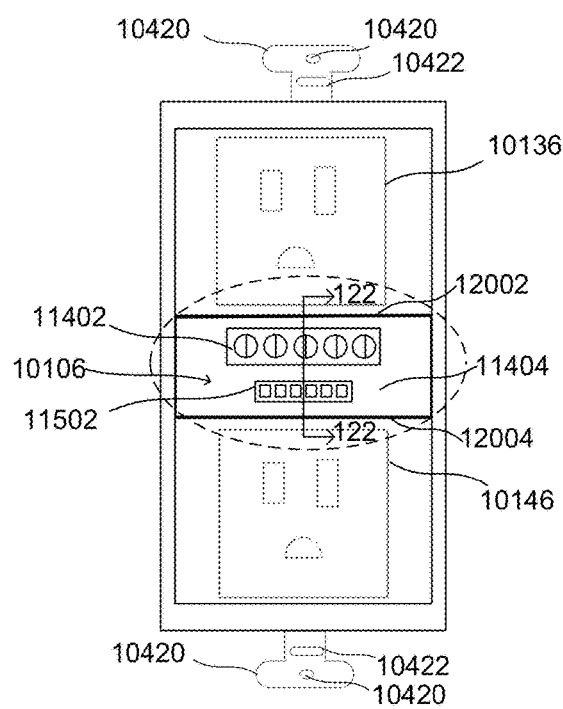
FIG. 120        FIG. 121

CONTROL ATTACHMENT CONFIGURED TO CONTROL AN APPLICATION OF POWER TO A LOAD AND A METHOD OF IMPLEMENTING A CONTROL ATTACHMENT

PRIORITY CLAIM

Applicant claims priority to U.S. Application 62/869,002, filed on Jun. 30, 2019, U.S. Application 62/877,784 filed on Jul. 23, 2019, U.S. application Ser. No. 16/560,723 filed on Sep. 4, 2019, and U.S. application Ser. No. 16/661,875 filed on Oct. 23, 2019, the entire applications of which are incorporated herein by reference.

TECHNICAL FIELD

An embodiment of the present invention relates generally to a control attachment of a power adapter, and methods of implementing power adapters and control attachments.

BACKGROUND

Power adapters, such as switches which control the application of power to a load (e.g. a light or other appliance for example), are an important part of any residential or commercial building, and can provide beneficial control of a load attached to the power adapter, such as timing control, motion detection, and dimming for example. As power adapters continue to advance, additional functionality may be available to a user. However, replacing a power adapter can come with significant expense. In addition to the cost of the replacement power adapter, it may be necessary to pay for the professional installation of the replacement power adapter, such as in the case of an in-wall installed power adapter that is coupled to wires in a wall of a building, such as a residential building or a commercial building. For many homeowners who attempt to replace a power adapter rather than have an electrician replace the power adapter, the homeowner may face a risk of shock or other bodily harm during the installation process, or improperly install a power adapter that may pose a risk to a user of the power adapter in the future.

In the case of new construction, and particularly a new residential construction, a purchaser (or a builder in the case of a home that is built without input from a purchaser of the home) may not know where the different types of power adapters should be initially placed. Further, it may not be until after living in the home for a period of time that a homeowner may have a better idea where certain types of power adapters should be placed. The homeowner would then have to change some power adapters, and therefore incur additional time and effort (or incur additional time and cost if the homeowner relies upon an electrician) to change the power adapters. Such a need to change power adapters may be particularly frustrating for the homeowner, who, having spent money in the purchase of the new home and spent considerable time during the planning and move-in process, may now have to spend additional money and time to fix a problem. That is, a homeowner may not appreciate the additional cost and time to make improvements to a home that they may have already invested considerable money and time in planning. While the homeowner may decide to delay any changes of power adapters in their home to avoid the additional cost and time, such a delay may lead to dissatisfaction with their homebuilder or the purchase of their new home.

Accordingly, circuits, devices, arrangements and methods that enable a user such as a homeowner or other building owner to easily and efficiently implement different power adapters are beneficial.

SUMMARY

A control attachment configured to control an application of power to a load is described. The control attachment may comprise a body portion adapted to be received by a power adapter; a plurality of contact elements extending from the control attachment, wherein the plurality of contact elements is adapted to be inserted into corresponding contact elements of the power adapter, and comprises a first contact element adapted to receive a first power signal from the power adapter and a second contact element adapted to receive a neutral signal from the power adapter, wherein the first power signal comprises a line power signal from the power adapter; and an actuator element extending from the body portion, wherein the actuator element is adapted to engage a corresponding switch element of the power adapter.

According to another implementation, a control attachment configured to control an application of power to a load may comprise a body portion adapted to be received by a power adapter; a plurality of contact elements extending from the body portion, wherein the plurality of contact elements is adapted to be inserted into corresponding contact elements of the power adapter, and comprises a first contact element adapted to receive a first power signal from the power adapter and a second contact element adapted to receive a neutral signal from the power adapter, wherein the first power signal comprises a line power signal from the power adapter; and a projection extending from the body portion, wherein the projection is adapted to engage a corresponding switch element of the power adapter.

A method of implementing a control attachment of a power adapter configured to control an application of power to a load is also described. The method may comprise configuring a body portion to be received by the power adapter; configuring a plurality of contact elements to extend from the control attachment, wherein the plurality of contact elements is adapted to be inserted into corresponding contact elements of the power adapter, and comprises a first contact element adapted to receive a first power signal comprising a line power signal from the power adapter, a second contact element adapted to receive a neutral signal from the power adapter; and providing an actuator element that extending from the body portion, wherein the actuator element is adapted to engage a corresponding switch element of the power adapter.

BRIEF DESCRIPTION OF THE DRAWINGS

FIG. 15 is a front and side view of a power adapter;

FIG. 16 is a cross-sectional view of the power adapter of FIG. 15 taken at lines 16-16;

FIG. 17 is a front and side view of a control attachment having a portion that extends through recess of a wall plate and a portion including attachment elements that are located behind the wall plate;

FIG. 18 is a front and side view of a control attachment that extends through recess of a wall plate, where the attachment elements are accessible when the wall plate is attached to the power adapter or the control attachment;

FIG. 19 is a side view of a control attachment having a movable toggle element;

FIG. 20 is a side view of the control attachment of FIG. 19 having the movable toggle element in a first position;

FIG. 21 is a side view of the control attachment of FIG. 19 having the movable toggle element in a second position;

FIG. 26 is a front and side view of a control attachment having a hinged toggle element;

FIG. 27 is a side view of the control attachment of FIG. 26;

FIG. 28 is a front and side view of the control attachment of FIG. 26 with the hinged toggle element in an open position and exposing a control module and optional user interfaces;

FIG. 29 is a front and side view of the control attachment of FIG. 26 with the control module of FIG. 28 removed;

FIG. 30 is another front and side view of the control attachment of FIG. 26 with the control module of FIG. 28 removed;

FIG. 31 is a front and side view of a control module that could be implemented in the control attachment of FIG. 26;

FIG. 32 is a front and side view of a control attachment having a control module that is accessible through a recess in a toggle element, such as a hinged toggle element;

FIG. 33 is a side view of the control attachment of FIG. 32 having a toggle element in a closed position;

FIG. 34 is a front and side view of the control attachment of FIG. 32 having the toggle element in an open position;

FIG. 35 is a front and side view of the toggle element of FIG. 32 that may be removed;

FIG. 36 is a view of an attachment element of the control attachment which is adapted to receive corresponding attachment element of the toggle element of FIG. 32;

FIG. 44 is a block diagram of an expanded view of elements of an in-wall power adapter and control attachment that is adapted to be installed in a junction box and to receive a wall plate;

FIG. 45 is a front view of the arrangement of FIG. 44 when combined;

FIG. 46 is another front view of the arrangement of FIG. 44 when combined and showing an intermediate wall plate for receiving the wall plate;

FIG. 56 is a front plan view of a control attachment having dedicated on and off switches and a sensor element that may be removable;

FIG. 57 is a side view of the control attachment of FIG. 56;

FIG. 58 is a front and side view of the control attachment of FIG. 56;

FIG. 59 is a front and side view of the control attachment of FIG. 56 without the removable sensor element to show contact the elements in a recess;

FIG. 60 is a rear view of the removable sensor element showing contact elements;

FIG. 61 is a front and side view of a control attachment having a removable screen;

FIG. 62 is a front and side view of a control attachment having a removable screen exposing a camera that is movable within a receiving element and shown directed to the left;

FIG. 63 is a front and side view of a control attachment having a removable screen of FIG. 62 showing the camera directed to the right;

FIG. 64 is a front inside view of a control attachment having a movable screen to enable controlling a direction of a sensor, such as a camera, by moving the screen;

FIG. 118 is a front view of the electrical interface of FIG. 117 showing an arrangement of insulating elements covering contact elements of the power adapter;

FIG. 119 is a front view of the electrical interface of FIG. 117 showing an arrangement of insulating elements of FIG. 118 having connector elements of the control attachment positioned between portions of the insulating elements;

FIG. 120 is a front view of a power adapter having a door arrangement in a closed arrangement;

FIG. 121 is a front view of the power adapter of FIG. 120 having the door arrangement in an open position;

FIG. 122 is a cross-sectional view of the power adapter of FIG. 120;

FIG. 123 is a cross-sectional view of the power adapter of FIG. 120 as shown in FIG. 122 having a control attachment in a first position;

FIG. 124 is a cross-sectional view of the power adapter of FIG. 120 as shown in FIG. 122 having a control attachment in a second position;

FIG. 125 is a cross-sectional view of the power adapter of FIG. 120 as shown in FIG. 122 having a control attachment in a third position;

FIG. 126 is a diagram showing a power adapter arrangement having an outlet that is controllable using 2 wireless communication protocol;

FIG. 127 is a block diagram of a power adapter having a control switch and a recess for receiving a control attachment;

FIG. 128 is a block diagram of a power adapter arrangement comprising the power adapter of FIG. 27 and having a control attachment;

FIG. 129 is a block diagram of a power adapter having a control switch and enable switches adapted to be coupled to actuator elements of a control attachment;

FIG. 130 is a block diagram of a power adapter arrangement comprising the power adapter of FIG. 129 and a control attachment;

FIG. 131 is a block diagram of a power adapter having a switch and user interface elements;

Figure 131:
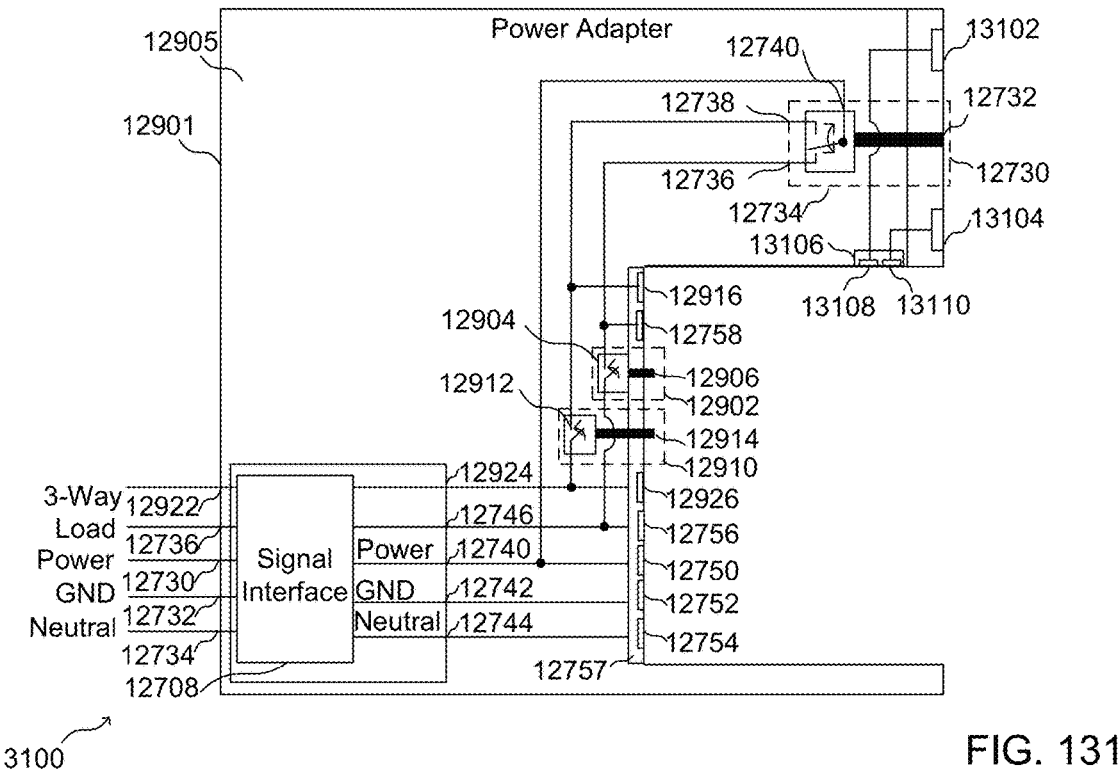
Figure 132:
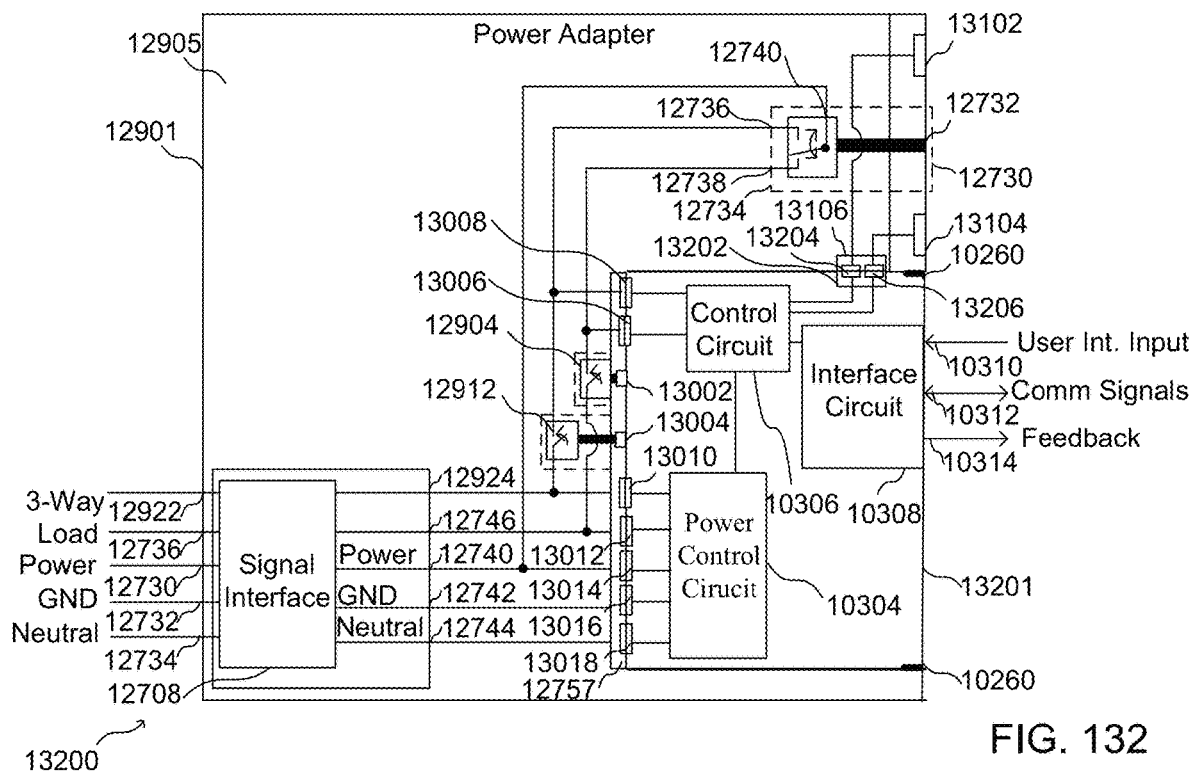
Figure 133:
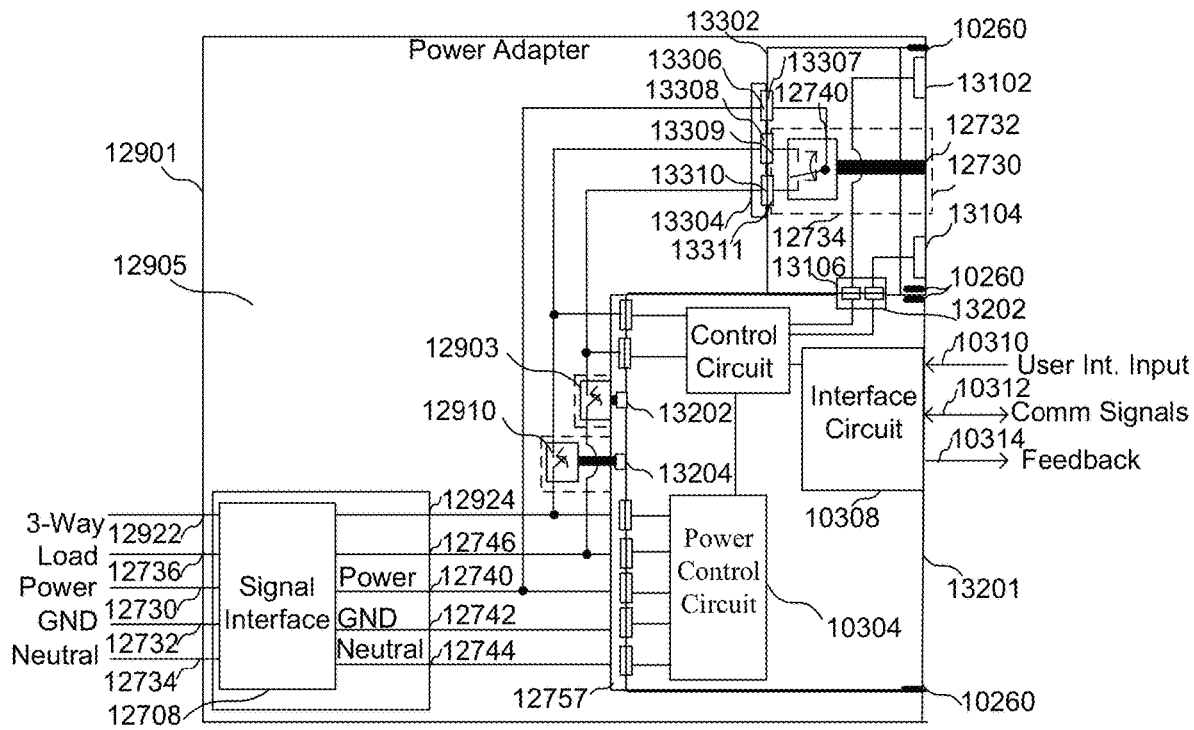
Figure 134:
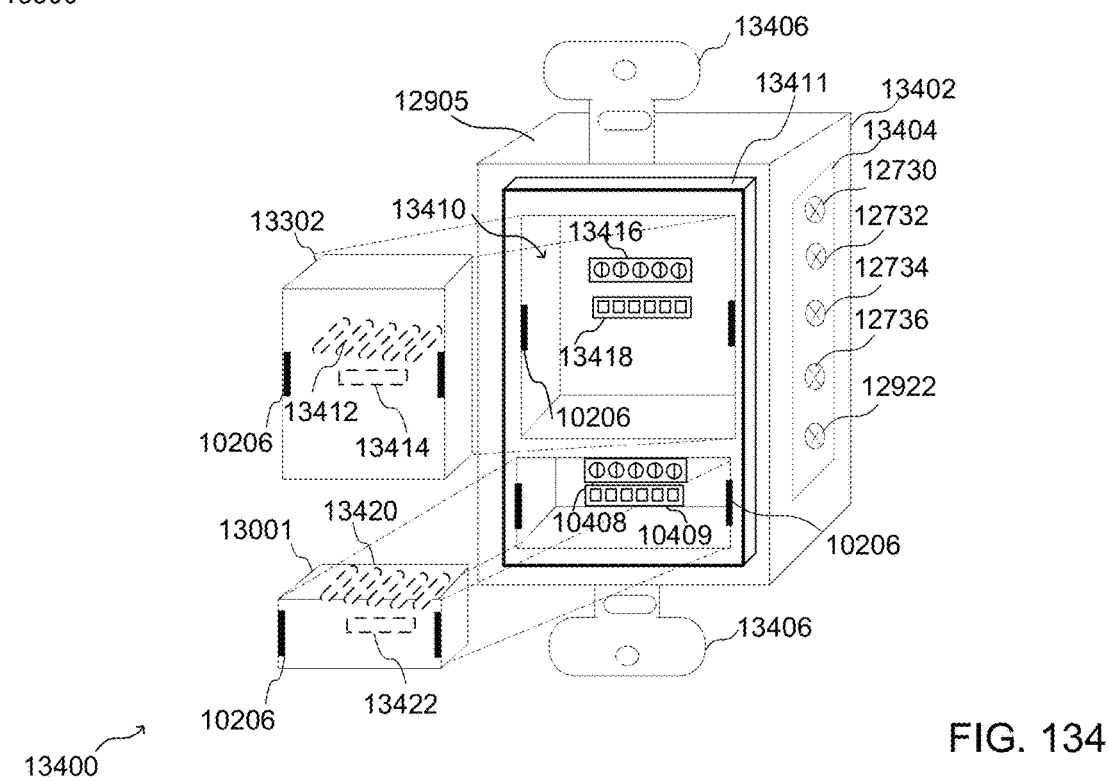
Figure 135:
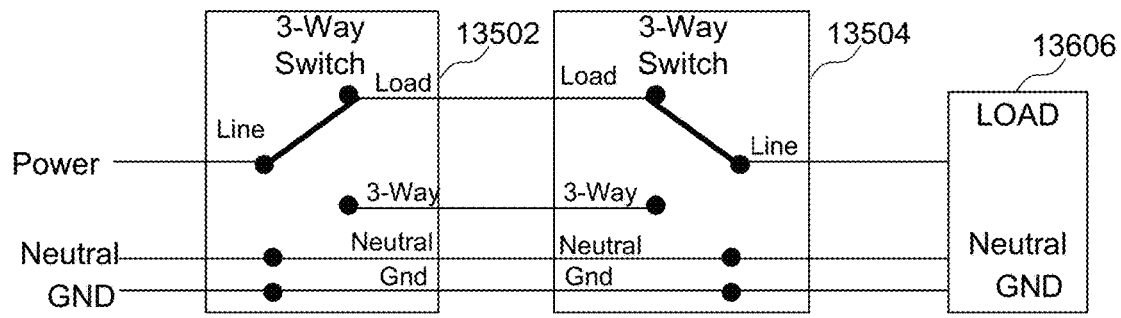
Figure 136:
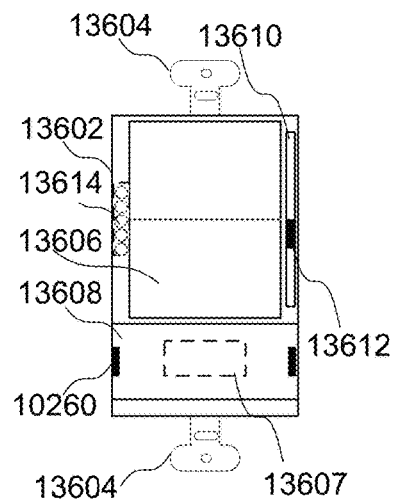
Figure 137:
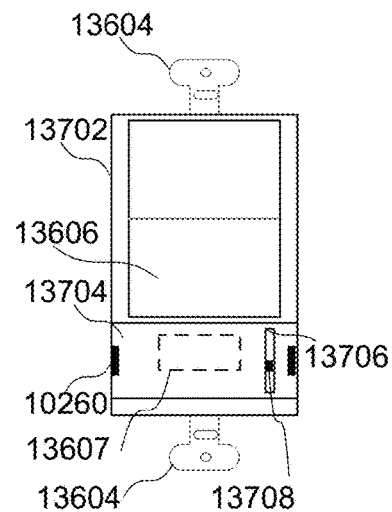
Figure 138:
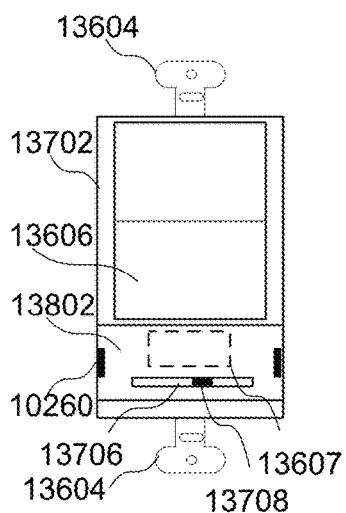
Figure 139:
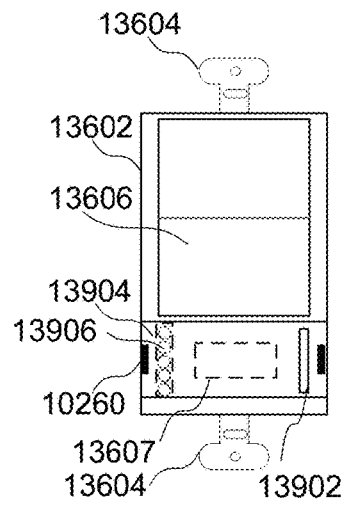
Figure 140:
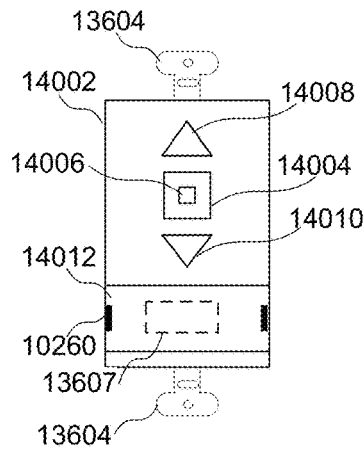
Figure 141:
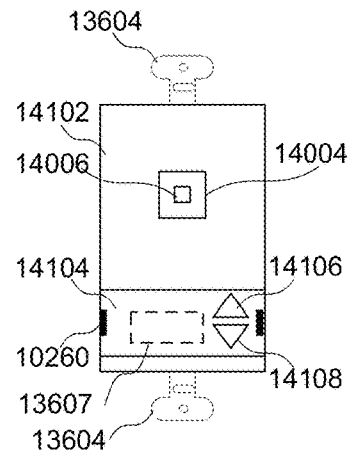
Figure 142:
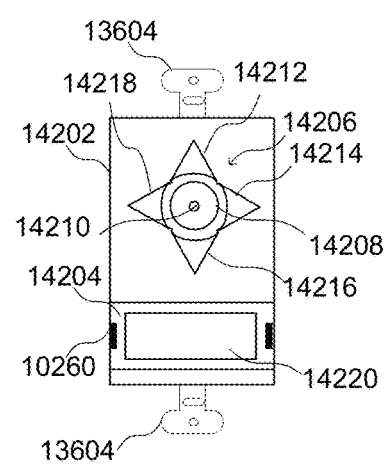
Figure 143:
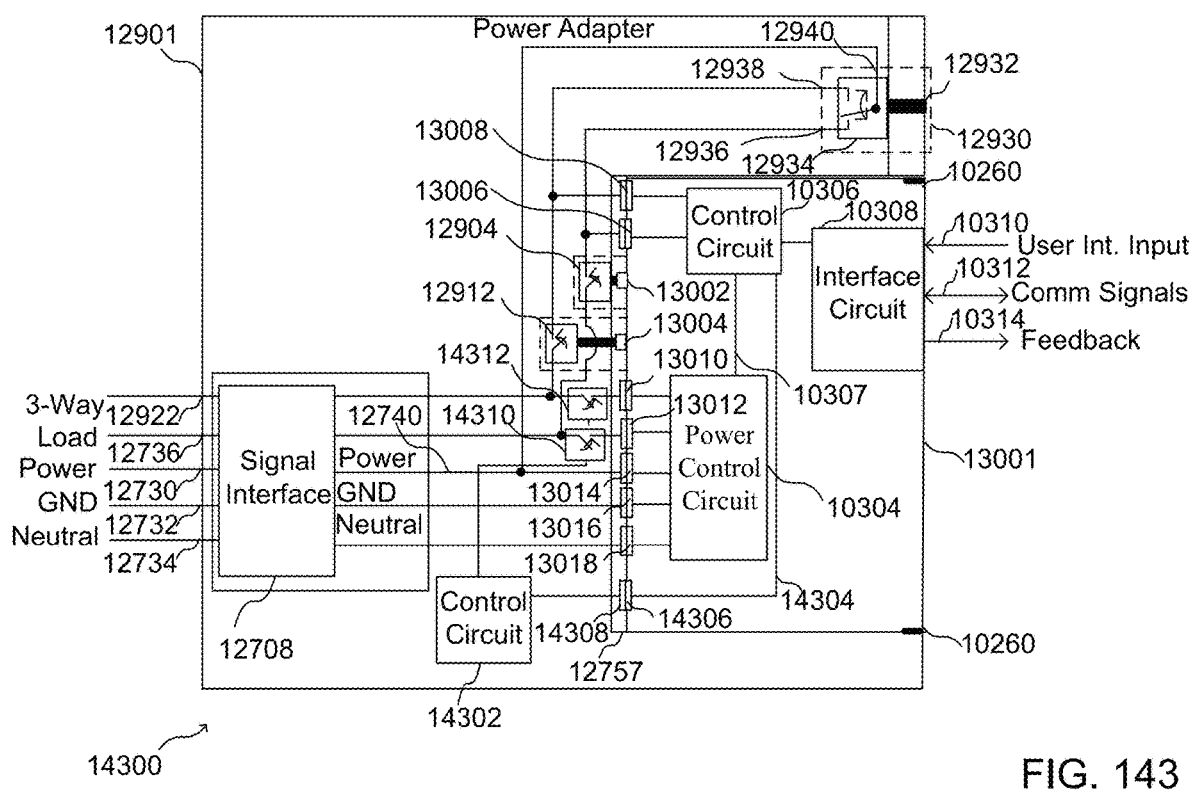
Figure 144:
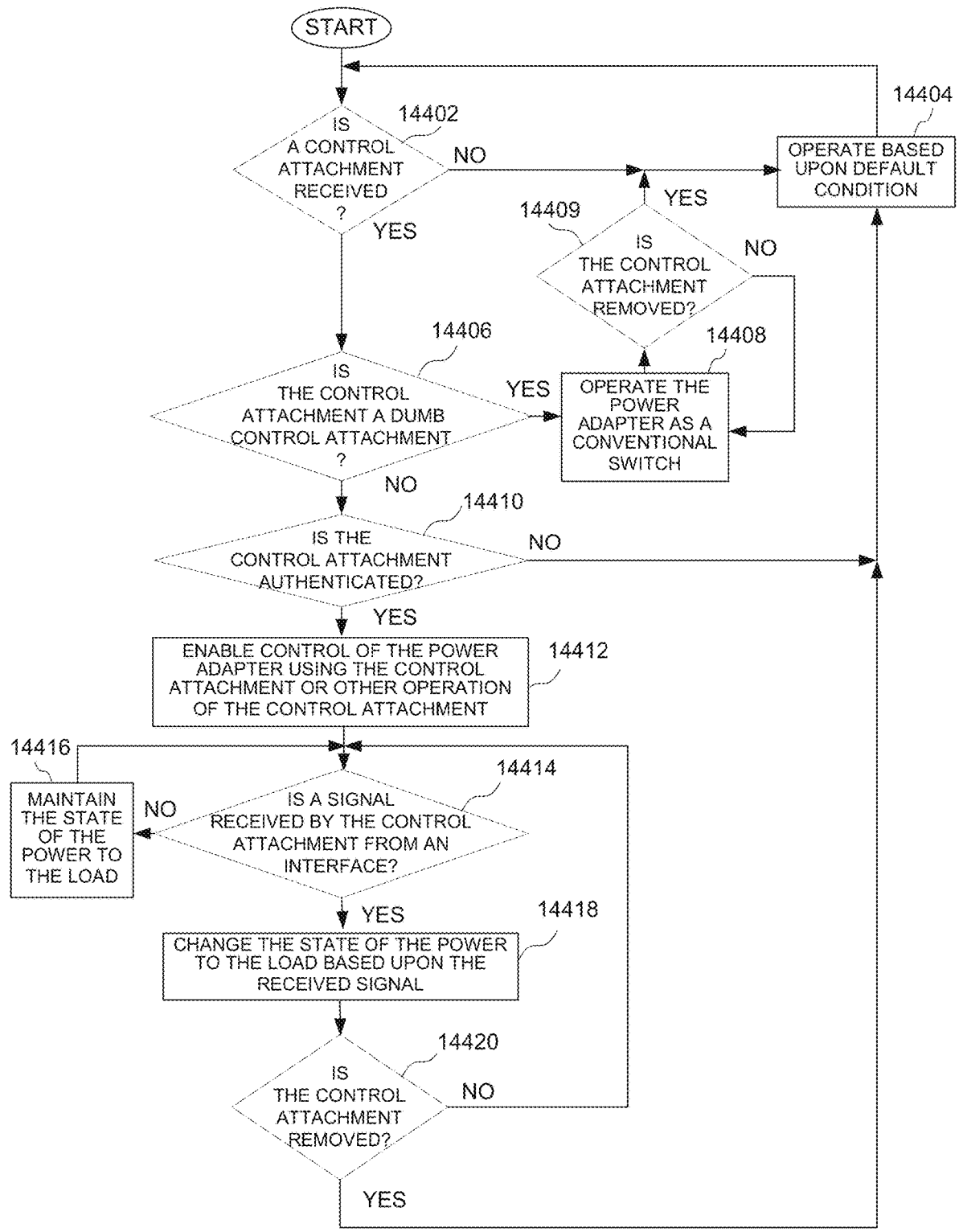
Figure 145:
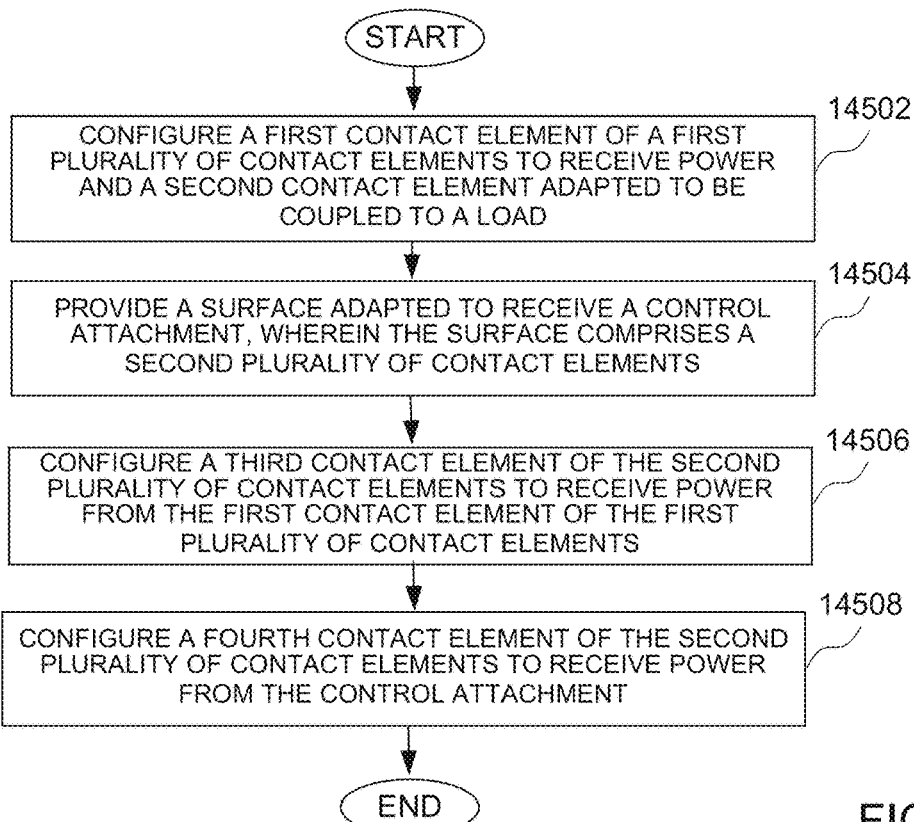
Figure 146:
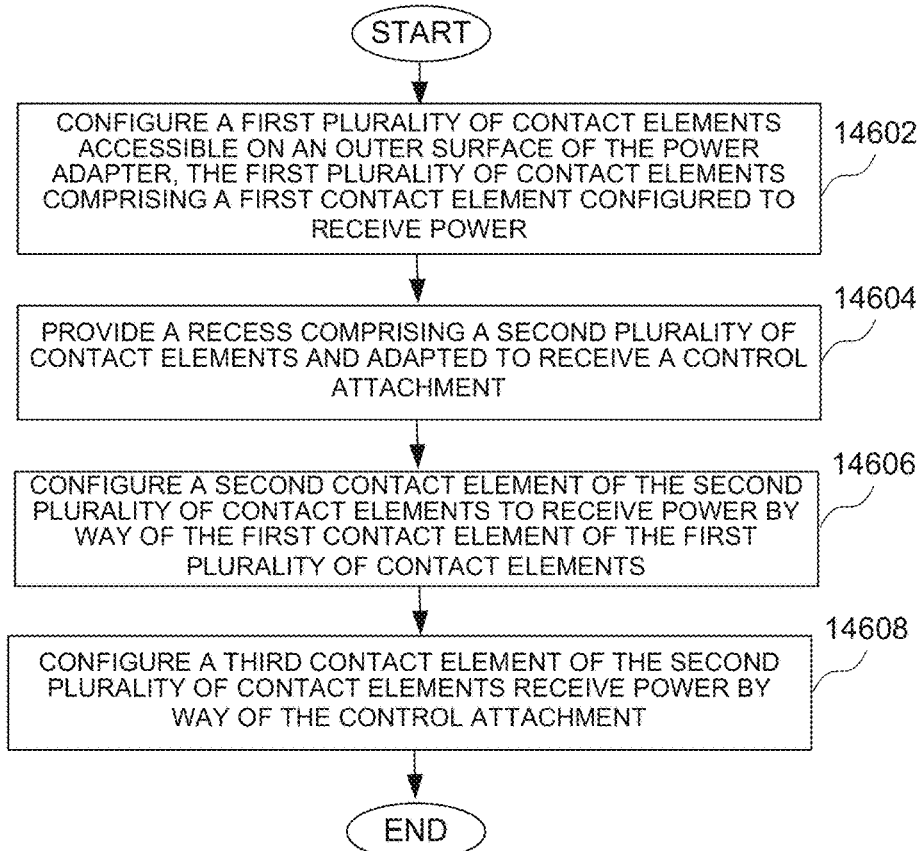

FIG. 132 is a block diagram of a power adapter arrangement having the power adapter of FIG. 131 and a control attachment;

FIG. 133 is a block diagram of a power adapter arrangement having the power adapter of FIG. 131 adapted to receive a removable user interface module and a control attachment;

FIG. 134 is a perspective view of power adapter assembly adapted to receive a removable user interface module and a control attachment;

FIG. 135 is a block diagram showing the configuration of 2 power adapter arrangements configured in a 3-way switching arrangement to control a load;

FIG. 136 is a front view of a power adapter arrangement having a toggle element and a dimmer control element associated with the power adapter;

FIG. 137 is a front view of a power adapter arrangement having a toggle element associated with the power adapter and a dimmer control element associated with a control attachment;

FIG. 138 is a front view of another power adapter arrangement having a toggle element associated with the power adapter and a dimmer control element associated with a control attachment;

FIG. 139 is a front view of another power adapter arrangement having a toggle element associated with the power adapter and a capacitive dimmer control element having a dimming level display associated with a control attachment;

FIG. 140 is a front view of another power adapter arrangement having a toggle element and a dimmer control element associated with the power adapter;

FIG. 141 is another front view of a power adapter arrangement having a toggle element associated with the power adapter and a dimmer control element associated with a control attachment;

FIG. 142 is a front view of a power adapter arrangement having a multi-element control switch associated with the power adapter;

FIG. 143 is a block diagram a power adapter arrangement having a power adapter configured to authenticate a control attachment;

FIG. 144 is a flow chart showing a method of implementing a power adapter arrangement having a control attachment;

FIG. 145 is a flow chart showing a method of implementing a power adapter configured to receive a control attachment; and FIG. 146 is a flow chart showing a method of configuring a control attachment adapted to receive power from a power adapter.

DETAILED DESCRIPTION

The power adapter arrangements, power adapters, control attachments, circuits, systems and methods set forth below provide a simple and efficient way for a building owner, building manager, or homeowner, to easily change the functionality of an electrical switch without having to replace the entire switch and, more importantly, without having to run the risk of making contact to a high voltage power line or high voltage power contact of an electrical system of the building, for example by connecting wires of the electrical system (e.g. from a junction box) to the power adapter. By selectively distributing elements between a power adapter and a control attachment of a power adapter arrangement, builders and purchasers of buildings (including residential home purchasers for example) can easily and efficiently design and construct a building with a fully operating electrical system having switches installed, and easily and efficiently change features of power adapter arrangements by simply changing a control attachment for some or all of the power adapter arrangements installed in the building. A power adapter arrangement having a power adapter that is configured to receive a control attachment as set forth below not only allows for changes or modifications to the configurations of power adapter arrangements after a building is constructed, but it also allows for easy updates to power adapter arrangements as technology changes and improved or different control attachments are available.

According to some implementations, power adapters having a power switching function are provided that enable the use of different control attachments having a range of functionalities, including basic control attachments that have limited functionality and more advance control attachments having different levels of functionality and different features. As will be described in more detail below, a common interface between a power adapter and all control attachments could be used. For example, the common interface could be adapted to receive both basic control signals, such as on/off control signals or dimmer control signals that are generated in response to a manual operation of a user (e.g. pressing a toggle element of control attachment_, and electrical signals generated by a circuit of the control attachment which may be independent of input of the user (e.g. on and off commands associated with a timer feature having a schedule for turning on or off power applied to a load controlled by the control attachment or an on command from a motion detector). A basic control attachment may use only a portion of the common interface, and the more advanced control attachments may use another portion of the common interface, where the portions may or may not overlap. According to some implementations, a first interface (e.g. a mechanical switch or a simple contact arrangement of a power adapter that is shorted by a contact element of the control attachment) could be provided for basic controls signals generated in response to manual user input on a user interface of the control attachment, and may be separate from a second interface, which may be adapted to receive more advanced signals, such as timing schedule signals associated with a timing pattern (i.e. at least one on time or off time for applying power to a device controlled by the power adapter arrangement according to a schedule, which may be based upon predetermined days or may be periodic (e.g. daily, weekly, monthly or yearly) which may be received by way of a wireless connection to a wireless control circuit of the control attachment or a control signal generated by a motion detector of the control attachment.

According to other implementations, a power switching function may be implemented in a control attachment, which provides flexibility in functions of the power adapter arrangement. For example, a simpler on/off switching arrangement could be provided using a relay in the control attachment, or a more advanced switching arrangement could be provided by using a TRIAC or other circuit to enable dimming functionality in the control attachment. That is, by placing a power switch, which enables the routing of power to a load in the control attachment, it is possible to provide a power adapter arrangement with or without dimming capabilities by providing a control attachment having a TRIAC or just a relay for performing power switching. As will be described in more detail below, many different variations of safe and flexible power adapter arrangements can be implemented. While a variety of embodiments of each of the power adapter and the control attachment having different levels of functionality and features are shown, it should be understood that various features and functionality could be interchanged between the different embodiments.

A description of example embodiments is provided on the following pages. The text and figures are provided solely as examples to aid the reader in understanding the invention. They are not intended and are not to be construed as limiting the scope of this invention in any manner. Although certain embodiments and examples have been provided, it will be apparent to those skilled in the art based on the disclosures herein that changes in the embodiments and examples shown may be made without departing from the scope of this invention. It will be understood that when an element is referred to as being (operatively or communicatively) "coupled with/to," another element, it can be connected directly with/to the other element directly or coupled to the other element via a third element.

According to various implementations, a power adapter may be configured to provide power to a load. The power adapter may comprise a first plurality of contact elements comprising a first contact element configured to receive power and a second contact element configured to provide power to a load; a receiving element configured to receive a control attachment; a first interface comprising a second plurality of contact elements configured to provide one or more reference voltages to the control attachment, wherein the first interface comprises an electrical interface; and a second interface comprising a switch configured to control power applied to a load in response to an actuation of the control attachment.

Control attachments may also be implemented. For example, a control attachment adapted to control the application of power to a load may comprise a toggle element on the control attachment, wherein the toggle element is movable in response to a manual actuation associated with the control attachment; a first interface comprising an actuator element configured to make contact with a power adapter, wherein the actuator element is adapted to engage with a switch of the power adapter in response to the manual actuation; and an attachment element adapted to attach the control attachment to the power adapter; wherein a manual actuation of the toggle element enables controlling the power applied to the load by the power adapter. It should be understood that the control attachments may be implemented with the power adapter as described below.

FIGS. 1-5 show implementations of a power adapter arrangement 100 having power switching capability (e.g. a relay or a circuit having a control terminal to enable dimming, such as a triode for alternating current (TRIAC) in the power adapter). According to some implementations, it may be desirable to provide reduced functionality of a power adapter, which is a device that receives a source of power, such as a reference voltage and selectively routes the power to a load based upon a control signal, such as a control signal associated with a timing pattern or in response to a sensor or some other external input. The power adapter implements selected switching function (e.g. basic on/off switching or on/off switching with dimmer control), and implements additional control functionality according to signals from a control attachment, which is removably attached to the power adapter. By reducing the complexity of a power adapter to include the power switching capability, and by providing additional control functionality or other functionality in the control attachment, the power adapters can be widely and cost-effectively implemented in new construction, such as in new home construction, with control attachments that may be initially installed having limited functionality.

Some or all of the control attachments having limited functionality can be easily replaced with more advance control attachments after an owner of the new construction has an opportunity to evaluate the power control needs of the new home, such as determining where a timer, motion detector or smart speaker may be beneficial. That is, a builder can efficiently (i.e. by installing a single type of power adapter at all locations where a switch is to be installed) and cost effectively (i.e. by installing a power adapter with a basic control attachment at all locations except certain locations where additional functionality may be believed to be needed) build a new home having a fully functional electrical system with little or no input (or even inaccurate input) from a purchaser of the new home. Such a use of power adapter arrangements as set forth in more detail below allows the owner of the new home (and future owners) to easily and cost effectively make changes to the electrical system of the home by simply changing the control attachments where necessary.

As will be described in more detail below, a control interface between a power adapter and a control attachment may be configured to accept a basic control attachment having limited functionality such as on/off functionality or on/off functionality with dimmer capability, and also accept a more advanced control attachment having more advanced functions such the ability to send control signals associated with a timing schedule received at the control attachment using a wireless control circuit or control signals from a sensor, such as a motion detector, to the power adapter. By way of example, a power adapter arrangement having a basic control attachment attached thereto may function in a similar manner to a conventional switch having on/off capability or on/off and dimmer capability. However, if the owner determines that additional functionality may be useful, the owner would only need to change the control attachment to have the desired additional functionality, such as timer functionality or motion detection functionality for example. While reference is made to power control needs, where an owner may evaluate the needs to control power applied to a load attached to the power attachment, it should be understood that control attachments may have functionality beyond controlling the load attached to a power adapter. For example, the control attachment may enable functions separate from controlling the load, such as a camera function, information or entertainment functions (a microphone and speaker for providing requests for information and receiving audible feedback, such as in a smart speaker), sensor functions (e.g. temperature or humidity sensors for home automation), wired or wireless networking functions (e.g. WiFi router, WiFi node of a WiFi mesh arrangement, or Bluetooth node of a Bluetooth mesh arrangement), or other any other functions of an attachment that may or may not require power from the power adapter.

Figure 1:
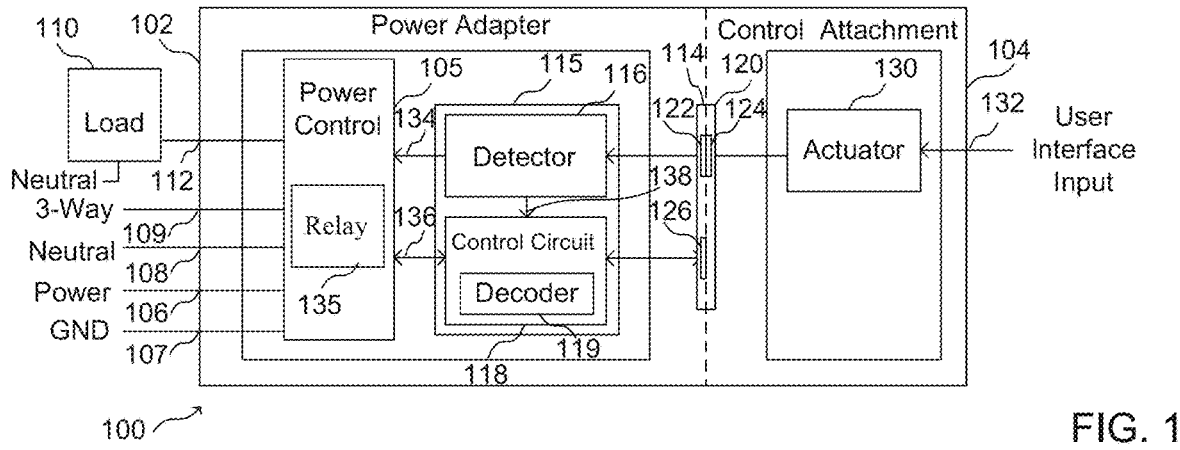
FIG. 1 is a block diagram of a power adapter arrangement having a basic control attachment.

Turning first to FIG. 1, a block diagram of a power adapter arrangement 100 having a power adapter 102 coupled to a control attachment 104 comprising a basic control attachment is shown. FIG. 1 shows a control interface configured to receive a signal by way of an actuator in response to user input. According to the implementation of FIG. 1, a very basic control attachment and a power adapter having a relay is disclosed. As will be described in more detail below, power adapters having more functionality, such as dimming functionality, and control attachments having more functionality, such as wireless communication functionality can be implemented.

According to the implementation of FIG. 1, the power adapter arrangement 100 comprises a power adapter 102 and the control attachment 104. The power adapter comprises a plurality of contact elements, often call terminals or inputs and outputs, that are adapted to make electrical connections to electrical wires in a junction box. More particularly, the power adapter 102 comprises a power control circuit 105 adapted to receive one or more reference voltages, such as a power voltage received at a power input 106 and a neutral voltage received at a neutral input 108. By way of example, the power voltage could be an electrical signal approximately 120 volts or 220 volts, depending upon the electrical system that is being used in the region. The power adapter may be designed to operate with a specific reference voltage, such as 120 volts or 220 volts. A ground voltage coupled to a ground input 107 and a neutral voltage coupled to a neutral input 108 are also provided. The use of neutral and ground terminals will be described in more detail below. A 3-way connection terminal 109, also known as a traveler connection, may also be provided. The 3-way terminal enables the user of the power adapter arrangement in a 3-way connection, where two different switches can be used as toggle switches for a single load, as is well known. The power control circuit 105 controls the application of a power signal outside of the power adapter arrangement to a load 110, which may be any device receiving power such as a light or appliance, at a load terminal 112, which may be a contact element adapted to be coupled to a wire in an electrical wiring arrangement that provides power to the load. It should be understood that the power signal generated at the load terminal 112 may be different that the power signal applied to the power adapter at the power input 106, such as due to voltage regulation (i.e. generate a signal having a known voltage and which may be filtered to eliminate spurious elements.) or dimming control for example.

There are generally three wires currently used in electrical wiring, including a live wire (i.e. the wire for providing power to a load, also called the hot wire), a neutral wire (i.e. are return path for the live wire), and a ground wire. While some older construction may only have 2 wires (e.g. there is only a live wire and a ground wire, where the ground wire is used as the return path for the live wire), most electrical outlets and switches in new construction include both a neutral connection and a ground connection, where 120 volt power is carried to homes through these two wires, and the live wire is the wire carrying current while neutral wire is the wire that completes the return path under normal conditions. Without the neutral wire, current cannot flow, and the neutral wire is always assumed to be charged in an active circuit. The neutral wire is coupled to ground (by grounding the neutral wire to a ground connection at the switching box for the building for example) to make the terminal of neutral wire at zero potential.

A ground wire (also called earth in some countries) is a wire that is ready to take all the current into the ground in case of a mishap, such as a high current generated in an appliance. Both neutral and ground wires are for the safety of the building, wiring system, appliances and human beings. The ground wire is assumed to be at zero potential while the potential of neutral depends upon an imbalance between the wires. Ground is therefore universal reference which is always taken to be zero potential, Neutral is provided by the power company to make the path of electricity closed. The ground wire on the other hand, prevents any electrocution to humans in the case of a mishap, where a ground wire is run throughout electric wiring and is buried the earth (e.g. 10-15 feet) adjacent to the house or below it.

A ground represents an electrical path, normally designed to carry fault current when an insulation breakdown occurs within electrical equipment. For example, breakdowns can be forced by connecting a metal tool or conductive material from a voltage potential to the steel structure within a facility. Connections to the electrical path (Ground) are made convenient for the installation of electrical equipment. Some stray current will always flow through the ground path. This current will come from a number of normal sources. Capacitive coupling and inductive coupling between power conductors and the ground path (conductive conduit, conductive structure members, etc.) are the greatest sources of ground path current.

While the power adapter arrangement may be wired in different ways in a circuit to apply power to a load, it should be understood that the various terminals for power, ground, neutral, and 3-way terminals are provided by way of example, and that the power adapter arrangement is configured to provide power to a load, such as by providing a path for current to flow through the load, in response to a control signal which may be directly (e.g. by a user actuation of a switch by interacting with a control attachment) or indirectly (e.g. a remote wireless operation or a stored timing program stored in one of the power adapter or the control attachment as will be described in more detail below) provided to the power adapter arrangement. For example, a power voltage may be coupled to a light that is controlled by the switch if the power adapter or the power voltage may be coupled to the switch, depending upon how the power adapter arrangement is installed. In either case, the switch provides a current path that may be controlled to allow the power to be applied to the light. In order to control the application of power provided to the load (e.g. the application of a voltage to a load terminal to allow the flow of current through the load), the power control circuit 105 of the power adapter 102 comprises a switch (which may be a relay or a TRIAC for example as described in more detail below) that enables the application of power from the electrical system to the load in response to a signal from the control attachment 104.

A switch, such as a relay or TRIAC for example, as implemented in a power adapter arrangement may provide switching functionality, e.g. turning on/off power to a load (e.g. a light or appliance). The switch may control a connection of a system at a voltage derived from the power supply that powers the power adapter arrangement and apply a voltage to a load. Accordingly, a switch may be powered from and/or control an electrical circuit at any commonly used voltage for controlling loads, such as 110V/120V, 220V/230V/240V, 50 Hz, 60 Hz, 5 A, 6 A, 10 A, 13 A, 15 A, alternating current (AC) for example, which are generally considered high voltage systems for example. It should be understood that the power signal (i.e. based upon a certain voltage or current) applied to the load may be different than the power signal provided to a terminal of the power adapter from the junction box, such as due to a dimming control function.

The power adapter 102 comprises a signal interface circuit 114 coupled to a control interface circuit 115. The control interface circuit 115 is adapted to generate a power control signal based upon one or more actuation signals generated by the control attachment, where the power control signal enables power to be applied to the load. For example, an actuation signal may be a signal based upon a manual actuation of an actuator element of the control attachment or a signal generated by a circuit of the control attachment and provided the power adapter by way of an electrical interface, where the power control signals may comprise a toggle signal (i.e. an on or off signal) or a dimmer control signal. It should be understood that the control circuit 115 enables independent operation of the actuator element and a signal generated by a circuit of the control attachment and provided the power adapter by way of an electrical interface, allowing for different types of control signals to be provided to the power adapter.

The control interface circuit 115 may comprise a detector 116 and a control circuit 118. The signal interface circuit 114 is adapted to be coupled to a corresponding signal interface circuit 120 of the control attachment 104, and comprises a plurality of signal coupling elements, which may be elements that enable the transfer of electrical signals and reference voltages, including low power reference voltages. More particularly, the signal interface circuit 114 comprises a signal coupling element 122 coupled to a corresponding signal coupling element 124 of the signal interface circuit 120. Another signal coupling element 126 is shown as a part of the signal interface circuit 114, but is not used in the implementation of the power adapter arrangement 100 of FIG. 1. That is, other control attachments 104 may be configured to provide a signal to the signal coupling element 126, as will be described in more detail in reference to FIG. 2. While coupling elements of the power adapter are shown in FIG. 1, it should be understood that only some coupling elements of the power adapter are shown, and that the power adapter may comprise additional coupling elements to provide interfaces for more advanced control attachments as will be described in more detail below.

The control attachment 104 comprises an actuator 130 That is adapted to receive a user input by way of a user interface input 132. As will be described in more detail below, the user interface input 132 may comprise any type of interface for providing an input to the actuator 130 which generates a control signal to the signal coupling element 124. The user interface input 132 may comprise a toggle switch for example. While paddle-type toggle switches are described in some examples below, it should be understood that any type of toggle switch could be employed. Also, the actuator 130 may comprise any time of signal actuator for generating a control signal in response to user input at the user interface input 132, and may comprise a mechanical actuator, an electrical actuator, or an electro-mechanical actuator for example, as described in more detail below.

Figure 81:
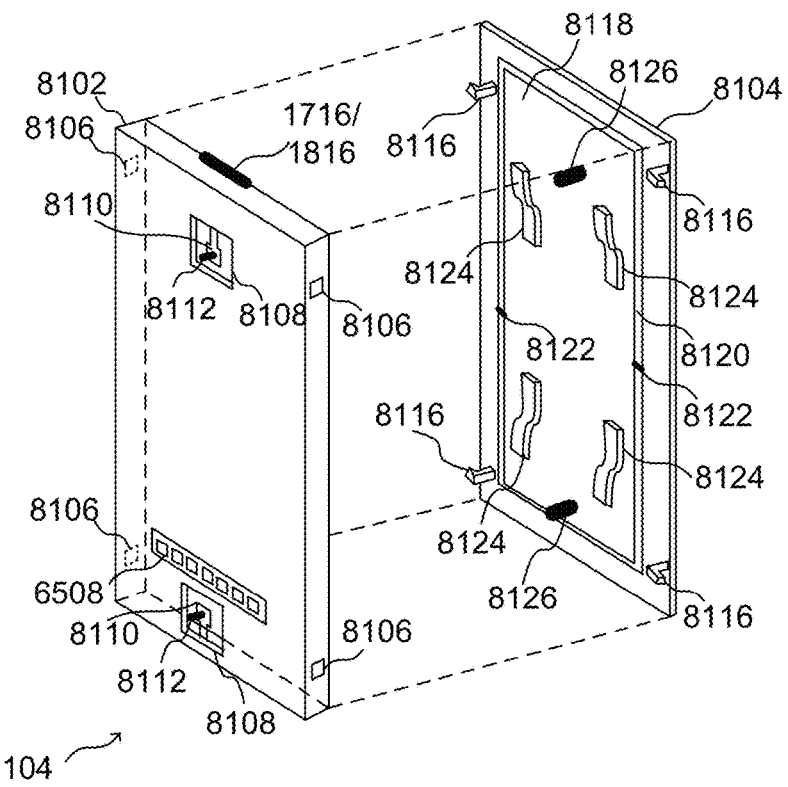
FIG. 81 is a diagram showing an example of a control attachment adapted to receive a control module.
Figure 82:
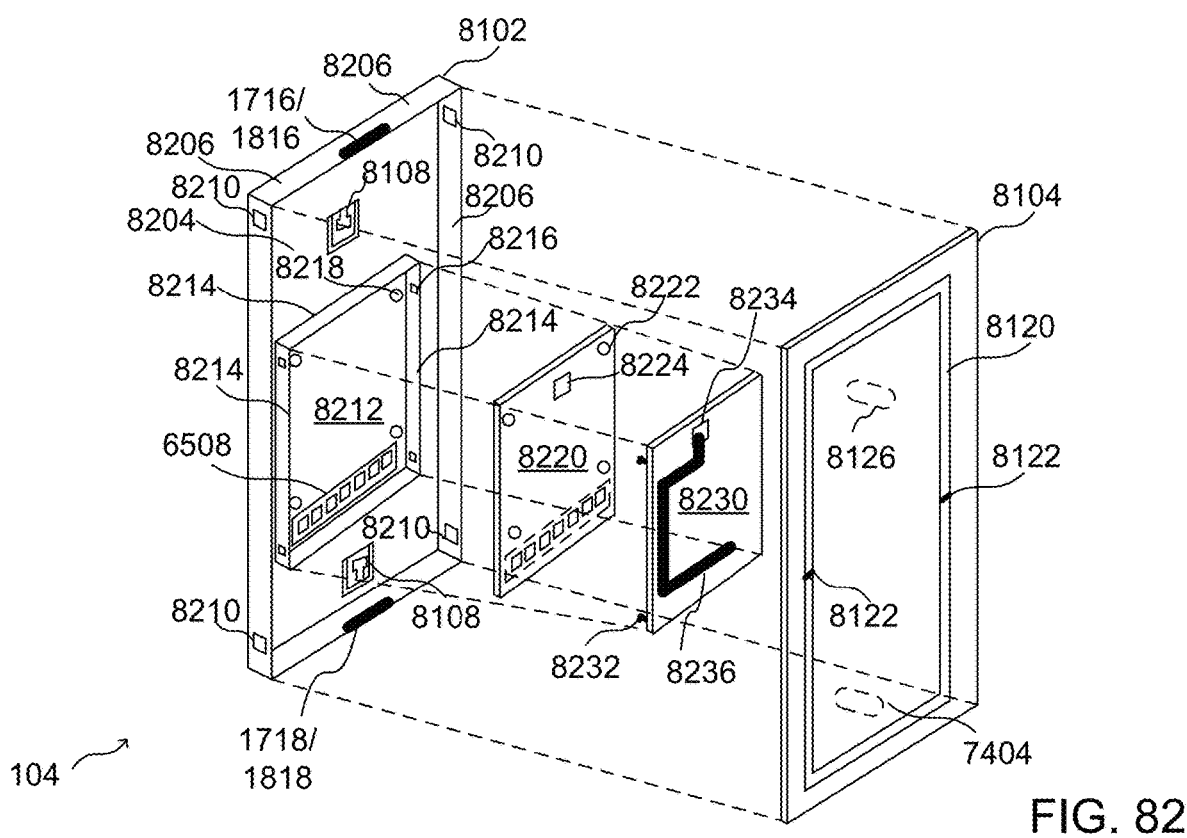
FIG. 82 is a diagram showing an inner surface of a rear housing of the control attachment of FIG. 81.

For example, in a mechanical application of the signal interface circuits 114 and 120, the actuator 130 may be configured to receive an actuation at the user interface input 132, such as the movement of a toggle switch, which may cause a movable element of the signal coupling element 124 to engage a corresponding movable element of the signal coupling element 122, as described in more detail by way of example in reference to FIGS. 81-82. The engagement of the movable element of the signal coupling element 124 and the corresponding movable element of the signal coupling element 122 may be detected by the detector. That is, the signal coupling elements 122 and 124 may facilitate the transfer of an actuation of a toggle switch detected at the user interface input 132 to the detector 116, where the detector 116 may be an electro-mechanical switch (e.g. a device that comprises a mechanical element that receives an input, such as a button which, when depressed, generates an electrical signal).

In electromechanical application of the signal interface circuits 114 and 120, the signal coupling element 122 may comprise an electromechanical switch and the signal coupling element 124 may comprise a movable element that moves in response to an actuation at the user interface input 132 to depress a button of the signal coupling element 122 (implemented as an electromechanical switch). In an electrical application of the signal interface circuits 114 and 120, each of the signal coupling elements 122 and 124 comprise electrical elements, which may be contact elements the enable the transmission of an electrical signal such as described in reference to FIGS. 10 and 11.

The control interface circuit 115 may comprises a detector 116 coupled to receive a control signal by way of the signal coupling element 122 in response to an actuator signal at the user interface input 132. The detector may comprise a mechanical, electromechanical, or electrical element for detecting a signal from the actuator 130, where the implementation of the detector may depend upon the particular implementation of the actuator 130 and the signal coupling elements 122 and 124. For example, if the signal coupling element 124 is a mechanical element, such as a movable element adapted to engage a button of the detector or an opening in the control attachment enabling an actuator element (e.g. a projection) to engage a switch of the power adapter through the opening, the detector may comprise a switch having a button that is moveable in response to the movement of the actuator element and generate an electrical signal coupled to at least one of the control circuit 118 and the power control circuit 105. If an electrical signal is generated by the signal coupling element 122, the detector may comprise an electrical circuit configured to detect the electrical signal and provide the electrical signal to at least one of the control circuit 118 and the power control circuit 105.

The control interface circuit 115 further comprises a control circuit 118 having a decoder circuit 119. The control circuit 118 is coupled to the signal coupling element 126 that is configured to provide control signals from a control attachment. While the control attachment according to the implementation of FIG. 1 is a basic control attachment that comprises an on/off actuator, other control attachments can be implemented that provide control signals, such as control signals received from a remote device, such as a smart phone, or dimmer control signals, as will be described in more detail below. The decoder circuit may not only be used to decode signals, but also to determine whether the control attached is an authorized control attachment that can interface with the power adapter. Because the distribution of high voltage electrical power signals in a residential or commercial building is dangerous, it is necessary to ensure that the control attachment is authorized to communicate with and control the power adapter and/or that the power adapter is authorized to receive signals from the control attachment.

While the control interface of FIG. 1 is shown by way of example as having a separate detector and control circuit, it should be understood that the detector could be implemented as a part of the control circuit 118, which may be a processor as will be described in more detail below. That is, the function of the detector and the function of the decoder may be implemented by a processor in response to signals detected by the processor. Similarly, while the decoder is shown as a part of the control circuit, the decoder could be implemented separate from the control circuit.

As shown in FIG. 1, the control attachment 104 is a basic control attachment, and signals are only sent to the power adapter from the actuator 130. Therefore, it is not necessary that the decoder determines whether the control attachment is an authorized control attachment, but rather the power adapter is configured to operate with a control attachment that controls in on/off feature of the power adapter arrangement by way of a given control signal interface, such as a control signal interface requiring a physical actuation associated with the user interface input (e.g. the pressing of a toggle element of the control attachment). As will be described in more detail below, the use of switches having buttons that may be actuated by a movable element of the control attachment enable a control attachment having no electronic circuits that may interface with a portion of a control signal interface (e.g. signal interface circuit 120) transmitting electrical signals. Such an arrangement is beneficial to enable a cost-efficient power adapter arrangement 100. That is, the control attachment 104 can be made primarily or completely of plastic, and have housings that may be adapted to be used with different types of control attachments (i.e. control attachments having basic functionality or control attachments having more advanced functionality). Further, such an arrangement enables a power adapter to be functional for providing at least on/off functionality when the control attachment is not attached to the power adapter. Therefore, a builder would be able to install power adapters throughout a building, and be able to use the power adapters without it control attachment before an owner or occupier of the building decided what types of control attachments to use at different locations of the building. That is, a power adapter may comprise one or more buttons to enable toggling of power to a load, where the user would be able to toggle the power to the load without a control attachment (i.e. by just pressing one or more switches that are exposed on the power adapter when the control attachment is not attached to the power adapter), or with the control attachment attached to the power adapter, as will be described in more detail below.

Signals from the signal interface circuit 114 may be processed by the control interface circuit 115 and provided to the power control circuit 105 to control the application of power to a load. For example, a signal from the detector (in response to an actuation by the actuator 130) may be provided by way of a signal line 134 to a switch 135, shown here by way of example as a relay and often referred to as a power switch, to control the application of power to the load. The switch may comprise any device that enables current to flow in a path including the load to provide power to the load, where the switch may comprise a path of controllable conductivity that conducts current from the power input to the load in response to a signal from the detector.

While the control attachment 104 of the implementation of FIG. 1 comprises a basic control attachment only having an actuator for enabling the on/off operation of the power control circuit, other control attachments may provide other control signals to the control circuit, where the control signals may be used to control the application of power to the load by way of a signal line 136 or may be used to identify the control attachment, as will be described in more detail below. The detector 116 may also be coupled to the control circuit 118 by way of a signal line 138, where the control circuit may provide signals to the power control circuit 105 by way of the signal line 136. That is, the detector 116 and the control circuit 118 may independently provide signals to the power control circuit 105, or the control circuit 118 may provide signals to the power control circuit 105 based upon a detected actuation of actuator 130 or control signals from a control attachment 104 having other circuits for providing additional features (e.g. on and off signals or dimming signals), as will be described in more detail below.

The control attachment 104 is removably attached to the power adapter. The power adapter may comprise a receiving element for interfacing with control attachment. The receiving element may be a surface of the power adapter that is configured to abut a portion of the control attachment, shown generally in FIG. 1 as the dashed line between the power adapter and the control attachment. As will be described in more detail below, the receiving element may comprise interface elements, including contact elements, electrical connectors and electro-mechanical interfaces (such as one or more switches for example), and attachment elements for enabling a control attachment to be attached to a power adapter.

According to some implementations, the receiving element may comprise a planar surface having contact elements that are configured to make electrical contacts with corresponding contact elements of the control attachment as will be described in more detail below. According to some implementations, the power adapter may comprise a recess for receiving the control attachment, where contacts elements of the power adapter may be on a wall of the recess for example. The recess may also help with align the power adapter and the control attachment. Attachment elements may be implemented on the receiving element of the power adapter, such as in the case where the receiving element comprises a recess. Attachment elements may also be provided on the receiving element or another element of the power adapter (e.g. flanges of the power adapter that are used to attach the power adapter to a junction box) when the receiving element comprises a planar surface. Examples of a receiving element are described in more detail in reference to FIG. 44, which describes both a recess and a planar surface acting as a receiving element of a power adapter.

FIGS. 2-5 show different implementations of both the power adapter 102 and the control attachment 104. For example, according to some implementations of the power adapter 102, dimming functionality may be provided. Different control attachments are also shown in FIGS. 2-5, where the control signals provided to the power adapter 102 may be provided by different types of signal interface circuits 114 and 120.

Figure 2:
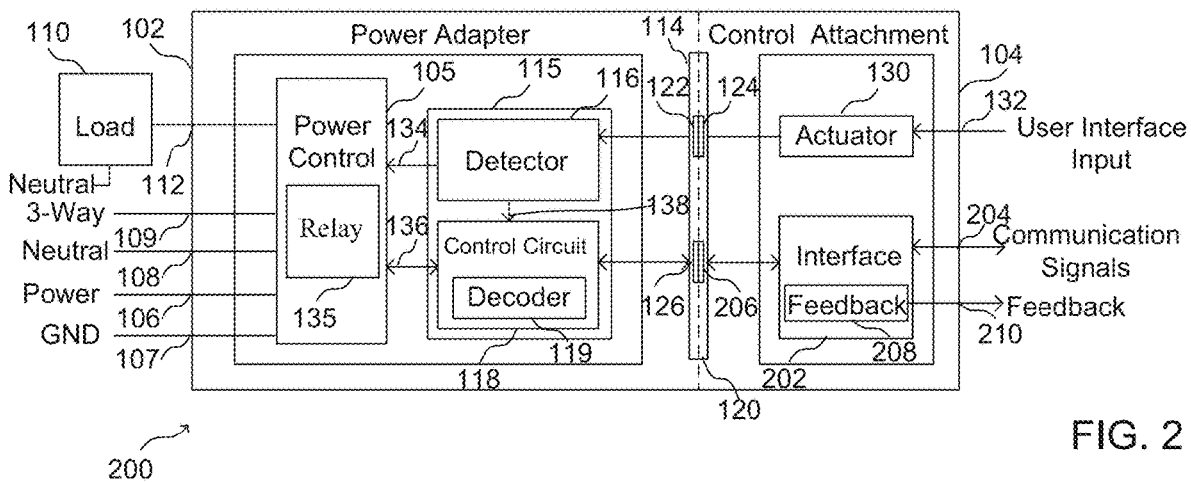
FIG. 2 is another block diagram of a power adapter arrangement having a control attachment with additional features.

Turning now to FIG. 2, another block diagram of a power adapter arrangement 200 having a control attachment with additional features is shown. According to the implementation of FIG. 2, an additional interface is provided for receiving control signals. In addition to the actuator 130, the control attachment 104 comprises an interface circuit 202, which may comprise a communication interface circuit, configured to transmit and/or receive communication signals by way of a communication interface 204. The communication signals may be provided directly to the communication interface 204 or indirectly, such as by a wireless connection or a wired connection. The signal interface circuit 120 also comprises a signal coupling element 206 that is adapted communicate signals with signal coupling element 126. According to some implementations, the signal coupling elements 126 and 206 could be contact elements, where one may be a contact pad and another may be a pogo pin for example, that are adapted to provide control signals to the control circuit 118. The interface circuit 202 may also comprise a feedback circuit 208 that is adapted to provide feedback signals by way of a feedback interface 210.

The feedback signal interface 210 could be any type of interface that provides a user of the power adapter arrangement with a feedback signal associated with the operation or status of the power adapter arrangement generated by the feedback circuit 208. For example, the feedback interface could be any type of interface, including an audio interface and/or visual interface. As will be described in more detail below in reference to FIGS. 50-64, the interface element may comprise one or more of speakers, microphones, display elements, lighting elements such as light emitting diodes (LEDs), sensors providing audio or visual feedback (e.g. a camera having an LED indicating that the camera is on), or tactile feedback elements.

According to the implementation of FIG. 2, the decoder circuit 119 can be used to authenticate the control attachment to ensure that the control attachment is an authorized control attachment. For example, the interface circuit 202 of the control attachment and the control circuit 118 can exchange signals to ensure that the control attachment is an authorized control attachment. The signals may include a variety of information that would enable the power adapter to not only identify the control attachment, such as by a serial number or some other unique identifier, but also information that would indicate the type of control attachment (e.g. Information that could indicate the available features or functions of the control attachment). If the control attachment is not an authorized control attachment, the power adapter may only allow the operation of the control attachment based upon manual actuations of an actuator in response to manual user interface input, such as manual actuations of the actuator 130 (e.g. a pressing of a movable element such as a toggle element of the control attachment). That is, the power adapter arrangement 200 will work with an unauthorized control attachment, but only based upon manual input detected by the control attachment.

According to some implementations, authentication could be achieved by a shared secret key authentication, where both the power adapter and the control attachment have a shared key that is used to exchange information to authenticate the power adapter. In cryptography, a shared secret key is a piece of data such as a random number, known only to the parties involved, in a secure communication. The shared secret key would be pre-shared (i.e. stored in a memory of both the power adapter and the control attachment. The shared secret can be fed to a key derivation function to produce one or more keys to use for encryption of messages. To make unique communication link between the power adapter and the control attachment and unique message keys, the shared secret key may be combined with the unique ID. While shared secret key is provided as one example of an authentication technique for authorizing a control module to operate with a power adapter, it should be understood that any type of authentication could be used.

Such a feature would prevent a power adapter from being used improperly, such as being "hijacked" and controlled by an unauthorized user of the power adapter arrangement. Because improper control of power by a power adapter arrangement may lead to an unsafe environment associated with the power adapter arrangement, it is beneficial to ensure that the control attachment is authorized. Because the control attachment could determine how power is applied to the load by the power adapter, it is beneficial if the control attachment controls the power in a safe manner, consistent with the operation of the power adapter. That is, the power adapter and the controller attachment are designed to operate safely with one another. An unauthorized control attachment may control the application of power to the load in a way that is not safe. For example, a fast toggling of a switch of the power adapter providing power to a load may lead to in unsafe electrical situation, which may cause an overheating of the power adapter or the load that may lead to a fire. Further, a low quality control attachment that is not an authorized control attachment may fail, resulting in power being applied to a load at a time or for a duration when it may be unsafe to apply the power. For example, an unauthorized control attachment may be used to control the application of power to a slow cooker, where the failure to turn off power to the slow cooker may result in and overheating of the slow cooker and a fire. Further, as will be described in more detail below, a user of a control attachment according to various implementations may be alerted when a control attachment is not operating properly or is defective. Therefore, it is beneficial to ensure that any control attachment would operate safely, according to specifications of the power adapter arrangement or a particular use of the power adapter arrangement, and that the control attachment is an authorized control attachment that has been determined to operate safely with the power adapter.

Figure 3:
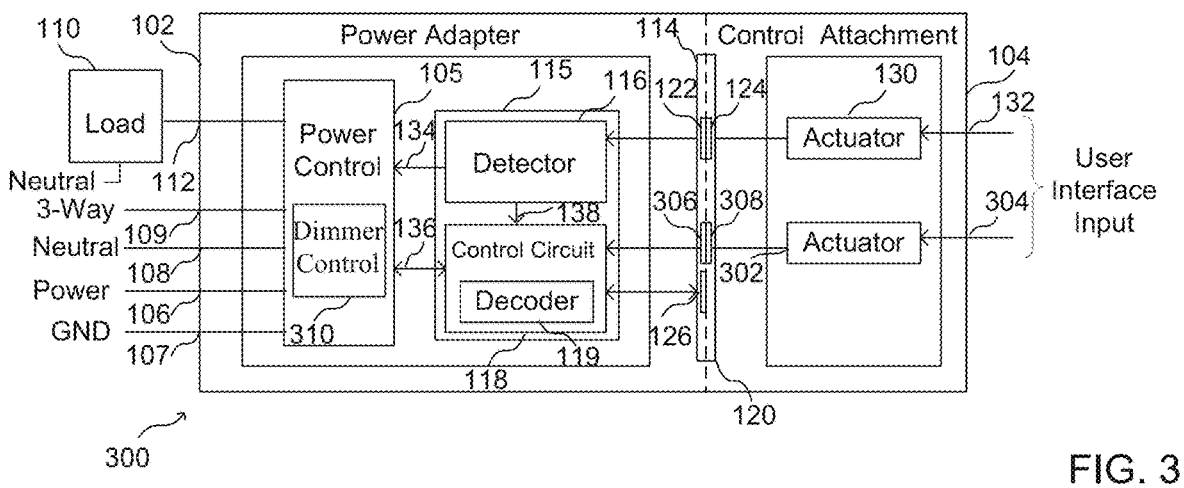
FIG. 3 is another block diagram of a power adapter arrangement having dimming functionality.

Additional implementations may allow for dimming control of a load, such as the dimming of power level applied to a light for example. According to the implementation of FIG. 3 showing another block diagram of a power adapter arrangement 300, a power adapter is implemented having a dimmer control circuit, and a second actuator is provided in the control attachment that enables dimming control. More particularly, an actuator 302 that is responsive to a user input at a user interface input 304 enables a user to manually control an amount of power applied to a load, such as a dimming of a light representing the load. A signal coupling element 306 of the signal interface 114 and a corresponding signal coupling element 308 of the signal interface circuit 120 are adapted to communicate signals from the control attachment to the power adapter in response to an actuation of the actuator 302.

The signal coupling elements 306 and 308 may comprise an electrical, mechanical, or electro-mechanical Interface. For example, the actuator may be a movable element that enables the generation of a voltage that is used for controlling the power applied to the load (i.e. a dimming functionality). And this will be described in more detail below, the voltage for a dimming functionality may be generated at the control attachment or at the power adapter. For example, a resistor divider network may be implemented in the control attachment, where the voltage generated by the resistor divider network may be provided to the power adapter by an electrical interface comprising signal coupling elements 306 and 308. According to another implementation, the signal coupling elements 306 and 308 may comprise a mechanical interface, where a movable element on the control attachment will align with and enable the movement of a corresponding movable element on the power adapter, where a movement of the movable element on the power adapter will generate the variable voltage (e.g. a voltage generated by a resistor divider) that may be used for dimming control. Also shown any implementation of FIG. 3, a dimmer control circuit 310, which may comprise a TRIAC circuit for example, is implemented in place of or in addition to the switch 135. That is, the TRIAC may be implemented to control dimming and block current applied to the load (i.e. turn off the load), or a separate relay may be used in addition to the TRIAC to block current applied to the load and turn off the load).

According to the implementation of FIG. 3, it is not necessary that the control attachment be authenticated. Rather, the control attachment 104 of FIG. 3 is similar to the control attachment 104 of FIG. 2, where it provides limited control of the power adapter (i.e. on/off control and dimmer control). As his apparent from the implementation of FIG. 3, both the on/off control and the dimmer control be provided by a low technology control attachment, where the control attachment may completely or substantially comprise plastic components and have little or no electrical components, enabling a low-cost control attachment. For example, when the dimmer control voltage is provided the control attachment, a simple resistor divider receiving a power signal (i.e. the low power signal provided from power adapter to the control attachment) and the ground signal (or neutral signal) can be used to provide a dimmer control voltage. Such an arrangement would enable a low cost control attachment (which may be based upon the control attachment providing basic on/off functionality and modified to include the resistor divider. As will be described in more detail in reference to FIGS. 4 and 5, dimmer functionality may be provided, but it may also be required that the control attachment is an authorized control attachment.

Figure 4:
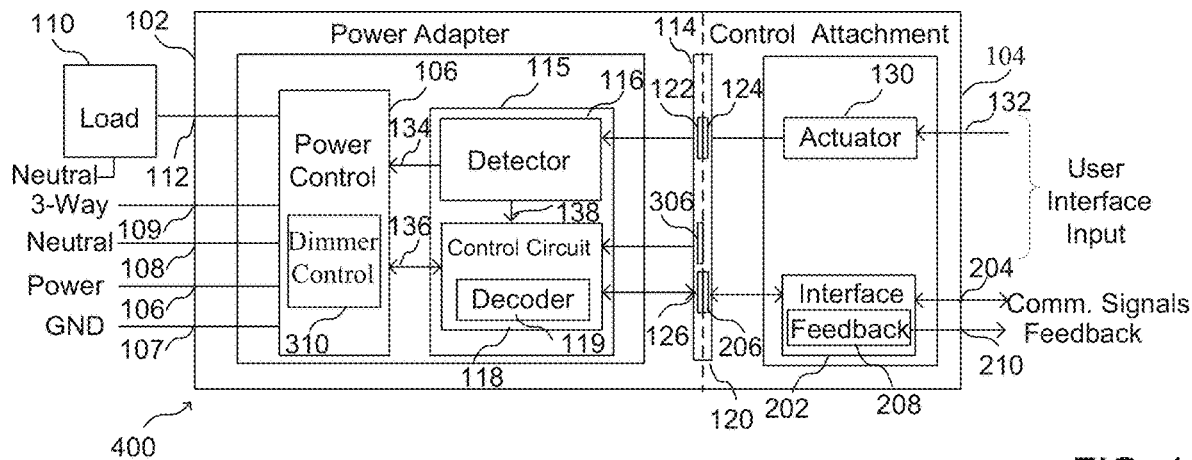
FIG. 4 is another block diagram of a power adapter arrangement having dimming functionality and a control attachment with additional features.

As shown in the block diagram of a power adapter arrangement 400 of FIG. 4, dimming functionality can be provided in a control attachment that may include additional control features and may require authentication, as generally described above and will be described in more detail below. According to the implementation of FIG. 4, a power adapter having a dimmer control circuit, and the control attachment comprises an interface that enables wireless control. Rather than an actuator that may generate a dimmer control signal in response to a user input (e.g. by way of a movable element on the control attachment), the interface circuit 202 is configured to provide dimmer control signals, where the dimmer control signals may be a part of or associated with communication signals provided by way of the communication interface 204. Therefore, the control circuit 118 will provide dimmer control signals by way of the signal line 136 to the dimmer control circuit 310 in response to signals received from the interface circuit 202. Further, because they control attachment communicates by way of the signal coupling element 126 and corresponding signal coupling element 206, enabling the transfer of electrical signals, the power adapter may authenticate the control attachment. Therefore, in addition to generating a dimming voltage signal, the communication interface may generate signals enabling the authentication of the control attachment.

Figure 5:
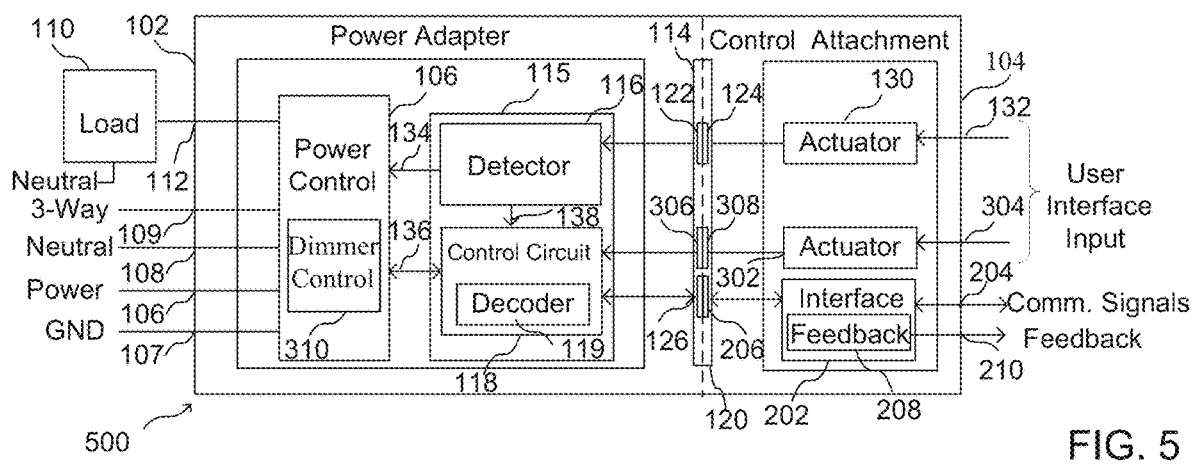
FIG. 5 is another block diagram of a power adapter arrangement having dimming functionality and a control attachment with both dimming capability and an interface for transmitting or receiving communication signals.

Turning now to FIG. 5, another block diagram of a power adapter arrangement having dimming functionality and a control attachment with both dimming capability and an interface for transmitting or receiving communication signals is shown. According to the implementation of FIG. 5, the control attachment that enables dimmer control and wireless control, where the dimmer control may be either a manual dimming control provided by way the user interface input 304 or by way of dimmer control signals (e.g. electrical control signals) generated by the interface circuit 202. As will be described in more detail below, the control circuit 118 may control the dimming in response to either control inputs provided by way of a user actuation or by way of the interface circuit 202.

According to power adapter arrangement as shown in FIG. 5, the dimmer control functionality based upon the user interface input 304 may be an electrical interface, such as a capacitive coupling interface that is responsive to the touch of a user. That is, rather than a mechanical or movable element enabling diming control, where the location of the movable element would correspond to a level of dimming, the actuator 312 may be an electrical interface, where the level of dimming may be shown by lighting elements (e.g. LED lights) that can be change by the communication interface in response to changes to dimming control detected by the communication interface. For example, a user may change the dimmer control level associated with the load using a user interface input 304 (such as a capacitive coupling element that would change the dimming level (which level would be indicated by an LED of a plurality of vertically arranged LEDs providing an indication level)) and using the interface circuit 202 that may receiving dimmer control information from an external device such as a smart phone.

By providing both electrical control (e.g. a capacitive coupling interface) and an electrical signal feedback (e.g. the use of LED lights) associated with dimming, it is possible to easily changes the electrical signal feedback in response to a change in the dimming level using either manual user input or the interface circuit 202. While it is possible to change the position of a mechanical switch associated with a dimming level for the power adapter arrangement, providing an electrical signal to control the dimming level and a visual feedback using LEDs for example, it is easy to enable a changing of the dimming level in response to both a mechanical or electro-mechanical actuator and a communication circuit that may receiving dimmer control signals based upon communication signals, such as wireless communication signals for example. That is, unlike a mechanical dimmer control element (i.e. movable element), the use of an electrical control element (i.e. capacitive coupling to detect a desired level), a dimming level can be both selected and display on the control attachment.

Further, the power adapter and the control attachment may communicate to enable the proper operation of a load controlled by the power adapter. For example, a control circuit of the power adapter may detect the type of device controlled by the power adapter, such as the type of light bulb (e.g. incandescent, halogen, LED, or CFL), or the number of watts that the bulb or other device draws, and therefore enables a control circuit of the control attachment to provide different control signals to the switching module to control the amount of power applied to the light bulb (such as a dimmable light bulb). That is, in addition to an implementation where the power adapter acts as a passive device, and only receives control signals from a control circuit of the control attachment, the power adapter and the control attachment could implement a bidirectional communication link according to another implementation to enable the control attachment to understand information received by the power adapter and better control the device controlled by the power adapter. Alternatively, the control module can detect the type or qualities of the light bulb by way of the electrical interfaces of the power adapter and the control attachment.

The range of current, voltage, or duty cycle of the voltage applied to the bulb (depending upon the type of dimmer used) could depend upon the type of bulb used. According to some implementations, the control attachment could provide a dimming control signal based upon the detected bulb, and apply a current, voltage or duty cycle of a voltage to the bulb over a range that will provide the correct dimming for the bulb. While the power adapter may be configured to provide a wide range of output power (e.g. a range of power that would power a 1 watt LED bulb or a 150 Watt incandescent bulb), the control attachment may control the range of dimming based upon at least one of the current, the voltage, or the duty cycle of the voltage applied to the bulb receiving power It should be understood that both the magnitude of the range and the location of the range for a given bulb in the overall range could be provided by the power adapter. For example, an incandescent bulb may be adapted to receive a voltage in a range of approximately 5 volts to 120 volts, while a LED light may be adapted to receive a voltage in a range from approximately 1 to 5 volts. As can be seen, not only do the ranges for the incandescent bulb and the range for the LED bulb have a different magnitude, but the ranges cover different portions of the overall voltage range provided by the power adapter (i.e. 1-120 volts). While the examples of ranges provided relate to voltage ranges, the ranges could be set for different bulbs according to other criteria, such as current or duty cycle of the voltage.

According to one implementation, the control of a dimming control circuit of the power adapter arrangement could be based upon the signal provided to the dimmer control circuit of the power adapter, where the dimmer control circuit of the power adapter would be adapted to provide a wide range of power to any type of bulb. In response to detecting a particular type of bulb, a dimming control signal would be generated in a range of dimming control signals associated with the detected type of bulb.

By way of example, the dimming circuit of a power adapter may be configured to receive a dimming code having a value between 1 and 120, where a dimming code of 1 received by the dimming control circuit would result in 1 volt output provided to the load and a code of 120 would result in a 120 volt output provided to the load. Therefore, if a particular LED bulb is detected that would receive between 1 and 5 volts (i.e. the dimming range of the LED bulb), then the selection of a dimmer controller on the power adapter would generate a code between 1 and 5 in response to the movement of the dimmer controller through the full range. For example, for a dimmer controller 1526 that is movable vertically over a predetermined range in the guide 1524, the dimmer control circuit of the power adapter would apply a voltage to the load in a range of 1-5 volts if the detected bulb is an LED bulb, but would apply a voltage in a range from 5-120 volts of the detected bulb is an incandescent bulb.

Similarly, for a power adapter that receives a dimmer control value by way of an electrical interface (e.g. a dimmer control voltage $V_{dim}$ generated based upon voltage divider circuit or a capacitive coupling circuit of the control attachment), the control attachment would provide a control signal to the control circuit of the power adapter that would apply a voltage to the load in a range of 1-5 volts if the detected bulb in an LED bulb and would apply a voltage in a range from 5-125 volts of the detected bulb is an incandescent bulb.

While the power adapter arrangements of FIGS. 1-5 are provided by way of example, it should be understood that various other configurations may be implemented within the spirit and scope of the invention. The power adapter arrangements of FIGS. 1-5 provide examples of different interfaces (e.g. multiple interfaces including different types of interfaces) that may provide different level of access (e.g. a mechanical switch that provides access to control on/off functionality of the power adapter for any control attachment or an electrical interface for controlling advanced features, such as providing dimmer control). Additional information and examples related to different types of interfaces that could be implemented in signal interface 114 and 120 are provided below.

Figure 6:
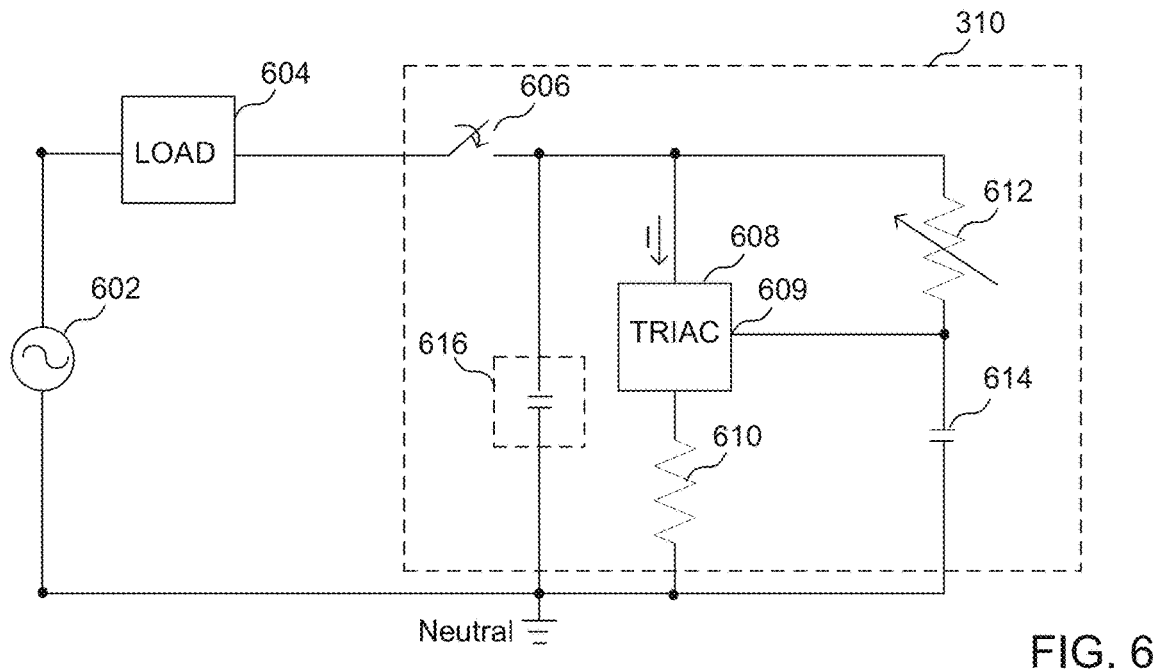
FIG. 6 is a block diagram of a dimmer control circuit that may be implemented in a power adapter or in a control attachment.

Turning now to FIG. 6, a block diagram of a dimmer control circuit that may be implemented in a power adapter or in a control attachment is shown. The dimmer control circuit of FIG. 6 receives power from a power source 602, such as an AC current source, coupled between a load 604 and a reference voltage, shown here by way of example as a neutral voltage. The load 604 is coupled to the dimmer circuit 310 by way of a switch 606. A path of current (I) through a dimmer control circuit, shown by way of example as a TRIAC 608, and a resistor 610 is provided to the neutral node. A control terminal 609 of the TRIAC receives a control voltage based upon a resistor setting of a variable resistor 612. That is, the variable resistor 612 can be adjusted by a user to control the current in the TRIAC, and therefore provide a dimming function for the load, such as a dimming function for a light for example. A firing capacitor 614 may be provided between the control terminal 609 at the variable resistor 612 and the neutral terminal. An interference capacitor 616 may also be provided in parallel with the current path through the TRIAC. While FIG. 6 is provided as one example of providing dimming control and employs a TRIAC, it should be understood that other circuits could be used for providing a dimming function, and the circuit of FIG. 6 is one example of a dimmer control circuit. Other circuit devices could be used for providing a dimming function, such as a silicon controlled rectifier (SCR) for example.

Figure 7:
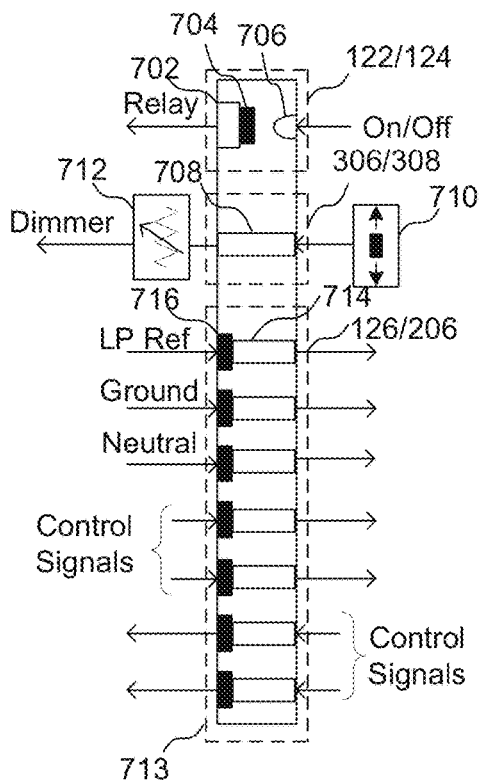
FIG. 7 is a block diagram of an interface between a power adapter and a control attachment.

FIGS. 7-11 provide examples of different types of interfaces that may include multiple types of elements that provide signals between a control attachment and power adapter, such as in signal interface circuits 114 and 120. By providing different types of elements that transmit signals, it is possible to provide different control attachments, including basic control attachments and advanced control attachments. Turning first to FIG. 7, a block diagram of an interface between a power adapter and a control attachment is shown. The implementation of FIG. 7 shows two manual switches, such as an on/off switch and a dimmer switch, and a connector arrangement for transmitting electrical signals, such as by way of contact elements. According to the implementation of FIG. 7, the dimmer control circuit is provided in the power adapter, and controlled by a movable element on the control attachment. As shown in FIG. 7, the pair of signal coupling elements 122 and 124 are configured as a mechanical on/off switch comprising a switch element 702 having a movable portion 704 associated with the power adapter and a switch actuator element 706 associated with the control attachment. The switch such as the switch element 702 located at an interface between the power adapter and the control attachment and that is accessible by a user or the control attachment on a surface of the power adapter may be considered an interface switch.

The pair of signal coupling elements 306 and 308 comprise a dimmer control interface 708 coupled to a dimmer control element 710. By way of example, the dimmer control interface 708 may comprise an element that enables the interfacing of a dimmer control element 710 of the control attachment, which is movable, with a moveable element 712 of the power adapter, which may comprise a variable resistor for or resistor divider circuit creating a dimmer control voltage. The dimmer control interface 708 may comprise an aperture or guide to enable the dimmer control element 710 of the control attachment to engage the movable element 712, so that a movement of the movable element 708 will cause a movement of the movable element 712. The movable element 712 could comprise a variable resistor or voltage divider circuit to generate a dimmer control (Dimmer) voltage.

In addition to the two mechanical interfaces associated with on/off functionality and dimmer functionality, pairs of contact elements, shown by way of example as signal coupling elements 126 and 206, enable the transfer of electrical signals, which may be low power electrical signals (e.g. approximately 5 volts, but in a range of approximately 0-24 volts). Input and output signals are provided to and from contact elements of an electrical interface 713 enabling the transfer of electrical signals between the control attachment and the power adapter. The electrical interface comprises contact elements for both the power adapter and the control attachment that make electrical contact when the power adapter is attached to the control attachment. According to some implementations, the electrical interface may be a connector for example.

Contact elements 714 of the control attachment are adapted to make an electrical connections to corresponding contact elements 716 of the power adapter for each of the pairs of contact elements as shown. For example, the contact elements 714 could be pogo pins adapted to make an electrical connection to corresponding contact pads 716 of the power adapter, or vice versa. The contact elements could be any type of contact elements to enable the transfer of electrical signals. According to some implementations, the electrical interface 713 may comprises a pair of contact blocks having contact elements, where the contact blocks can be implements as needed and based upon the number of contact elements needed to transfer electrical signals, as will be described in more detail below. For example, a contact block may comprise a plastic module (to provide electrical isolation between the contacts) that may be snapped into to a retaining element for the contact block, where a contact block having different numbers of contact elements may be selected. The electrical interface 713 may comprise contact elements that make contact for an electrical connection as a result of the control attachment being attached to the power adapter, or may comprise contact elements that are secured to one another, such as by a friction fit as a part of a connector or using attachment elements associated with the two components of the connector. For example, corresponding contact elements may comprise a female receptacle adapted to receive a male contact prong, as a part of a connector or as stand-alone contact elements associated with the control attachment and the power adapter.

Examples of signals provided to or transferred between the power adapter and the control attachment are also shown in FIG. 7. For example, the top three pairs of contact elements 714 and 716 provide reference voltages from the power adapter to the control attachment. Three reference voltages are shown by way of example, including a power voltage (shown here by way of example as a low power (LP) reference voltage), a ground reference voltage, and a neutral reference voltage, where the ground and neutral voltage may have a voltage corresponding to the ground and neutral voltage provided to the power adapter as described above. While the reference voltages may not be used for a basic control actuator having only on/off functionality (because there is no need for a power reference voltage in the control attachment) or a dimmer control functionality (in the case where no electrical signal is generated by the control attachment such as in FIG. 7 where a dimmer control signal is generated in the power adapter), they may still be made available to any control attachment, in may be used by a control attachment that requires power. Both basic control attachments and more advanced control of attachments may require power. For example, as will be described in more detail below in reference to FIG. 8, a basic attachment having a dimmer control function may require that a dimmer control voltage is generated by the control attachment. Therefore, at least power and ground (or neutral) would be necessary to generate a reference voltage using a variable resistor for example in the control attachment, where the reference voltage is then provided to the power adapter.

Figure 8:
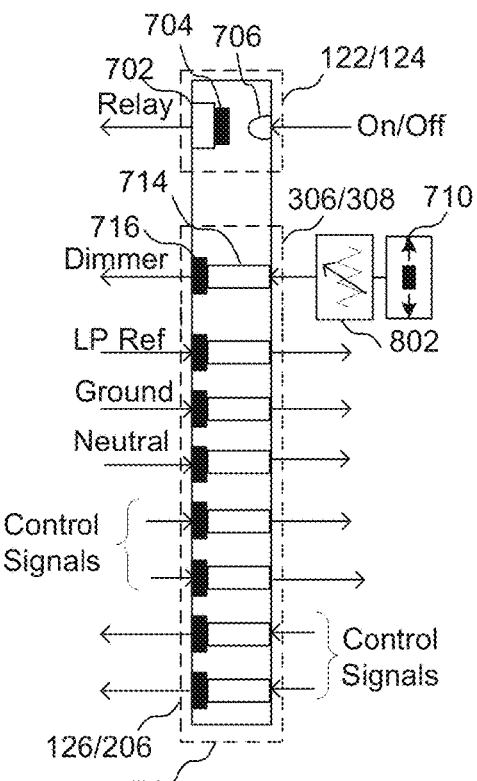
FIG. 8 is another block diagram of an interface between a power adapter having a dimmer control circuit and a control attachment.

Turning now to FIG. 8, another block diagram of an interface between a power adapter having a dimmer control circuit and a control attachment is shown. The implementation of FIG. 8 also shows two manual switches and a connector arrangement for transmitting signals, but the dimmer control circuit is provided in the control attachment, and the dimmer control signal is provided from the control attachment to the power adapter by way of the electrical interface 713. As shown in FIG. 8, a dimmer control circuit 802 is provided on the control attachment to provide a dimmer control signal to the contact element 714 of the electrical interface 713. According to the implementation of FIG. 8, the control attachment would require power and ground voltages from the power adapter.

Figure 9:
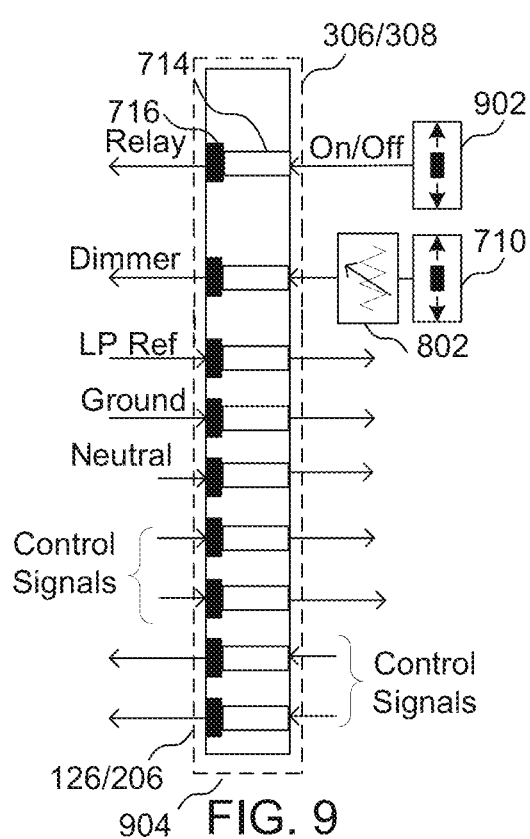
FIG. 9 is another block diagram of an interface between a power adapter and a control attachment having a dimmer control circuit.

Turning now to FIG. 9, another block diagram of an interface between a power adapter and a control attachment having a dimmer control circuit is shown, where all of the signals are transmitted by an electrical signal through one or more contacts of a connector 904. That is, as with the dimmer control circuit 802, an on/off switch actuator 902 is configured to generate a voltage (e.g. a logical "0" for off and a logical "1" for on) that is transmitted by a pair of contact elements of the connector 904.

As further shown in FIGS. 7-9, control signals may be communicated between the power adapter and the control attachment by way of the electrical interface 713. For example, 2 control signals are provided by way of 2 sets of corresponding contact elements 714 and 716 from the power adapter to the control attachment (shown by way of example below the contact elements for providing reference voltages from the power adapter to the control attachment). 2 additional pairs of corresponding contact elements are provided at the bottom of the electrical interface 713 as shown to provide control signals from the control attachment to the power adapter. The control signals can be used for any types of functions associated with control attachment and the power adapter, including for example an authentication of the control attachment, a pairing of the control attachment and the power adapter, any functions for providing signals from the control attachment to the power adapter, as well as any functions for providing feedback to a user of the control attachment for example.

While a single electrical interface 713 is shown by way of example, it should be understood that the electrical interface 713 could be split into different electrical interfaces, such as different connectors associated with different functions. For example, the portion of the electrical interface 713 providing reference voltages from the power adapter to the control attachment could be separate from a portion of the electrical interface 713 for providing control signals between the power adapter in the control attachment. Such an arrangement would enable a modular assembly of a control attachment or power adapter. That is, it may be possible to provide a low-cost control attachment having dimmer capability, but no other transfer of control signals, where the control attachment would require a smaller contact block having fewer contacts, where only contact elements for the elements for an on/off signal or reference voltages would be needed. However, the control attachment could be configured to receive a larger contact block (or an additional contact block) also having contact the elements for control signal, as will be described in more detail below.

Figure 10:
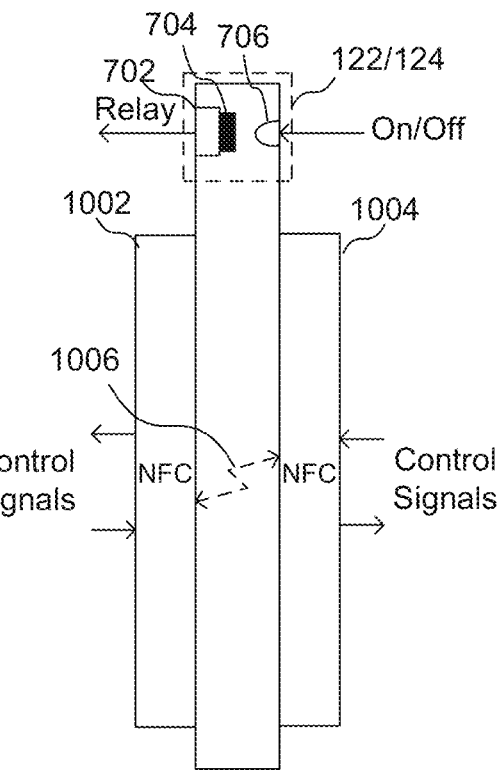
FIG. 10 is another block diagram of an interface between a power adapter and a control attachment having a wireless connection.

While wireless control signals could be coupled to a control attachment by way of contact elements as will be described in more detail below, it should be understood that wireless power signals and communication signals could be provided between the power adapter and the control attachment. The transmissions of signals could be achieved by any type of wireless connection, such as a Bluetooth protocol or a Near Field Communication (NFC) protocol for example. For example, a first wireless communication transceiver 1002 implemented in a power adapter could communicate with a second wireless communication transceiver 1004 implemented in a control attachment by way of a wireless communication link 1006. Power could be provided to the control attachment by way of an inductive coupling circuit or any other type of wireless charging circuit. According to the implementation of FIG. 10, a switch element 702 could be implemented to enable an on/off function of the power adapter arrangement. While FIG. 10 shows an example of an on/off switch, it should be understood that other types of switches could be used, or the on/off signal could be transmitted by way of the wireless communication link 1006 instead to provide a fully wireless interface.

Figure 11:
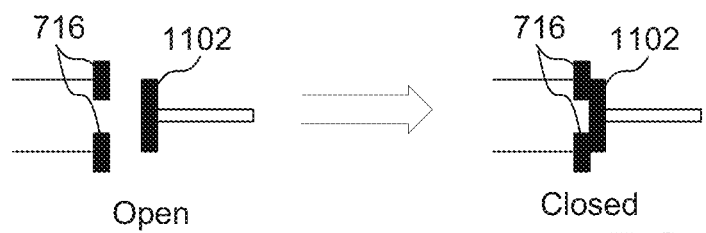
FIG. 11 is an example of a switch configuration enabling a connection by shorting contacts of a connector of a power adapter.

Turning now to FIG. 11, an example of a switch configuration enabling a connection by shorting contacts of a connector of a power adapter is shown. That is, the implementation of FIG. 11 would provide a simple method of sending a signal from a control attachment to a power adapter by merely shorting two contact elements 716. As shown in FIG. 11, a contact element 1102 is movable too short to the contact elements 716 of the connector 904, for example, to provide a closed circuit. Therefore, an off signal can be generated by the open circuit on the left of FIG. 11, while an on signal can be generated by the closed circuit on the right of FIG. 11. While various interface elements and combinations different interface elements are shown, it should be understood the interface elements and combinations of interface elements are shown by way of example, and that different interface elements and different combinations of interface elements could be employed.

While uni-directional control signals are shown by way of example in FIGS. 7-9, it should be understood that the corresponding contact elements of the power adapter and control attachment could be implemented to enable the transfer of bidirectional control signals. Further, the pairs of contact the elements could enable serial communication associated with a particular function, or collectively could represent a parallel communication interface. Any number of control signal contact elements could be implemented to enable the transfer of information between the power adapter and the control attachment, and the control signal contact elements could be configured in a way to implement any type of communication protocol.

For example, any number of pairs of contact elements could be used to implement a serial communication interface, such as a serial peripheral interface (SPI) having one wire for each of the power adapter and the control attachment and one wire for clock pulses, an RS-232 interface that provides a full duplex communication link, Ethernet, Universal Serial Bus (USB), or any other synchronous or asynchronous serial communication link. Similarly, any number of pairs of contact elements could be used to implement a parallel communication interface, such as a General Purpose Instrument Bus (GPIB, also known as the IEEE-488 standard) for example.

Figure 12:
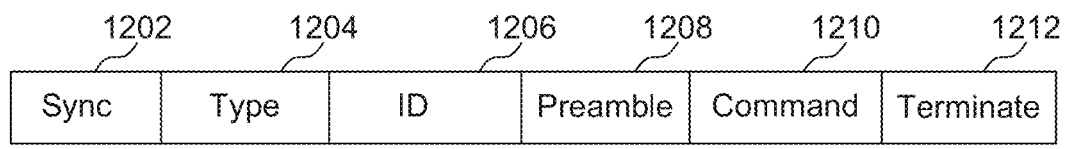
FIG. 12 is block diagram of a data block having a plurality of fields enabling the transfer of signals between a power adapter and a control attachment.

Turning now to FIG. 12, a block diagram of a data block having a plurality of fields enabling the transfer of signals between a power adapter and a control attachment is shown. According to the exemplary block diagram of FIG. 12, different fields are provided that enable the communication of signals between the power adapter and the control attachment. The data block of FIG. 12 comprises a synchronization (Sync) field 1202, a type (Type) field 1204, an identification (ID) field 1206, a preamble (Preamble) field 1208, a command (Command) field 1210, and a terminate (Terminate) field 1212. The synchronization field 1202 enables a transfer of data between the control attachment and the power adapter to allow the control attachment to control the application of power to a load. For example, the synchronization signal could be used by one of the power adapter or control attachment too indicate that data, such as commands or identification information, is being sent. A type field may also be included and can be used to indicate the type of power adapter or control attachment that is used. An ID field is also provided to include an identification, which may be a unique identification for example, of either the power adapter the control attachment. As will be described in more detail below, the identification may be used to authenticate the control attachment and enable the control attachment to provide signals to and receive signals from the power adapter. The identification field may be a unique identification field.

A preamble may then be provided to indicate the type of information that might follow, such as commands or other data that might be exchanged. A command field could include any type of command or other information (e.g. information provided in response to a command) to be provided from one of the power adapter to the control attachment. Finally, a terminate field could comprise data indicating that the transmission has ended. Once a control attachment is authenticated as being an authorized control attachment, data may be transmitted between the power adapter and control attachment until the exchange of data between them is terminated using data in the terminate field, as described in more detail in reference to FIGS. 13 and 14.

While the fields of FIG. 12 are shown by example, it should be understood that different fields or additional fields could be implemented to perform any necessary functions, including enabling the exchange of information between the power adapter and the control attachment, the control of the power adapter by the control attachment, and feedback from the control attachment to a user of the control attachment. Also, each of the fields may comprise sub-fields. Further, similar data could be included in different fields, and could be transmitted and received according to a predefined protocol.

Figure 13:
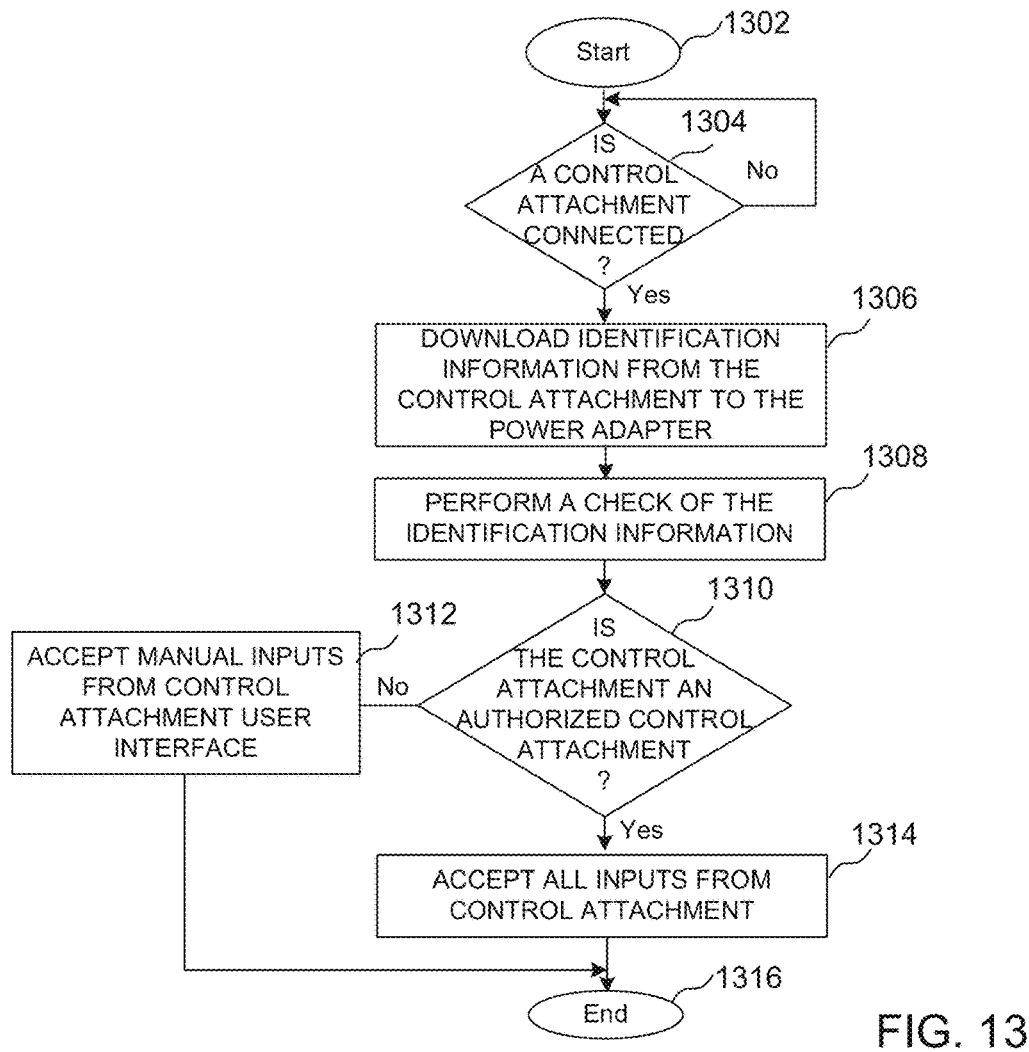
FIG. 13 is a flow chart showing a method of enabling the control of a power adapter using a control attachment.

Turning now to FIG. 13, a flow chart showing a method of enabling the control of a power adapter using a control attachment is shown. That is, the circuits and methods set forth below not only ensure that an approved control attachment is used for including advanced features for controlling the power adapter, but enables manual operation of basic features, such as manual on/off or dimming control. After the method is started at a block 1302, such as in response to the detection of an event by a power adapter (e.g. determining that a control attachment may have been attached to the power adapter), it is determined whether a control attachment is attached to the power adapter at a block 1304. If so, identification information is downloaded from the control attachment to the power adapter at a bock 1306. A check of the identification information is then performed at a block 1308. It is then determined whether the control attachment is an authorized control attachment. That is, the control attachment is authenticated as an authorized control attachment. An authorized control attachment may be a control attachment that is confirmed to be used with the power adapter. For example, the power adapter may analyze a unique identification signal provided by the control attachment to determine whether the control attachment is authorized to work with the power adapter.

Because the control of high voltage electrical signals can be dangerous, where the improper use of high voltage signals can lead to a fire or personal injury, it is beneficial to ensure that only authorized control attachments are allowed to control the application of power to a load, as described in more detail above. Therefore, if it is determined that the control attachment is not an authorized control attachment at a block 1310, only manual inputs (i.e. inputs provided by a user to an interface of the control attachment, such as by a user engaging a toggle element for example) from the control attachment user interface will be accepted at a block 1312. While it is beneficial to not only prevent an unauthorized control attachment (i.e. a control attachment that has not been authorized) from controlling a power adapter, it is also beneficial to allow the control attachment to control the power adapter in response to manual user inputs. That is, a user will be able to use simple functions of the power adapter so that the user can turn on and off the light until the control attachment can be replaced with an authorizes control attachment. Unlike an unauthorized control attachment that may not function properly with the power adapter, and may unsafely apply power to a load, the manual use of the control attachment should not provide any risk to the user. However, if it is determined that the control attachment is an authorized control attachment, all inputs from the control attachment will be accepted at a block 1314, and the processes ended at a block 1316. It should be understood that the authorization process in the block 1310 may be performed whenever a control attachment is attached. That is, once a control attachment is authorized, it may continue to operate with the power adapter until it is removed.

Figure 14:
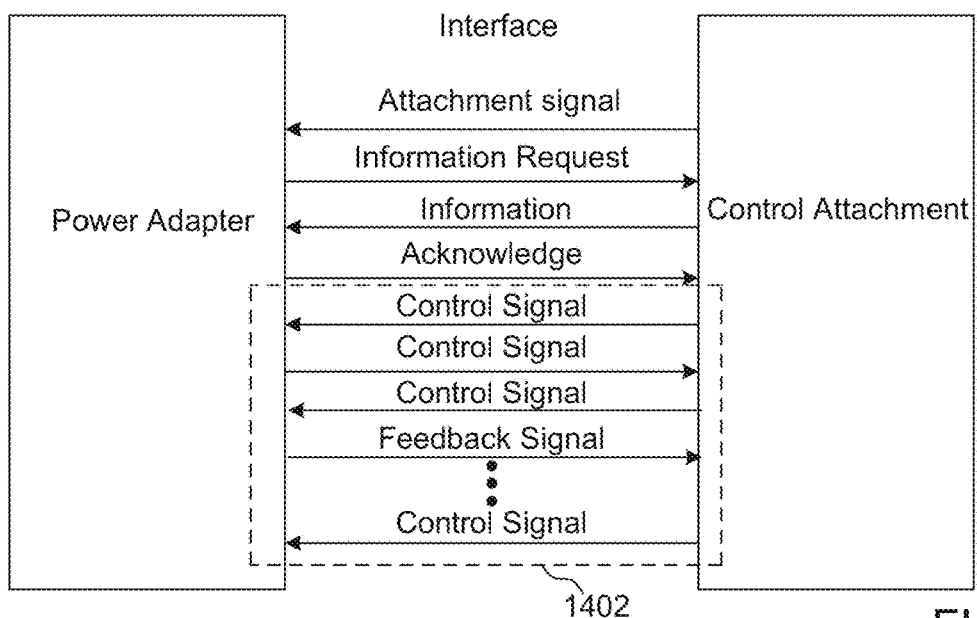
FIG. 14 is an example of a signal transfer protocol for transferring signals between a power adapter and a control attachment.

Turning now to FIG. 14, an example of a signal transfer protocol for transferring signals between a power adapter and a control attachment is shown. As shown for example in FIG. 14, an attachment signal may be provided by the control attachment to the power adapter. The attachment signal may be a voltage that is generated in response to a power reference voltage being provided to the control attachment. That is, the power adapter would detect that the control attachment is receiving the power reference voltage from the power adapter and drawing current. The power adapter, in response to detecting the attachment signal, may then provide an information request. For example, the power adapter may request identification information to enable authenticating the control attachment. The information may then be provided to the power adapter, which way then provide an acknowledgement signal. Various control signals and feedback signals 1402 can then be transferred between the power adapter and the control attachment. The control signals and feedback signals can relate to the operation of the power adapter, the operation in the control attachment, signals received from the control attachment and provided to the power adapter to control the application of power to a load, or feedback signals provided to the control attachment. While an exemplary sequence of signals being transferred is shown, it should be understood that other sequences and other signals could be transmitted, or that similar types of signals could be transmitted according to a predetermined signaling protocol to achieve authorization of the control attachment and control of the power adapter.

Various examples of power adapters, control attachments, and a power adapter as coupled to control attachments are now shown. While some examples of power adapters and control attachments are shown, it should be understood that features of the power adapters and control attachments could be implemented differently, and features could be interchanged between the various implementations. The examples are provided in the following figures to demonstrate how features could be implemented. However, it should be understood that the various features could be implemented differently.

Turning first to FIG. 15, a front and side view of a power adapter 102 is shown. As shown in the implementation of FIGS. 15-21, an on switch and an off switch are provided on a surface of the power adapter to enable manual control of the power adapter using a basic control attachment, and even when the control attachment is not attachment. More advance features of a more advance control attachment can be implanted using connector shown near the bottom of the power adapter. While contact elements are also provided on the surface of the power adapter and exposed to a user of the power adapter when the control attachment is not attached or is removed to be replaced with a different control attachment, the contact elements do not include high voltage signals, and therefore are not a risk to uses of the power adapter. That is, a user of the power adapter can operate the power adapter without a control attachment attached to the power adapter without any risk to the user. Such a configuration makes the power adapter arrangement (having a power adapter that can be used without a control attachment) particularly beneficial to a home builder that may wire a house and allow a user to install control attachments, or allow the home builder to wire a house and install the control attachments at a later time after consultation with the home owner. However, during the time from the wiring of the power adapters and the time when a home owner may select control attachments, lights or other devices controlled by the power adapter may be used without a control attachment attached.

A wall, 1501 having a top 1502 in a planar surface, extending around a perimeter of the power adapter defines a recess 1503 extending to a rear surface 1504 comprising a back wall of the recess. A first switch 1506 comprising a switch control element 1507 and a second switch 1508 comprising a switch control element 1510 are positioned on the rear surface 1504 of the recess. The first switch 1506 and the second switch 1508 may comprise physical actuators that generate a signal in response to a physical external input (i.e. a manual input such as a pressing of the switch element). For example, the first switch 1506 and the second switch 1508 may be electro-mechanical actuators enabling on off control of the power adapter.

As described above, the first switch 1506 and the second switch 1508 may be used with or without a control attachment, and even with the control attachment that is not authorized. That is, because only low power voltage signals may be provided to an electrical interface 1512 having contact elements 1514, a home builder can install the power adapter (even without control attachment, but with a wall plate if desired) without concern that the user of the power adapter would be exposed to a high voltage electrical signal. The user could control the power adapter by merely depressing the switch control element 1507 to turn power to the load on or depressing the switch control element 1510 to turn power to the load off. While the electrical interface 1512 may be used to receives signals from an authorized control attachment 104, an unauthorized control attachment connected to the power adapter would be allowed to be used to turn on and off power to the load, but may be prevented from controlling the power adapter by way of the contact elements of the electrical interface 1512. Further, while the electrical interface 1512 is shown at the bottom of the power adapter, it could also be placed between the switch is 1506 in 1508 of the power adapter, as will be shown in other implementations below, or at another location or in another orientation.

The power adapter would also comprise contact elements that are coupled to reference voltages of a building, which may include a high power reference voltage (e.g. 120 or 220 volt reference voltage), and ground and neutral reference voltages, as described above. For example, a first contact element 1516 is shown here by way of example as having a screw 1518 that is adapted to secure a wire to the contact element 1516, and a second contact element 1520 having a screw 1522 adapted to secure a wire to the contact element 1520 are shown. While two contact elements are shown on a side of the power adapter, additional contact elements could be provided on the opposing side for example, or on the top or bottom, where any number of contact the elements are provided to enable the appropriate control of loads in an electrical circuit. For example, the contact elements such as contact elements 1516 and 1520 could be provided to enable connections to power, neutral, ground, and 3-way, as shown and described for example in FIGS. 1-5.

The power adapter may also comprise a dimmer control feature, where a guide element 1524 enables the movement of a dimmer controller 1526 to provide dimming control. A corresponding dimmer control element may be implemented in the control attachment, where the dimmer control elements are coupled to enable dimming control from the control attachment, as will be described in more detail in reference to FIGS. 65-75. While the dimmer control functionality is provided for manual dimmer control, it should be understood that dimming control could also be provided by way of the electrical interface 1512, where dimming control can be coordinated using the 2 interfaces as will be described in more detail below. It should be understood that the dimmer controller 1526 is optional, and dimming control could be controller by non-mechanical elements from the control attachment by way of the electrical interface. A pair of flanges 1528 are included on the top and bottom of a power adapter that is configured to be attached to a junction box, where each flange comprises an opening 1530 for receiving a screw enabling the power adapter to be coupled to a the junction box and threaded portion 1532 for receiving a screw that enables a wall plate to be attached to the power adapter, as will be described in more detail below.

Turning now to FIG. 16, a cross-sectional view of the power adapter of FIG. 15 taken at lines 16-16 is shown. As shown in FIG. 16, the switch control elements 1507 and 1510 of the switches 1506 and 1508 are exposed in the recess 1503, enabling the user to use the switches without actuator elements of the control attachment normally used to control the switches. As also shown in the cross sectional view of FIG. 16, the recess 1503 provides space for receiving elements of the control attachment, such as circuit elements and/or mechanical elements of a control attachment for enabling operation of the power adapter, as will be described in more detail below.

Various types of control attachments are also described. According to some implementations, the control attachment could be configured to be placed behind the recess or opening of a wall plate, where a toggle element extends though the opening in the wall plate after the wall plate is attached to the power adapter, but cannot be inserted through or removed through the opening in the wall plate when the wall plate is attached to the power adapter. That is, the control attachment can only be attached to or detached from the power adapter when the wall plate is not attached to the power adapter, as described in reference to FIG. 17 and other figures below. By requiring that the wall plate be removed to attach the control attachment to the power adapter or remove the control attachment from the power adapter, it is more difficult to remove the control attachment, making it more difficult for a control attachment to be stolen or removed as a prank.

Figure 48:
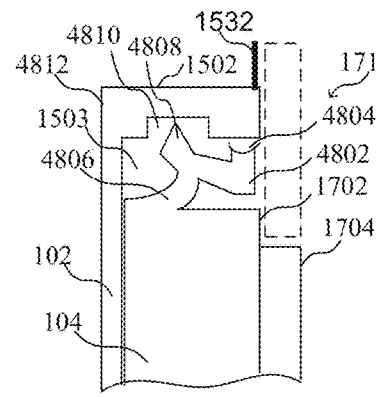
FIG. 48 is another side view of a portion of attachment elements of a power adapter and a corresponding control attachment that may be located behind a wall plate, where the attachment element of the power adapted is on a side wall of the power adapter.

Alternatively, the control attachments may be adapted to be inserted through a recess of a wall plate coupled to the power adapter. That is, a control attachment can be attached or removed when the wall plate is attached to the power adapter as will be described in more detail in reference to FIG. 18 and other implementations below. As will be described in more detail below in reference to FIGS. 48 and 49, the attachment elements associated with the power adapter could be configured to receive control attachments that can be attached or detached when the wall plate is attached to the power adapter (FIG. 49), or only when the wall plate is detached from the power adapter (FIG. 48). That is, according to some implementations, a common power adapter can be provided, where the control attachment can be implemented to accommodate either type of control element.

Figure 24:
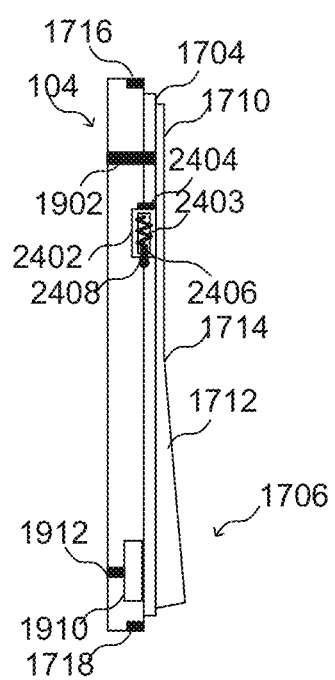
FIG. 24 is a side view of a control attachment that may be implemented with the power adapter of FIG. 22 and having a toggle element in a first state.
Figure 25:
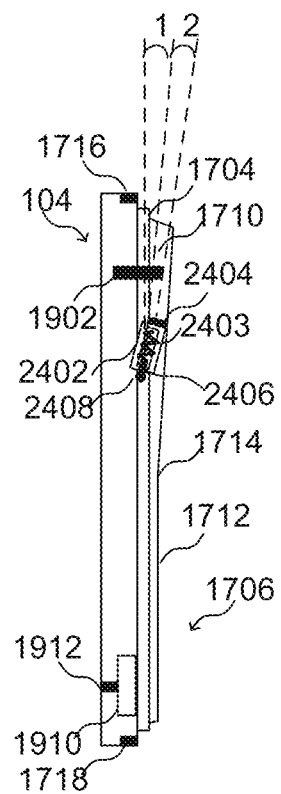
FIG. 25 is a side view of the control attachment of FIG. 24 where the toggle element is a second state.

According to various implementations, maintained switches (i.e. switches that a state of power applied to a load is maintained until another toggle event occurs) are shown, where the toggle element may be spring loaded to return to a common fixed position by one or more spring elements after a toggle motion (to either apply power to the load or remove power from the load) as described in reference to FIGS. 17-21 or may move between 2 fixed positions as described in reference to FIGS. 24-25.

Turning now to FIG. 17, a front and side view of a control attachment having a portion that extends through recess of a wall plate and a portion including attachment elements that are located behind the wall plate (i.e. preventing the control attachment from being attached or detached when the wall plate is attached to the power adapter) is shown. As shown in FIG. 17, the control attachment 104 comprises a planar surface 1702 of a body portion 1703, where a wall 1704 extends from the planar surface 1705, and would extend through the opening in the wall plate when the wall plate is attached to the power adapter. That is, the wall 1704 will be aligned with the perimeter of the opening of the wall plate and extend through the opening of the wall plate when the control element is attached to the power adapter and the wall plate is then attached to the power adapter, where the wall plate will cover at least a portion of the planar surface 1702. According to some implementations, the perimeter of the opening of the wall plate may abut the planar surface 1702. The planar surface 1702 may also be aligned with the planar surface on top of the wall 1502 so that the planar surface on the top of the wall 1502 and the planar surface 1702 are in the same plane. Such an arrangement may make it easier for the wall plate to correctly align with the power adapter and control attachment when they are coupled together.

The control attachment 104 of FIG. 17 may also comprise a toggle element 1706, shown here by way of example as a paddle-type toggle element, that is movable within a gap 1708 within the base portion 1703. The toggle element comprises a top portion 1710 and a bottom portion 1712 on either side of a center portion 1714. The toggle element 1706 Is movably coupled to the base portion 1703 by way of hinge elements 1715. As will be described in more detail below in reference to FIGS. 19-21, The toggle element main move between and on position and an off position.

The control attachment also comprises attachment elements 1716 and 1718 that enable attaching the control attachment to the power adapter. According to some implementations, the attachment elements may comprise movable elements, such as leaf springs having a projection for engaging with a corresponding element of the power adapter, as will be described in more detail in reference to FIGS. 47-49. According to the implementation of FIG. 17, the attachment elements are positioned so that they are not accessible when a wall plate is place over the control attachment and coupled to the power adapter. That is, a user of the power adapter any not be able to engage or interact with the attachment elements, and the base portion 1703 would not fit through the opening of the wall plate (and therefore the control attachment would not be able to be inserted or removed with the wall plate on). As will be described in reference to FIG. 18, the attachment elements would be accessible to the user when the wall plate is attached, enabling the user to insert or remove the control attachment when the wall plate is attached.

While a combination of power adapter and the control attachment in FIGS. 15-17, it should be understood that a power adapter having no recess could be implemented, where the rear surface 1504 is in the same plane as the top of the wall 1502. Alternatively, the back wall could be raised with respect to the top of the wall, where the control attachment may have a peripheral flange that could be placed over the back wall and abut a planar surface around the top of the wall 1502. It should also be understood that many different types of attachment elements could be implemented, and the attachment of the control attachment to the power adapter could be based upon any principle, including a friction fit, where the attachment elements would comprise attachment elements that abut one another and are attached based upon friction, such as when edges of the control attachment abut the inside portion of the wall 1501, or when a peripheral flange abuts side walls of the back wall that is raised with respect to the wall 1501. Any other type of attachment elements could be used, including spring loaded attachment elements, or projections and corresponding flanges or recesses adapted to receive the projection for example.

Turning now to FIG. 18, a front and side view of a control attachment that extends through opening or recess of a wall plate, where the attachment elements of the control attachment are accessible when the wall plate is attached to the power adapter is shown. While the wall plate is generally attached to the power adapter, the power adapter arrangement could be configured so that wall plate is attached to the control attachment. According to the implementation of FIG. 18, a base portion 1801 comprises a top portion 1802 of a wall 1803, where both the top portion 1802 and at least a portion of the wall 1803 may extend through the opening of a wall plate when the wall plate is attached to the power adapter arrangement. That is, at least a portion of the base portion 1801 extends through the opening of wall plate so that a user can access the attachment elements associated with the based portion and remove the control attachment.

More particularly, the control attachment of FIG. 18 comprises a gap 1804 between a toggle element 1805 and the wall 1803. The toggle element 1805 comprises the top portion 1806 and a bottom portion 1808 on either side of a center portion 1810, which comprises a pivot portion. Attachment elements 1816 and 1818 are positioned at the top and bottom of the base portion 1801 to enable the control attachment to be attached to the power adapter. It should be understood that the attachment elements 1716 and 1718 of FIG. 17 and attachment elements 1816 and 1818 of FIG. 18 could be configured to attach to the same attachment elements of the power adapter 102 as described in reference to FIGS. 48 and 49. Such an arrangement would enable a user to decide which type of power attachment to use (i.e. a control attachment that can be attached and detached when the wall plate is attached to the power adapter or a control attachment that can be attached or detached only when the wall plate is not attached to the power adapter). Having a choice of the types of control attachments is beneficial to a user because there may be different situations where one type of control attachment may be better than another. For example, an owner of a residential home could use control attachments that can be attached and detached when the wall plate is attached to the power adapter. However, in a commercial building where there is a chance that a control attachment may be stolen or removed as a prank, it would be beneficial to install control attachments that can only be removed when the wall plate is removed. That is, requiring that the wall plate be removed for the control attachment to be detached would make it more difficult for the control attachment to be stolen or removed by an unauthorized party. According to some implementations, a control attachment that can only be detached when the wall plate is removed could also be configured to require a special tool to be removed even after the wall plate is removed.

Turning now to FIG. 19, a side view of the control attachment of FIG. 17 having a toggle element is shown. According to the implementation of FIG. 19, actuator elements 1902 and 1904 are movable in response to a user actuation of the top portion 1710 and the bottom portion 1712 of the toggle element 1706. Also shown in FIG. 19 is a control circuit 1910 coupled to contact elements 1912, which would be present if the control attachment is a smart control attachment and comprises a control circuit, such as control circuit 118 as described above. While the control circuit 1910 is shown by way of example near the bottom of the control attachment, it should be understood that the control circuit can be placed at other locations along the control attachment. The control attachment may also comprise spring elements 1906 and 1908. The spring elements 1906 and 1908 enable the toggle element to return to a standing position (i.e. a return-to-center type toggle element that remains in a fixed, center position whenever a portion of the toggle element is not being pressed).

Figure 80:
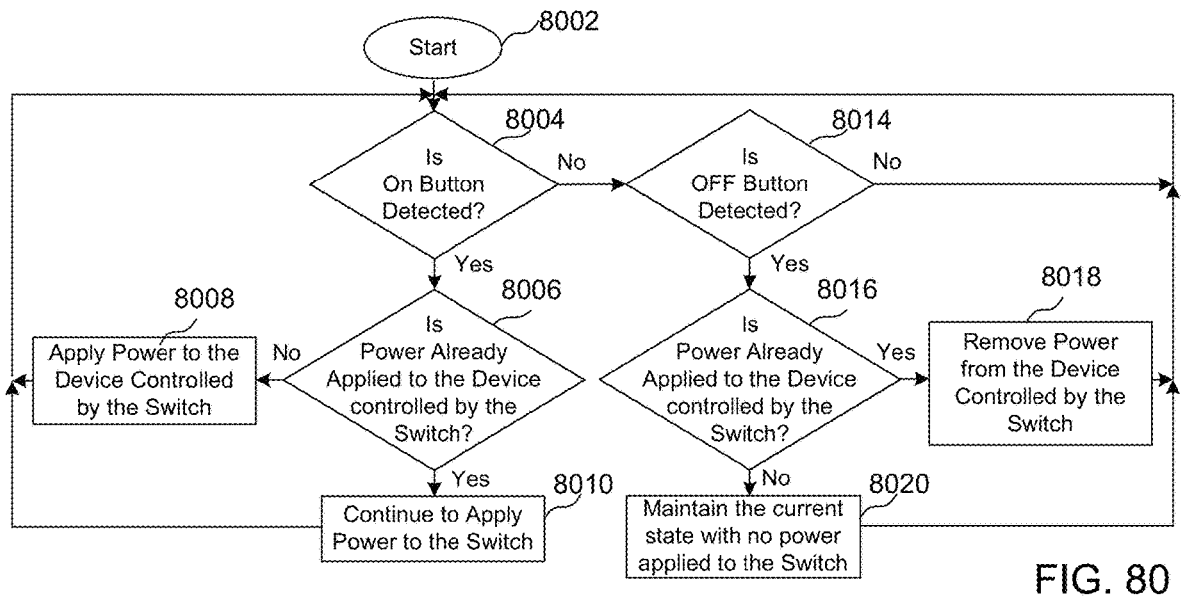
FIG. 80 is a flow diagram showing a method of implementing a power adapter arrangement having two toggle switches.

Turning now to FIGS. 20 and 21, the state of the toggle element before returning to the center position is shown. FIG. 20 shows a side view of the control attachment of FIG. 19 having a movable toggle element in a first position, which may be considered an on position (for a switch that is not in a 3-way switch connection). FIG. 21 is a side view of the control attachment of FIG. 19 having a movable toggle element in a second position, which may be considered an off position (for a switch that is not a 3-way switch connection). As will be described in more detail below in reference to FIG. 80, different actions can be taken depending upon a current state of power applied to a device when either the top portion or the bottom portion of the toggle element 1706 is pressed. While FIGS. 19-21 are based upon the control attachment of FIG. 17, it should be understood that the same toggle element arrangement could implemented according to the implementation of FIG. 18, where the control attachment is removable when the wall plate is attached.

Figure 22:
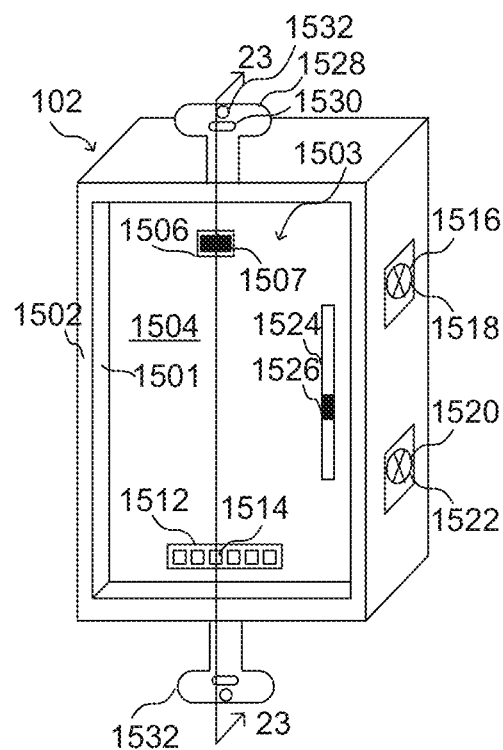
FIG. 22 is a front and side view of a power adapter having a single toggle actuator and an optional dimmer control element.

Turning now to FIG. 22, a front and side view of a power adapter having a single toggle actuator and an optional dimmer control is shown. According to the implementation of FIGS. 22-25, a single on/off switch is included on the power adapter. According to the implementation of FIG. 22 and also shown in the cross-sectional side view of FIG. 23, the switch 1508 is not included, where a toggle function depends upon a change of state of the switch 1506 having a movable switch control element 1507. By using a single on/off switch, the area of the power adapter of FIG. 15 having the second switch can be used for other functions, as will be described in more detail below. The control attachment that could be used with the power adapter of FIG. 22 may comprise a spring-loaded toggle element that may be retained in an on or off position as described in FIGS. 21-24 below to enable the use of a single switch on the power adapter. That is, the switch control element 1507 will be held in a certain state after an indication of a desire to change a state of the power applied to the load (i.e. by pressing the top portion of the toggle element), and then released in response to another indication of a desire to change the state of the power applied to the load (i.e. by pressing the bottom portion of the toggle element).

Figure 23:
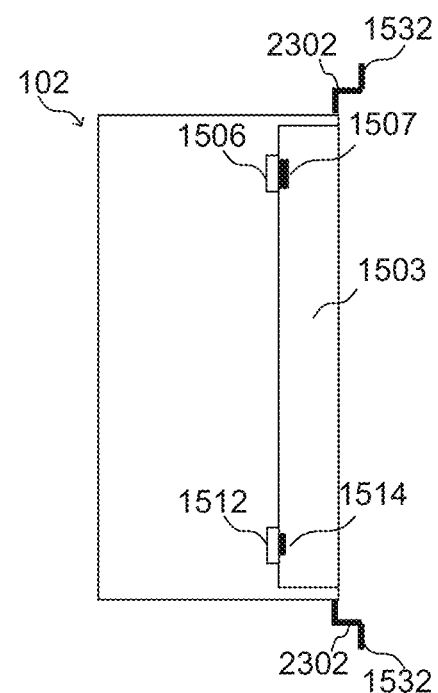
FIG. 23 is a side view of the power adapter of FIG. 22.

As shown in the implementation of FIG. 23, the flange 1528 may be contoured as shown to enable an attachment element of the control attachment to be coupled to a corresponding attachment element of the flange, such as to a projection 2302 of the flange That is, an attachment element of the flange may be adapted to receive a corresponding attachment element of a control attachment to enable attaching the control attachment to the power adapter. Such an arrangement may be beneficial when the power adapter does not comprise a recess 1503, but rather the control attachment is attached to a planar surface of the power adapter.

Turning now to FIGS. 24 and 25, an example of a control attachment that could be used with the power adapter of FIG. 22 is shown. The control attachment of FIG. 24 is a static control attachment (i.e. remains in a fixed position when either the top portion or the bottom portion of the toggle element is moved), and comprises a toggle element that is moved to either a first static position as shown in FIG. 24 or a second static position as shown in FIG. 25. A side view of a control attachment that may be implemented with the power adapter of FIG. 22 and having a toggle element in a first state as shown in FIG. 24. The control attachment of FIG. 24 may comprise a spring-loaded element 2402 that retains the toggle elements in either the first position or the second position when moved to that position.

More particularly, the spring-loaded element 2402 comprises a spring 2403 that may be extended when moved from a first position to a second position, where the spring is coupled between a first coupling element 2404 and a second coupling element 2406, and the spring-loaded element 2402 is coupled to the control attachment at a hinge element 2408. In the first state as shown in FIG. 24 after the top portion of the toggle element is pressed, the spring 2403 is in a first resting state, holding the toggle element in the first state as shown in FIG. 24. When in the first state, the toggle element will hold the switch control element 1507 in a "pressed" state.

However, when the bottom portion of the toggle element is pressed, the spring-loaded element 2402 extends through an arc defined by angles 1 and 2 as shown. As the spring-loaded element 2402 passes through the 1st angle, the spring is extended, and then begins to return to a non-extended state (i.e. a second resting state) as the spring-loaded element 2402 reaches the end of the second angle as shown in FIG. 25. When the spring-loaded element 2402 reaches the end of the second angle, these spring is again no longer extended, holding the spring loaded element in the second state. While paddle-type toggle elements are shown in reference to FIGS. 17-25, it should be understood that any type of toggle element could be implemented.

Turning now to FIG. 26, a front and side view of a control attachment having a hinged toggle element is shown. According to the implementation of FIGS. 26-31, a hinged toggle element enables access to control elements that may include user interface elements behind the toggle element and a recess for receiving a control module. More particularly, a hinged actuator element 2602 is coupled to the control attachment base portion 1703 by hinge elements 2604. As shown in the side view of FIG. 27 of the control attachment of FIG. 26, elements are included that enable the control of an actuator of the power adapter for controlling the power adapter. For example, a top portion 2701 can be depressed within a wall portion 2702, where an opening 2703 is provided in the back wall of the control attachment that enables a switch actuator element 2704, shown here by way of example as a projection, to extend through a back wall of the control attachment and make contact with an actuator of the power adapter. It should be understood that the switch actuator element 2704 could engage an intermediate actuator element, as will be described in more detail below in reference to FIGS. 81 and 82. A spring element 2706 may be included to enable the toggle element to return to a fixed state, as shown in FIG. 27. The control attachment may also comprise a control circuit 2710 and contact element 2712 near a bottom portion 2714 of the hinged toggle element.

Turning now to FIG. 28, a front and side view of the control attachment of FIG. 26 with the hinged toggle element in an open position and exposing a control module and optional user interfaces is shown, where the inner surface 2808 of the hinged toggle element comprises the switch actuator element 2704 and the spring element 2706. More particularly, a rear surface 2802 of an inner portion of the control attachment (i.e. visible when the movable toggle element is open) may comprise various user interfaces or be adapted to receive a control module. For example, a recess 2804 may be included to receive a controller 2806, which may comprise a control module or insert for example. The inner surface may also comprise a user interface 2814, which may comprise actuator elements or electrical connectors for programming the control attachment or power adapter or otherwise controlling the power adapter. The user interface 2814 may be coupled to the controller 2806 by way of a signal line 2816.

Turning now to FIG. 29, a front and side view of the control attachment of FIG. 26 with the controller 2806 of FIG. 28 removed is shown. The recess 2804 may comprise attachment elements 2902, which may be implemented on either side of the recess for example. The recess may also comprise an electrical interface 2904, which may be a connector or contact block, having contact elements 2906. According to the implementation of FIG. 30, rather than having an electrical interface, the recess may comprise an opening 3002 that enables the contact elements of the controller 2806 to be exposed on the back of the control attachment, enabling electrical connections to corresponding contact elements of the power adapter.

According to the implementation of FIG. 31, the controller 2806 comprises a rear surface 3102 that is adapted to abut a rear surface of the recess 2804. The rear surface 3102 comprises an electrical interface 3104, such as a connector or contact block having contact elements 3106. The context elements 3106 may make an electrical contact with the contact elements 2906 of the control attachment when the controller 2806 is inserted into the recess 2804. Alternatively, the contact elements 3106 may make contact with corresponding contact elements of the power adapter according to the implementation of FIG. 30. Attachment elements 3108 are adapted to couple with corresponding attachment elements 2902 to secure the controller 2802 in the recess and ensure an adequate electrical connection between the corresponding contact elements.

According to the implementation of FIG. 32, a control module 3206 may be accessible when a hinged toggle element is in a closed position as shown. More particularly, a front and side view of a control attachment having a control module 3206 that is accessible through a recess in a toggle element, such as a hinged toggle element as shown. According to the implementation of FIG. 32, a hinged toggle element may comprise a recess for receiving a control module, where the control attachment comprises in control actuator 3202 having a top portion 3203 that enables a toggle selection and a recess 3204 adapted to receive a control module 3206. The control module 3206 may comprise a lens 3208 (e.g. a translucent region that may be adapted to accommodate a sensor such as a camera or a motion detector), which is also shown in FIG. 33, where the control module 3206 may comprise contact elements 3302 that may be coupled to contact elements of the control attachment or the power adapter as described in reference to FIGS. 29 and 30. As shown in FIG. 33, the control module 3206 may be attached to or detached from the control attachment while the control actuator 3202 is in a closed position. The control actuator 3202 also comprises hinge elements 3210 to enable both an actuator motion (i.e. a movement of the control actuator to enable an actuation of a switch of the power adapter) and an opening of the control actuator 3202 to expose user interface elements on an inside surface of the control attachment as shown in FIG. 34. An inside surface 3402 of the control actuator 3202 may comprise the switch actuator element 2704 and the spring element 2706 as described above.

Turning now to FIG. 35, a front and side view of the toggle element 3203 of FIG. 32 that may be removed is shown. More particularly, the actuator element 3202 comprises a first and second leg portions 3502 and 3504 associated with the hinge elements 3210. As shown in FIG. 36, the base portion 1703 of the control attachment may comprise a hinge element 3602 adapted to receive the hinge element 3210. For example, a protrusion 3604 associated with a base portion 3606 comprises first and second projections 3608 and 3610 to form a recess 3612. The recess 3612 is sized to receive the hinge element 3210 such that the control actuator 3202 may be attached to and detached from the control attachment.

Figure 37:
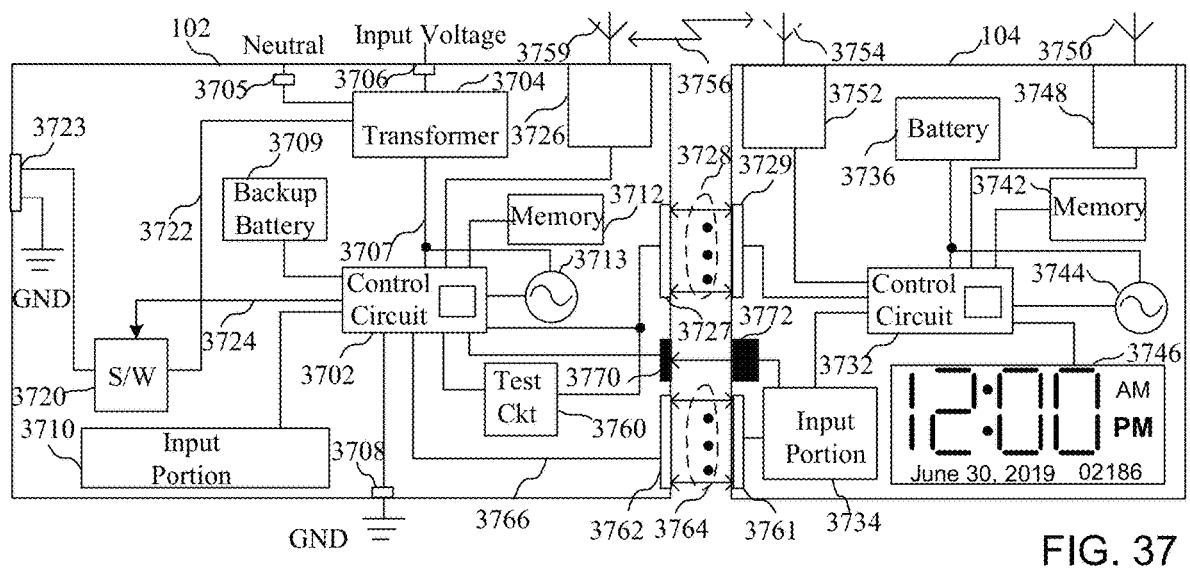
FIG. 37 is a block diagram showing an example of circuit elements and interface elements that could be implemented in the power adapter 102 and control attachment 104.
Figure 83:
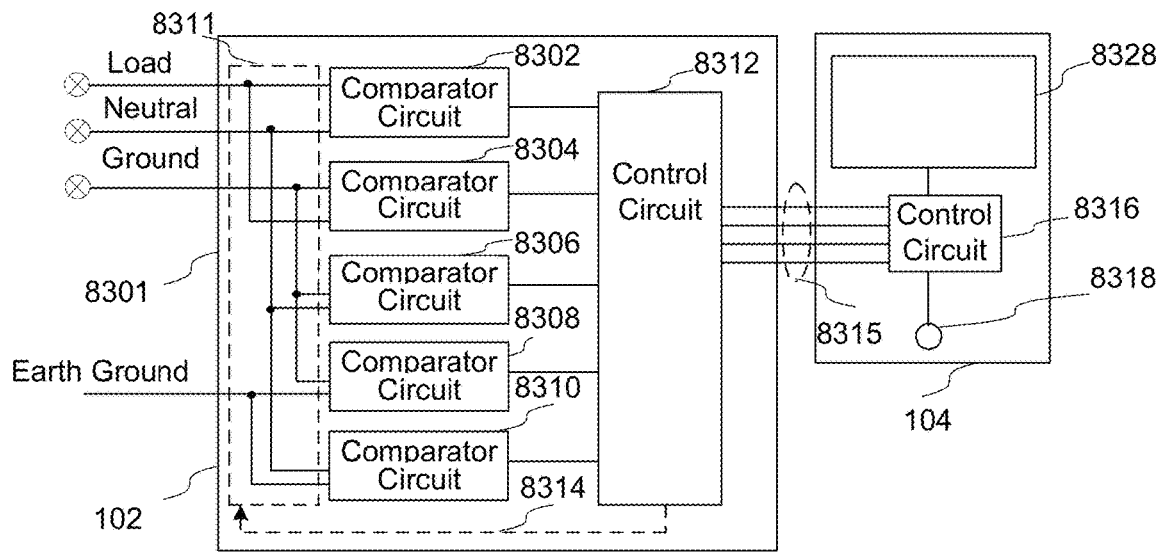
FIG. 83 is a block diagram of a circuit for testing the connections associated with a power adapter.
Figure 84:
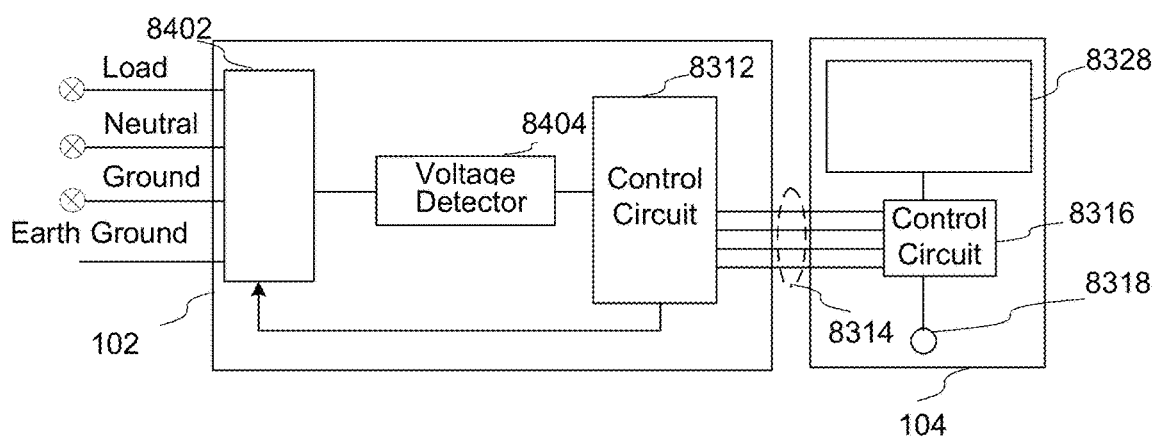
FIG. 84 is another block diagram of a circuit for testing the connections associated with a power adapter.

Turning now to FIG. 37, a block diagram of a power adapter and a control attachment that may be connected using a variety of connection elements is shown. The exemplary elements of the power adapter 102 and the control attachment 104 of FIG. 37 may be implemented to perform the operations of the power adapter and the control attachment as described in reference to FIGS. 1-5 for example or other figures, and the wireless and physical interface elements between the power adapter and the control attachment of FIG. 37 may be implemented as described in reference to FIGS. 7-10 for example or other figures. However, it should be understood that FIG. 37 provides an example of a configuration of elements that could be used to enable the operation of a power adapter arrangement having a power adapter and a control attachment. Different elements could be implemented in the power adapter arrangement, or the elements as shown could be configured or distributed differently in the power adapter arrangement within the spirit and scope of the invention. Certain functions implemented by way of example in multiple blocks of the functional block diagram of FIG. 37 may be implemented in a single block. For example, a test circuit of the power adapter may be implemented as a part of a control circuit of the power adapter. Examples of test circuits that could be implemented are shown in FIGS. 83 and 84. Further, different functions of the power adapter arrangement may be distributed differently between the power adapter 102 and the control attachment 104, as described in the different examples set forth herein.

The block diagram of FIG. 37 shows elements of a power adapter arrangement, such as the power adapter arrangement of FIGS. 1-5 for example. As shown in FIG. 37, a control circuit 3702 is coupled to various elements of the power adapter 102 to provide power to and enable communication with the control attachment 104 and control the operation of the power adapter. The control circuit 3702 may control at least one of the other components of the power adapter 102, including controlling power applied to a load, and/or perform an operation or data processing relating to communication with the control attachment 104.

The control circuit 3702, as well as the control circuit 3732 described in more detail below, may comprise a processor suitable for the execution of a computer program, and may include, by way of example, both general and special purpose microprocessors, a central processing unit (CPU), an application processor (AP), or a communication processor (CP), or any type of processor that could be used to communicate with the control attachment or an external device or control the switching operation of the power adapter. The control circuit 3702 could be an ARM processor, an X86 processor, a MIPS processor, a general purpose unit GPU, or any other processor configured to execute instructions stored in a memory. The control circuit 3703 could be implemented in one or more processing devices, including a processor and other dedicated logic circuits.

Generally, a processor will receive instructions and data from memory, such as a read only memory or a random access memory or both, where the processor is configured to perform actions in accordance with instructions. One or more memory devices may be included as a part of the processor or separate from the processor for storing instructions and data. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; or any other type of memory device. The processor and the memory can be supplemented by, or incorporated with, special purpose logic circuitry. According to other implementations, the control circuits 3702 and 3732 may be implemented by logic circuits, such as an application specific integrated circuit (ASIC).

A transformer 3704 is coupled to an input port 3705 for receiving a neutral voltage and an input port 3706 to receive an input voltage that enables providing power to a load by way of an output of the power adapter. That is, the transformer receives a high power signal, and the power adapter controls the application of the high power signal to a load. The input ports comprise contact elements that could be for example wires or connector screws that are wired into a junction box or could be contact elements associated with an electrical outlet in a wall of a residential or commercial building. The control circuit also receives a ground potential at a ground terminal 3708, which may be another contact element such as a ground wire or ground contact, or a ground prong of an outlet of the power adapter for example.

The transformer 3704 also provides power, which will be a low power signal, to the control circuit 3702 by way of a power line 3707. That is, the transformer 3704 will generate a low power signal (e.g. approximately 0-24 Volts) that is used to power electronic circuits of the power adapter and/or electronic circuits of the control attachment. The control circuit 3702 may also receive power by way of a backup battery 3709 to retain any information such as operational information or timing patterns in the event of a power loss. While a battery is shown by way of example, a different source of backup power could be implemented, such as a capacitor that will provide power to the power adapter and/or the control attachment in the event of a power loss.

An input portion 3710 may be implemented to enable the input of information or the selection of features of the power adapter, such as timing patterns that may be implemented by the power adapter. The input portion may include one or more buttons that can be selected to enable a resetting of the power adapter or a pairing of the power adapter and the control attachment as will be described in more detail below. Examples of user interface elements that may be implemented by the input portion 3710 are described in more detail below in reference to FIG. 44.

A memory 3712 is coupled to the control circuit and may store operational information, timing patterns, software programs, data for implementing software programs, and any other data used in operating the power adapter or control attachment. It should be noted that the input portion 3710 of the power adapter may also include the connector for receiving the portable memory device such as a USB thumb drive or an SD memory to download any type of data, such as operational information, programming data, or firmware as will be described in more detail below. An oscillator 3713 may be coupled to the control circuit to enable the control circuit to maintain a current time.

A switch 3720 is coupled to receive power from the transformer by way of a power line 3722 and provide power to an output 3723 (which may be another contact element that is coupled to a load such as by a wire in an electrical system or a contact element of an outlet adapted to receive a plug) in response to control signals generated by the control circuit 3702 on a line 3724 from the control circuit. The control signals may be any type of signals for regulating power applied to a load, such as on and off signals and dimming signals for example. The switch 3720 may be a relay or TRIAC for example for coupling high power signals to a load as described above. The control signals may be generated in response to signals received by the power adapter, including signals received from the control attachment. The control signals may be associated with a timing pattern that is stored in a memory of the power adapter arrangement, including a memory of one or both of the power adapter and the control attachment. The power adapter arrangement may control the application of power to the load based upon a timing pattern that is stored in a memory (e.g. memory 3712 or memory 3742), or in response to signals provided to the control attachment (such as by way of the wireless communication circuit 3748) in real time (i.e. the control attachment controls the application of power to the load as it receives a command by way of the wireless communication circuit 3748). The control signals by also be generated in response to other information received by the control attachment, such as by a sensor of a control attachment or information received from the control attachment received from an external device, such as a smart phone or other computer device or element of a wireless network.

The output 3723 may be wires or screws that can be coupled to wires in the case of an in-wall power adaptor that are coupled to a device (i.e. load) that is powered by the power adapter (or contact elements of an outlet that receives a plug for the device controlled by the power adapter).

A wireless communication circuit 3726 could be used to receive various information, such as operational information, programming data, or firmware updates from the control attachment 104 or from some other source, as will be described in more detail below. The wireless communication circuit 3726 could be adapted to implement any type of wireless communication protocol as described herein, by way of a wire communication connection with the control attachment 104 or with an external device other than the control attachment.

The power adapter 102 and the control attachment 104 may communicate by way of an interface 3727, which may be an electrical interface, such as a connector or a plurality of contact elements, as described herein. The interface 3727 enables a communication link 3728 with an interface 3729, which may also be an electrical interface, such as a connector or a plurality of contact elements. The communication link may comprise contact elements of the interfaces 3727 and 3729 to enable the transfer of communication signals between the interfaces. The communication link may also provide reference voltages including power and ground (or neutral) reference voltages to power elements of the control attachment.

The control attachment 104 comprises a control circuit 3732, which may be any type of processing circuit for (i) receiving inputs, such as by way of an input portion 3734 or by way of a wireless connection, and (ii) controlling the operation of the control attachment 104, including communicating with the power adapter to control the application of power to the load. The input portion could be implemented to receive inputs (e.g. mechanical inputs, sensor inputs, etc.) as shown and described in reference to the various control attachments described herein. A battery 3736 or some other source of energy such as a capacitor may be used to power the control attachment 104 or function as a backup power source during a power loss (if the control attachment 104 normally receives power by way of the interface 3729). A display 3746 may also be provided.

A wireless communication circuit 3748, which may be a wireless receiver or both a wireless transmitter and receiver (i.e. a wireless transceiver), comprises an antenna 3750. Data received by the wireless communication circuit 3748 may be provided to the control circuit 3732, or data generated by the control circuit 3732 may be transmitted by the wireless communication circuit 3748. Data, such as a timing pattern or operational information (e.g. time, date and location information) entered by the input portion or received by way of the wireless communication circuit 3748, may be stored in a memory 3742.

The wireless communication circuit 3748 may be any type of receiver for receiving wireless communication signals, such as GPS receiver, a cellular receiver, a radio frequency (RF) receiver, a WiFi receiver, a Bluetooth receiver, and NFC receiver, or any other type of receiver adapted to receive data according to any wireless communication protocol, where the information may include operational information, programming data, software updates, or any other type of information enabling operation of the power adapter arrangement. According to some implementations where the control attachment comprises a smart speaker (i.e. a device having a microphone and often a speaker that is configured to response to commands, including controlling other device such as in-wall or plug-in timers, or respond to questions by providing answers to questions) as described in more detail below, data and information may be received by the wireless communication circuit 3748 of the control attachment from an external device associated with a system employing a smart speaker, such as an Alexa brand system from Amazon.com, Inc., a Google Home brand system from Alphabet Inc., or Apple Home from Apple, Inc. for example.

The operational information, control information, sensor information, or any other data or information received by the control attachment, such as by way of the input portion 3734 or by way of a wireless connection, may be provided to the control circuit to enable the operation of the control circuit and the implementation of the timing patterns to control the load. A GPS receiver is commonly available from SiRF Technology, Inc, for example, while a cellular receiver could be implemented in an integrated circuit chip or module, such as a chip or module available from u-blox Holding AG of Thalwil, Switzerland. Operational information including time, date and location that may be necessary to implement a timing pattern for example may also be received from a network, such as a Wifi network, from a smart phone (which may receive the operational information from a cellular network for example) communicating with the control attachment by way of a WiFi network, or a short range connection, such as Bluetooth or NFC. Therefore, actuators for entering time, date and location information could be eliminated from one or both of the power adapter and the control attachment with the use of a wireless communication circuit 3748.

While the wireless communication circuit 3748 for receiving communication signals from a remote network, such as a GPS network, a cellular network, a local area network such as WiFi, or short range connection such as Bluetooth or NFC, is shown as a part of the control attachment 104, some information received by the wireless communication circuit 3748 could instead be received by the wireless communication circuit 3726 of the power adapter 102. That is, the wireless communication circuit 3726 could be adapted to receiving operational information or any other data wirelessly from a remote device using any wireless communication protocol or wirelessly from the control attachment by way of the corresponding wireless communication circuit 3752.

An oscillator 3744 or some other device for keeping a time for the control attachment may be coupled to the control circuit, where a current time or other data may be displayed on the display 3746. While separate oscillators are shown in the power adapter 102 and the control attachment 104, it should be understood that a single oscillator could be implemented, and an oscillating signal or other signal based upon the oscillating signal (e.g. a clock signal) could be shared between the power adapter 102 and the control attachment 104.

The wireless communication circuit 3752 has an antenna 3754 enabling the communication of signals with a corresponding wireless communication circuit 3726 (having an antenna 3759) of the power adapter by way of a wireless communication link 3756. While both a physical connection for transferring signals and/or power is provided by way of the communication link 3728 and a wireless communication link 3756 is provided by way of the corresponding wireless communication circuits 3726 and 3752, it should be understood that one of the communication links could be implemented. A test circuit 3760 coupled to the interface 3727 and the control circuit 3702. The test circuit 3760 could be used to determine whether the power adapter is wired in an electrical system correctly, as will be described in more detail below. Alternatively, the test circuit 3760 could be implemented in the control attachment 104, as described in more detail in reference to FIG. 84. Such an arrangement would reduce the complexity of the power adapter and apply the cost to the control attachment. While some control attachments may not the capability to perform a test, a dedicated test control attachment could be used to ensure that the power adapter is wired properly. While a dedicated test circuit is shown, which may comprise a voltage detector for example, it should be understood that some or all of the testing operation could be performed in the control circuit 3702 and/or 3732 for example.

In addition to the communication link 3728, other interfaces can be provided to enable the communication of signals between the control attachment and the power adapter. For example, a connector 3761 of the control attachment and a connector 3762 of the power adapter enable a communication interface 3764. According to one implementation, the communication interface 3764 may comprise an electrical interface enabling the transfer of electrical signals between the control attachment and the power adapter. For example, separate interfaces may be implemented to transfer control signals and power signals. Further, an actuator element 3770 of the power adapter, such as a switch, may be configured to receive an actuator input from a corresponding actuator element 3772. According to one implementation, the actuator elements 3770 and 3772 may be adapted to receive a manual input, such as a pressing of an actuator elements of a control attachment as described herein.

A wireless protocol implemented by one of the wireless communication circuits may be, but is not limited to, a standard for transmitting signals and/or data through electromagnetic radiation in different frequency spectrums. Examples of current wireless standards include, but are not limited to IEEE 802 standards, UMTS, GSM 850, GSM 900, GSM 1800, GSM 1900, GPRS, ITU-R 5.138, ITU-R 5.150, ITU-R 5.280, IMT-1000, Bluetooth (BT), Bluetooth-low-energy, also known as BLE, Wi-Fi, Ultra-Wideband, WiMAX, and Infrared, Some standards may be a conglomeration of sub-standards such as IEEE 802.11 which may refer to, but is not limited to, IEEE 802.1a, IEEE 802.11b, IEEE 802.11g, or IEEE 802.11n as well as others under the IEEE 802.11 umbrella. Wireless links may also include any cellular network standards used to communicate among mobile devices, including, but not limited to, standards that qualify as 1G, 2G, 3G, or 4G, including specifications or standards maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, LTE, LTE Advanced, UMTS, Mobile WiMAX, and WiMAX-Advanced. Cellular network standards may use various channel access methods e.g. FDMA, TDMA, or CDMA.

Figure 38:
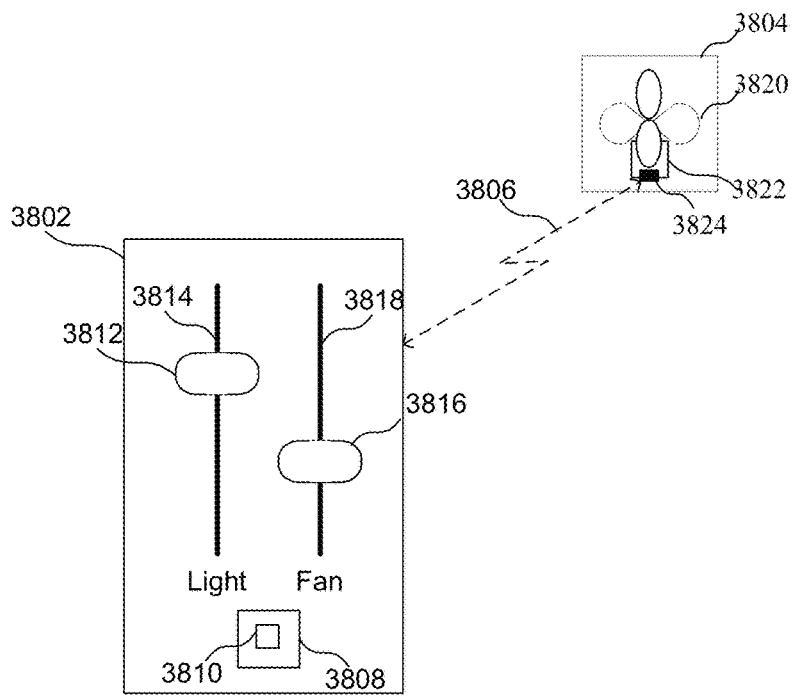
FIG. 38 is a diagram showing a control element adapted to control both a light and a fan.

Turning now to FIG. 38, a diagram showing a control attachment adapted to control both a light and a fan is shown. According to the example of FIG. 38, a control attachment 3802 that may be coupled to a power adapter comprises interfaces for controlling a light, including dimming functionality, and controlling the speed of a fan. More particularly, the control attachment 3802 is adapted to communicate with a fan 3804 by way of a wireless communication signal 3806. The control attachment may comprise a switch 3808 having a status indicator 3810, which may comprise an LED for example that made provide an indication of these status of the power applied to the fan. The control actuator 3802 may also comprise movable elements for controlling the dimming of the light as well as the speed of the fan. More particularly, a first control element 3812 may be movable within a channel 3814 to control the dimming of the light. Similarly, a second control element 3816 may be movable within a channel 3818 to control the speed of the fan 3820, which may comprise a control circuit 3822 having a wireless communication circuit adapted to communicate with a corresponding wireless communication circuit of the control attachment 3802. While the control elements are shown by way of example, it should be understood that other control elements can be implemented.

Figure 39:
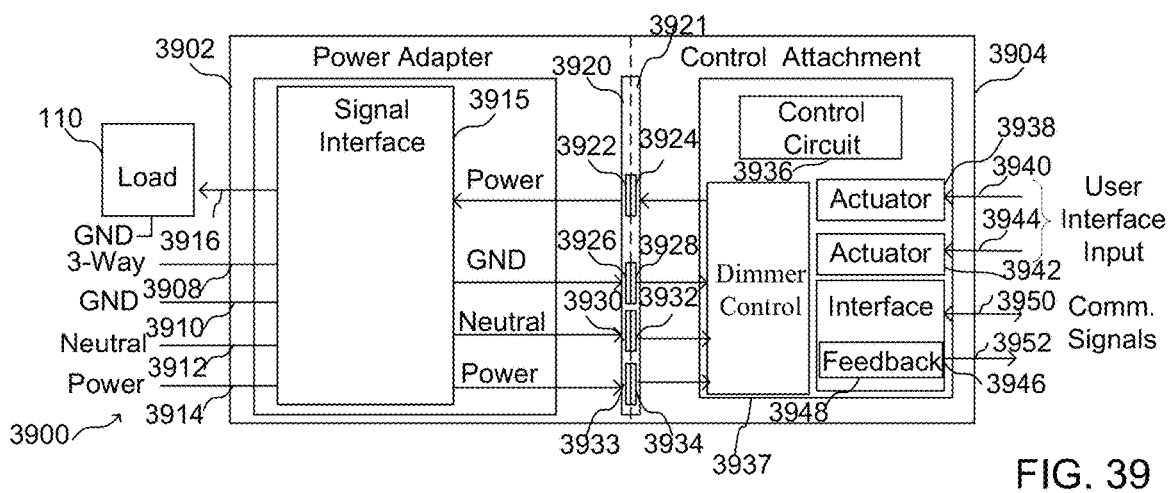
FIG. 39 is an arrangement of a power adapter and a control attachment having a power switch.

Turning now to FIG. 39, an arrangement of a power adapter and a control attachment having a power switch is shown. According to the implementation of FIGS. 38-42, the power switching functionality is provided in the control attachment. That is, unlike the embodiments of FIGS. 1-37 that implement low power signals between the power adapter and control element, high power signals are provided through the interface between the power adapter and the control attachment. According to the implementation of FIG. 39, a power adapter 3902 is coupled to a control attachment 3904, where the power adapter may comprise a 3-way control input 3908, a ground input 3910, a neutral input 3912, and a power input 3914. A signal interface 3915 enables the transfer of signals to and from the power adapter and between the power adapter and the control attachment. A load terminal 3916 is also provided to be coupled to a load. Because the control attachment is configured to receive a high power voltage, the control attachment may also include an outlet for receiving a plug.

The power adapter arrangement of FIG. 39 comprises a plurality of interface elements 3920 and 3921, which may include contact elements for example. More particularly, a connector element 3922 is coupled to a corresponding connector element 3924 for providing a power signal there is routed to the load. That is, rather than having a switching element, such as a relay or a TRIAC operating as a dimmer control circuit, in the power adapter, it may be provided in the control attachment according to the implementation of FIG. 39, where power routed to the power adapter is routed through the control attachment and back to the load. The connector also comprises a connector element 3926 coupled to a corresponding connector element 3928 to provide a ground signal from the power adapter to the control attachment. A connector element 3930 is coupled to a corresponding connector element 3932 to provide a neutral signal from the power adapter to the control attachment. A power signal, which may be based upon the power signal provided to the power adapter, is provided by way of a connector element 3933 to a corresponding connector element 3934. The interface element 3920 may comprise a single connector, a plurality of connectors, is shown by way of example in FIG. 40.

The control attachment comprises elements for receiving the power from the power adapter, and selectively applying power to a load by way of the signal interface 3915. More particularly, the control attachment 3904 comprises a control circuit 3936 adapted to receive signals from various interfaces and control a dimmer control circuit 3937 for providing the power to a load by way of the connector elements 3922 and 3924. The control attachment comprises various actuators in a user interface for receiving input signals that may be used by the control circuit 3936 to control the dimmer controller, and generate output signals. An actuator 3938 comprises a user interface input 3940 for receiving user interface input. By way of example, the actuator 3930 may comprise an on off button. An actuator 3942 comprises a user interface input 3944 for receiving additional user interface input, such as dimmer control input. An additional interface 3946 may be coupled to a feedback circuit 3948, and may receive signals by way of a communication interface 3950 and generate feedback signals by way of a feedback output 3952. The communication signals provide to the control attachment may be wireless communication signals for example. The feedback signals may be any type of audio or visual feedback signals for any type of user interface as described herein. Accordingly, the power adapter 3902 is configured to receive high voltage power from an interface of the power adapter, where the power is routed through the control attachment and back to the power adapter to be provided to the load. By configuring the switching control of power of the power adapter arrangement of FIG. 39 in the control attachment, it is possible to provide a simplified power adapter, where the functionality of the switching is provided in the control attachment.

Figure 40:
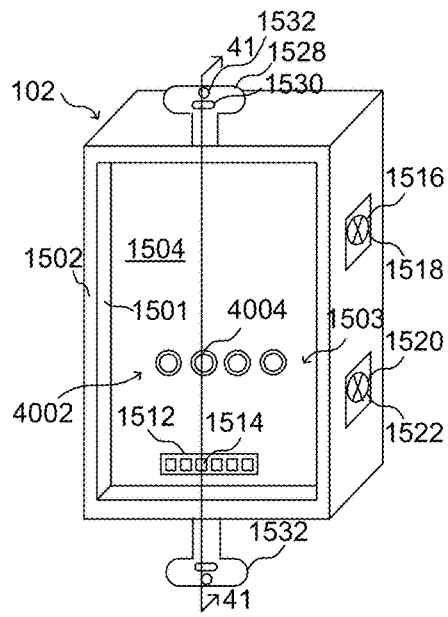
FIG. 40 is a front and side view of the power adapter 3902 of FIG. 39.
Figure 41:
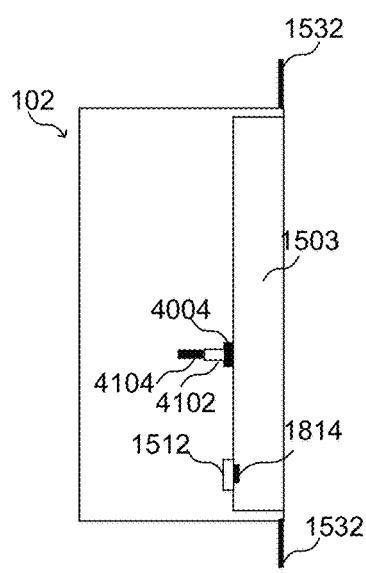
FIG. 41 is a cross-sectional view of the power adapter 3902 taken at lines 41.
Figure 42:
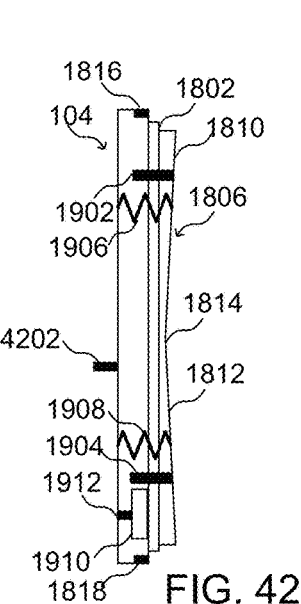
FIG. 42 is a side view of a control attachment that could be coupled to the power adapter 3902 of FIG. 39.

FIGS. 40 through 42 show an example of connections for routing the signals between the control attachment and the power adapter. As shown FIG. 40, a front and side view of the power adapter 3902 of FIG. 39 includes a contact block 4002, shown here by way of example as having a plurality of discrete contact elements 4004, which may comprise female receptacle contact elements for example. As shown in FIG. 41, receptacle 4102 coupled to a signal line 4104 is adapted to receive a contact pin 4202 of the control attachment of FIG. 42. Because the contact block 4002 comprises a contact element having high voltage, it should be understood that the contact block would be configured to prevent any inadvertent contact with the high voltage power, such as including protection elements currently found in outlets to prevent injury to a user.

Figure 43:
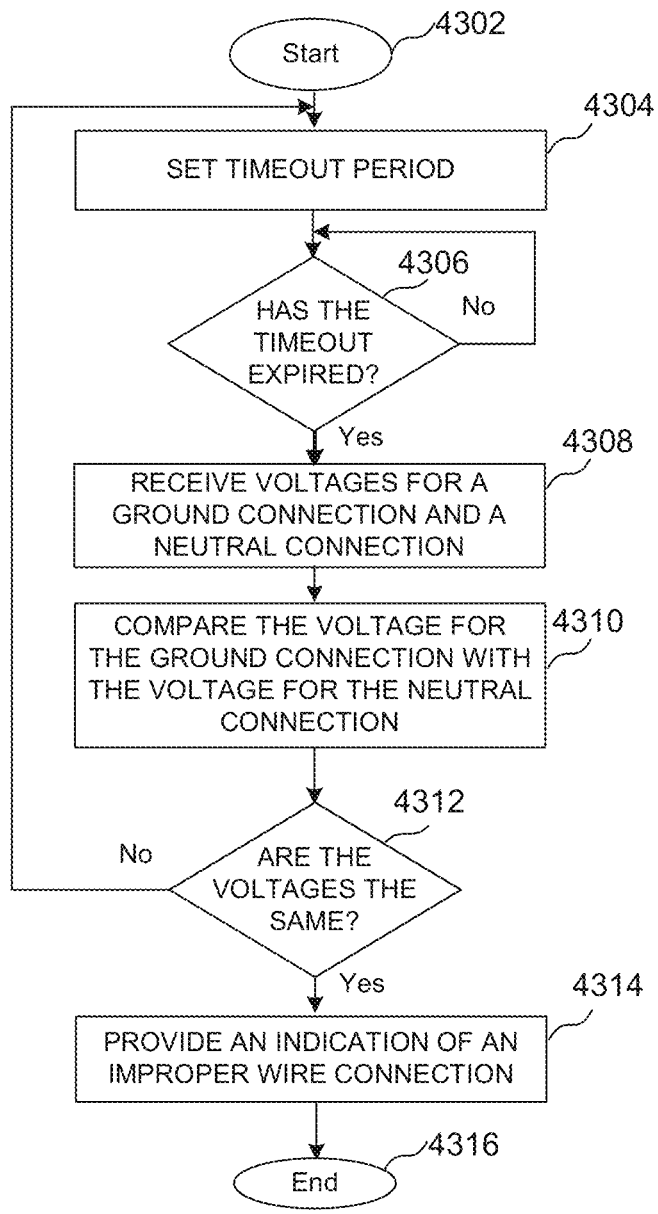
FIG. 43 is a flow chart showing a method of enabling a wiring fault detection.

Turning now to FIG. 43, a flow chart shows a method of enabling a wiring fault detection. Whatever implementing a device that is coupled to high voltage electric power, it is important that the device is properly installed to prevent any injury to the installer or a user. If a device is improperly installed, it may not be obvious to a user, and any injury may occur without notice to the user. Accordingly, it is beneficial to indicate whether a device has been improperly, or a condition has changed such that the device he has a fault for example. One common fault that may occur is a ground fault, where the ground is not properly attached, or the ground and neutral are inverted. Accordingly, it may be beneficial to evaluate the ground and neutral voltages with respect to one another to determine whether there is a ground fault. For example, After the method is started at a block 4302, such as after a control attachment is attached to a power adapter, a timeout period may be set at a block 4304. It is then determined whether the timeout period has expired in a block 4306. If the timeout period has expired, voltages for the ground connection in the neutral connection are received at a block 4308. The voltages for the ground connection and the neutral connection are then compared in a block 4310. It is then determined whether the voltages are the same at a block 4312. If not, the timeout period is again set at the block 4304. However, if the voltages are not the same, an indication of an improper wiring connection is provided in a block 4314, and the processes ended in a block 4316.

Turning now to FIG. 44, a block diagram of an expanded view of elements of an in-wall power adapter and control attachment that is adapted to be installed in a junction box and to receive a wall plate is shown. A junction box describes the housing into which a power adapter arrangement is inserted. A junction box may be formed from metal, plastic or PVC for example, and may be defined as being 1-gang for having a single power adapter arrangement or 2-gang for having 2 power adapter arrangements, as is well known. A "wall plate" (also referred to as face plate or switch cover) refers to, but is not limited to, a typically plastic or metal cover designed to fit around and/or over at least a portion of the power adapter arrangement while in the junction box, and generally overlaps the surrounding wall or ceiling for example to provide an aesthetically and/or functional cover.

A power voltage, also referred to as an electrical supply, is a reference voltage to provide electrical power for the load controlled by the power adapter arrangement as described above. According to the implementation of FIG. 44, a junction box 4402 is coupled to conduit 4404 having wires 4406 that may be used to provide power by way of the reference voltages to the power adapter arrangement by way of a terminal portion 4408 of the wires that extend into a recess 4410 adapted to receive the power adapter arrangement. Flanges 4412 and 4414 receive a screw or other attachment element by way of a threaded portion 4416 to enable attaching corresponding flanges of the power adapter to the flanges 4412 and 4414.

The power adapter 102 comprises a front surface 4424 that defines a recessed portion 4426 extending from the front surface to a back wall 4427. The switching portion may also comprise an attachment element 4430 adapted to be coupled to a corresponding attachment element of the control attachment. The power adapter may also comprise flanges 4432 having a threaded portion 4434 for receiving a screw to secure a wall plate to the modular power adapter and a hole 4436 which comprises an opening for receiving a screw that can be inserted into the threaded portion 4416 and can be used to secure the power adapter 102 to the junction box 4402.

User interface elements and other elements enable a user to implement the power adapter with a control attachment within the recess 4426, such as on a back wall of the recess for example (or on another surface accessible by a user in an implementation not having a recess). For example, a communication port 4438, which may comprise a connector or a plurality of contact elements for example, may be implemented. The contact elements may be contact pads adapted to be in electrical contact with contact elements of the control module, where the contact elements may be spring loaded contacts such as pogo-pins, or other flexible or spring loaded contacts that extend from a back surface of the control attachment and align with and make electrical contact with the contact pads of the power adapter. Alternatively, contact pads can be implemented on the control attachment and the corresponding contacts can be implemented on the back of the recess of the power adapter. While the contact elements are indicated as being on the back surface of the power adapter and the control attachment, it should be understood that the contacts can be placed on other surfaces, such as a side of the power adapter and a side of the control module.

The power adapter may also comprise a control button 4440, which may function as a reset button or a pairing button for enabling the pairing of the control module with the power adapter. The control button may be used to reset the power adapter, enabling the power adapter to receive new data associated with a control attachment, and therefore to enable the power adapter and the control attachment to communicate and control a device receiving power from the power adapter arrangement. The control button 4440 could also enable a pairing function to pair an authorized control attachment to communicate with the power adapter. That is, a pairing function can be implemented, wherein a control button on each of the power adapter and the control attachment can be selected to enable the transfer of information between the control attachment and the power adapter. It may be necessary to charge the control attachment by coupling the control attachment to the power adapter to enable the control attachment to perform a reset operation and to enable a pairing of the control attachment with the power adapter. Alternatively, separate buttons may be implemented for a reset button and a pairing button.

The pairing operation is beneficial to ensure that only an authorized control attachment is implemented to prevent for example unauthorized control of a power adapter which may have a wireless control feature. For example, the control of the device receiving power from the power adapter may be compromised, and unauthorized use of a device under the control of the power adapter may occur. Further, the power adapter and the control attachment may communicate to enable the proper operation of a load controlled by the power adapter. For example, a control circuit of the power adapter may detect the type of device controlled by the power adapter, such as the type of light bulb (e.g. halogen, LED, or CFL), or the number of watts that the bulb or other device draws, and therefore enables the control circuit of the control attachment to provide different control signals to the power adapter to control the amount of power applied to the light bulb (such as a dimmable light bulb or a low power light bulb for example).

In addition to an implementation where the power adapter acts as a passive device, and only receives control signals from a control circuit of the control attachment, the power adapter and the control attachment could implement a bidirectional communication link according to another implementation to enable the control attachment to understand information received by the power adapter and better control the device controlled by the power adapter. Alternatively, the control attachment can detect the type or qualities of the light bulb by way of the communication ports of the power adapter and the control attachment.

A wireless communication circuit 4442 (shown in dashed to indicate that it may be behind the back wall 4427 of the recess) may also be implemented in the power adapter. The wireless communication circuit 4442 could be for example the wireless communication circuit 3726 of FIG. 37 for example. A communication port 4440, which may be a USB port or a port for receiving another type of memory card, such as an SD card, may be implemented on the power adapter, and may receive any type of information, such as operational information, timing patterns for turning the device controlled by the power adaptor on or off, or other data that is beneficial in implementing the operation of the control attachment. A timing pattern may include for example on and off times for a timing feature of the modular power adapter. While the USB port is shown on the power adapter, it should be understood that a USB port could instead be implemented on the control attachment, or implemented on the control attachment in addition to a USB port on the power adapter. An electrical interface, which may correspond to one of the electrical interfaces (e.g. electrical interface 713 of FIG. 7) described above may also be implemented. An electrical interface 4444 comprises contact elements 4446 for receiving reference voltages, such as ground and power signals providing current to a load, are also provided on the power adapter, as described above. While contact elements comprising screws are shown, contact elements comprising wires adapted to be coupled to wires in a junction box could also be implemented.

The control attachment 104 may comprise a rear portion 4450 that is inserted into the recess 4426. The various interfaces of the control attachment align with the corresponding interfaces of the power adapter to enable the communication of at least one of control signals and power between the power adapter and the control attachment. The wall plate 4459 can be attached to the power adapter using holes 4464, where the holes receive screws that can be inserted into threaded portions 4434 of the flanges 4432.

The dimensions of the various elements of modular power adapter are selected to enable the modular power adapter to be attached to a junction box, such as a conventional residential junction box. Therefore, the width $w_s$ of the power adapter may be selected to be less than the width of a conventional residential junction box, and the height $h_s$ may be selected to be less than the height of a conventional residential junction box. A depth ds of the recess 4426 is also selected to ensure that, when the control attachment is attached to the power adapter, the contact elements of the communication ports provide an adequate electrical connection to enable the transfer of data signals and/or power signals (e.g. provide adequate pressure between contacts and contact pads will enable an electrical connection). Also, the dimensions of back portion 4450 of the control attachment has a width $w_c$ and a height $h_c$ that are just slightly less that the width $w_s$ and the height $h_s$ to ensure that the control attachment fits into and aligns with the power adapter (or the width and height of the recess 4426 if the power adapter comprises a recess).

The dimensions of a front portion 4454 are also selected to extend through opening 4462 in a wall plate, and ensure that the edges of the opening of the wall plate cover the flange 4455 of the control attachment. The connector element 4458 is adapted to be secured to a corresponding connector element 4430 of the power adapter 102. The edges 4460 define opening 4462. Because the height $h_p$ and the width $w_p$ of the opening 4462 are slightly greater that the height $h_c'$ and the width $w_c'$ of the front portion 4454', the front portion 4454 can extend through the opening 4462, where the edges 4460 of the opening 4462 will generally cover the flange 4452. Outer edges 4459 and 4460 of the wall plate extend beyond the perimeter of the junction box to cover the junction box.

Alternatively, the control attachment 104 may be implemented without the flange 4455 to enable the control attachment to be inserted and removed while the wall plate is in place. According to one implementation, the control attachment may be implemented in a ski-boot arrangement. For example, a flange 4456 (shown by the dashed line) may be implemented as attachment element for the bottom of the recess (i.e. in place of the attachment element 4430 as shown at the bottom), and may be adapted to receive a corresponding flange 4455. That is, for an implementation of a control attachment 104 that is adapted to be inserted or removed through an opening of a wall plate, the flange 4455 can be inserted through the opening and behind the flange 4456, and then the attachment element 4458 at the top of the control attachment can be coupled to the attachment element 4430. The attachment elements at the top of the control attachment and power adapter could be implemented as described in reference to FIG. 49. It should be understood that the power adapter 102 and control attachment 104 of FIG. 4 could be implemented as any of the power adapters or control attachments as described herein.

Turning now to FIG. 45, a front view of the power adapter arrangement and wall plate of FIG. 44 when combined is shown. According to the implementation of FIG. of 45, a power adapter arrangement based upon the control attachment of FIG. 18 (where the control attachment can be removed when the wall plate is attached to the power adapter) is shown when a wall plate is attached to the power adapter. As can be seen, the wall plates 4502 comprises holes 4504 for receiving screws to attach the wall plate to the power adapter. As is apparent in FIG. 45, the attachment elements 1816 and 1818 are exposed through the hole in the wall plate, and the control attachment can be removed.

According to the implementation of FIG. 46, the control attachment is based upon the control attachment of FIG. 17, where the attachment elements are not exposed through the opening of the wall plates 4602, and therefore the wall plate must be removed to insert or remove the control attachment. As also shown, there are no holes for receiving screws to attach the wall plate to the power adapter. Rather, an intermediate wall plate 4604 that may be attached to the power adapter by way of openings 4606 is implemented, where attachment elements 4608 are configured to be attached to corresponding attachment elements of the wall plate 4602, eliminating the requirement for screws, which can be unsightly.

Figure 47:
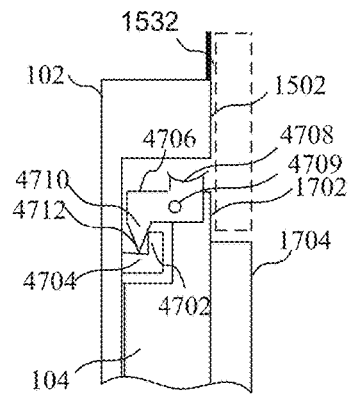
FIG. 47 is a side view of a portion of attachment elements of a power adapter and a corresponding control attachment that may be located behind a wall plate, where the attachment element of the power adapted is on a back wall of the power adapter.

Turning now to FIG. 47, a side view of a portion of attachment elements of a power adapter and a corresponding control attachment that may be located behind a wall plate (shown in dashed lines), where the attachment element of the power adapted is on a back wall of the power adapter, is shown. More particularly, a flange 4702 extending from a projection 4704 enables an attachment element of the control attachment to be coupled to the flange. For example, a body portion 4706 of an attachment element of the control attachment comprises an attachment element actuator 4708 that moves about a hinge 4709 so that an attachment element 4710 having a projection 4712 with beveled edges can engage with the flange 4702 (i.e. be positioned behind the flange 4702 to secure the control attachment to the power adapter). For example, a user of the control attachment can move the projection 4712 using the attachment element actuator 4708 to cause the attachment element 4710 to rotate and the projection 4712 to disengage from the flange 4702. The wall plate can then be attached, covering the attachment element of the control attachment.

Turning now to FIG. 48, another side view of a portion of an attachment element of a power adapter and a corresponding control attachment that may be located behind a wall plate (shown in dashed lines), where the attachment element of the power adapted is on a side wall of the power adapter, is shown. According to the implementation of FIG. 48, a body portion 4802 comprises an attachment element actuator 4804 that is movable by way of a leaf spring portion 4806. When the attachment element actuator 4804 is moved away from the top of the wall 1502 of the control attachment, a projection 4808 having beveled edges is removed from a recess 4810 in an end portion 4812 of the power adapter, enabling the control attachment 104 to be removed from the power adapter 102. As is apparent from FIGS. 47 and 48, the wall plate, as shown in dashed lines, would have to be removed to be able to access the attachment elements and therefore remove or detach the control attachment from the power adapter.

Figure 49:
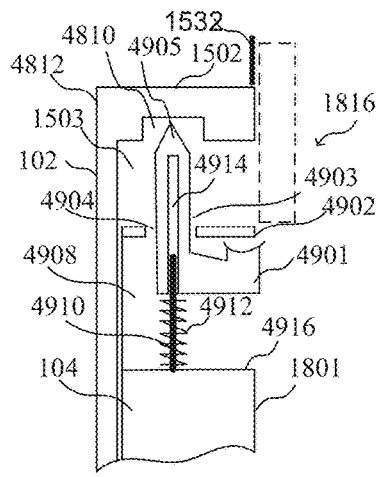
FIG. 49 is a side view of a portion of attachment elements of a power adapter and a corresponding control attachment that may be accessible through a recess in a wall plate.

However, according to the implementation of FIG. 49, which shows a side view of a portion of attachment elements of a power adapter and a corresponding control attachment that may be accessible through a recess in a wall plate, the control attachment can be removed without removing the wall plate (shown in dashed lines). More particularly, an attachment element 4901 is movable within the control attachment, and can be moved so that the control attachment clears an end wall 4902 of the control attachment, allowing the control attachment to be removed with the wall plate in place. The control attachment comprises a projection 4903 that extends through an opening 4904 in the end wall 4902, and extends to a terminal end 4905 that is adapted to being received by the attachment element of the power adapter (shown here by way of example as a recess 4810 in the side wall of recess 1503) of the power adapter. The actuator element 4901 is movable within a recess 4908. A rod 4910 is configured to receive a spring 4912, where the rod extends into a shaft 4914 of the attachment element 4901.

As can be seen in FIG. 49, the spring loaded arrangement comprising the attachment element 4901, the rod 4910 and spring 4912 enable both securing the control attachment to the power adapter and allowing the control attachment to be removed with the wall plate in place. That is, when the attachment element 4901 is moved towards the wall 4916 of the control attachment, compressing the spring, the terminal end 4905 would extend into the opening 4904, allowing the control attachment to be removed by clearing the wall plate.

It should be noted that the embodiments o FIGS. 48 and 49 use the same attachment element for the power adapter. That is, according to the implementations of FIGS. 48 and 49 using the same power adapter, a user of the power adapter could install a control attachment that can be removed when the wall plate is in place, or could install a control attachment that can only be removed when the wall plate is removed. Such a feature provides flexibility for not only a user of the power adapter, but also for builders who may be installing the power adapters. That is, the builder can install a single power adapter in all locations for any type of structure, and install the desired control attachment that meets the needs of the user, including control attachments that can be removed with a wall plate in place, or only when the wall plate is removed. While examples of a control attachment having a leaf spring and having a helical spring are shown, it should be understood that any type of control attachment could be used. For example, control attachment arrangements could be implemented where a movable element on either the power adapter or the control attachment could be moved to couple an attachment element of the other of the power adapter or the control attachment. Alternatively, the control attachment may be coupled to the power adapter using only friction, particularly where a portion of control attachment is located behind the wall plate.

Various control attachments are shown in FIGS. 50-64. While the control attachments are shown by way of example, it should be understood that other control attachments could be implemented, or various features in the different control attachments could be combined or changed as desired. While specific examples of power adapter arrangements, including interfaces on both a power adapter and a control attachment as will be described in more detail below, are shown, it should be understood that both input elements and output elements may include a variety of features. Input devices may include any type of interface for providing information to or controlling, directly or indirectly, either the power adapter or the control attachment, where an input from the user can be received in any form, including acoustic, speech, or tactile input. Feedback elements may also be used to provide for interaction with a user as well. For example, feedback provided to the user can be any form of sensory feedback (e.g., visual feedback, auditory feedback, or tactile feedback).

Figure 50:
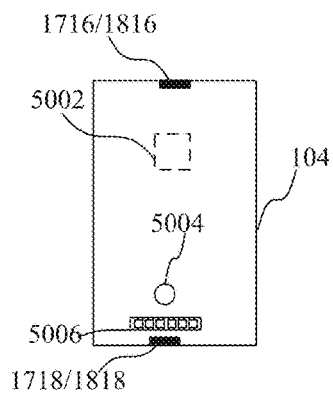
FIG. 50 is a rear view of a control attachment.
Figure 51:
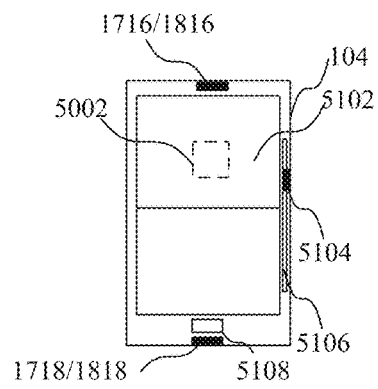
FIG. 51 is a front view of a control attachment having a toggle element and a dimmer control element.

Turning first to FIG. 50, a rear view of a control attachment is shown, where a control circuit 5002, which made comprise a wireless control circuit for example is included. A button 5004, which may be a reset button or a button for pairing the control attachment with the power adapter, is included. While a single button is shown by way of example, it should be understood that multiple buttons could be included for performing different functions, such as a reset function or pairing function. An electrical interface 5006 may also be included to enable the communication of signals between the control attachment and a power adapter, as described above.

Examples of interface elements on the front of the control attachment are now shown. A front view of a power adapter of FIG. 51 has a toggle element 5102, such as a paddle toggle element for example. and a dimmer control element 5104 that is movable within a guide 5106. An interface element 5108 could also be included, and may include an input elements such as a connector or an output element such as a status indicator, such as an LED.

Figure 52:
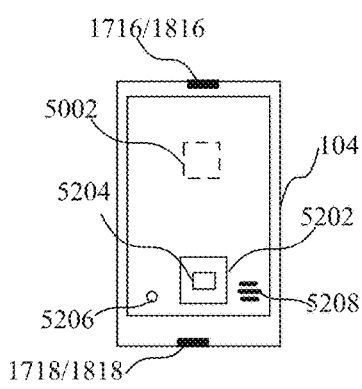
FIG. 52 is a front view of a control attachment having a toggle element, a microphone and a speaker.

Turning now to FIG. 52, a front view of a power adapter having a toggle element, a microphone and a speaker is shown. More particularly, a toggle button 5202 (also known as an on/off switch), which may have a status indicator 5204, such as an LED light, are also included. The control attachment may also include a microphone 5206 and a speaker 5208, enabling the control attachment to function as a smart speaker, such a smart speaker that may be adapted to operate according to a smart speaker protocol from Amazon, Inc. (using the Alexa brand protocol), Alphabet Inc. (using the Google Home brand protocol) or Apple, Inc. (using the Apple Home brand protocol) for example.

Figure 53:
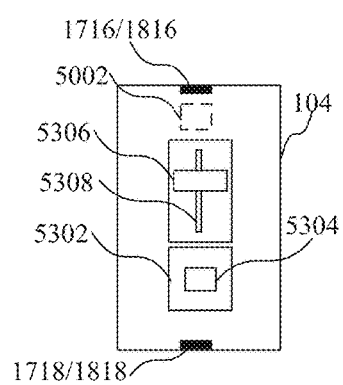
FIG. 53 is another front view of a control attachment having a toggle element and a dimmer control element.

Turning now to FIG. 53, another front view of a power adapter having a toggle element and a dimmer control element is shown. According to the implementation of FIG. 53, a control attachment having dimmer functionality comprises a toggle element 5302 that may comprise a status LED 5304. A movable dimmer controller 5306 that is movable within a guide 5308 is also included.

Figure 54:
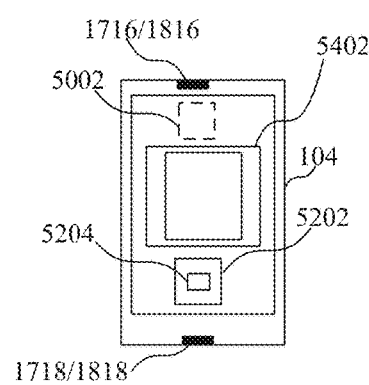
FIG. 54 is a front view of a control attachment having a toggle element and a motion detector.

Turning now to FIG. 54, a front view of a power adapter having a toggle element and a sensor is shown. According to the implementation of FIG. 54, in addition to a toggle button 5202, a sensor 5402 could be included on a front surface. A sensor as used herein may refer to, but is not limited to, a transducer providing an electrical output generated in dependence upon a magnitude of a measure and selected from the group comprising, but is not limited to, environmental sensors, biological sensors, chemical sensors, ambient environment sensors, position sensors, motion sensors, thermal sensors, infrared sensors, RFID sensors, a light sensor, a microphone, a camera, a thermometer, a humidity sensor, a smoke detector, and an air quality sensor, such as for carbon monoxide.

By way of example, the sensor 5402 could comprise a sensor for detection motion, such as a camera or a motion detector. Power could be applied to the load in response to the detection of motion, and the application of power could be overwritten by the toggle button 5202. Alternatively, when a sensor comprising a camera is activated in response to motion, and the camera could record activities within range of the camera after motion is detected.

According to some implementations, for a control attachment configured to detect motion in a room, the sensor device can include one or more of passive sensors (e.g., passive infrared (PIR) sensor), active sensors (e.g., microwave (MW) sensor, ultrasonic sensors etc.) and hybrid sensors that include both passive and active sensor (e.g., Dual Technology Motion sensors). The passive sensors do not emit any energy and detect changes in energy of the surrounding. For example, a PIR sensor can detect infrared energy emitted by the human body (due to the temperature associated with the human body). In contrast, active sensors may emit electromagnetic or sonic pulses and detect the reflection thereof. For example, MW sensor emits a microwave pulse and detects its reflection. Hybrid sensors can include both active and passive sensors and therefore motion can be sensed both actively and passively (hybrid sensing). Hybrid sensing can have several advantages. For example, the probability of false positive detection of motion can be smaller in hybrid sensors compared to active/passive sensors. Data associated with a motion sensor can be used to indicate that motion has been detected in an area proximal to a load comprising a light, for example. The detected motion can be used to turn on a light controlled by the power adapter. According to some implementations, the power adapter may use the detected motion for providing a security feature, and may provide power to the load for a predetermined period of time, such as to deter an intruder or provide light outside a home in the event that an individual is detected outside the home.

Figure 55:
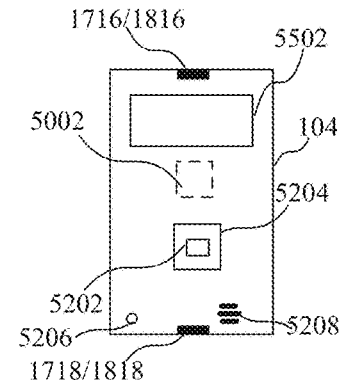
FIG. 55 is a front view of a control attachment having a toggle element and a display.

Turning now to FIG. 55, a front view of a power adapter having a toggle element and a display is shown. More particularly, the control attachment of FIG. 55 comprises a display 5502. In addition to the microphone 5206 in the speaker 5208, the display 5502 can provide additional information to a user.

Any of the exemplary control attachments of FIGS. 50-55 may comprise a wireless circuit for receiving control signals or for acting as a WIFI extender or implemented as a WiFi mesh node in a WiFi mesh arrangement or a Bluetooth mesh node in a Bluetooth mesh arrangement. A control attachment may also be configured as a network extender or network repeater, as will be described in more detail below in reference to FIG. 85.

Turning now to FIG. 56, a front plan view of a control attachment having dedicated on and off switches and a sensor element that may be removable is shown. According to the implementation of FIG. 56, a power adapter having 2 toggle elements 5602 and 5604 (e.g. an on toggle switch on top and an off toggle switch on bottom) are movable within a gap 5606 and can be implemented with a sensor module 5608 (also known as an insert) that not only controls operation of a load controlled by a power adapter arrangement, but also may comprise a sensor element, such as one or more of a camera, motion detector or any sensor as described above beneficial to a home automation system. The outputs of the sensor may be used not only to control the application of power to the load or control some other operation of the load, but also can provide information to other elements of a system implementing a power adapter arrangement having a control attachment as shown in FIG. 56.

While an example of the control attachments of FIGS. 56-64 describe a camera or motion detector by way of example, it should be understood that any sensors as described above could be used to transmit or receive information that may be beneficial in any aspect of a home automation system for example. According to some implementations, the sensor module 5608 may include a microphone and a speaker for detecting commands, questions, or other inputs and providing audio feedback, such as is commonly performed by smart speakers as mentioned above. The implementations of FIGS. 56-64 provide another example of power adapter arrangement having a power adapter and a control attachment, where the control attachment is implemented as a modular element of the power adapter arrangement.

As shown in the side view of FIG. 57, actuator elements 5702 and 5704 are included to enable on and off functionality using the toggle elements 5602 and 5604. A front and side view of the control attachment of FIG. 56 is shown in FIG. 58.

Turning now to FIG. 59, a front and side view of the control attachment of FIG. 56 without the removable sensor element shows contact the elements in a recess 5902. As shown in FIG. 59, an electrical interface element 5904, such as a connector or contact block having a plurality of contact elements 5906, comprises contact elements provided on a rear surface of a recess adapted to receive the sensor module 5608, which may be a sensor module for example. The contact elements may transfer data and other signals between the control attachment and the power adapter. That is, the contact elements may provide signals to circuits of the control attachment 104, or may provide signals directly to the power adapter by way of contacts of the power adapter.

Turning now to FIG. 60, a rear view of the removable sensor module 5608 shows contact elements, and particularly a rear surface 6002 having an electrical interface element 6004 comprising contact elements 6006. Signals can be transmitted between the sensor module 5608 and the power adapter. According to another implementation, an opening could be provided in the rear surface of the control attachment to enable the contact elements of the sensor module make a direct connection to corresponding contact elements of the power adapter as described above in reference to FIG. 30.

Turning now to FIG. 61, a front and side view of a sensor module 5608 having a removable screen 6102 is shown. In addition to a sensor 6106, which may comprise a camera or motion detector for example, the removable sensor module may also comprise control elements adapted to control settings of the sensor module, as shown by way of example as a movable element 6108 that is movable in a guide 6110. For example, the control element may control a sensitivity setting of a motion detector or camera or any other sensing element. The removable screen may be tinted or otherwise opaque to obscure the sensor and the control elements (if possible, without affecting the operation of the sensor). Attachment elements 6112 on the sides of the sensor module 5608 may be coupled to corresponding attachment elements 6114.

Turning now to FIG. 62, a front and side view of a control attachment having a removable screen exposing a camera that is movable within a receiving element and shown directed to the left is shown. According to the implementations of FIGS. 62 and 63, the sensor element 6202 may be movable within an opening 6204 to improve the operation of the control attachment. For example, the power adapter arrangement may be placed in a location of a room where it may be beneficial when the sensor element, such as a camera or motion detector, is directed towards a certain location, such as towards a door or window for example. Even in the event that a sensor is used for detecting a wide area of a room, it may be beneficial to be able to adjust the direction or orientation of the sensor when the power adapter arrangement is on a wall switch location that may be on a side of a room rather than near the center of the room. A front and side view of a control attachment having a removable screen of FIG. 62 shows the camera directed to the right in FIG. 63.

Turning now to FIG. 64, a front inside view of a control attachment having a movable screen to enable controlling a direction of a sensor, such as a camera, by moving the screen is shown. The implementation of FIG. 64 enables the simple adjustment of the orientation or direction of a camera or sensor by adjusting the screen itself. That is, the sensor may be attached to the screen, where the screen can be rotated to provide a desired orientation. The screen may be tinted or opaque to obscure the presence of the sensor, as shown in FIG. 64 where the sensor 6402 is lightly shaded to indicate the opaque nature of the screen. Because it may be difficult to see the direction or orientation of the sensor, a marker 6204 may be provided to enable the orientation of the sensor to easily be determined. While the screen as shown in FIG. 64 enables a horizontal adjustment of the sensor, it should be understood that the screen could be adjusted in any orientation, where the screen may be a ball that swivels to provide both horizontal and vertical adjustments.

While various control attachments are shown, it should be understood that functionality of the control attachment may be distributed between the main portion of the control attachment and the removable sensor module, or completely located in the removable sensor module.

Figure 65:
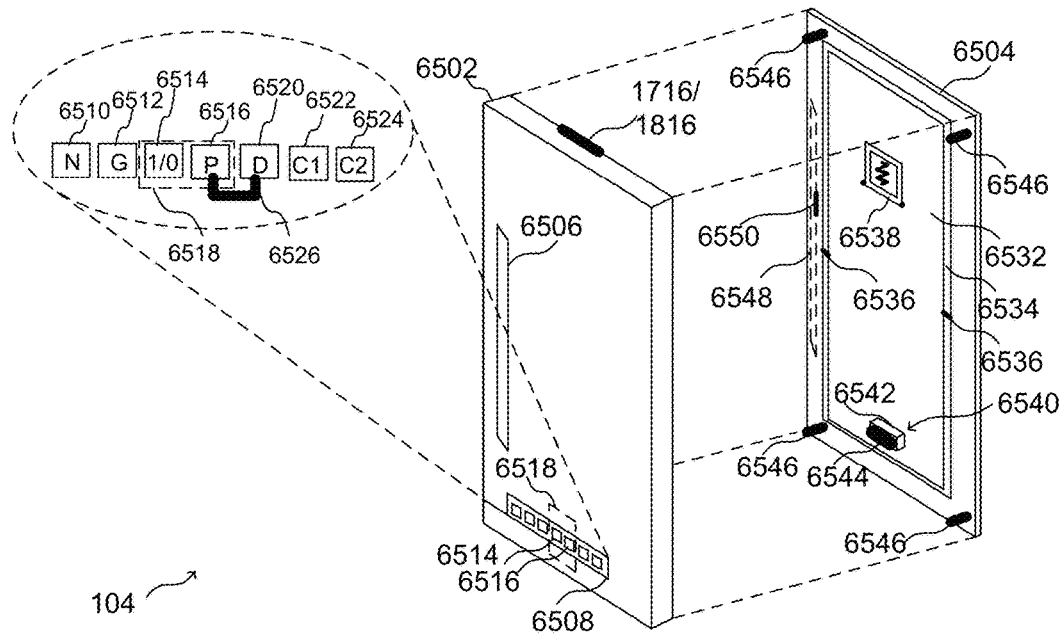
FIG. 65 is a diagram of a control attachment having contact elements for electrically connecting contacts of an electrical interface.
Figure 66:
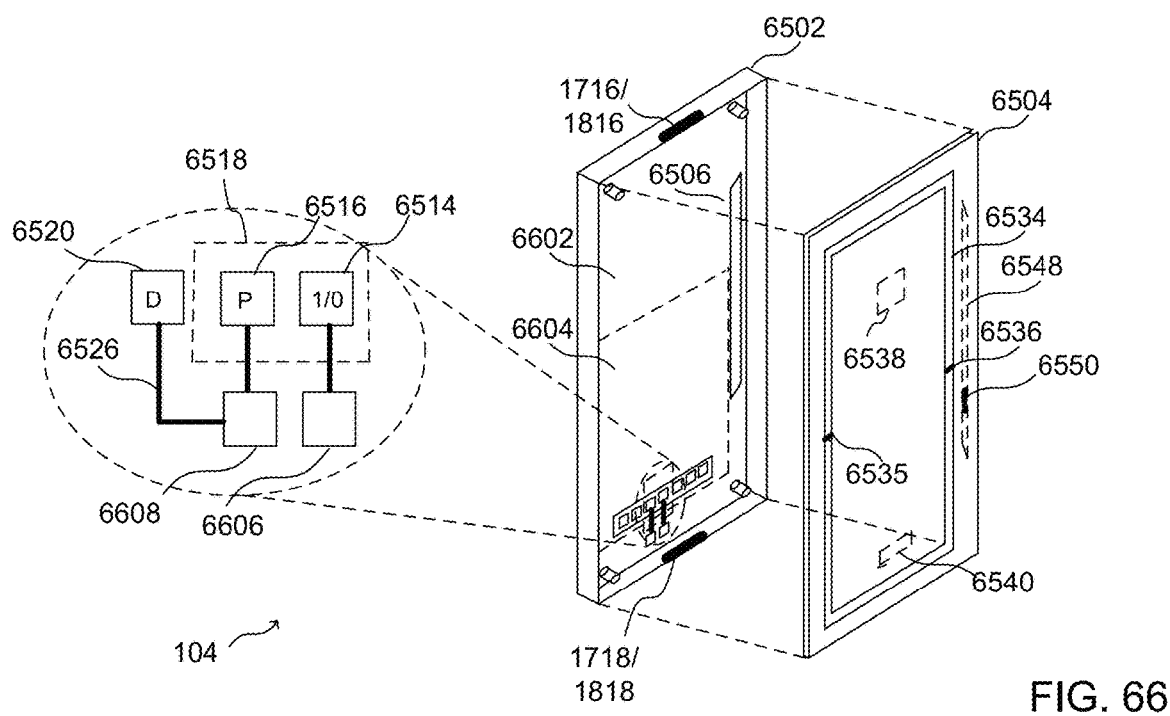
FIG. 66 is a diagram showing an inner surface of a rear housing of the control attachment of FIG. 65.
Figure 67:
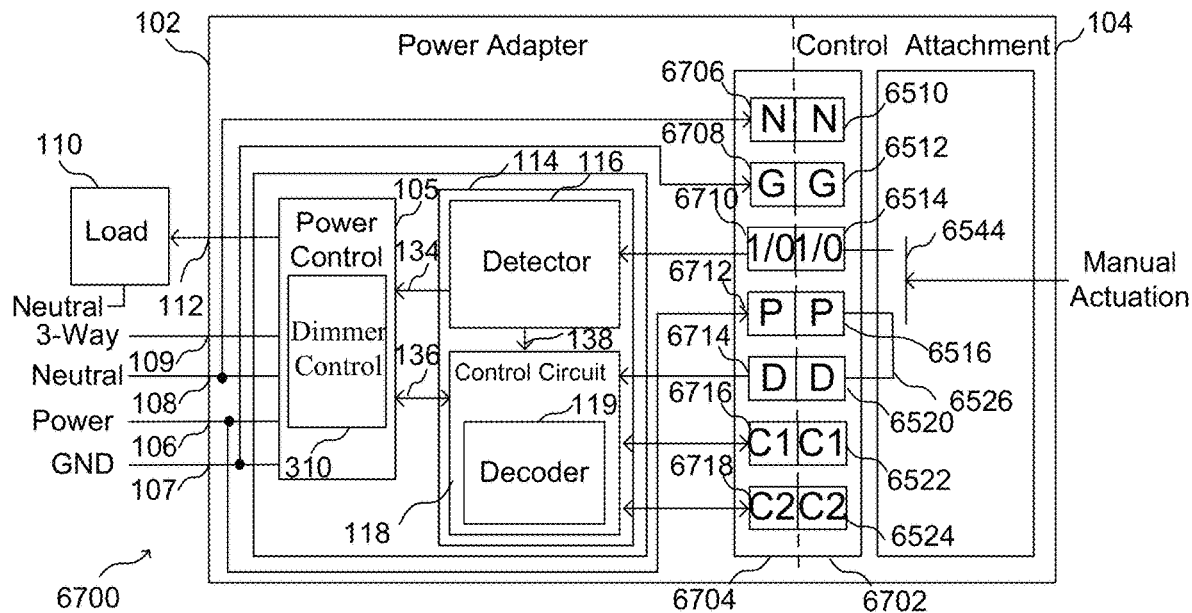
FIG. 67 is a block diagram of a power adapter arrangement using a control attachment according to the implementation of FIG. 65.
Figure 68:
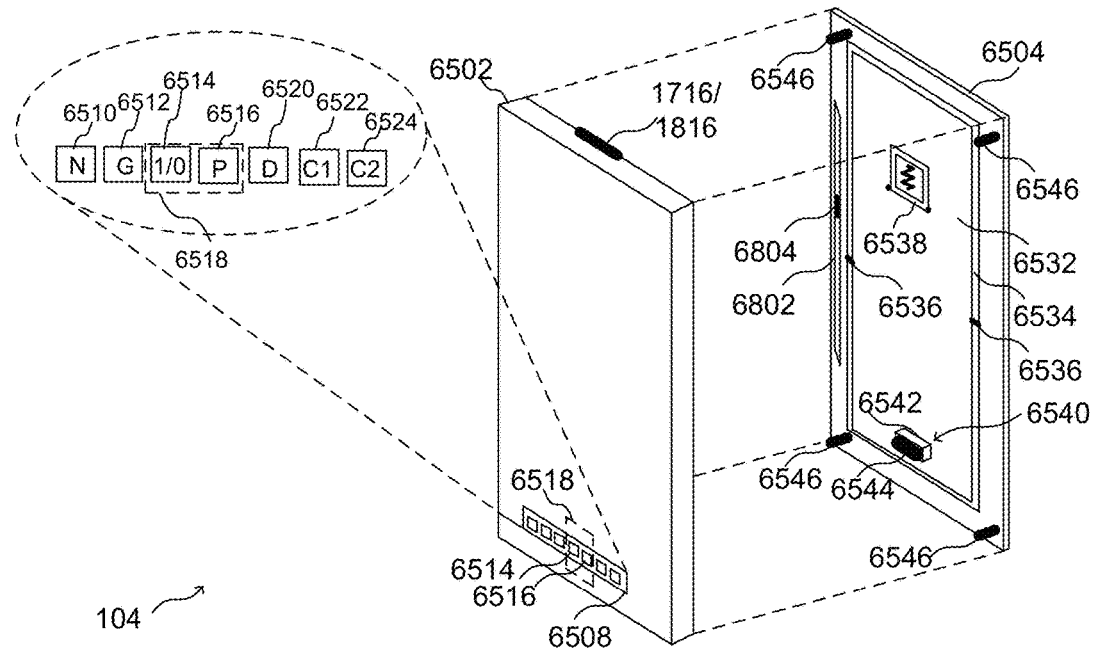
FIG. 68 is a diagram of another control attachment having a switch and an electrical interface.
Figure 69:
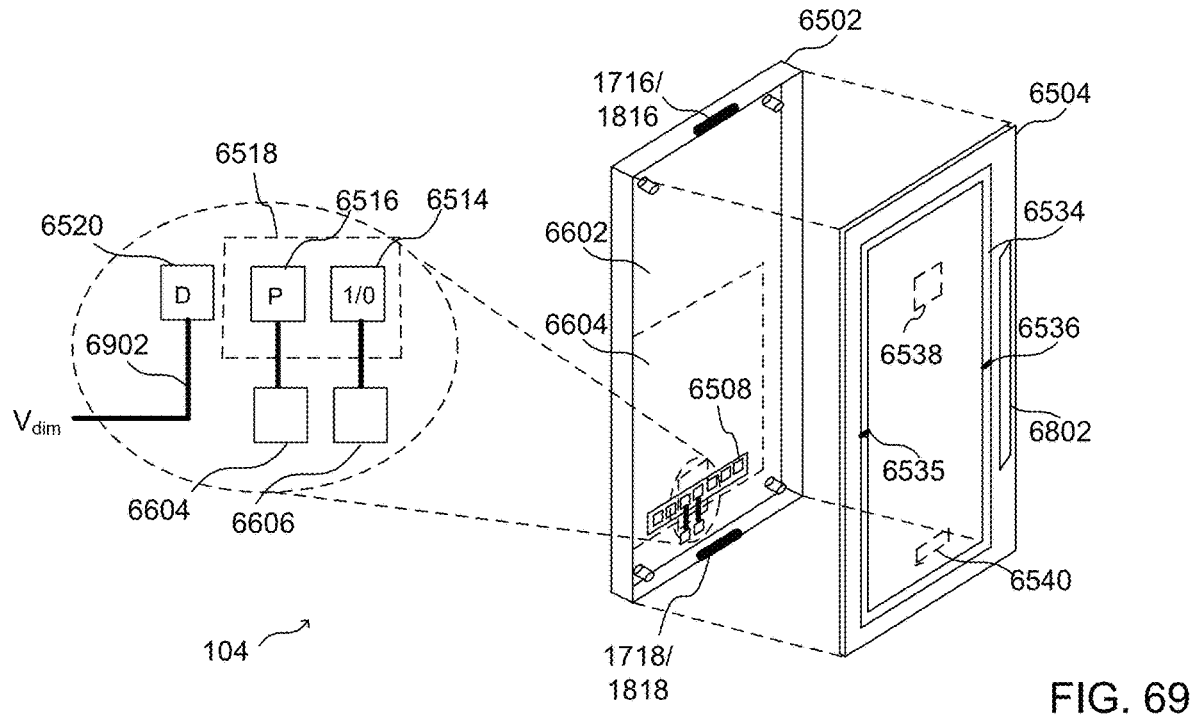
FIG. 69 is a diagram showing an inner surface of a rear housing of the control attachment of 68.
Figure 70:
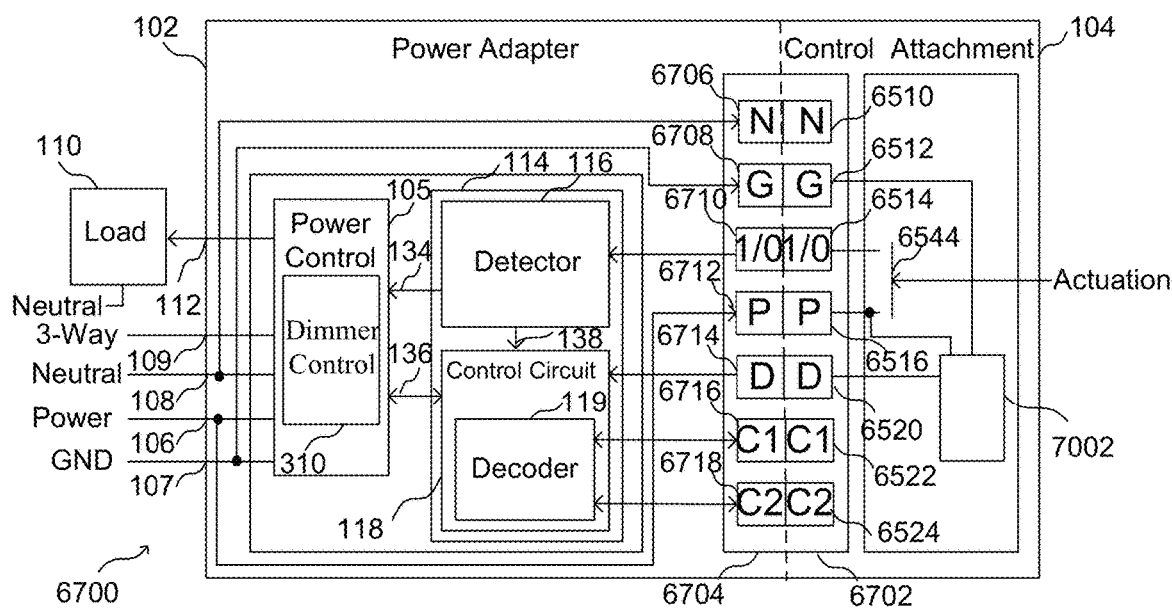
FIG. 70 is a block diagram of a power adapter arrangement using a control attachment according to the implementation of FIG. 68.
Figure 71:
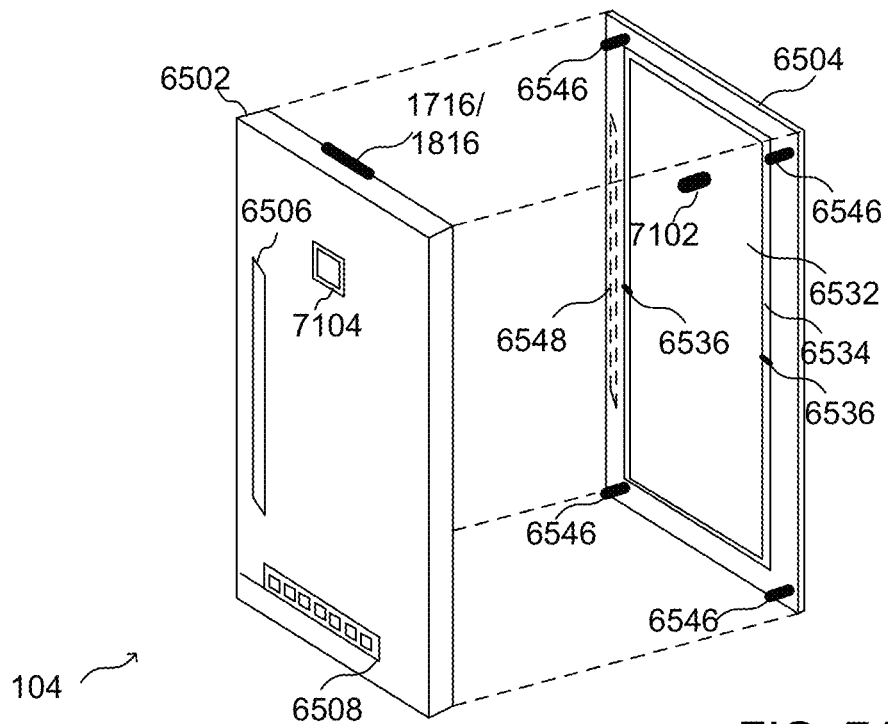
FIG. 71 is a diagram of another control attachment having an actuator element.
Figure 72:
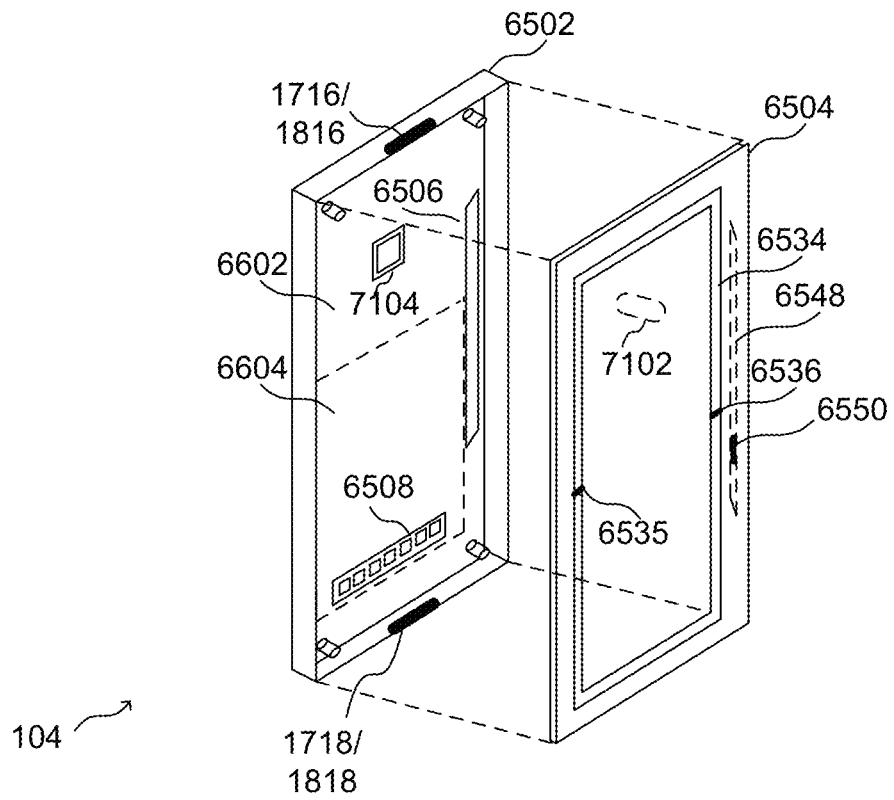
FIG. 72 is a diagram showing an inner surface of a rear housing of the control attachment of 71.
Figure 73:
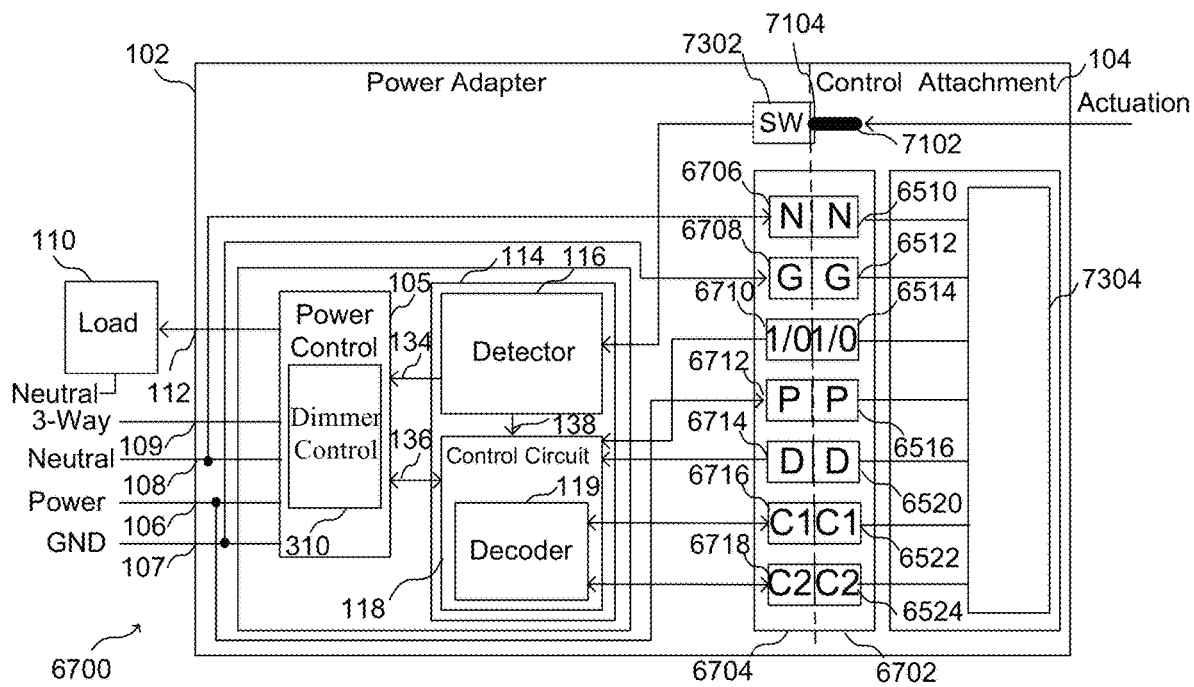
FIG. 73 is a block diagram of a power adapter arrangement using a control attachment according to the implementation of FIG. 71.
Figure 74:
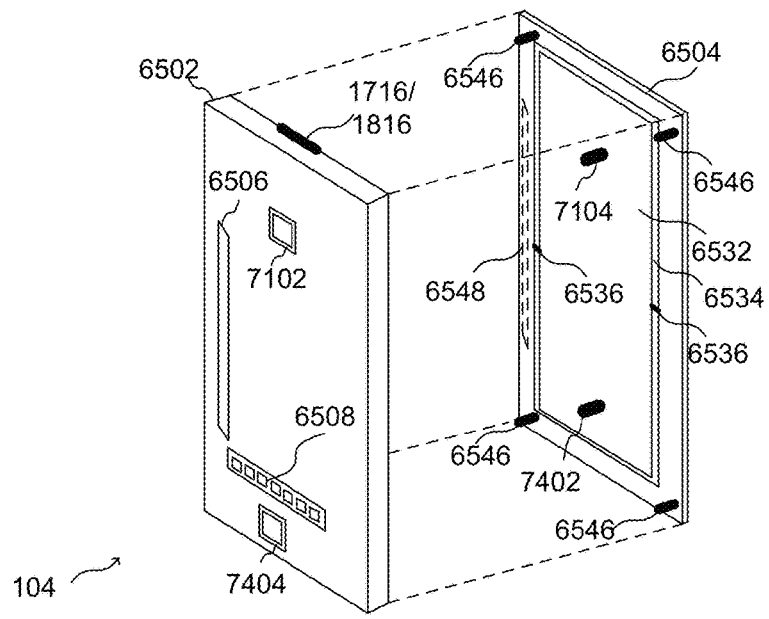
FIG. 74 is a diagram of a control attachment having two actuator elements.
Figure 75:
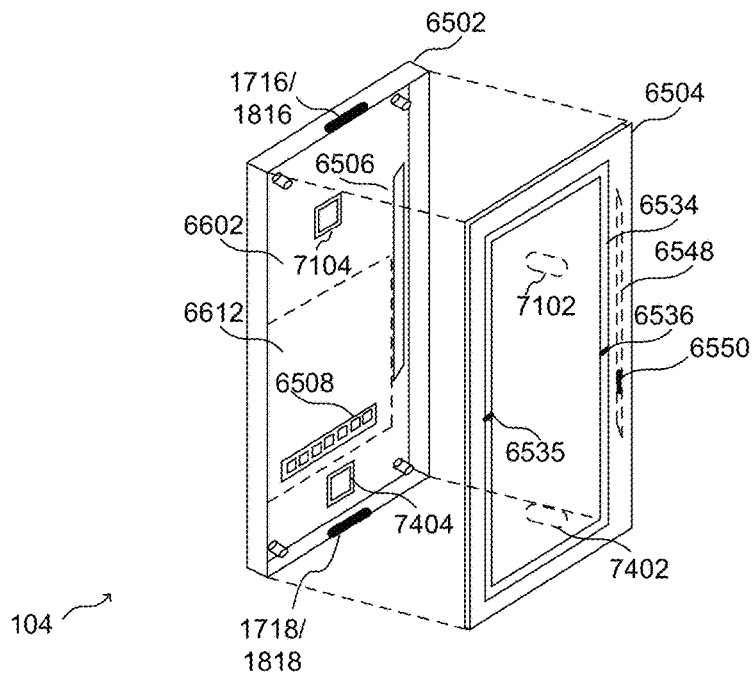
FIG. 75 is a diagram showing an inner surface of a rear housing of the control attachment of 74.
Figure 76:
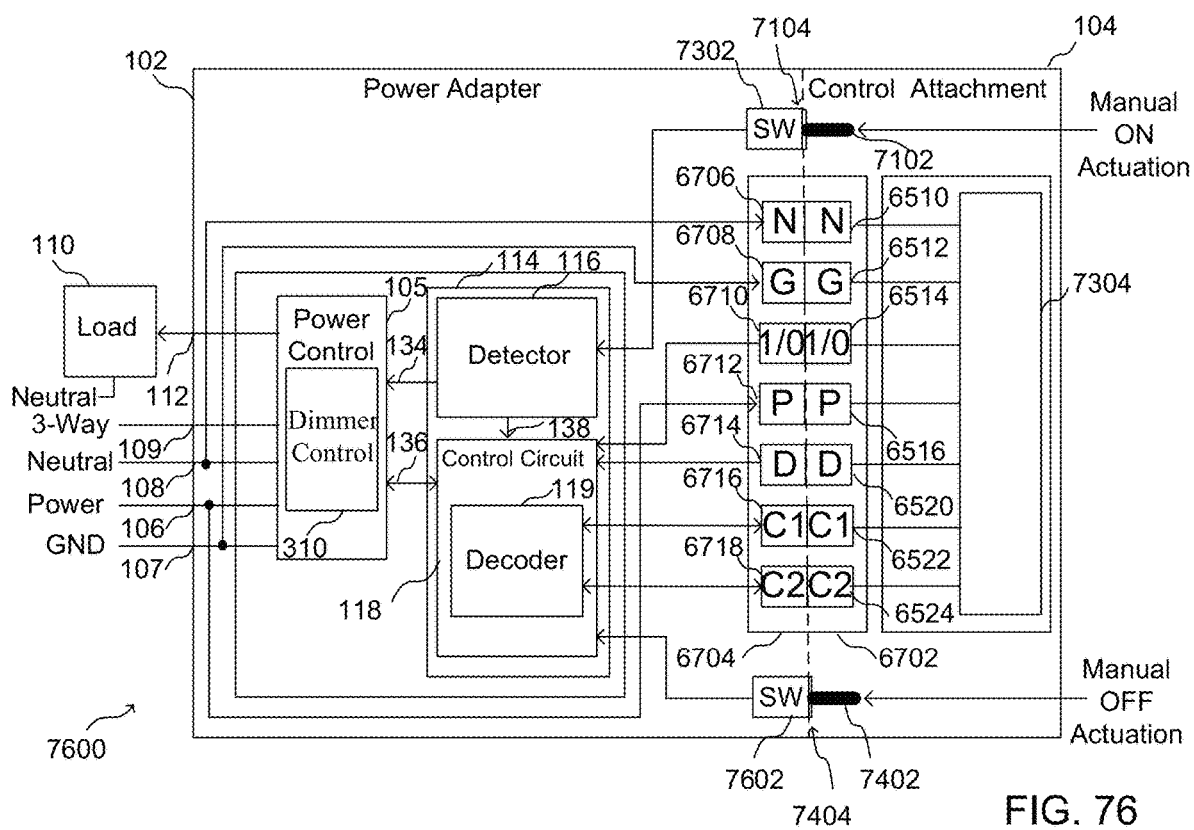
FIG. 76 is a block diagram of a power adapter arrangement using a control attachment according to the implementation of FIG. 74.

Groups of figures are now provided that show arrangements of interfaces, including for example electrical interfaces, mechanical interfaces, and electromechanical interfaces. FIGS. 65-67 show a single interface for providing signals to the power adapter from the control attachment, where the single interface comprises an electrical interface for a basic control attachment having no dimming control, where on and off signals are generated in response to a user actuation. FIGS. 68-70 also shows a single interface comprising an electrical interface, where a dimmer control signal may be generated in response to a user actuation on the control actuator or from a control circuit or control module. FIGS. 71-73 show multiple interfaces, including at least a mechanical or electro-mechanical interface and an electrical interface, where an on or off signal may be generated in response to a user actuation of a toggle element of the control attachment, and other signals may be sent by way of an electrical interface. FIGS. 74-76 also show multiple interfaces, but includes 2 mechanical or electro-mechanical interfaces and an electrical interface, where an on or off signal may be generated in response to a user actuation of a toggle element using the 2 mechanical or electro-mechanical interfaces, and other signals may be sent by way of an electrical interface.

Turning first to FIGS. 65-67, FIG. 65 shows a diagram of a control attachment having contact elements for electrically connecting contacts of an electrical interface. According to the implementation of FIGS. 65-67, a single toggle element is used, where a detection of a toggle actuation may be detected by the shorting of two contacts on a rear surface of the control attachment. In the event that the control attachment is used with a power adapter having dimmer functionality, but the control attachment does not have a dimmer control, the dimmer contact of the control attachment can be pulled high so that the power adapter controls the load at a maximum output.

An expanded view of the control attachment of FIG. 65 comprises a rear housing 6502 and a front housing 6504 that are coupled together, and shows the outer surface of the rear housing 6502 and the inner surface of the front housing 6504. For example, the front housing and the rear housing may be snapped together using attachment elements, glued together, thermally bonded, or attached using any type of attachment elements or attachment process. The rear housing 6506 comprises a dimmer control channel 6506 that provides an opening for allowing a dimmer control element to move within the dimmer control channel and control a corresponding dimmer control element of the power adapted, such as the dimmer control element 1526 of FIG. 15.

The rear housing also comprises an electrical interconnect element 6508, which may be a connector or a contact block for example, having a plurality of contact elements adapted to make an electrical connection with corresponding contact elements of a power adapter. An exemplary arrangement of contact elements of the electrical interconnect element 6508 is shown in the dashed oval. More particularly, seven contact elements are shown, including a neutral contact element 6510 for providing a neutral voltage signal from the power adapter to the control attachment, a ground contact element 6512 for providing a ground voltage signal from the power adapter to the control attachment, an on/off (I/O) contact element 6514 for providing an on signal or an off signal from the control attachment to the power adapter, a power contact element 6516 for providing a low power voltage signal (e.g. approximately 3-5 volts) to the control attachment for providing power for electric circuits that may be implemented in the control attachment.

The on/off contact element 6514 and the power contact element 6516 may be positioned next to each other as a contact element pair 6518 so that they can be easily shorted, such as by a contact element on a toggle element of the control attachment.

The electrical interface element 6508 may also comprise a dimming contact element 6520 for receiving a dimmer control signal from a dimmer control circuit of the control attachment. According to the implementation of FIG. 65, which is a basic control attachment having no dimming capability, the dimming contact element 6520 is coupled to the power contact element 6516, such as by a metal trace 5626 or jumper, to provide a high voltage signal to the corresponding dimming contact element of the power adapter. That is, if the power adapter has dimming capability, but the control attachment does not provide dimming control, it would be beneficial to pull the dimmer control signal high so that the full amount of power would be provided to the load.

Control contact elements 6522 and 6524 could also be included to transmit signals, such as control signals, between the control attachment and the power adapter. While specific contact elements are shown in the example electrical interconnect element 6508 of FIG. 65, it should be understood that fewer contact elements, additional contact elements, or different contact elements could be implemented. For example, any number of contact elements could be used for transmitting control signals or other data, as will be described in more detail below.

The front housing 6504, the inside portion of which is shown in FIG. 65, could include various elements enabling the operation of the control attachment. More particularly, a toggle element 6532 is positioned within a gap 6534 and coupled to the front housing 6504 by hinge elements 6536. A spring element 6538 enables the toggle element to be held in a first position or a second position, as describe above. That is, the spring element 6538 may be configured to hold the toggle element 6532 in either first position where the ground contact 6512 and contact element 6514 are not shorted, and a second position where the ground contact 6512 and contact element 6514 are shorted, as described above in reference to FIGS. 24 and 25.

More particularly, a contact element 6540 comprises a receiving element 6542 for receiving a contact portion 6544, which comprises a conductive element. The contact portion 6544 may be used too short two of the contacts of the electrical interface 6508, such as the ground contact 6512 and on/off contact element 6514 to enable providing an off signal to the power adapter (where an on signal is generated when the ground contact 6512 and on/off contact element 6514 are not shorted). Attachment elements 6546, shown here by way of example on four corners of the front housing 6504, may be used to attach the front house in 6504 to the rear housing 6502. A dimmer control channel 6548 may also be included and is adapted to receive a movable dimmer control element 6550 for engaging with a corresponding dimmer control element of the power adapter, as described above in reference to FIG. 15.

Turning now to FIG. 66, a diagram shows an inner surface of a rear housing and an outer surface of the front housing of the control attachment of FIG. 65. More particularly, an inner surface 6602 comprises an area 6604 that is adapted to receive a circuit board or control module, as will be described in more detail below. In expanded view of a portion of the electrical interface 6508 is shown in the dashed oval, where a contact element 6606 and a contact element 6608 are provided to enable shorting of the context elements by the contact portion 6544. Also shown in FIG. 66 is the jumper 6526 that couples the dimming contact element 6520 to the power contact element 6516, as described above.

It should be noted that the control attachment 104 of FIGS. 65 and 66 are adaptable such that the same front housing and rear housing can be used in basic control attachments having no circuit board or circuit module as shown in FIG. 66, but can be adapted to retain a circuit board or circuit module, and therefore be implemented as a smart control attachment. For example, a circuit board or circuit module can be attached to the inner surface 6602 of the rear housing 6502, where the front housing 6504 is then attached to the rear housing 6502. Such an arrangement would achieve economies of scale for production of the control attachment and enabling different types of control attachments to be easily assembled and used in a power adapter arrangement.

Turning now to FIG. 67, a block diagram of a power adapter arrangement 6700 using a control attachment according to the implementation of FIGS. 65 and 66 is shown, where the block diagram of FIG. 67 shows an example of an electrical interface 6702 having connectors or contact blocks each having contact elements that enable the communication of signals between the control attachment in the power adapter. According to the implementation of FIG. 67, a single electrical interfaces provided, namely a first electrical interface 6702 associated with the control attachment and a second electrical interface 6704 associated with the power adapter.

A neutral contact element 6706 is adapted to be electrically coupled to neutral contact element 6510. A ground contact element 6708 is adapted to be electrically coupled to ground contact element 6512. A toggle contact element 6710 (e.g. on/off (1/0) contact element) is adapted to be electrically coupled to contact element 6514 (e.g. on/off (1/0)

contact element). A power contact element 6712 (e.g. low voltage—approximately 5 volts) is adapted to be electrically coupled to a corresponding power contact 6516 to receive a low voltage reference power signal. A dimmer contact element 6714 is adapted to be electrically coupled to dimmer contact 6520. A signal contact element 6716 (e.g. first control signal) is adapted to be electrically coupled to control contact element 6522 (e.g. for a first control signal). Signal contact element 6718 (e.g. second control signal) is adapted to be electrically coupled to control contact element 6524 (e.g. second control signal). While there are no electrical connections to some of the contact elements, such as the neutral and ground contact the elements or the signal contact elements (because the control attachment does not comprise a control circuit for example), other embodiments of the control attachment will include electrical connections to the contact elements of the control attachment to enable in operation of the control attachment, as will be described in more detail below.

An on or off signal is provided in response to a manual actuation, as shown by contact portion 6544 which could be used to short the contact element 6514 with the power contact element 6516. Also shown in the arrangement of FIG. 67 is the shorting of the dimmer contact 6520 to the power contact element 6516. Each of the electrical interfaces 6702 and 6704 may comprise connectors having contact elements that are electrically coupled together when the control attachment is attached to the power adapter for example, or may just comprise contact elements that will make an electrical contact when the control attachment is attached to the power adapter. That is, it is not necessary that the electrical interfaces of the control attachment and power adapter are necessarily connectors that are adapted to mate with one another, but rather may just be contact elements that make electrical contacts when the control attachment is attached to the power adapter (e.g. the contact elements may comprise pogo pins in corresponding contact pads, or just contact pads that will make contact).

According to the implementation of FIG. 67, because the control attachment does not include dimmer functionality, but the power adapter does include dimmer functionality, the dimmer contact element 6520 is pulled high (i.e. coupled to the power contact element 6516) to receive the power signal as an input to the control circuit 118. Therefore, the power adapter will apply full power to the load, and the only control signal for controlling power applied to the load would be the signal generated at the toggle contact 6710.

Turning now to FIG. 68, a diagram of another control attachment having a switch and an electrical interface is shown. According to the implementation of FIGS. 68-70, dimmer functionality can also be provided on the control attachment. As shown in FIG. 67, a dimmer control channel 6802 is adapted to receive a dimmer control element 6804. The dimmer control element 6804 is movable to select a dimmer setting and is adapted to be coupled to and to control a corresponding dimmer control element of a power adapter.

As shown in FIG. 69, which is a diagram showing an inner surface of a rear housing of the control attachment of 68, the dimmer contact element 6520 is coupled to receive a dimmer control signal $V_{dim}$ by way of a signal line 6902. The $V_{dim}$ signal may be generated by a circuit within control attachment. For example, a resistor divider circuit adapted to receive the power and neutral signals from the power adapter may be configured to generate the dimmer control signal $V_{dim}$, which is provided back to the power adapter to control the power to the load, as will be described in reference to FIG. 70. Rather than controlling the motion of a corresponding dimmer control element of the power adapter, the $V_{dim}$ value may be generated by movement of the dimmer control element 6804 which would control a resistance of a variable resistor and therefore the $V_{dim}$ value.

Turning now to FIG. 70, a block diagram of a power adapter arrangement using a control attachment according to the implementation of FIG. 68 is shown. According to the implementation of FIG. 70, a control circuit 7002 is coupled the power contact element 6516 and the ground contact 6512, and is configured to provide the dimmer control voltage $V_{dim}$ to the control circuit 118 by way of the contact element 6520. The dimmer control voltage could be generated by the control circuit 7002 in response to one or both of a user actuation or a signal received from an external device, such as a smart phone or other computer device. For example, the control circuit 7002 could comprise a resistor divider circuit (i.e. a variable resistor) that generates the dimmer control voltage. Alternatively, or in addition to the resistor divider circuit, the control circuit 7002 may comprise a wireless transceiver that receives dimming signals from an external device.

Turning now to FIGS. 71 and 72, diagrams of another control attachment having an actuator element are shown. According to the implementation of FIGS. 71-73, an actuator element is adapted to control a switch in response to a manual actuator input, such as the pressing of a toggle element of the front housing of the control attachment. For example, the switch may be associated with the power adapter, and an actuator element 7102, which may be a projection extending from the toggle element, can extend to or through a rear housing of the control attachment, such as through an aperture 7104, to enable the actuation of a switch on the power adapter. While the implementation of FIGS. 71-73 shows an arrangement where the actuator element would extend through a recess in the rear housing, it should be understood that the rear housing could be implemented as described in FIGS. 81 and 82, where a flexible projection may be used to make contact with a switch of the power adapter. That is, there may be one or more intervening elements between the actuator element 7102 and the switch on the power adapter, where the one or more intervening elements enable the actuator element 7102 to indirectly control the switch, such as to generate an on or off signal.

Turning now to FIG. 73, a block diagram of a power adapter arrangement using a control attachment according to the implementation of FIG. 71 is shown. As shown in FIG. 73, 2 control interfaces are provided, including the electrical interfaces 6702 and 6704 as described above, and the interface between the control attachment and power adapter comprising the actuator element 7102 and the aperture 7104, where the actuator element 7102 comprises a prong or projection for engaging, directly or indirectly, a switch 7302. The switch may comprise an electro-mechanical switch (i.e. comprises a movable element to generate an electrical signal) used to generate an on or off signal detected by the detector 116 to control the power applied to the load. The control attachment may also comprise a control circuit 7304, which may comprise a circuit board or circuit module that is attached to a housing of the control attachment. The control module may comprise a wireless transceiver for example, and may receive control signals (e.g. on or off signals and dimming signals) for controlling the operation of the power adapter. As will be described in more detail below in reference to FIGS. 80 and 81, the control circuit 7304 may be attached to the rear housing 6502, enabling the front and rear housings of the control attachment to be used in basic control attachments, or advanced control attachments, such as a control attachment having a control module.

Turning now to FIGS. 74 and 75, a diagram of a control attachment having two actuator elements is shown. That is, rather than having a single actuator element for enabling generating on and off control signals, the control attachment of FIGS. 74 and 75 include 2 actuator elements, where one may be used for generating an on signal and the other may be used for generating an off signal. For example, the actuator element 7102 may be used for generating an on signal in response to a pressing of a top portion of the toggle element, while an actuator element 7402 may be used for generating an off signal in response to a pressing of the bottom portion of the toggle element, where the actuator element 7402 may directly or indirectly engage with a second switch of the power adapter, such as through an aperture 7104 or by way of intermediate elements between the actuator element 7402 and the second switch 7602 as described in reference to FIG. 76.

Turning now to FIG. 76, a block diagram of a power adapter arrangement using a control attachment according to the implementation of FIG. 74 is shown. As shown in FIG. 76, in addition to a switch 7302 that is adapted to receive a manual on signal in response to movement of the actuator element 7102, a second switch 7602 may be implemented on the power adapter, where the second switch 7602 may be an electro-mechanical switch configured to receive a manual off signal in response to the movement of the actuator element 7402.

Figure 77:
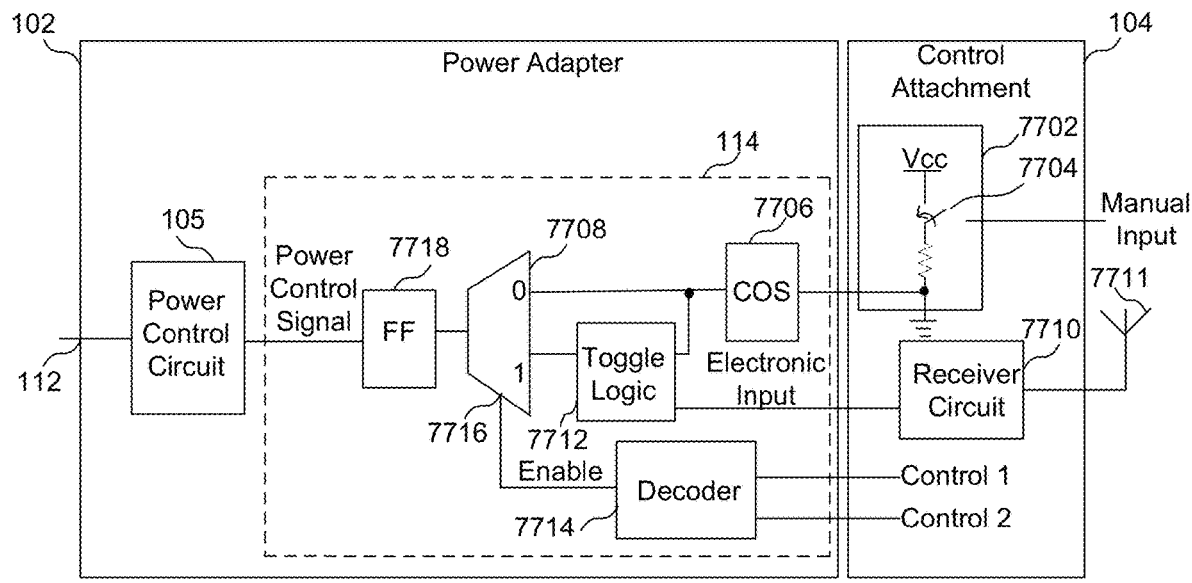
FIG. 77 is a block diagram of a power adapter arrangement showing an example of an interface circuit.

Turning now to FIG. 77, a block diagram of a power adapter arrangement shows an example of a portion of the signal interface circuit 114. More particularly, the signal interface circuit 114 of FIG. 77 comprises circuit elements that enable the detection of both an on or off signal generated by a manual input or an on or off signal received by or generated by a control circuit. That is, the circuit of FIG. 77 is intended to show a circuit that enables different types of controls signals being provided to the control attachment. The control attachment may comprise a switch 7702 having a switching element 7704 adapted to receive a manual input, where an output signal generated (e.g. a high output generated by the switch 7702 when the switch element 7704 is closed) In response to the manual input, a change-of-state (COS) circuit 7706 will detect when a manual input (e.g. a pressing of the toggle element) is received on the control attachment. An output of the COS circuit 7706 is provided to a first input of a selection circuit 7708, shown here by way of as a multiplexer. A receiver circuit 7710, having an antenna 7711, is adapted to receive control signals, such as on and off signals or dimming signals, where the receiver circuit provides a control signal to a toggle logic circuit 7712. That is, the toggle logic circuits 7712 is adapted to receive both the output of the COS circuit 7706 and an electronic input by way of the receiver 7710 (e.g. a signal indicating a change in the on or off state from the wireless receiver or a control circuit of the control attachment that may be applying a timing pattern for example).

A decoder circuit 7714 is configured to receive control signals, such as first and second control signals as shown, and generate an enable signal that is coupled to a control terminal 7716 of the multiplexer. That is, the decoder 7714 may determine the type of control attachment, and select the output of the COS circuit 7706 if the control attachment does not have having a control circuit or wireless receiver that may provide a toggle signal, or select the output of the toggle logic 7712 if the control attachment comprises a control circuit or wireless receiver that may provide a toggle signal.

The toggle logic circuit will receive both the output of the COS circuit and the electronic input to generate the power control signal. An output of the selection circuit 7718 may comprise a power control signal that is provide to a register 7718, shown here by way of example as a flip-flop, an output of which is provided to the power control circuit 105. Because there is a single manual actuator, which may be implemented as described in reference to FIGS. 22-25 and FIGS. 65-73, the state of the switch controlling power to the load may be changed whenever a toggle signal is detected, as will be described in more detail in reference to FIG. 78.

Figure 78:
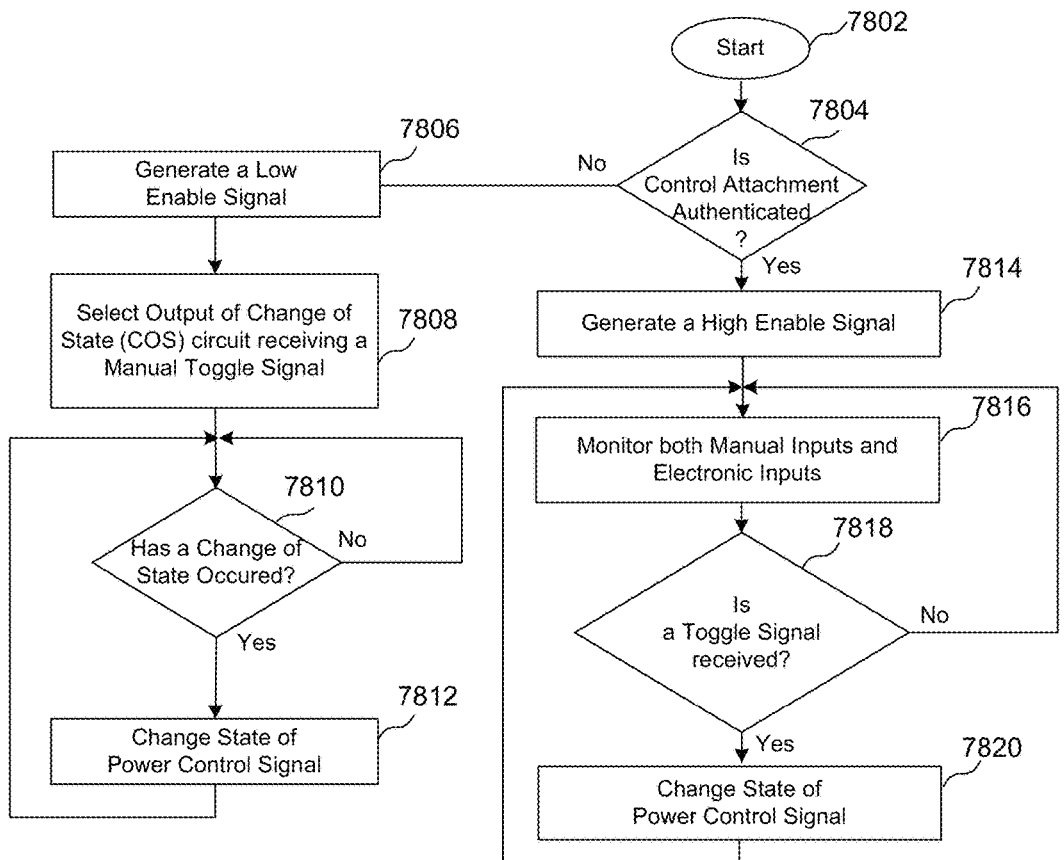
FIG. 78 is a flow diagram showing a method of implementing a power adapter arrangement having a single toggle switch.

Turning now to FIG. 78, a flow diagram shows a method of implementing a power adapter arrangement having a single toggle switch. After the method is started at a block 7802, it is determined whether the control attachment is authenticated at a block 7804. If not, a low enable signal would be generated by the decoder 7714 at a block 7806, thereby selecting the output of the COS circuit 7706 at a block 7808. That is, if the control attachment is not authenticated (or is a basic control attachment that does not have a control circuit), the power adapter will still be able to receive control signals from the control attachment based upon manual inputs (such as a manual toggle detected by a switch of the power adapter). It is then determined whether a change of state has occurred in a block 7810. If so, is change of state of the power control signal is performed, such as by the signal interface circuit 114, at a block 7812. Therefore, the control attachment will continue to operate as a "dumb" control attachment, where the power adapter responds to manual toggle signals (or manual dimmer control signals if both the power adapter and the control attachment are configured to receive manual dimmer control signals).

If the control attachment is authenticated at the block 7804, a high enable signal is generated at a block 7814, where both the manual inputs and the electronic inputs can be monitored at a block 7816, such as by the toggle logic circuit 7712. It is then determined whether a toggle signal is received at a block 7818. If so, the power control signal may be changed to indicate a change of state of the power to the load at a block 7820. It should be understood that detecting whether a toggle signal is received at the block 7818 may be based upon either the manual input detected by the COS circuit 7706, or in response to a signal received by the receiver circuit 7710 (or based upon a toggle signal that is provided as an electronic input to the toggle logic 7712 based upon a timing pattern stored in the control attachment or stored in the power adapter).

For example, when using a control attachment having a toggle element that stays in a fixed position after the top or bottom of the tangle element is pressed, the toggle logic will determine that the user intends to change the state when the toggle element is pressed. That is, because a user will know that, even if the bottom of the title element is flush with the control attachment, the top of the toggle element must be pressed to change the state, as is commonly the case with the use of a 3 way switch for example. In contrast, when implementing a toggle element that returns to a steady state position (i.e. will always return to a center position whether the top of the toggle element or the bottom of the toggle element is pressed), the interface circuit may consider the pressing of the top of the toggle element to be an indication that the user intends to apply power to the load or the pressing of the bottom of the toggle element to be an indication that the user intends to turn off power to the load, as will be described in more detail below in reference to FIGS. 79 and 80.

Figure 79:
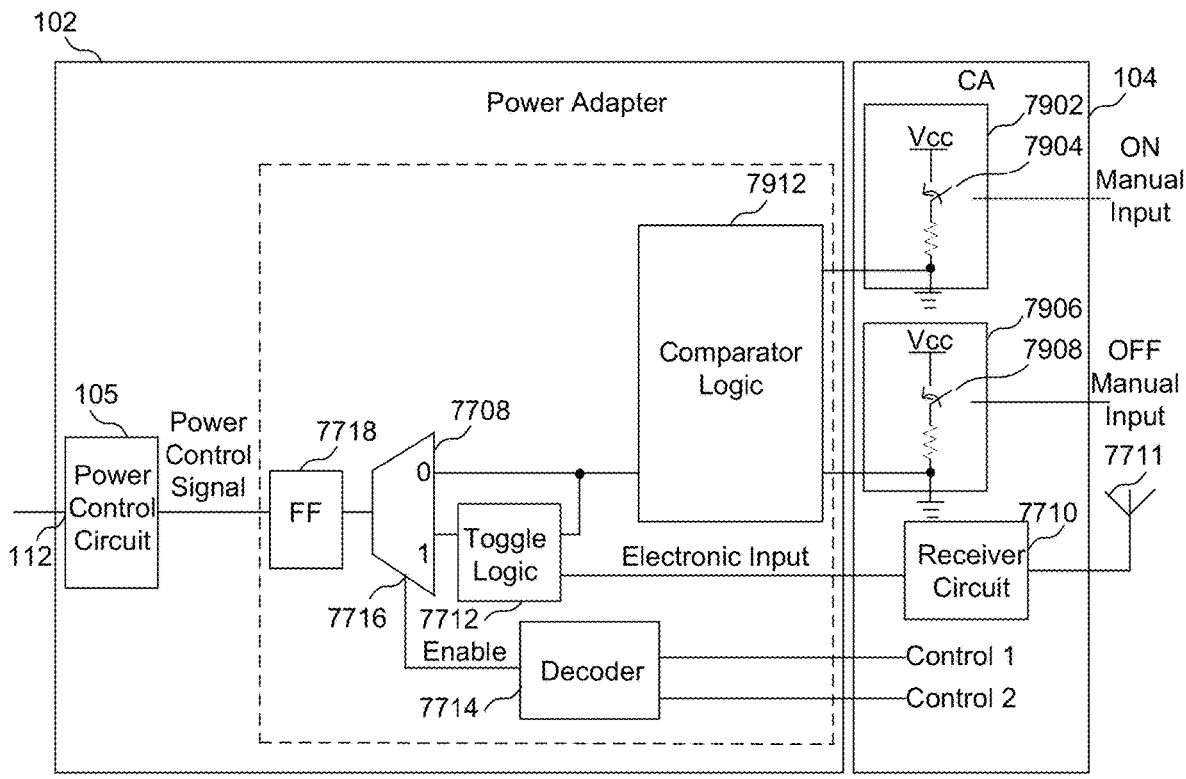
FIG. 79 is another block diagram of a power adapter arrangement showing an example of an interface circuit.

Turning now to FIG. 79, another block diagram of a power adapter arrangement showing an example of an interface circuit is shown. According to the implementation of FIG. 79, 2 separate switches are provided. More particularly, a switch 7902 has a switch element 7904 is that is adapted to receive an on manual input signal, such as the pressing of the top of a toggle element, and a switch 7906 has a switch element 7908 is that is adapted to receive an off manual input signal, such as the pressing of the bottom of the toggle element. Comparator logic 7912 may be implemented to detect a change of state that may be desired by a user. That is, the comparator logic may be used to detect whether power is currently being applied to a load, and whether the selection of the top of a toggle element is intended to change that state, or to detect whether power is not currently being applied to a load, and whether the selection of the bottom of a toggle element is intended to change that state, as will be described in more detail in reference to FIG. 80. That is, because the state of power applied to the load may be controlled by additional inputs other than the toggle element (e.g. an input associated with a wireless signal or a signal associated with a timing pattern generated by a control circuit of the control attachment or the power adapter), it may be necessary to determine whether a user actually intends to change the state of power applied to the load Turning now to FIG. 80, a flow diagram shows a method of implementing a power adapter arrangement having two toggle switches of FIG. 79. After the process is started at a block 8002, such as when the control attachment is attached to the power adapter, it is determined whether an on button is detected (e.g. pressing the top portion of the toggle element) at a block 8004. If so, it is determined whether power is already applied to the device controlled by the switch (i.e. the load) at a block 8006. If not, power is applied to the device controlled by the switch of the power adapter at a block 8008. However, if power is already applied to the device controlled by the switch, the power adapter will continue to apply power to the switch at these step 8010. Similarly, if the off button (e.g. pressing the bottom portion of the toggle element) is detected any block 8014, it is determined whether power is already applied to the device controlled by the switch at a block 8016. If so, power is removed from the device controlled by the switch of the power adapter at a block 8018. Otherwise, the current state of no power being applied to the load by the switch is maintained at a blocked 8020.

Turning now to FIGS. 81 and 82, expanded diagrams show an example of a control attachment, and more particularly, a flexible arrangement that allows common components (i.e. the same components over multiple devices) to be used in a range of different control attachments. The implementations of FIGS. 81 and 82 show another aspect of a modular control attachment, where a circuit board or control module is implemented inside the control attachment. As will be described in more detail below, the control attachment of FIGS. 81 and 82 may be implemented as a modular control attachment, where the control attachment may receive a circuit board or circuit module or a module comprising a connector or contact block. The circuit board or control module may also include or be coupled to a speaker and microphone to enable any aspect of a home automation system.

One beneficial aspect of the implementation of a control attachment of FIGS. 81 and 82 is that a basic control attachment (i.e. a control attachment having no control circuit) can be implemented at a low cost, but also converted to an advanced control attachment having a variety of features. For example, in some cases, both the front and rear housing of the control attachment may be used for both basic and advanced control attachments. In other cases, the front housing may be different, such as in the case where a speaker and microphone is implemented in the control attachment, where an opening for the speaker and microphone are provided on the front housing.

A rear housing 8102 is adapted to be coupled to a front housing 8104. The rear housing comprises attachment elements 8106, shown here by way of example as an aperture that is adapted to receive a corresponding attachment element of the front housing 8104. However, it should be understood that other types of attachment elements could be implemented, such as a flange that is adapted to receive a corresponding attachment element on the front housing 8104. An opening 8108, is included in the rear housing, and may comprise an intermediate actuator element. That is, because it may be beneficial to provide an intermediate actuator element so that the actuator element of the front housing does not need to extend so far to reach a switch of the power adapter, the intermediate actuator element may enable the actuator element of front housing two more easily control the switch of the power adapter. According to the implementation of FIG. 81, a flexible projection 8110 extends to an actuator element 8112, which may be a prong for example. The flexible projection acts like a leaf spring, and will move in response to a movement of an actuator element of the front housing, such as in the actuator element on a toggle element. That is, when the actuator element of the front housing is moved towards the power adapter, the intermediate actuator element 8112 will also move toward the power adapter, and engage the switch of the power adapter. According to the implementation of FIG. 81, a second intermediate actuator element may also be in included, shown here by way of example as an actuator element positioned below the electrical interface 6508.

The front housing 8104 comprises a plurality of attachment elements 8116. According to the example of FIG. 81, the attachment elements 8116 comprise flanges that are adapted to be inserted into the corresponding attachment elements 8106, which are shown as recesses before receiving the flanges. According to some implementations, the recess is could enable a user to depress the flanges of the attachment elements 8117 and remove the front housing. Such an arrangement would allow a user to replace the front housing to change the color of the control attachment (e.g. white or beige). According to other implementations, the attachment elements of the rear housing may receive the flanges of the front housing, but may not be accessible to the user on the outside of the control attachment. An inner surface 8118 of a toggle element that is movable within a gap 8120 using hinge elements 8122 comprises being plurality of spring elements 8124, such as leaf springs as shown. The spring elements enable the toggle element to return to a steady state position, as described above in reference to FIGS. 18-21 for example. While leaf springs are shown by way of example, it should be understood that any type of spring could be used. Actuator elements 8126 are provided to control the application of power applied by a power adapter to a load, and may directly engage a switch of the power adapter or may engage an intermediate actuator as described above.

The diagram of FIG. 82 shows an inner surface of a rear housing of the control attachment, and particularly an arrangement that allows flexibility in implementing different features in a control attachment, such as implementing a rear housing that is adapted to receive a control circuit on a circuit board, or a control module comprising a module having a circuit board, as will be described in more detail below. An inner surface 8204 comprises wall portions 8206 defining the inner surface in a recess of the rear housing. Attachment elements 8210, such as an aperture or a flange adapted to receive a corresponding attachment elements, are shown. The rear housing may also comprise a receiving element 8212, as shown here by way of example as having walls 8214 for defining a recess adapted to receive a circuit board or circuit module configured to implement advanced features of the power adapter arrangement. Attachment elements 8216 of the walls 8214 enable receiving corresponding attachment elements of a circuit board, a control module having a circuit board, or a cover adapted to enclose a circuit board or control module. According to the implementation of FIG. 82, attachment elements 8218 are shown here by way of example are threaded portions for receiving corresponding screws to attach a circuit board 8220 to the rear housing using holes 8222. According to some implementations, the circuit board may comprise a contact 8224 adapted to receive a corresponding contact on a cover for the circuit board that may have a printed antenna element. More particularly, a cover 8230 may be adapted to attach to the receiving element 8212, such as by using corresponding attachment elements 8232 that are attached to the attachment elements 8216. The contact element 8224 may be coupled by a contact 8234 to an antenna element 8236, which may be a wire for example, or may be a printed antenna on the cover 8230. Rather than having a circuit board and cover, a control module may be snapped into the receiving element 8212.

Turning now to FIG. 83, a block diagram of a circuit for testing the connections associated with a power adapter when the contacts of the power adapter are electrically connected to wires providing power to the power adapter is shown. The test circuit 8301 comprises circuits for comparing voltages at the contacts of the power adapter (e.g. contact elements 1516 and 1520 of FIG. 5). According to the implementation of FIG. 83, one or more comparator circuits are used to compare voltages at the contacts that receive reference voltages as shown to determine whether the power adapter is improperly wired or not functioning properly.

According to one implementation, a first comparator circuit 8302 is coupled to the load contact (to receive the voltage on the load contact) and coupled to the neutral contact (to receive the voltage on the neutral contact). A second comparator circuit 8304 is coupled to the load contact (to receive the voltage on the load contact) and coupled to the ground contact (to receive the voltage on the ground contact). A third comparator circuit 8306 is coupled to the neutral contact (to receive the voltage on the neutral contact) and coupled to the ground contact (to receive the voltage on the ground contact). A fourth comparator circuit 8308 is coupled to the ground contact (to receive the voltage on the ground contact) and the power contact (to receive a voltage associated with the earth ground). A comparator circuit 8310 may also be implemented to compare the neutral contact to power. The switch 8311 may be controlled by control signals from the control circuit 8312 by way of a control line 8314, while signal lines 8315 may be provided from the control circuit 8312 to the control circuit 8316. It should be noted that the power contact of the power adapter receiving power signal from the building system could also be monitored and compared to other signals. An improper wiring of the power contact of the power adapter receiving power signal from the building system may be less important in terms of safety, and any issue related to a wiring error associated with the power contact may have more to do with an operating error. In contrast, a wiring error where power is coupled to a ground or neutral contact or a ground or neutral contact is not properly wired may lead to a serious safety condition. Further, monitoring of the load contact would not only provide voltage information, but would also provide information related to the operation of the power adapter arrangement. However, it should also be understood that both the power contact (i.e. line voltage) and the load contact could be monitored. It should be noted that the voltage values detected at the contact elements of the power adapter from the wires of a junction box may be high voltage values, and can be converted to lower value voltages (representing a level of the detected voltage, but in a lower voltage range) for comparison, particularly when any comparison is performed in the control attachment.

The comparator circuits 8302-8310 may comprise voltage comparators for example. According to other implementations, the comparator circuits may be adapted to detect currents within the power adapter when the power adapter is operating to detect abnormal operating conditions of the power adapter or a device powered by the power adapter, or detect power usage by a device powered by the power adapter. While comparators 8302-8310 are shown by way of example, it should be understood that additional comparators could be implemented to compare any voltage detected at various input nodes (e.g. power, neutral, ground, 3-way, etc.) in the power adapter and generate information that may be beneficial in determining whether a power adapter is installed correctly (e.g. is correctly wired) or is operating correctly (e.g. is not a defective product). While multiple comparator circuits are shown, it should be understood that a single comparator could be implemented, where the nodes (e.g. load, neutral, ground and power) could be selectively coupled to a comparator. For example, a switch 8311 coupled to receive voltages at various nodes could enable the selection of inputs to a single comparator circuit.

A control circuit 8312 may be coupled to the comparators 8302-8310 to receive output signals generated by the comparators indicating the results of the various comparisons. By way of example, the comparator circuits could generate a difference in the voltages on the lines coupled to the comparator, or could provide a result representative of the difference in voltages (such as for high voltage signals). While the control circuit 8312 may be configured to process information and communicate test results to reduce the number of signal lines to a control circuit 8316 of the control attachment 104, the outputs of the comparator circuit could be provided directly to the control attachment 1004. For example, the control circuit 8312 could receive detected voltages values, where the control circuit 8316 could determine an improper wiring condition based upon the detected voltage values and provide a message on the display 8328.

It should be noted that a testing function can include circuits that are distributed between the power adapter and the module. That is, while voltages associated with the power adapter could be detected by a circuit in the power adapter, such as by one or more voltage detectors, other processing to detect improper wiring or a defective power adapter or module may be performed in the power adapter (such as by using control circuit 8312 of the power adapter), by the module (using control circuit 8316 of the module), or distributed between the power adapter and the module.

The control circuit 8312 may not only receive signals from the comparators, but may also provide control signals that enable the testing of the power adapter to the 8316. According to one implementation, a test of the connections of the power adapter may be performed whenever a module is attached to a power adapter. For example, the control circuit of one the power adapter and the control attachment may detect the connection of the control attachment to the power adapter, and initiate a testing of the connections of the power adapter. For example, in the implementation of FIG. 83, the control circuit 8316 may detect one or more outputs of the control circuit 8312 to determine whether the power adapter is improperly wired or is defective. Alternatively or in addition to an automatic testing initiated by one of the control circuit 8312 or the control circuit 8316 (such as when a control attachment is attached or a periodic test), a user interface element 8318, shown here as a button by way of example, may be used to initiate a testing of the connections by a test circuit of the power adapter or the control attachment. That is, a user may desire that a check be performed to make sure that the power adapter is properly wired and operating correctly or the power adapter and control attachment are operating correctly. The test results can then be provided to the user. By way of example, the test results can be displayed on a display 8328.

Turning now to FIG. 84, another block diagram of a circuit for testing the connections associated with a power adapter when the contacts are electrically connected to wires providing power to the power adapter is shown. According to the implementation of FIG. 84, a switching circuit 8402 coupled to the various nodes (e.g. contact elements 1516 and 1520 of FIG. 5) enables the connection of the nodes to single voltage detector 8404 that can provide a measured voltage value to the control circuit 8312 (or directly to the control circuit 8316 as described above). The voltage detector can sequentially detect voltages at different nodes to determine whether the power adapter is improperly wired or not operating properly. While a single voltage detector is shown, it should be understood that multiple voltage detectors could be implemented. Also, while voltages are shown as being detected, it should be understood that currents be detected instead of voltages or in addition to voltages.

There are different conditions that can be detected to determine whether a power adapter is wired properly and working properly. When a power adapter is wired correctly, the line (i.e. power wire) is connected to a power contact of the power adapter (which may be detected at the power or load contact), the neutral line is connected to the neutral contact, and ground line is connected to the ground contact. However, the ground contact may be improperly connected to the neutral contact to form an improper ground connection, commonly called a bootleg ground. A particularly dangerous condition can exist when there is not only an improper connection of the ground contact to the neutral wire, but the line (power) and neutral connections are reversed, commonly known as a reverse polarity bootleg ground. What makes this improper wiring condition particularly dangerous is that the ground connection, which is improperly connected to a power line, may make portions of the power adapter have a high voltage electrical charge and may lead to an electrical shock or an electrocution of the user of the power adapter.

In order to detect the improper wiring of a power adapter, it is necessary to use a voltmeter, where the voltage between ground and neutral (as detected by a voltage detector and comparator) will be very close to zero. However, to detect a reverse polarity bootleg ground connection, it is necessary to connect a prong of a voltmeter to earth ground, and test each of the power, neutral and ground contacts with respect to earth ground. Because a recess adapted to receive a control attachment provides access to measurements associated not only with the power, neutral and ground terminals of an outlet, but also an earth ground (by determining a voltage associated with the power adapter, such as by determining the voltage of the flange electrically connected to the junction box, which should be at earth ground), it is possible to detect improper wiring conditions. That is, a test circuit could not only be coupled to the power (or load), neutral and ground contacts to detect voltages at those contacts, but could also detect a voltage of earth ground to use as a reference voltage. Because a junction box receiving the power adapter is at earth ground, the voltage at earth ground can be detected by determining the voltage of the junction box, such as by determining the voltage of a flange of the power adapter connected to the junction box. A test circuit internal to the power adapter could detect the voltage at earth ground by providing a conductor coupled to a flange of the power adapter (e.g. flange 1520 of FIG. 15 that is electrically coupled to the junction box and therefore at earth ground). It should be understood that test circuits could be implemented in power adapters receiving any type of power adapter modules as described above.

Figure 85:
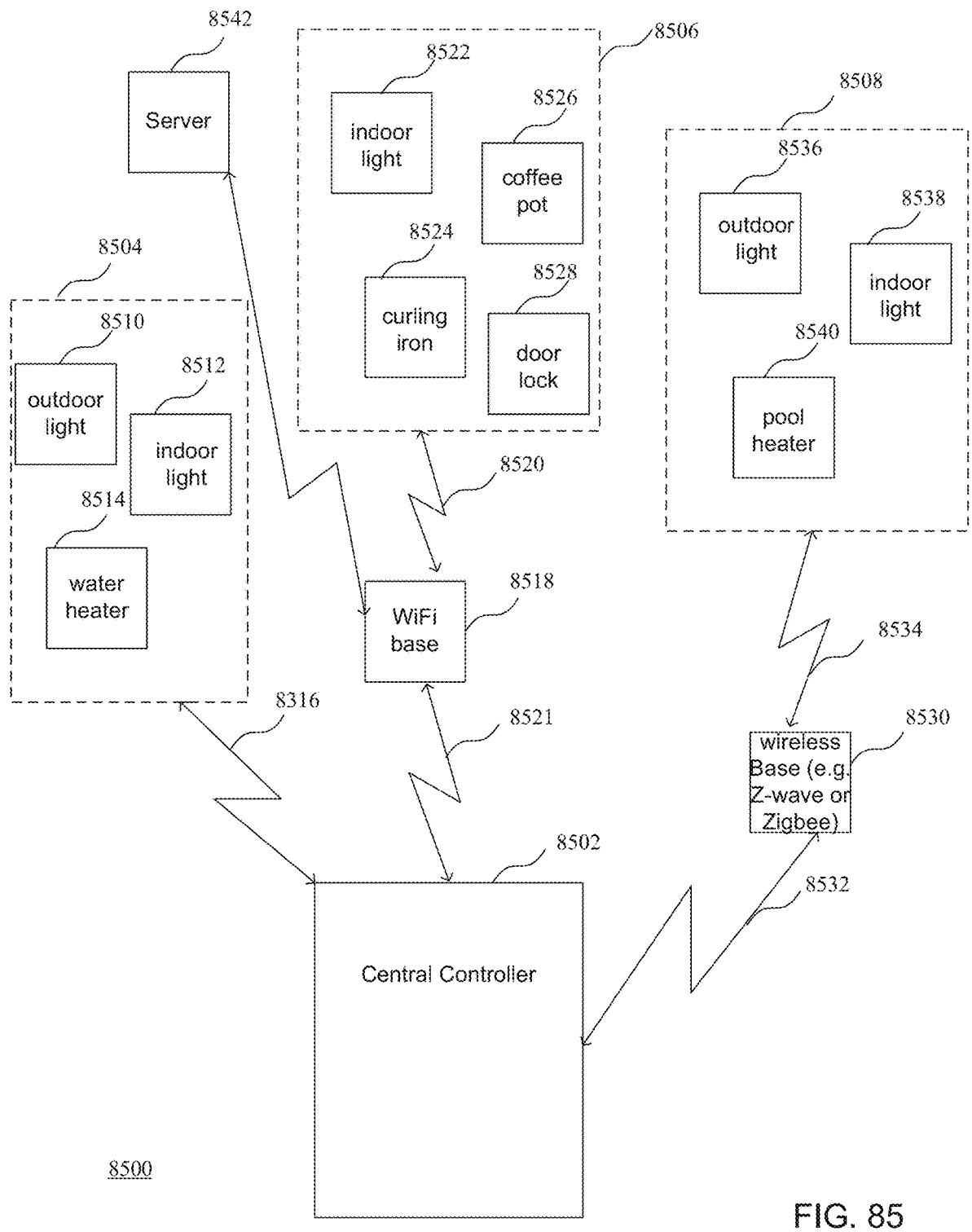
FIG. 85 is a block diagram of a system having a plurality of power adapters implementing different communication protocols.

Turning now to FIG. 85, a block diagram of a system having a plurality of power adapters implementing different communication protocols is shown. The system of FIG. 85 shows power control devices that can be used to control a variety of elements in the system. According to the implementation of FIG. 85, a single central controller 8502 can provide multimodal control of different control devices or different sets of control devices. The control devices could be power adapter arrangements as set forth above or other suitable control devices that could be coupled to control a device or integrated in the device to control the device. The single controller 8502 could be for example a smart phone, a tablet computer or any other computer or device enabling a wireless connection to multiple control modules by way of different wireless protocols as described above. For example, the controller 8502 could communicate with a first set 8504 of control devices, a second set 8506 of control devices, and a third set of control devices 8508. The first set of control devices may include an outdoor light 8510, an indoor light 8512, and a water heater 8514 that are controlled by way of a first wireless connection 8516. As shown in FIG. 85, the central controller 8502 is directly in communication with devices of the first set of devices using a short range communication protocol. That is, there is no intervening control element, such as a base station or wireless hub, that receives control signals from the central controller and provides control signals to the control devices. By way of example, a first set of devices could communicate with central controller by way of a Bluetooth connection, where the devices could be implemented in a Bluetooth mesh network, or a near field communication (NFC) link. The short range communication protocol may be accessible at a distance of approximately 100 feet for example. The devices of a first set could be implemented in different locations, and could include for example an indoor device, an outdoor device, a device controlling a specific device, such as a water heater or an under-cabinet lighting fixture. The first set of control devices could be associated devices that a user does not wish to access remotely, or a device about which the user may have security concerns and may not want to have controlled by a lower security protocol, such as an IEEE 802.11 communication protocol, also known as WiFi. The first communication protocol may therefore be a local communication protocol, and more particularly a direct local communication protocol.

The second set 8506 of control devices may be controlled by way of a second connection, which may be for example a network. The second set of devices 8606 could include devices that are controlled by the controller using a local area network, including a base station or wireless hub that communicates with a plurality of devices. By way of example, the local area network (LAN) could be a WiFi network including a WiFi base 8518 enabling communication links 8520 and 8521. The local area network could also be accessible by a wide area network such as a cellular network to enable remote access to devices. The WiFi network could be any network implementing any IEEE 802.11 standard for example. The second set of appliances controlled by the devices could include the types of devices that a user may desire to access from a remote location, such as an indoor light 8522, a curling iron 8524, a coffee machine 8526, a particular lamp, or a wireless-controlled door lock 8528. That is, these devices may be devices that a user may wish to check to make sure that they have been turned off, or the types of devices that a user may wish to turn on while they are away.

The third set of devices 8508 could be controlled by another wireless base 8530 enabling communication links 8532 and 8534 to control other specialty devices such as pool controls or specialty lighting. According to the example of FIG. 85, an outdoor light 8536, and indoor light 8538, and a pool heater 8340 could be controlled by the wireless base 8530. The wireless base 8330 could be a Z-Wave or a ZigBee controller for example. Therefore, a short range communication link or a WiFi connection of system 8500 could be integrated with an existing system employed by the user, such as a Z-Wave or ZigBee system for example.

One beneficial aspect of the system is that a single controller can control a plurality of devices using a plurality of different connections implementing different wireless communication protocols and having different capabilities. The controller can also access a server 8342 by way of one of the elements of the system, such as the WiFi base 8318. The server may receive information from or provide information to the server 8342. For example, the server may receive information from the central controller related to the state or operation of various devices on the system 5600, or may provide information or data enabling the operation of the devices on the system 8300. For example, the information can be related to analysis of the devices implemented on the system, or could be information of interest to a user, such as news or weather, which could be displayed on a device of the system. By implementing a variety of different communication protocols, it is possible to implement the different devices with the most suitable communication protocol from a single controller. For example, while a WiFi enables remote access, it may also be more susceptible to hacking or other security issues. However, a Bluetooth or NFC connection, because of its short-range nature, may have fewer hacking or security issues, but is generally not remotely accessible. While different types of devices are described, the system of FIG. 85 could be implemented a gas meter, a sprinkler, a fire alarm, a thermostat, a street light, fitness equipment, a hot water tank, a heater, or a boiler with any type of device for home security, home automation, or internet-of-things (loT) device). The system could also include devices that are incorporated in or improve networks, such as wireless communication networks. For example, the devices could include a network extender (e.g. provide greater range for the network) or be a node for a mesh network, such as a WiFi network or Bluetooth network.

According to some implementations, authentication could be achieved by a shared secret key authentication, where both the power adapter and the control attachment have a shared key that is used to exchange information to authenticate the power adapter. In cryptography, a shared secret key is a piece of data such as a random number, known only to the parties involved, in a secure communication. The shared secret key would be pre-shared (i.e. stored in a memory of both the power adapter and the control attachment. The shared secret can be fed to a key derivation function to produce one or more keys to use for encryption of messages. To make unique communication link between the power adapter and the control attachment and unique message keys, the shared secret key may be combined with the unique ID. While shared secret key is provided as one example of an authentication technique for authorizing a control module to operate with a power adapter, it should be understood that any type of authentication could be used.

Control attachments may be multifunctional, and where one function may be used for the benefit of another function. For example, a control attachment having wireless capability may have be used to provide information to a user associated with another function of the control attachment. For example, a control attachment having a WiFi wireless control circuit may send a level of an expendable material used in the module, such as a fragrance in a refillable module or a replaceable module (an empty module having a fragrance can be removed from the control attachment and replaced with a new module having the fragrance) that may be used to provide a scent to a room to a user of the control module.

Figure 86:
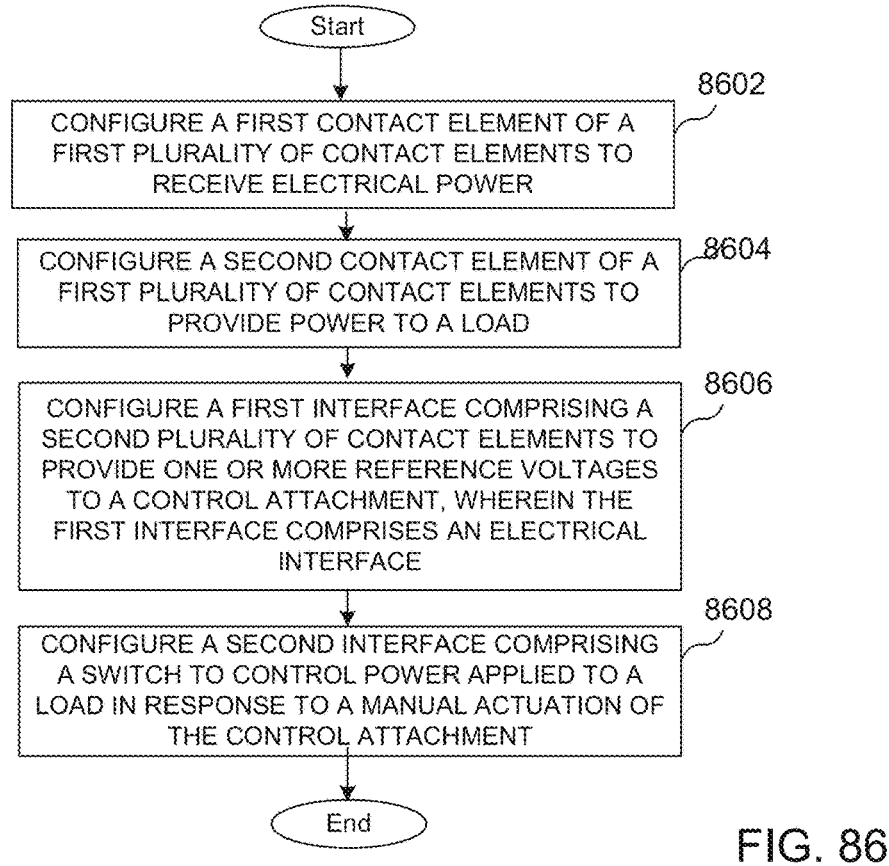
FIG. 86 is directed to a method of controlling a power adapter to provide power a load.

Turning now to FIG. 86, a method of controlling a power adapter to provide power a load is described. The method of FIG. 86 as well as the method of FIG. 87 described below may be implemented using any of the systems or circuits as described above. It should be understood that additional elements could be implemented in the method based upon the systems and methods as described above.

More particularly, a first contact element of a first plurality of contact elements is configured to receive electrical power at a block 8602. A second contact element of a first plurality of contact elements is configured to provide power to a load at a block 8604. A first interface comprising a second plurality of contact elements is configured to provide one or more reference voltages to a control attachment, wherein the first interface comprises an electrical interface at a block 8606. A second interface comprising a switch is configured to control power applied to a load in response to a manual actuation of the control attachment at a block 8608.

Figure 87:
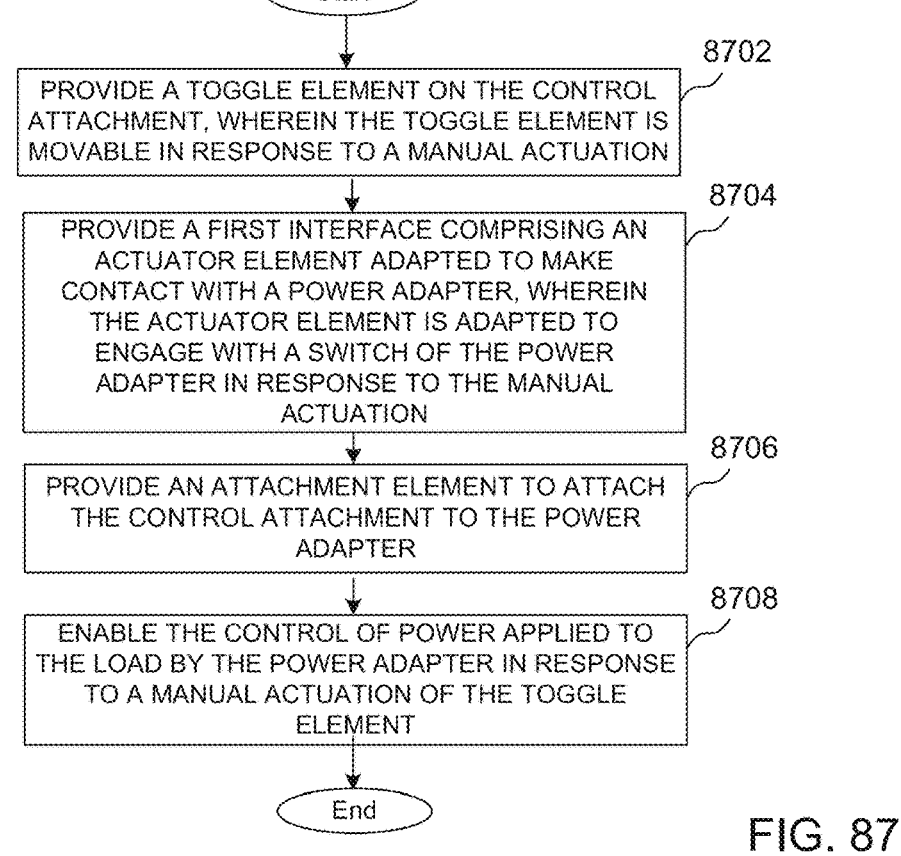
FIG. 87 is directed to a method of controlling the application of power to a load using a control attachment.

Turning now to FIG. 87, a method of controlling the application of power to a load using a control attachment is described. More particularly, a toggle element is provided on the control attachment, wherein the toggle element is movable in response to a manual actuation at a block 8702. A first interface comprising an actuator element adapted to make contact with a power adapter is provided, wherein the actuator element is adapted to engage with a switch of the power adapter in response to the manual actuation at a block 8704. An attachment element is provided to attach the control attachment to the power adapter at a block 8706. The control of power applied to the load by the power adapter is enabled in response to a manual actuation of the toggle element at a block 8708. While the elements of FIG. 86, which is directed to a method of controlling a power adapter, and FIG. 87, which is is directed to controlling the application of power to a load, are shown separately, it should be understood the elements of the figures could be implemented together to implement a power adapter arrangement as described above.

Power is distributed in an electrical system of a building through different branches of the electrical system. More particularly, a load center receives power for a building and enables the distribution of power to groups of loads. Typically, each load of the groups of loads may comprise multiple outlets and switches. For example, one group of loads may comprise all of the outlets and switches associated with a kitchen, and a second group of loads may comprise all of the outlets and switches associated with a family room. Outlets and switches are wired in the electrical system at a location that is associated with a group of loads. For power adapters comprising outlets (e.g. typically having 2 outlets adapted to receive corresponding plugs), the loads comprise the devices that are plugged into the outlet. Power adapters comprising switches may control one or more devices receiving power by way of the power adapter. For example, a load controlled by a power adapter comprising a switch may comprise a light in the kitchen. In some instances, the power adapter comprising a switch may control multiple devices, such as multiple lights in kitchen. Power adapters comprising switches may also control outlets, such as two switched outlets in a living room for example.

One primary function of a load center is to distribute power to different groups of loads, and provide over-current protection (which may indicate a short circuit or some other electrical anomaly) for the different groups of loads. One conventional way of providing over-current protection is the use of a fuse for each group of loads. By way of example, a load center may distribute power to 20 groups of loads, where 20 fuses may be used to provide over-current protection to the corresponding 20 groups of loads. Over-current protection is beneficial to prevent personal injury to an individual using an outlet or switch (e.g. shock or electrocution) or a fire in the event of too much current flowing to the load. While fuses need to be replaced in the event that too much current causes the fuse to blow, circuit breakers are more commonly used because they do not need to be replaced, and can be reset in the event that the circuit breaker is tripped.

However, there is cost associated with either fuses or circuit breakers to provide over-current protection, and providing a fuse or circuit breaker for each power adapter (e.g. a power adapter comprising an outlet or a power adapter comprising switch). Providing over-voltage protection for each power adapter in a building would be cost prohibitive. Load centers provide a benefit of grouping loads for reducing the number of over-current protection devices in a building, such as 20 circuit breakers rather than providing over-current protection for each of a larger number of switches or outlets in an average residence, which may be more than 100 outlets and switches for example. Load centers also provide convenience to switch off power to a section of a residence having power adapters associated with multiple loads. For example, if a homeowner is replacing a switch in the kitchen, it is possible to turn off power to all of the power adapters in the kitchen to safely replace one of the power adapters (i.e. without having to turn off power to the entire residence, such as by way of main switch which may be provided in the load center for controlling the application of power to each of the circuit breakers and therefore all of the power adapters receiving power in the residence).

While load centers provide a benefit of reducing cost for over-current protection and disabling power to a group of power adapters for convenience, where circuit breakers are located in the load center and are not used for controlling to power to a single load, power adapters are distributed beyond the load center to provide switching capability to one or more loads. As power adapters continue to advance, it is beneficial to provide flexibility in power adapters without increasing the cost in a way that would make it cost prohibitive to install the more advanced power adapters. Different power switching devices, such as relays or TRI-ACs may have different advantages and disadvantages related to cost, size and switching characteristics. Power adapters may also provide flexibility in the application of power applied to a load and may be used to provide power to other elements that are dependent upon the location of the power adapter, such as sensor capability for use in a security system or a smart home for example. Providing flexibility in power adapters for implementing different power switching devices is beneficial, as will be described in more detail below.

Figure 88:
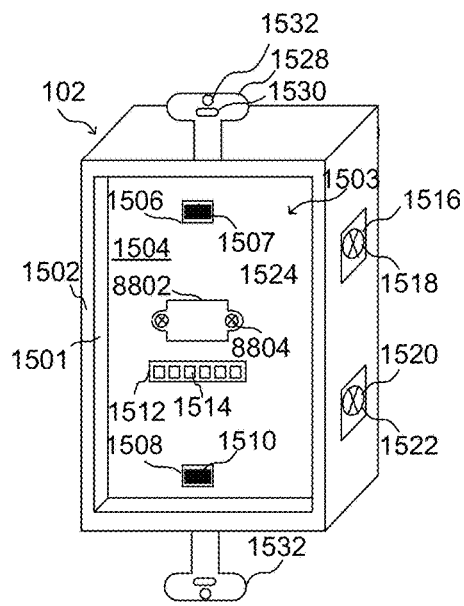
FIG. 88 is a block diagram of a power adapter having a removable power switching module.
Figure 89:
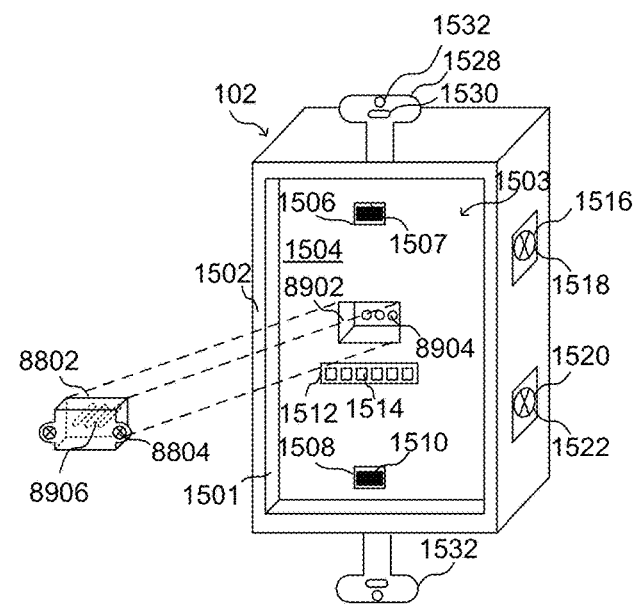
FIG. 89 is a block diagram showing the removable power switching module removed from the power adapter.

FIGS. 88 and 89 show an implementation of a power adapter having a removable power switching module to enable a user of the power adapter to select a power switching functionality of the switching module. As described above, there are different types of power switching, including conventional on/off power switching and power switching with dimming control. However, there are different costs associated with the different functionality. For example, as described above, conventional on/off power switching may be achieved by a relay, which may be less expensive than a power adapter having dimming functionality, which may require a more expensive device such as a TRIAC. Because a builder or homeowner may not be certain where it may be necessary to have dimming functionality, it may be costly to install power adapters that have dimming capability and that are adapted to receive control attachments everywhere in a new construction. However, it is also costly and time consuming for a homeowner to later change a power adapter that does not have dimming capability to a power adapter that has dimming capability. That is, not only would the homeowner have to incur the cost of a complete power adapter, but the homeowner may also have to incur the cost of hiring an electrician or expend the time to replace the power adapter. According to the implementation of FIGS. 88 and 89, the homeowner may be required to only replace the power switching module, thereby reducing both hardware cost and installation time and/or expense.

While a user should turn off the power to the power switching module as described in reference to FIGS. 88 and 89 when replacing the power switching module, additional protective measures can be provided to increase the safety of implementing a power adapter having the power switching module. The contact elements of the power adapter can be implemented as tamper resistant contact elements to prevent a user from inadvertently making contact with a high voltage contact of the power adapter if the user failed to turn off the power to the power switching module. For example, a shutter mechanism may be implemented with the contact elements to block access to the contact elements unless a power switching module is inserted. Further, the removable power switching module can be implemented as a child proof module, such as by requiring that the module be screwed in to the power adapter. Such a power switching module being screwed in would not only prevent a child from making contact with a high voltage contact, but also prevent an adult from inadvertently making contact with a high voltage contact. That is, the power switching module that is screwed into the power adapter could only be removed by taking an active step of removing the screws, but not by an inadvertent bumping or other contact with the power switching module.

Turning first to FIG. 88, a block diagram of a power adapter having a removable power switching module is shown. The implementation of FIG. 88 may be based upon the power adapter of FIG. 15 for example. The power adapter of FIG. 88 is configured to receive a control attachment as described above (e.g. a control attachment as described in FIG. 17-21 or 24-34) and provide a power switching function. A removable power switching module 8802 is attached to the power adapter 102 by attachment elements 8804, shown here by way of example as a flange adapted to receive a screw. However, it should be understood that any type of attachment element could be employed, including attachment elements that enable the power switching module to be easily attached or detached (as described above in reference to attaching a control attachment to a power adapter) of different types of attachment elements that provide safety to a user (i.e. prevent an inadvertent removal of the power switching module)

As shown in FIG. 89, the removable power switching module 8802 may be removed from the power adapter, where a recess 8902 having contact elements 8904 is exposed. Contact elements 8906 of the removable power switching module (shown in dashed lines as extending from the rear of the removable power switching module) are configured to be inserted into and make electrical connections with the contact elements 8904 in the recess of the power adapter. The power switching module 8802 is configured to provide a current path for power to be applied to a load, and may be controlled in response to a signal provided to the power switching module, such as from a control attachment by way of a contact element 1514 of the electrical interface 1512.

Any number of contact elements 8906 could be implemented, and may depend upon the functionality of the power switching module. However, the number of contact elements 8904 should be at least as large as the number of corresponding contact elements of any power switching module 8802 that may be used. That is, it is possible that different power switching modules 8802 may have different numbers of contact elements based upon the functionality, but the number of contact elements 8906 should be as least as great as the number of contact elements 8906 of any power switching module. The contact elements 8906 should include as many contact elements as necessary to implement the features of power switching module. For example, more contact elements may be required for a power switching module having dimming functionality than a power switching module that only provides on/off capability. According to one implementation, the power switching module could be a simple power switch, such as a relay, where one of the contact elements 8906 is coupled to receive power and another contact element of the contact elements 8906 is coupled to the load. That is, two contact elements could be used for implementing the current path for enabling power to be applied to the load, where the power may be applied to the load based upon the state of the relay. The state of the relay (e.g. opened or closed) could be controlled by a third contact. For example, the relay may be switched in response to a signal provided to a third contact element of the contact elements 8906 comprising a control terminal (i.e. a signal applied to the control terminal can be used to close the relay to apply power to the load or open the relay to cut off the power applied to the load).

According to another implementation, the power switching module could comprise a TRIAC or some other device enabling a dimming operation, where one or more contact elements power switching module can be used for switching on or off power and controlling dimming. For example, the dimmer control circuit 310 as shown in a FIG. 6 could be implemented in a power switching module 8802. According to the dimmer control circuit 310, four contact elements may be necessary. In addition to the two contact elements used to provide a current path enabling power to be applied to a load, two additional contact elements may be used for both controlling the switching of power (i.e. on and off functionality) and for providing dimming control. That is, a third contact element can be used for controlling the switch 606 of FIG. 6 to control on and off functionality and a fourth contact can be used for controlling the resistance value of the resistor 612 to provide dimming control.

As can be seen, the power adapter of FIGS. 88 and 89 enables a single power adapter to be installed and easily converted from a lower-cost power adapter (e.g. having a relay) to a higher-cost power adapter (e.g. having a TRIAC). Such a conversion can be achieved without the need for an electrician and with reduced time and expense. That is, a user can simply turn off the power and safely replace the power switching module, without having to buy a complete power adapter and without having to attach the power adapter to wires of an electrical system. The user can also replace the control attachment to include dimming features. That is, while the user would not be able to use dimming features with a power adapter only having a relay for example, the user would be able to use a larger variety of control attachments (e.g. control attachments having dimming capability) by replacing a power switching module with a power switching module having dimming capability. While contact elements of the power adapter are on a surface of a recess for receiving a control attachment, it should be understood that the power adapter may be implemented with a surface that is not in a recess and flush with the control attachment when the control attachment is attached to the power adapter.

Figure 90:
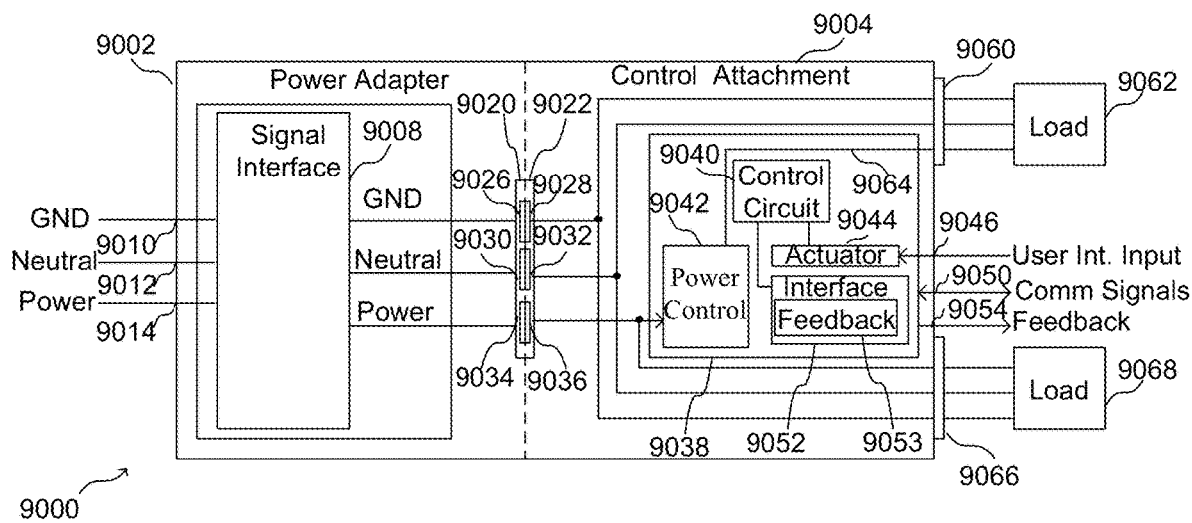
FIG. 90 is a block diagram a power adapter arrangement having a power adapter and a control attachment comprising one or more outlets.

Turning now to FIG. 90, a block diagram of a power adapter arrangement having a power adapter and a control attachment comprising one or more outlets is shown. More particularly, the power adapter arrangement 9000 comprises a power adapter 9002 and a control attachment 9004. The power adapter 9002 comprises a signal interface 9008 adapted to receive a ground signal at an input 9010, a neutral signal at an input 9012 and a power input at an input 9014. The ground, neutral and power inputs are configured to provide current paths as described above to provide power to a load attached to an outlet of the control attachment. Outputs of the signal interface (which may filter signals for example) are provided to an electrical interface 9020.

The electrical interface 9020 is adapted to be coupled to a corresponding electrical interface 9022. More particularly, a contact element 9026 is coupled to a corresponding contact element 9028, a contact element 9030 is coupled to a corresponding contact element 9032, and a contact element 9034 is coupled to a corresponding contact element 9036. While specific contact elements are shown, it should be understood that other contact elements could be provided, including contact elements for transmitting low power signals between the power adapter and the control attachment.

The control attachment 9004 comprises an interface circuit 9038 having a control circuit 9040 that is configured to control a power control circuit 9042. The interface circuit 9038 comprises elements for enabling a user to interact with the control attachment, directly or indirectly. For example, an actuator 9044 may be coupled to receive a user interface input at an input 9046. The actuator 9044 could be any type of user interface actuator, such as a button or some other movable element for example. The control attachment may also comprise an interface circuit 9052 configured to receive communication signals by way of an input 9050. The communication signals may be wireless communication signals received, directly or indirectly, from a remote device. According to some implementations, the remote device could be a dedicated remote device, such as a radio frequency (RF) device that is provided to communicate with the control attachment. According to other implementations, the remote device could be a computer device. For example, the computer device could be a portable device, such as a smart phone, tablet or some other portable computer. The remote device could also be a fixed computer, such as a control terminal attached to a wall and may be associated with a security system for example. The interface circuit 9052 may be configured to transmit and receive communication signals according to any communication protocol as described above, including any wireless communication protocol. The interface circuit 9052 may also comprise a feedback circuit 9053 configured to send a feedback signal by way of an output 9054. The feedback signal may be any type of audio, visual, or tactile feedback signal that may provide information to a user related to the state or operation of the power adapter arrangement, including for example an on/off state of power applied to a load or any state or operation of the control attachment.

As can be seen in FIG. 90, the power control circuit 9042 receives the power signal, which is a high voltage power signal as described above, and selectively provides the power signal to the load 9062 in response to a control signal from the control circuit 9040. The power control circuit may be implemented as a power control circuit as described above in reference to FIGS. 1-5, and may include a relay that enables on and off functionality (i.e. applying power to or cutting off power to the load) or a dimming control circuit that not only enables on and off functionality, but also enables dimming functionality. The control signal (generated by the control circuit 9040 and provided to the power control circuit 9042) may be based upon an input provided to the actuator 9044 or the interface 9052. For example, power may be applied to the outlet 9060 in response to a user input to the actuator 9044 or communication signals provided to the interface circuit 9052 to control the application of power to a load. As can be seen in FIG. 90, power, neutral and ground signal are provided to the outlet 9066, and therefore outlet 9066 is always on (i.e. always receiving power). In contrast, outlet 9060 is configured as a switched outlet (i.e. an outlet that may be controlled to selectively apply power to the outlet). While the application of power to one of the outlets (i.e. outlet 9060) is controlled, it should be understood the control attachment could be configured so that both outlets (i.e. outlet 9060 and outlet 9066) are controlled outlets, where they may be controlled together (i.e. both are responsive to a single signal) or controlled separately.

Figure 91:
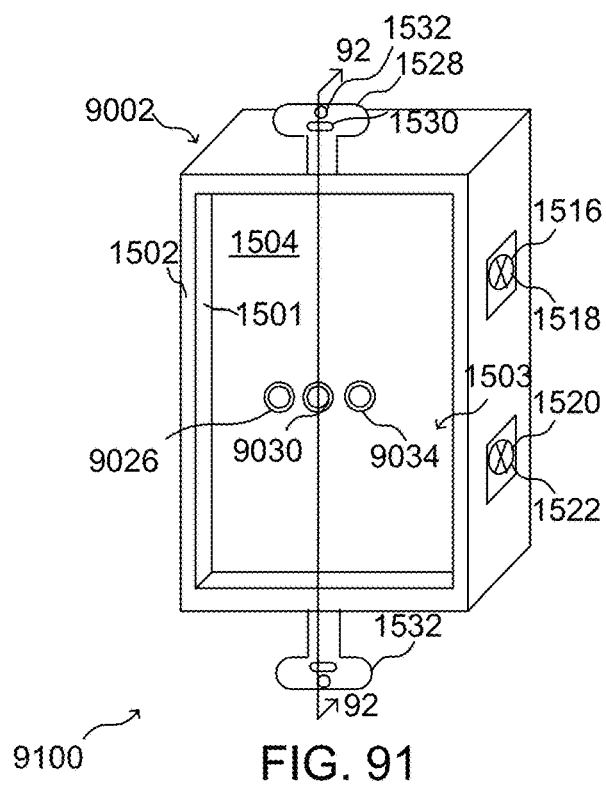
FIG. 91 is a front and side view of the power adapter of FIG. 89.

Turning now to FIG. 91, a front and side view of the power adapter that may be implemented according to the power adapter arrangement of FIG. 90 is shown. The power adapter 9100 comprises a plurality of contact elements (e.g. contact elements 1516 and 1520) configured to receive power signals (e.g. high voltage power signals and ground or neutral signals) as described above, and transmit the power signals between the power adapter and the control attachment. That is, rather than implementing power switching functions in the power adapter, the power signal received by the power adapter is provided to the control attachment by contact elements on the power adapter, where the switching of power that is applied to a load by way of an outlet of the control attachment is controlled by elements of the control attachment, such as described above in reference to FIG. 90. The three contact elements 9026, 9030 and 9034 of FIG. 90 are shown as female receptacles adapted to receive corresponding male contact elements of the control attachments, such as prongs as described in FIG. 93. While an example using a male and female contacts is described by way of example, it should be understood that any type of contact element arrangements could be employed.

Figure 92:
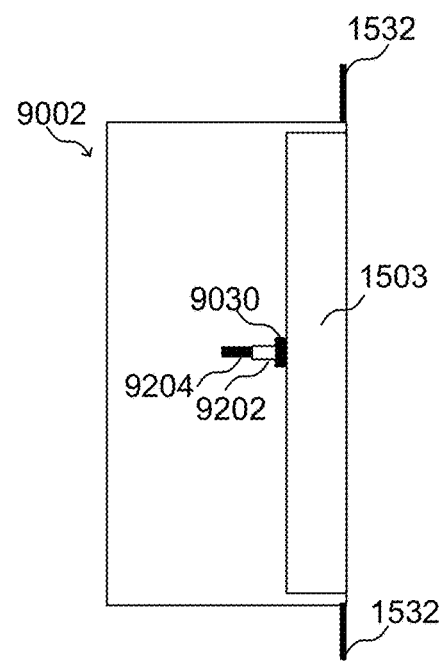
FIG. 92 is a side view of the power adapter of FIG. 88.
Figure 93:
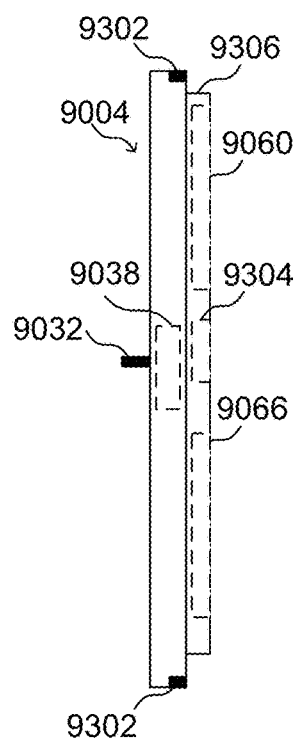
FIG. 93 is a side view of the control attachment of FIG. 88.

Turning now to FIG. 92, a side view of the power adapter 9100 is shown. As shown in FIG. 92, the contact element 9030 comprises a receptacle 9202 for receiving the corresponding contact element 9032, as shown for example as a prong in FIG. 93. When the control attachment of FIG. 93 is attached to the power adapter of FIG. 91, the contact element 9032 extends into the receptacle 9202 of the contact element 9030 and makes an electrical contact to the corresponding contact 9030 of the power adapter to enable the transfer of an electrical signal between the power adapter and the control attachment. A signal line 9204 enables the transfer of signals to between the power adapter and the control attachment. As shown in FIG. 93, attachment elements 9302 are provided to enable attaching the control attachment to the power adapter. The attachment elements could be any type of attachment element as described above. Further, the control attachment could be implemented so that it can be inserted into or removed from the power adapter through the opening of the wall plate while the wall plate is attached to the power adapter. For example, the attachment elements could be exposed through the opening of a wall plate to enable the attachment element to be inserted into or removed from the power adapter through the opening of the wall plate, such as described above in reference to FIG. 17 for example. Alternatively, the attachment elements could be behind the wall plate so that the wall plate must be removed for the control attachment to be inserted into or removed from the power adapter, as described above in reference to FIG. 18 for example.

Figure 94:
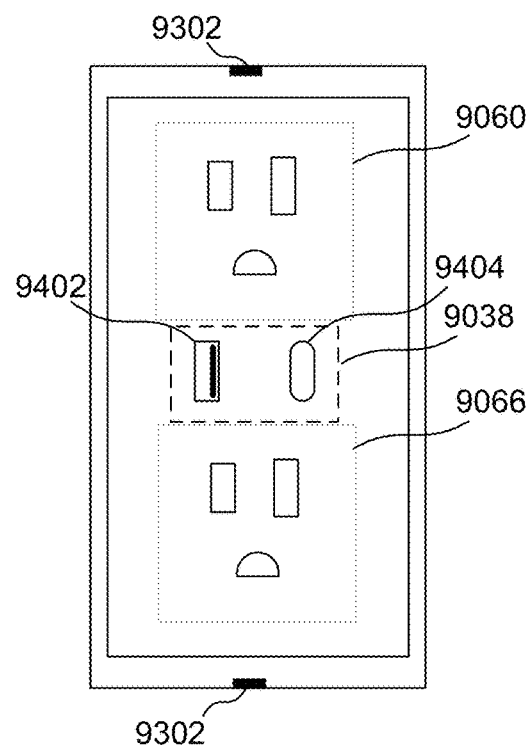
FIG. 94 is a front view of the control attachment of FIG. 88.
Figure 95:
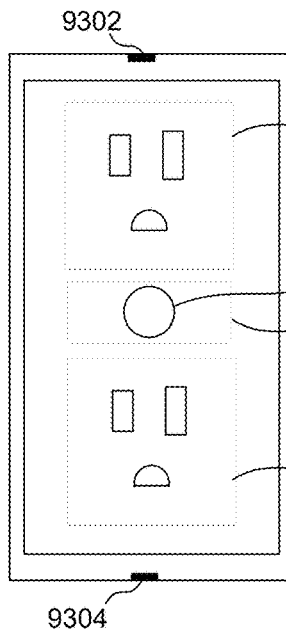
FIG. 95 is a front view of the control attachment of FIG. 88 according to another implementation.
Figure 96:
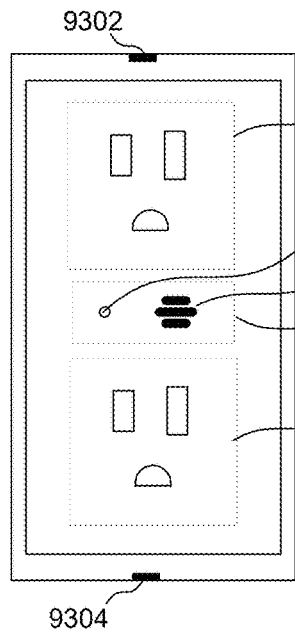
FIG. 96 is a front view of the control attachment of FIG. 88 according to another implementation.

Further, user interface elements 9304 may also be provided, and may include any element for implementing interface circuit 9038. The interface elements may include elements enabling direct interaction (e.g. a button, a switch, a connector) or indirect interaction (e.g. a speaker microphone). For example, connectors 9402 and 9404, shown here by way of example as USB and USB Type C contact elements, enable a user to receive power or transmit communication signals to a device attached to the connector. While connectors are shown by way of example in FIG. 94, it should be understood that any type of user interface elements could be implemented as described above, such as described in reference to FIGS. 51-64, either for receiving a user input at the control attachment or providing information to a user. For example, as shown in the implementation of FIG. 95, the interface circuit 9038 is shown in dashed lines in FIG. 93 as being internal to the control attachment, but may have interface elements that are exposed. For example, as shown in FIG. 95, a sensor 9502 may be implemented. The sensor could be any type of sensor as described above, such as a camera or a motion detector. According to the implementation of FIG. 96, the interface circuit may comprise a smart speaker having a microphone 9602 and a speaker 9604.

Figure 97:
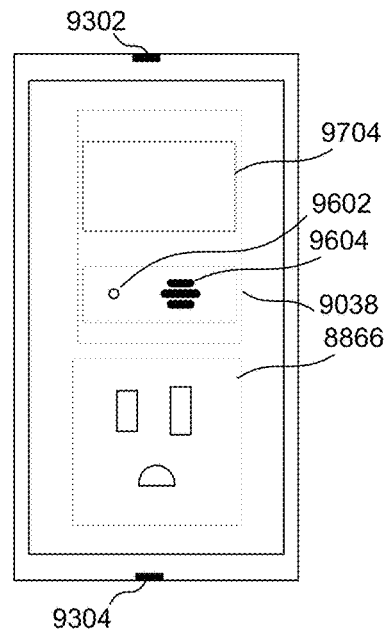
FIG. 97 is a front view of the control attachment of FIG. 88 according to another implementation.

It should be noted that some implementations of the interface circuit 9038 may require more space than is available between 2 outlets 9060 and 9066. Therefore, as shown in the implementation of FIG. 97, a single outlet is implemented, where the remaining space that is exposed though an opening of a wall plate can be used for other interface elements. That is, more space may be needed for a single function, or for providing multiple functions, including any combination of user interface elements as described above. In addition to elements of a smart speaker having a microphone 9602 and a speaker 9604, the interface circuit 9038 may include another user interface element 9704, which may be any type of user interface element, such as a sensor or connector as described above.

Figure 98:
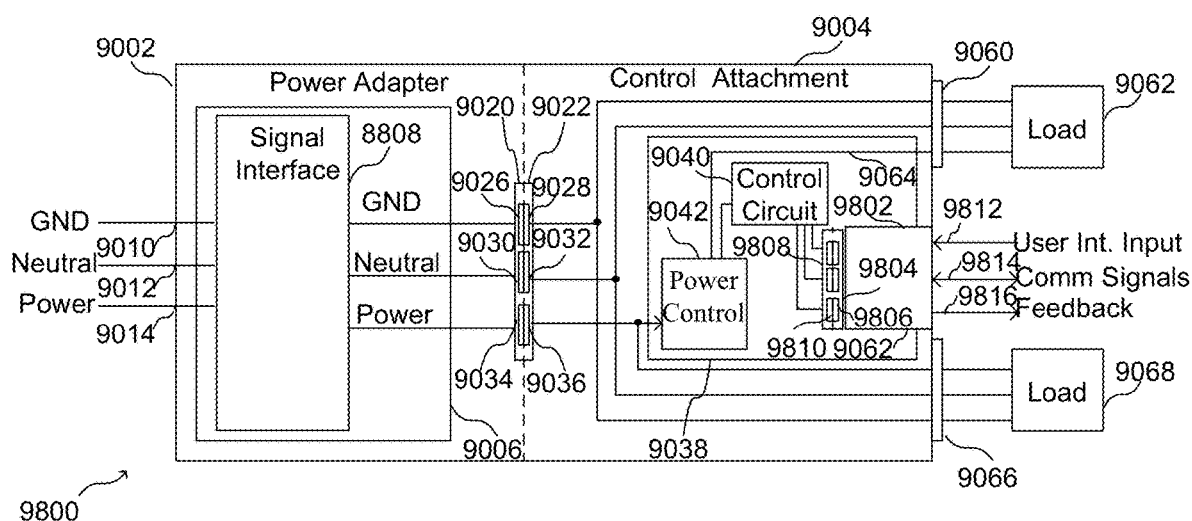
FIG. 98 is a block diagram a power adapter arrangement having a power adapter and a control attachment comprising one or more outlets according to another implementation.

While the control attachment arrangements of FIGS. 93-97 have user interface elements that are integrated into the control attachment, the control attachment may be configured to receive a removable user interface element, which may be a removable module for example. As shown in FIG. 98, a removable module 9802 is coupled to the control circuit 9040, and enables the implementation of user interface elements as described above. The module 9802 may comprise a connector 9804 having contact elements 9806. The control attachment may also comprise a corresponding connector 9808 having contact elements 9810. While a physical connector is shown by way of example, it should be understood that any type of interface for communication signals between the module 9802 and control circuit 9040 could be implemented as described above.

The module 9802 may comprise various user interface inputs, which may be physical user interface inputs or wireless user interface inputs. For example, a user interface input 9812 may be implemented to receive an actuation signal from an actuator accessible by a user. A communication input 9814 may be implemented to transmit and receive communication signals, such as any of the communication signals as described above, while an output 9816 may be implemented to provide feedback to a user, such as audio, visual or tactile feedback. As described below in reference to FIGS. 99 and 100, the control attachment may be implemented with a recess to receive the module 9802. The module 9802 may transmit and receive communication signals using any wireless communication protocol, and control an outlet or provide any user interface function (e.g. a camera, a motion detector, a smart speaker), as described above.

Figure 99:
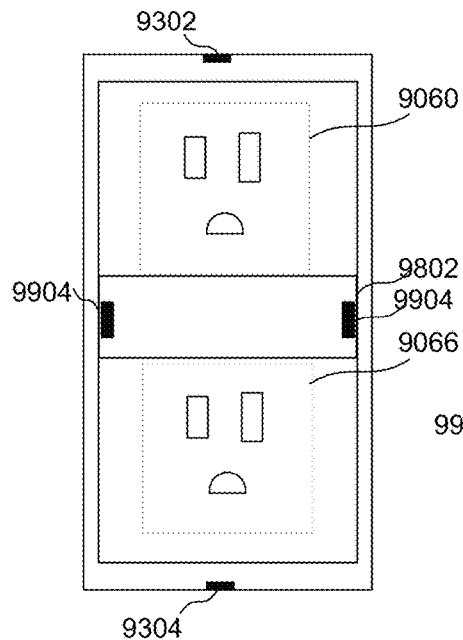
FIG. 99 is front view of the power adapter arrangement of FIG. 96 according to one implementation.
Figure 100:
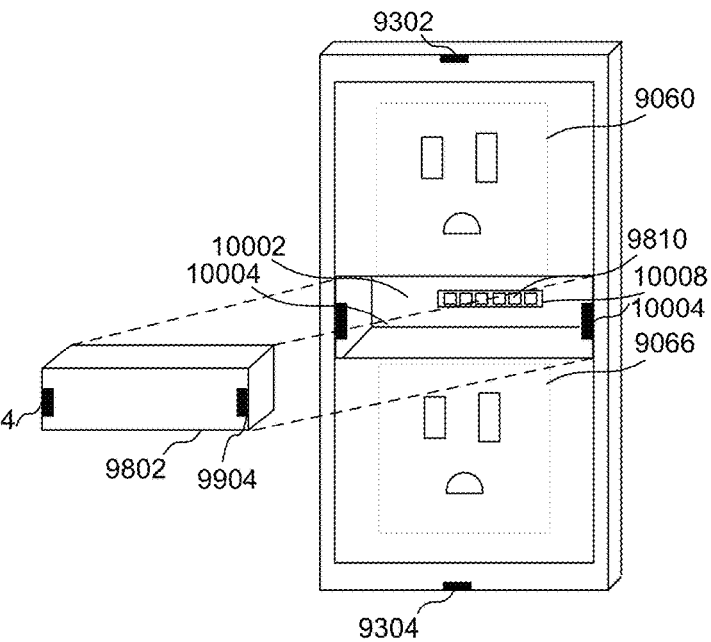
FIG. 100 is a front and side view of the power adapter arrangement of FIG. 97 showing a module removed from a recess of the control attachment.

As shown in FIGS. 99 and 100, module 9802 may be detachably inserted into a recess 10002, and attached to the control attachment by attachment elements 9904 to corresponding attachment elements 10004 as shown. The attachment elements 9904 and 10004 may implemented according to any of the power adapter arrangements as described above. An electrical interface 10008 may comprise contact elements 9810 for example. While the module 9802 is configured to be inserted into a recess, the module 9802 may be attached to an external surface of the control attachment.

According to additional implementations set forth below, a power adapter arrangement can be implemented where outlets or switches are provided as a part of the power adapter, and a control attachment coupled to the power adapter may be used to control the switching of power to a load (either electrically connected to a contact element of the power adapter such as by a wire associated with a device wired in an electrical system of a building (e.g. ceiling light) or a device plugged into the power adapter (e.g. lamp or appliance)), as will be described in more detail below. By placing switching functionality for power applied to the load in the control attachment of a power adapter arrangement, power adapters (implemented to include either an outlet or a switch) can be universally installed at a low cost, allowing a resident or occupant of the building to cheaply and easily install a control attachment that provides switching. That is, because of the cost associated with switching, such as the cost of a relay or a TRIAC for example, it is beneficial to provide basic switching capability (e.g. a manual switch) for a switch or "always on" outlets of a power adapter comprising outlets, where the control attachment providing additional functionality can be cheaply and easily added later.

When a "dummy" control attachment is used in a power adapter providing switching functionality, the power adapter will function as a conventional switch having manual on and off capability. However, when a control attachment having switching capability is attached to the power adapter, the power adapter arrangement may provide additional functionality (e.g. wireless control of power applied to the load or sensor capability for use in a security system or smart home). Similarly, when a dummy control attachment is used in a power adapter having outlets, the outlets will provide power as normally provided in a conventional outlet (i.e. "always on" outlets). However, when a control attachment having switching capability is used in the power adapter having outlets, one or more of the outlets can be implemented as a switched outlet, where the switching capability (e.g. a relay or a TRIAC) for the switched outlet is provided by the control attachment. By configuring the power adapter to receive either a dummy control attachment or a control attachment having switching capability, a low cost switch or low cost outlet can be provided, where the low cost switches or outlets can be universally installed, and easily upgraded without having to replace the entire power adapter. That is, in addition to reducing cost, time and effort of replacing an entire outlet or switch installed in a junction box, additional cost reductions can be achieved by only having to provide additional hardware of a control attachment. The switch and the outlet on the power adapter installed in the junction box will remain, and will not need to be replaced. As will be described in more detail below, the power adapters for switching and power adapters having an outlet can be configured to receive the same control attachments. As will further be described in more detail below, control attachments can be provided with other functionality, which may be in addition to switching functionality, and may include any user interface elements for implementing a smart home or security system.

Figure 101:
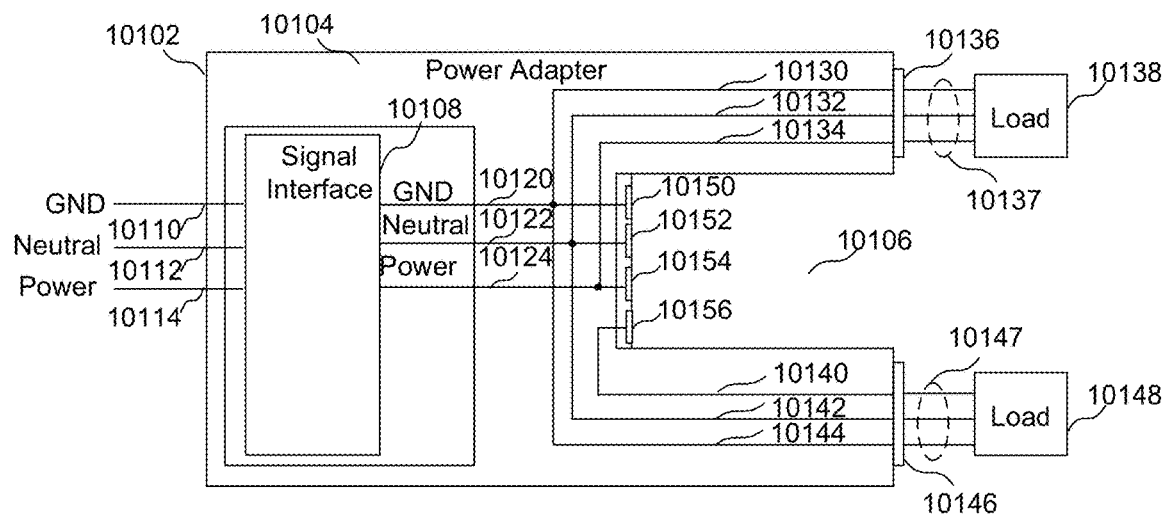
FIG. 101 is a block diagram of a power adapter having outlets and a recess for receiving a control attachment adapted to provide switching for power applied to a load.

Turning first to FIG. 101, a block diagram of a power adapter having outlets and a recess for receiving an insert adapted to provide switching for power applied to a load is shown. The power adapter of FIG. 101 is configured to receive a control attachment, wherein the control attachment routes power received from the power adapter back into the power adapter. That is, the power adapter is configured to receive power from an electrical system (such as by being electrically connected to wires in a wall of a building or plugged into an outlet) and provide power that is routed through a control attachment inserted into a recess of the power adapter back to an outlet of the power adapter. By routing the power that is provided to an outlet through the control attachment, it is possible to provide switching of power (provided to a switched outlet for example) in the control attachment if desired. Unlike conventional outlet devices having no switching capability (where the entire power adapter would need to be replaced to achieve a switched outlet), only the control attachment would need to be added to achieve switching capability by placing the switching capability in the control attachment.

As shown in FIG. 101, a power adapter 10102 comprises a body portion 10103 having a recess 10106 configured to receive a control attachment that may have power switching functionality. The power adapter comprises an electrical interface 10108 (functioning as an interface for routing signals) that is coupled to a plurality of inputs, shown here as a contact element 10110 adapted to be coupled to a ground node of an electrical system, a contact element 10112 adapted to be coupled to a neutral voltage, and a contact element 10114 configured to receive a power signal (which may provide a voltage or a current for driving a load as described above). The signal interface 10108 may be included to provide voltage regulation and signal conditioning to remove noise for example. That is, a ground voltage is generated on a signal line 10120 at an output of the signal interface, a neutral voltage is generated on a signal line 10122 at an output of the signal interface, and a power voltage is generated on a signal line 10124, where current may flow on the signal lines 10122 and 10124 depending upon the control of power applied to a load, and current may flow on the ground signal line 10120 depending on any condition that may require power to flow to ground (such as a for safety in the event of too much current flowing in the circuit).

The ground signal line 10120, the neutral signal line 10122, and the power signal line 10124 are coupled to corresponding signal lines 10130, 10132, and 10134 that provide current paths to an outlet 10136, which is adapted to receive contact elements 10137 (e.g. electrical prongs of a plug adapted to be inserted into the outlet) associated with a load 10138. Similarly, the ground signal line 10120 and the neutral signal line 10122 are coupled to corresponding signal lines 10142 and 10144 that provide current paths to an outlet 10146 that is adapted to receive contact elements 10147 (e.g. electrical prongs of a plug) associated with a load 10148.

Figure 102:
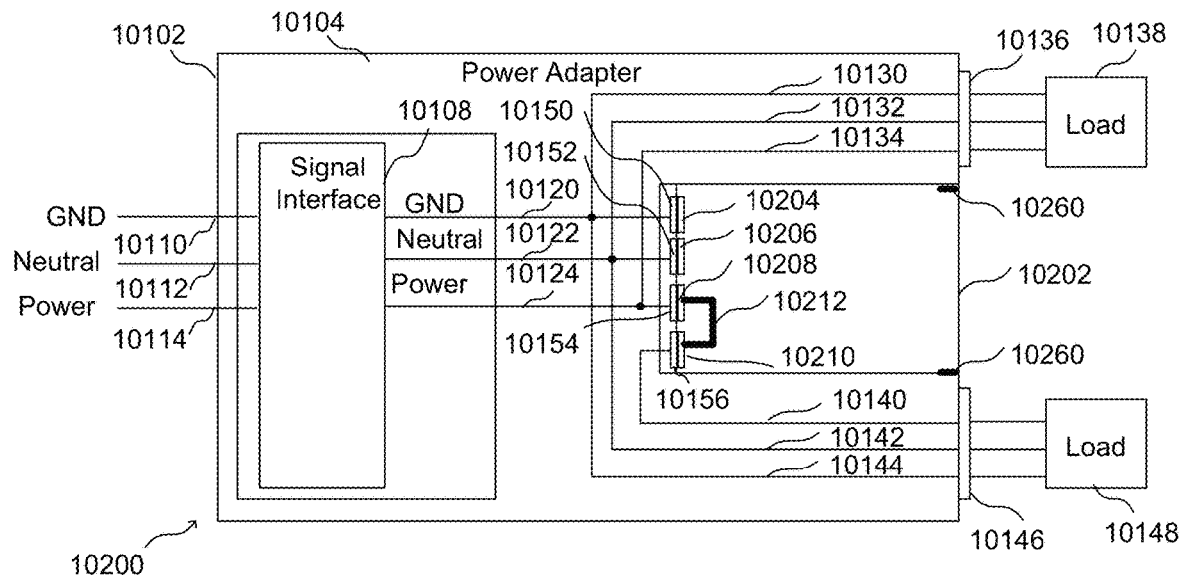
FIG. 102 is a block diagram of a power adapter arrangement having a power adapter arrangement of FIG. 101 and a control attachment having a connector arrangement for routing power received from the power adapter back to the power adapter.
Figure 103:
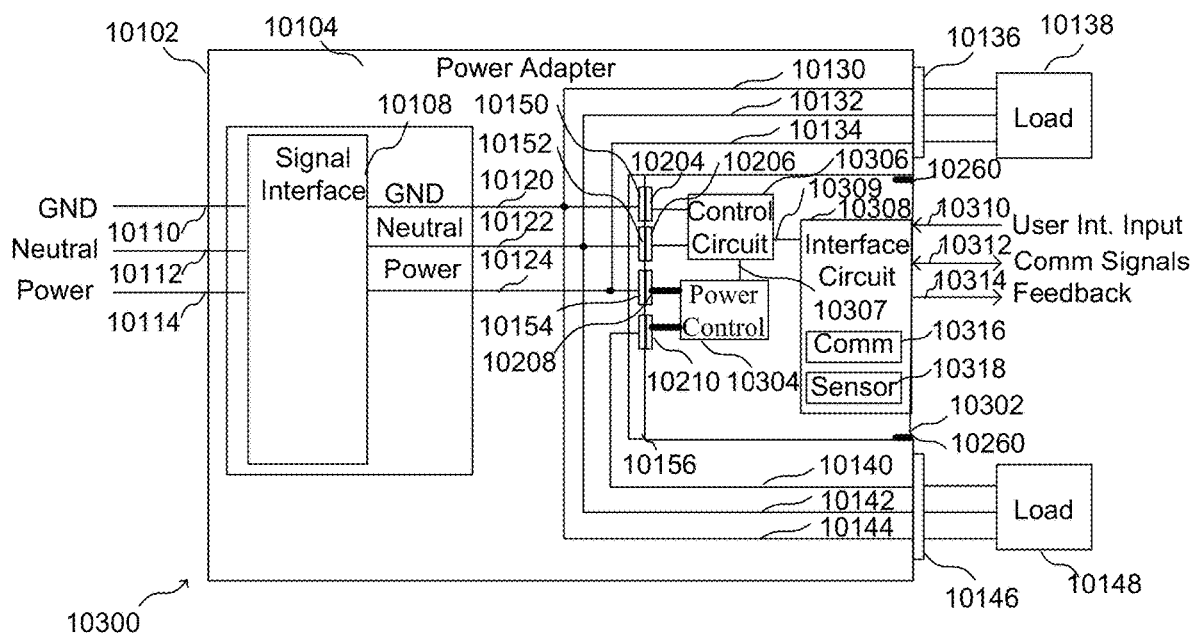
FIG. 103 is a block diagram of a power adapter arrangement having a power adapter arrangement of FIG. 101 and a control attachment having a control circuit for routing power received from the power adapter back to the power adapter.

The ground signal line 10120, the neutral signal line 10122, and the power signal line 10124 are also coupled to corresponding contact elements 10150, 10152 and 10154 to provide voltages and enable current paths for allowing power to be applied to a load and for providing current paths for safe operation. Unlike the configuration of signal lines provided to the output 10136 that provides power to the load 10138 (where all of the signal lines 10120, 10122, and 10124 are connected to corresponding signal lines 10130, 10132 and 10134, and the outlet 10136 comprises a non-switched outlet, also known as an "always on" outlet), only the neutral signal line 10142 and the ground signal line 10144 are electrically connected to the corresponding neutral signal line 10122 and ground signal line 10120. A power signal on the power signal line 10124 is routed through a control attachment by way of the contact element 10154 and a contact element 10156, as will be described in more detail below, such as by the control attachments as shown in FIGS. 102 and 103. That is, rather than implementing the outlet 10146 as an unswitched outlet, power provided to the outlet 10146 is routed through a control attachment by way of the contact elements 10154 and 10156. As can be seen in FIG. 101, the switching of power is not performed in the power adapter, but rather in a control attachment inserted into the power adapter. By placing any circuits for switching power in the control attachment, a low-cost power adapter having outlets (which may be implemented as a conventional outlet having "always on" outlets for example) may be implemented. As will be described in more detail below, a simple, low-cost control attachment may be implemented to configure and operate the outlet 10146 as a non-switched outlet, while other control attachments can be implemented to configure and operate the outlet 10146 as a switched outlet.

As shown in the implementation of FIG. 102, a control attachment may comprise a connector arrangement for routing power received from the power adapter back to the power adapter as shown. The control attachment 10202, which may be considered a dummy control attachment, comprises contact elements 10204, 10206, 10208, 10210 that are adapted to be coupled to the corresponding contact elements 10150, 10152, 10154 and 10156. As shown, a signal line 10212 can be provided between the contact element 10208 and 10210 to enable routing a power signal from the contact element 10154 to the contact element 10156, and therefore to the signal line 10140 to provide power to the outlet 10146. According to the configuration of FIG. 102, the outlet 10146 will receive power and operate as an unswitched outlet, where the signal line 10212 operates as a jumper. It should be understood that the contact elements 10204 and 10206 may not be necessary, but may be implemented to provide additional safety or provide mechanical alignment when the control attachment is inserted into the recess of the power adapter.

Implementing a control attachment having a power control circuit that may be used to control the switching of power received by the power adapter and applied to the load enables the outlet 10146 to be implemented as a switched outlet. According to the implementation of FIG. 103, the power adapter 10102 as shown comprises a control attachment having a control circuit for controlling the routing of power received from the power adapter back to the power adapter. More particularly, the power adapter 10302 comprises a power control circuit 10304 that controls the switching of power received from the power adapter, and therefore enables the outlet 10146 to be operated as a switched outlet. The control circuit 10306 is coupled to the power control circuit 10304 by way of a signal line 10307 to control the operation of the power control circuit. The control circuit 10306 could be implemented in a processor as described above, and is configured to process signals received from an interface circuit 10308, such as signals from a wireless communication circuit or a sensor of the interface circuit 10308. According to some implementations, the power control circuit 10304 may comprise a relay having a path of controllable conductivity coupled to the contact elements 10208 and 10210, where a control terminal of the relay (i.e. the terminal controlling the flow of current through the relay) may be controlled by a control signal on the control signal line 10307 to allow power to flow from the power adapter and back to the power adapter through the control adapter 10302.

According to other implementations, a TRIAC circuit such as described in reference to FIG. 6 could be used in the power control circuit. While dimming may be less likely to be used in a power adapter having outlets (as compared to a power adapter having a switch as described below), the TRIAC circuit could be operated to turn on or off power to the outlet, and not necessarily for dimming. That is, the TRIAC circuit may have advantages compared to a relay, such as cost or size advantages. Further, because a TRIAC may be commonly used when a control attachment is used in a switch, it may be beneficial to implement a TRIAC in a control attachment to enable the control attachment to be implemented in both a power adapter having an outlet and a power adapter having a switch, as will be described in more detail below.

The control circuit 10306 may be coupled to one or both of neutral and ground contacts 10150 and 10152 to provide a reference voltage and to provide a discharge path to prevent a shock or other injury to a user as a result of contact with the control attachment. The control circuit 10306 may also be coupled to an interface circuit 10308 by way of a signal line 10309 to enable the communication of signals between the control circuit 10306 and the interface circuit 10308. The interface circuit 10308 may be any type of interface for generating signals that may be used to control the operation of the power adapter arrangement and the application of power to a load. For example, the interface circuit 10308 may receive user interface inputs at an input 10310. That is, a user interface may be provided on the control attachment and exposed through an opening of a wall plate attached to the power adapter arrangement. The control attachment may comprise any types of user interface elements, such as any type of actuator for receiving a manual input from a user, such as an on/off actuator, a dimmer control circuit, or any other actuator, including the user interface elements as described in FIGS. 136-142. The user interface elements may also be a passive user interface element, such as a microphone, a speaker, or a sensor.

The interface circuit 10308 may also comprise an input/output element 10312 for receiving and transmitting communication signals, such as wireless communication signals sent to or from a wireless communication circuit 10316 of the interface circuit that may implement a wireless communication protocol as described above, such as described above in reference to FIG. 37 for example. For example, the interface circuit may receive a schedule or timing pattern for applying power to a load by way of the wireless communication circuit from a remote device, such as a smart phone, as described above. The control circuit may then implement the schedule for applying power to a load based upon the signals received from by the wireless communication circuit and stored in a memory, as described for example in reference to the power adapter and control attachment of FIG. 37. According to some implementations, the timing pattern may be stored in a memory of the control attachment, where various interface elements of the control attachment of FIG. 103 may use elements as described in reference to FIG. 37 for example. The interface circuit 10308 may be coupled to one or more user interface elements, such as actuators or buttons accessible by a user or passive elements such as a microphone. The interface circuit 10308 may also comprise one or more feedback elements 10314 that may provide feedback to a user. The interface circuit may also comprise one or more sensors 10318, including any of the sensors as described above. The sensors may be used for detecting conditions external to the power adapter arrangement, and providing signals to the control circuit 10306 based upon the conditions detected by the sensor. Signals generated by a wireless control circuit or a sensor may be used by the control circuit to generate control signals provided to the power control circuit 10304 to control the application of power to a load. The feedback element could comprise any type of visual (e.g. LEDs or a display), audio (e.g. speaker) or tactile feedback element as described above. It should be understood that the wireless communication circuit 10316 and one or more sensors 10318, including any of the sensors as described above, may be implemented in an interface circuit 10308 of any of the implementations having the interface circuit.

While the signal interfaces to the control circuit are described as signal lines 10307 and 10309, it should be understood that the signal lines 10307 and 10309 may comprises a multi-line bus or any other type of signaling interface. It should be noted that the control attachment could comprise any user interface elements or circuits that could receive or provide information beneficial to the operation of the power adapter arrangement or any device external to the power adapter arrangement, such as a device associated with a home automation system or a home security system.

Figure 104:
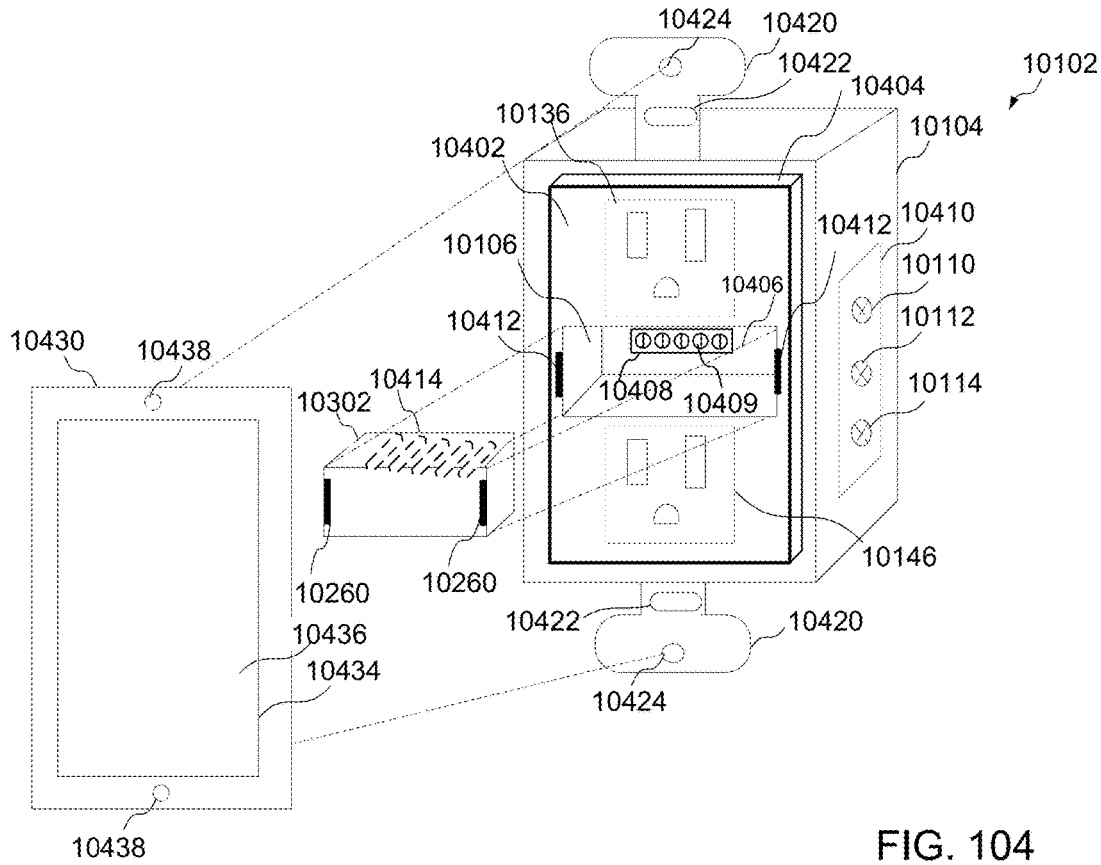
FIG. 104 is a perspective view of a power adapter arrangement comprising a power adapter having an outlet and a control attachment adapted to be received by the outlet.

Turning now to FIG. 104, a perspective view of a power adapter arrangement comprising a power adapter having an outlet and a control attachment adapted to be received by the outlet is shown. More particularly, a power adapter arrangement having a power adapter, a control attachment, and a wall plate is shown in an expanded view. A front surface 10402, which has a wall 10404 to provide a raised front surface that extends through an opening in a wall plate, comprises the recess 10106 extending to a rear surface 10406. An electrical interface 10408, shown here by way of example on the rear surface 10406, comprises a plurality of contact elements 10409, which may have tamper resistant elements (i.e. child protection elements) to prevent inadvertent contact with a high voltage power contact. While electrical interface 10408 is shown by way of example on a rear surface of the recess 10106, it should be understood that the electrical interface 10408, or individual contacts of the electrical interface 10408, could be located on another wall of the recess 10106.

An electrical interface 10410 comprises contact elements 10110-10114 on an outer surface of the power adapter to enable the power adapter to be coupled to wires of a junction box. While the contact elements 10110-10114 are shown on the same outer surface of the power adapter 10102, It should be understood that the contact elements could be distributed among different outer surfaces of the power adapter. Distributing the contact elements provides convenience for installing the power adapter in a junction box (i.e. causing the wires of the junction box to be dispersed in the junction box, making it easier for the power adapter to fit in the junction box). While the contact elements 10110-10114 are shown as screw-type contact elements adapted to receive a wire from the junction box, it should be understood that any type of contact elements could be employed, including wires extending from the power adapter. Further, the contact elements, such as the screw type contact elements as shown, could be recessed on the outer surface as is commonly done, where the contact elements are generally exposed or accessible on an outer surface to secure a wire of the contact element.

As will be described in more detail below, one or more additional electrical interfaces, such as a low power electrical interface, may be provided in the recess 10106, where the additional electrical interface may be provided on the rear surface or any other surface of the recess, or contact elements of the additional electrical interface may be distributed on different surfaces of the recess.

The power adapter 10102 also comprises attachment elements 10412, which may be adapted to engage with corresponding attachment elements 10260 of the control attachment. The attachment elements 10412 and 10260 may be implemented according to any of the attachment elements as described above, including for example as described in reference to FIGS. 47-49, or other suitable attachment elements. The control attachment 10302 as shown in FIG. 104 is adapted to be inserted into the recess 10106, where contact elements 10414 (e.g. male contact elements) are configured to be inserted into corresponding contact elements 10409 (e.g. female contact elements). According to some implementations, the contact elements 10414 comprise prongs that are inserted to corresponding contact elements of the power adapted configured to receive the prongs. That is, as with an outlet configured to receive prongs of a plug, an arrangement of prongs and contact elements receiving the prongs enable the contact elements of the power adapter (which may be high voltage contacts) to be recessed within the power adapter (such as within the recess 10106 for example) and be further protected by insulating elements associated with a tamper resistant element. While the contact elements 10409 may include high voltage contacts, it should be understood that the contact elements 10414 and corresponding contact elements 10409 may be used to route low voltage signals, such as low voltage control signal as will be described in more detail below.

The power adapter 10102 of FIG. 104 also comprises flanges 10420 to enable the power adapter to be attached to a junction box, such as using screws that extend through a recess 10422. The flanges may also comprise threaded portions 10424 for receiving screws to secure a wall plate 10430 to the power adapter. That is, an edge 10434 defines an opening 10436 that is adapted to receive the front surface 10402 and wall portion 10404, where screws can be extended through holes 10438 to the threaded portion 10424 to secure the wall plate to the power adapter. It should be understood that the control attachment and power adapter could be configured so that the control attachment can be inserted and removed when the wall plate is attached to the power adapter, as described above in reference to FIG. 18 for example, or so that the control attachment can only be inserted and removed when the wall plate is not attached to the power adapter, as described above in reference to FIG. 17 for example. According to some implementations, the power adapter can be configured to receive different types of control attachments, include control attachments that can be inserted/removed when the wall plate is attached, or inserted/removed only when the wall plate is not attached, as described above in reference to FIGS. 48 and 49.

Figures 105, 106:
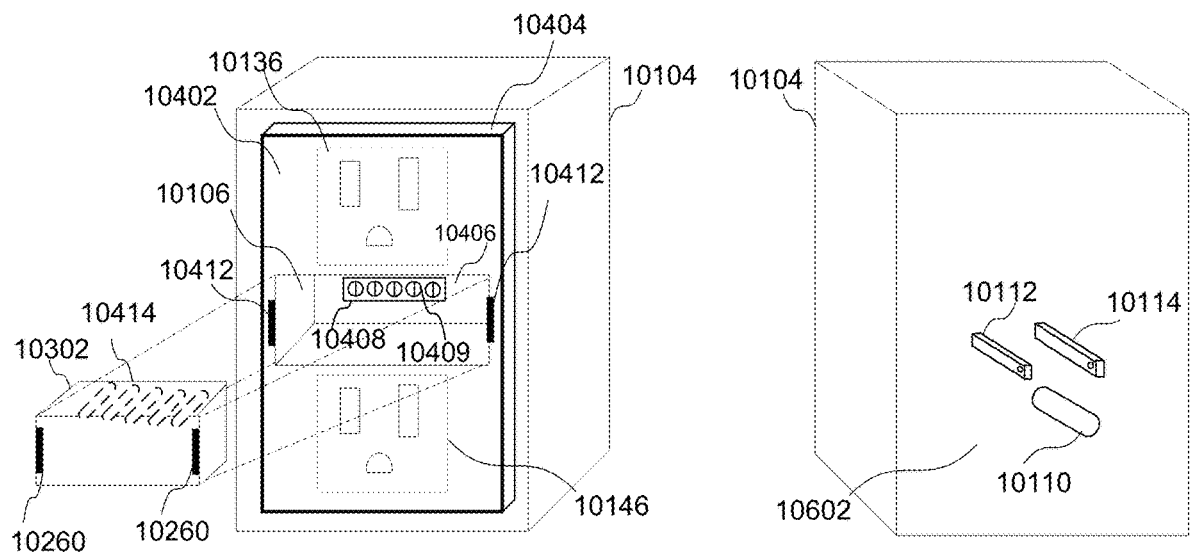
FIG. 105 is a perspective view of another power adapter arrangement comprising a power adapter having an outlet and a control attachment adapted to be received by the power adapter.
FIG. 106 is a rear view of the power adapter arrangement of FIG. 105 showing an electrical interface comprising a plug.

Turning now to FIGS. 105 and 106, a perspective view of another power adapter arrangement comprising a power adapter having an outlet and a control attachment adapted to be received by the power adapter is shown. A rear view of the power adapter arrangement of FIG. 105 is shown in FIG. 106, where an electrical interface comprising a plug extends from the rear surface. That is, contact elements 10110-10114 comprise prongs of a plug adapted to be inserted into an outlet to receive power that is applied to a load by way of one of the outlets 10136 and 10146. While a plug extends from the rear surface 10602 of the implementation of FIG. 106, it should be understood that a cord having a plug could extend from the rear surface, as is commonly used in an extension cord or a power strip.

Figure 107:
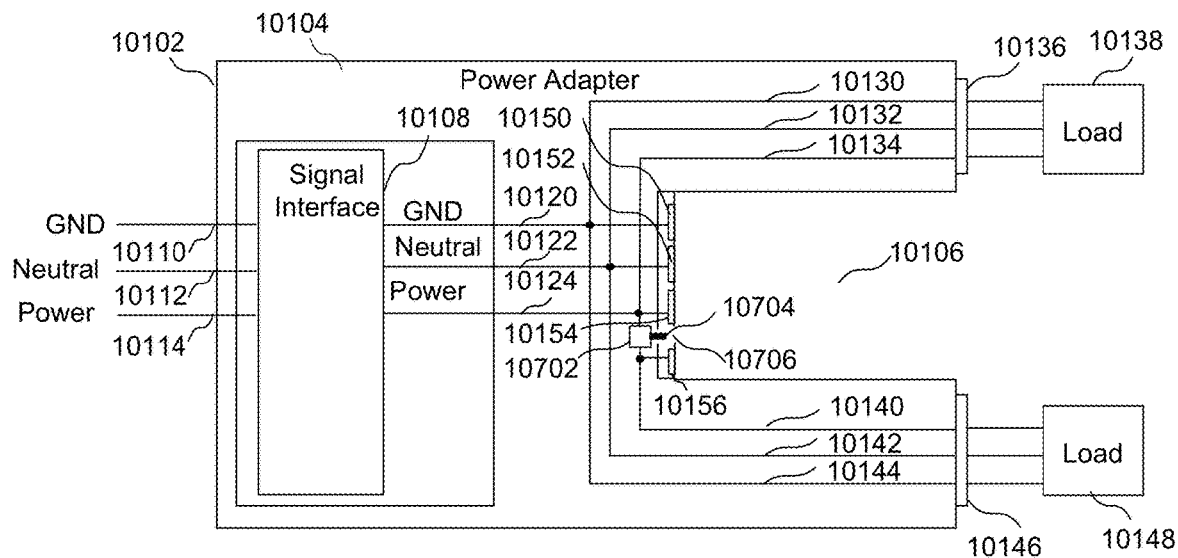
FIG. 107 is a block diagram of a power adapter having a switch controllable by a control attachment to control the routing of power received from the power adapter back to the power adapter.

Turning now to FIG. 107, a block diagram of a power adapter having a switch controllable by a control attachment to control the routing of power received from the power adapter back to the power adapter is shown. While the implementation of FIG. 102 having a control attachment comprising a simple contact arrangement for routing the power signal from the power adapter back to the power adapter through the control attachment, it may be beneficial to have a control attachment that does not require any electrical connectors (i.e. the control attachments may simply comprise a plastic housing, and the power adapter may operate without any control attachment). According to one implementation, the power adapter may comprise a switch 10702 that detects a control attachment adapted to control the application of power to a load. That is, the switch 10702 may be implemented to provide power to the outlet 10146 (i.e. enabling the outlet 10146 to operate as an always on outlet), unless a control attachment is configured to control power to the load. Therefore, when a dummy control attachment is inserted (or no control attachment is inserted), it will not change the state of the switch, where the power signal line is coupled to the outlet which operates as an always on outlet. For example, an actuator 10704 of the switch 10702, which is accessible through a recess 10706 in a wall of the recess 10106, would remain in the same state when a dummy control attachment is attached to the power adapter (or when no control attachment is inserted).

Figure 108:
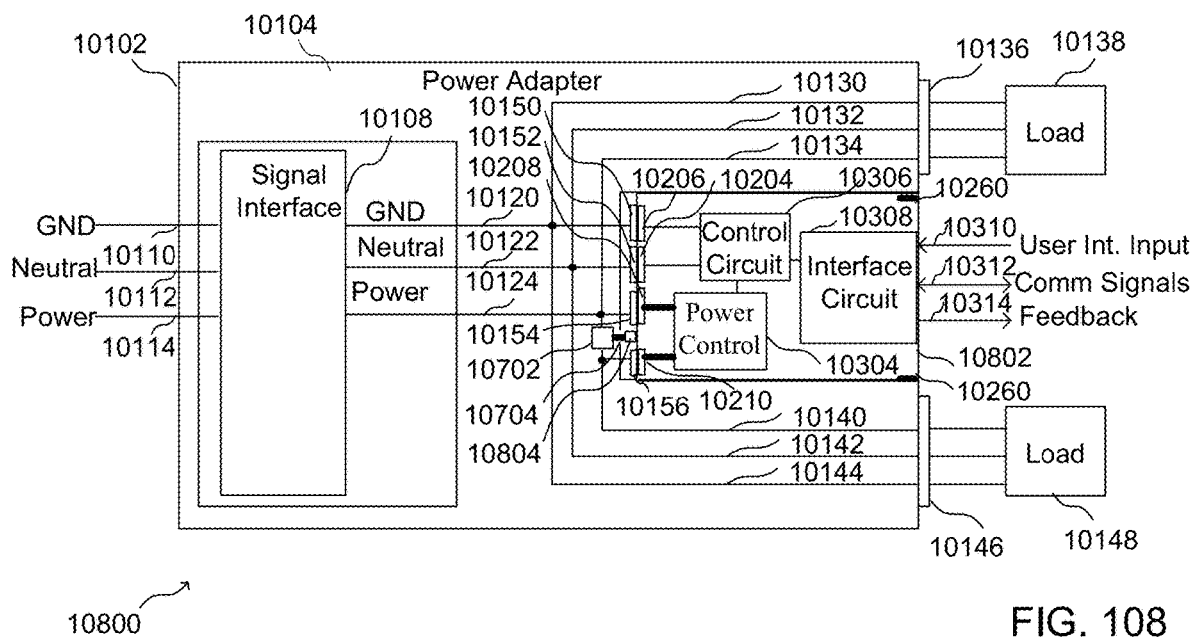
FIG. 108 is a block diagram of a power adapter arrangement comprising a power adapter and a switch, where the power adapter has a switch controllable by a control attachment to control the routing of power received from the power adapter back to the power adapter.

However, when a control attachment is adapted to control power applied to the outlet 10146 (making the outlet 10146 a switched outlet), the control attachment may engage the actuator 10704, changing the state of the switch to decoupled power applied to the outlet 10146 by way of the switch. As shown in FIG. 108, the switch 10702 is controllable by a control attachment 10802 to control the routing of power received from the power adapter back to the power adapter through the control attachment. More particularly, the control attachment 10802, which may comprise control and interface elements as described above in reference to FIG. 103 for example, also comprises an actuator element 10804 that is provided on the control attachment and configured to engage the actuator element 10704 when the control attachment is inserted into the recess 10106 as shown. That is, when the control attachment 10802 is inserted into the recess 10106, the actuator element 10804 engages the actuator 10704 (such as by pressing the actuator 10704 configured as a button for example), causing the switch 10702 to open (i.e. prevent the transmission of power from the power signal line 10124 to the signal line 10140) and therefore making the outlet 10146 a switched outlet controllable by the power control circuit 10304 and the control circuit 10306. While a switch 10702 is configured by way of example to have a button as shown, it should be understood that other types of switches could be used. As can be seen in the implementation of FIGS. 107 and 108, the power adapter arrangement can be implemented with a dummy control attachment having no elements that are necessary for the operation of the power adapter operating with 2 always on outlets, or with a control attachment controlling the application of power to a load coupled to the outlet 10146.

Figure 109:
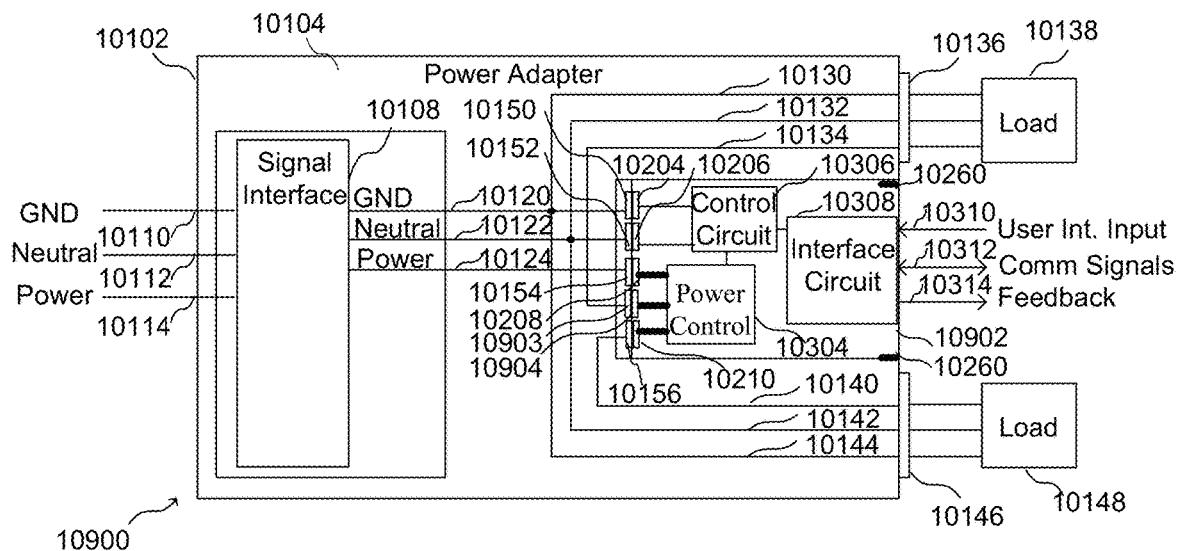
FIG. 109 is a block diagram of a power adapter arrangement having a power adapter and a control attachment configured to control two outlets.

The control of outlets and the arrangement of elements of a power adapter could be implemented in different ways, as will be described in reference to FIGS. 109-112. Turning first to FIG. 109, a block diagram of a power adapter arrangement having a power adapter and a control attachment configured to control two outlets is shown. Unlike the arrangement of the power adapter of FIGS. 107-108, the power adapter of FIG. 109 may be implemented so that the power control circuit 10304 controls both outlets 10136 and 10146. In addition to the contact elements 10154 and 10156 used for coupling signals to the power control circuit 10304, a contact element 10903 and a corresponding contact element 10904 enable the power control circuit 10304 to control the application of power to the outlet 10136. That is, rather that having the outlet 10136 coupled to the power signal line 10124, the signal line 10134 is coupled to the contact elements 10903 and 10904 to receive power from the power control circuit, enabling the outlet 10136 to be operated as a switched outlet. The outlets 10136 and 10146 could be controlled independently or together.

Figure 110:
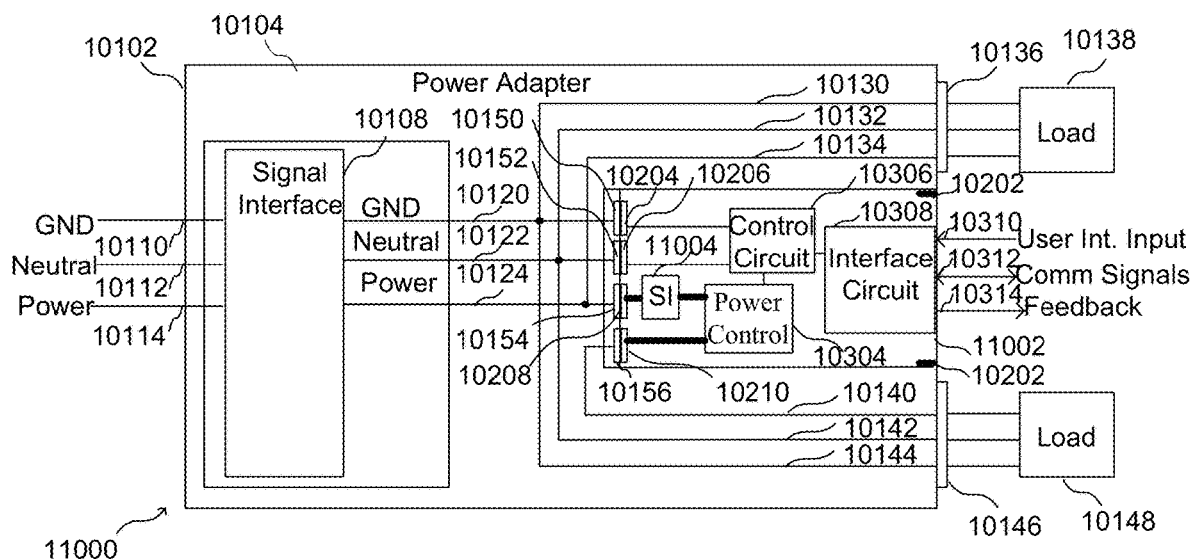
FIG. 110 is a block diagram of a power adapter arrangement having a control attachment including a signal interface circuit.

According to the implementation of FIG. 110, a control attachment may be implemented to have a signal interface circuit as shown. That is, some or all of the signal interface functions, which may include noise filtering and voltage regulation as described above, may be implemented in the control attachment (i.e. in addition to or in place of the signal interface 10108). For example, the control attachment 11002 of FIG. 110 may include a signal interface circuit 11004 coupled to the contact elements 10154 and 10208 as shown to the receive the power signal, where noise filtering and/or voltage regulation can be performed in the signal interface 11004 of the control attachment. It should be understood that the partitioning of elements, such as signal interface elements between the power adapter and the control attachment may be determined by factors such as cost factors associated with the power adapter (i.e. minimizing the complexity and cost of the power adapter to promote a more widespread installation of the power adapters), size factors associated with control attachments (i.e. space requirements for circuits implemented in the control attachment), and other considerations that may impact consumer adoption of certain power adapter arrangements (e.g. including all of the signal interface elements are in the power adapter so that no circuit element is required in the control attachment).

Figure 111:
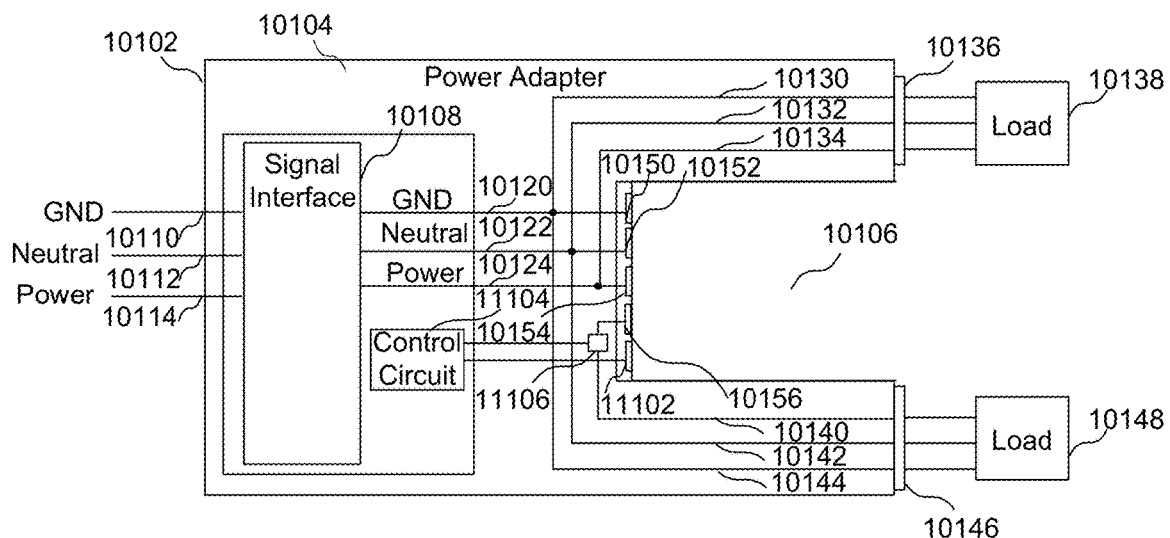
FIG. 111 is a block diagram of a power adapter having a switch for controlling the application of power to an outlet.
Figure 112:
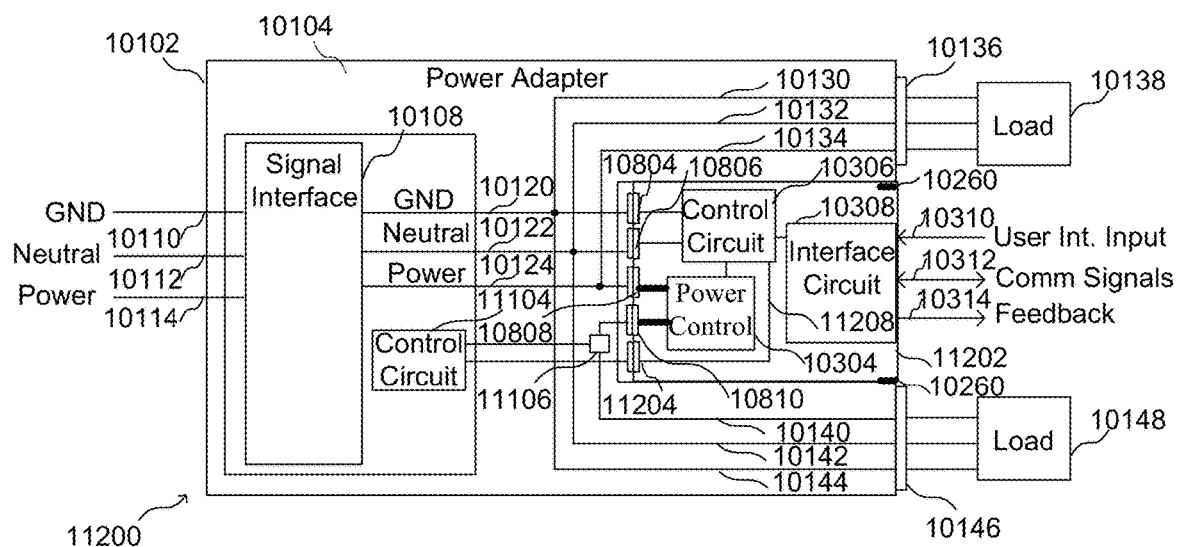
FIG. 112 is a block diagram of a power adapter arrangement comprising the power adapter of FIG. 111 having a switch for controlling the application of power to an outlet.

According to the implementations of FIGS. 111 and 112, control circuits provided in both the power adapter and the control attachment to enable authenticating the control attachment, where the power adapter having a switch for controlling the application of power to an outlet is shown. As can be seen in FIG. 111, a contact element 11102 is provided for routing signals from the control attachment to a control circuit 11104, an output of which is provided to a switch 11106 that is configured to receive a power signal from the power control circuit 10304 and route the power to the signal line 10140. The power control circuit 10304 and the switch 11106 enable the power adapter arrangement to operate the outlet 10146 as a switched outlet using the control attachment 11202, as shown in FIG. 112. The control circuit 10306 is coupled to the contact element 11204 to enable the transfer of signals between the control circuit 10306 of the control attachment 11202 and the control circuit 11104 of the power adapter 10102. According to some implementations, the control circuit 11104 of the power adapter may communicate with the control attachment to authenticate the control attachment as set forth above. If the control attachment is not authenticated, the control circuit 11104 may open the switch 11106 to prevent power from being applied to the signal line 10140. However, if the control attachment is authenticated, the switch may be closed, enabling the power control circuit 10304 to operate the outlet 10146 as a switched outlet.

While different features are shown in the different implementations of FIGS. 101-112, it should be understood that the various features may be interchanged between the different implementations. According to some implementations, some of the operations of the control circuits 10306 and 11104 in conjunction with other elements of the power adapter or the control attachment are described in reference to FIG. 113.

Figure 113:
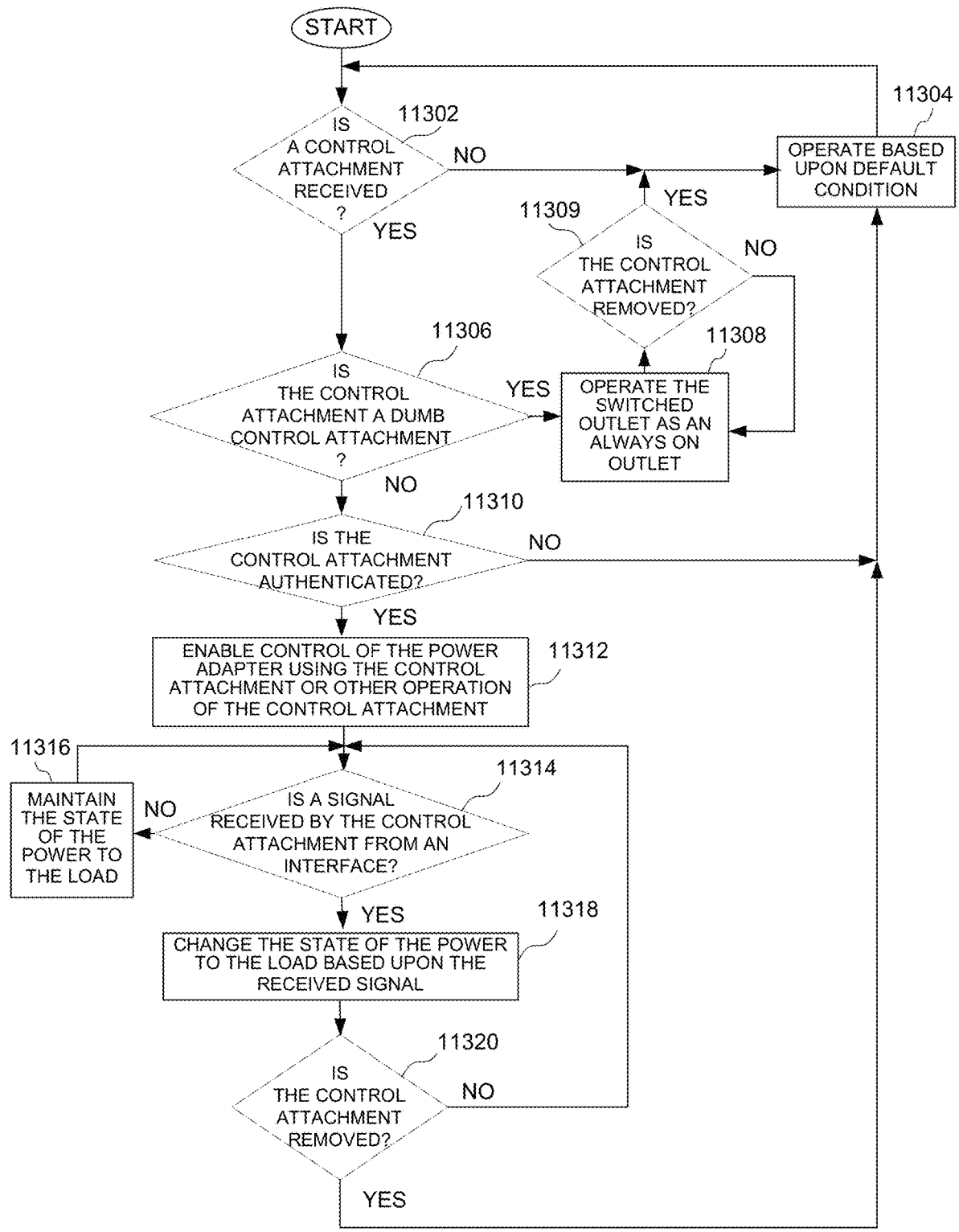
FIG. 113 is a flow chart showing a method of implementing a power adapter arrangement.

Turning now to FIG. 113, a flow chart shows a method of implementing a power adapter arrangement having an outlet. More particularly, it is determined whether a control attachment is received by a power adapter at a block 11302. If not, the power adapter operates in a default condition of a power adapter having no control attachment at a block 11304. For example, the default condition could be that a switched outlet of the power adapter is in an always on state, as described above in reference to FIGS. 107 and 108. Alternatively, the default condition is that the switched outlet is disabled when a control attachment is not attached to the power adapter.

If a control attachment is received by the power adapter, it may then be determined whether the control attachment is a "dumb" control attachment (i.e. a control attachment having no circuits for controlling the application of power to a switched outlet, also known as a blank attachment) at a block 11306. If so, one or more of the outlets operated as switched outlets may be operated as always on outlets at a block 11308 until the control attachment is removed. If the control attachment is removed at the block 11309, the power adapter operates according to the default condition at the block 11304.

If the control attachment is not a dumb control attachment (i.e. the control attachment comprises circuits for controlling the switching of a switched outlet or any other circuits that may receive power from the power adapter, such as a sensor or any other element of a user interface as described above), it may optionally be determined whether the control attachment is authenticated to operate with the power adapter as described above at a block 11310. It the control attachment is not authenticated, the power adapter is operated according to the default condition at the block 11304. If the control attachment is authenticated, the control attachment is enabled to control the power adapter at a block 11312, such as the application of power to a load, or communicate signals between the control attachment and the power adapter. For example, the power adapter and control attachment could be operated as described above in reference to FIGS. 111 and 112.

If the control attachment is not a dumb attachment and authenticated (if necessary), it may then be determined whether a signal is received from an interface of the control attachment at a block 11314. If not, the power adapter arrangement maintains the state of power to the load at a block 11316. If a signal is received, the state of the power to the load may be changed based upon the received signal, or any other type of operation or communication of signals may be performed based upon the received signal at a block 11318. The control of the application of power to a load may be performed by a control circuit of the control attachment and or the control circuit of the power adapter using a power control circuit having a relay or a TRIAC for example. The control of the application of power may be based upon any inputs received at a user interface circuit of the control attachment as described above. Until the control attachment is removed, the control attachment continues to monitor for received signals at the block 11314. If it is determined that the control attachment is removed at a block 11320, the power adapter is operated in the default condition at the block 11304. The flow chart of FIG. 113 may be implemented in one or more of the power control circuit 10304 and the control circuit 10306 of the control attachment or the control circuit 11104 of the power adapter (i.e. if authentication is required).

Turning now to FIGS. 114-125, examples of contact elements for implementing a power adapter arrangement having a control attachment configured to receive a power signal and route the power signal back to the power adapter. Because a contact element carrying a high voltage power signal is provided on the power adapter (to enable providing the power signal to the power adapter), it is beneficial to increase the safety of implementing a power adapter by implementing the contact elements as tamper resistant contact elements to prevent a user from inadvertently making contact with a high voltage contact (e.g. 120 volts or some other voltage that may be dangerous) of the power adapter. In addition to being less accessible than the contact elements of an outlet for receiving a plug, the contact elements of the power adapter configured to receive corresponding contact elements of a control attachment may be implemented as tamper resistant contact elements, such as those that are currently implemented on the contact elements of an outlet.

Figure 114:
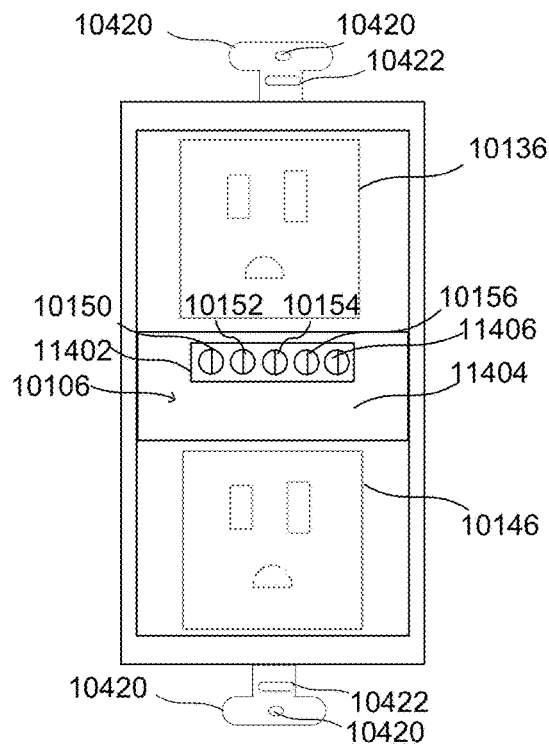
FIG. 114 is a front view of a power adapter showing a recess between a pair of outlets adapted to receive a control attachment.

As shown in FIG. 114, a front view of a power adapter shows the recess 10106 between the pair of outlets 10136 and 10146 adapted to receive a control attachment. More particularly, an electrical interface 11402 on a rear surface 11404 of the recess comprises a plurality of contact elements 11406, shown here by way of example as tamper resistant contact elements. The electrical interface 11402 may comprise the contact elements the contact elements 10150, 10152, 10154, 10156, and a contact 11406. That is, the electrical interface 11402 may comprises an additional contact element 11406 in the power adapter having outlets to accommodate a control attachment that may have more contact elements than needed in a power adapter having an outlet, such as a control attachment used in a power adapter having a switch which may also require a 3-way switch terminal. The electrical interface 11402 could be in the recess of the power adapter of any of the embodiments of FIGS. 101-112. While the electrical interface is shown by way of example on the rear surface, it should be understood that the electrical interface could be implemented on any other surface of the recess, or distributed on different surfaces.

Figure 115:
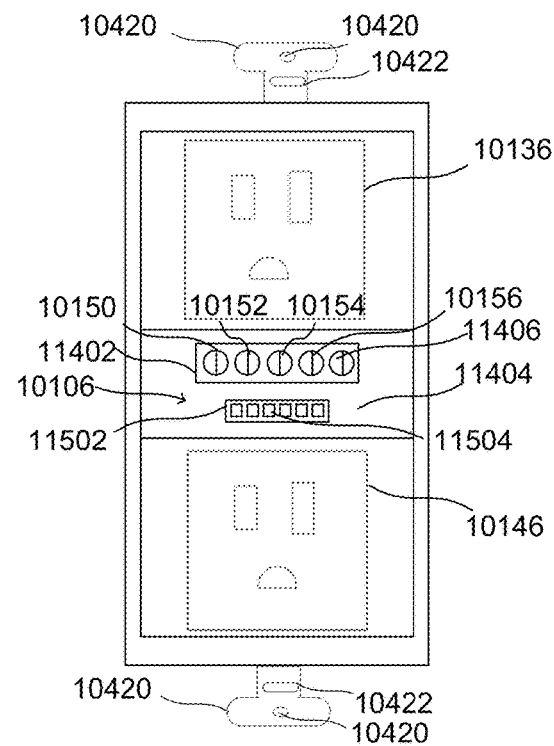
FIG. 115 is a front view of another power adapter showing a recess between a pair of outlets adapted to receive a control attachment.

As shown in the implementation of FIG. 115, an additional electrical interface 11502 having contact elements 11504 may be provided. According to some implementations, the electrical interface 11502 may comprise a low power electrical interface (e.g. approximately 5 volts or less), which may be implemented as described above for example in FIGS. 1-44. For example, low voltage control signals may be used to communicate between a control circuit of the power adapter and a control circuit of the control attachment.

According to some implementations, low power control signals may be communicated between the power adapter and the control attachment using the contact elements of the electrical interface 11404. That is, although tamper resistant contact elements may not be necessary for low voltage electrical interfaces, it may be beneficial to include a single electrical interface for both high voltage and low voltage signals. According to other implementations, low power communication signals could be provided on the high voltage lines. For example, a high frequency signal having a low voltage could be transmitted by way of the power contact elements of the power adapter and the control attachment. That is, the power contact elements, in addition to transmitting a high voltage power signal, could also function as a serial communication interface as described above to transmit communication signals between the power adapter and the control attachment using a high frequency signal. According to other implementations, multiple contact elements of the electrical interface 11402 of the power adapter could be used for transmitting communication signals according to parallel communication protocols as described above. While the electrical interface 11402 is shown having physical contact elements, it should be understood that the electrical interface 11402 could comprise any type of interface, such as wireless or optical interfaces.

Figure 116:
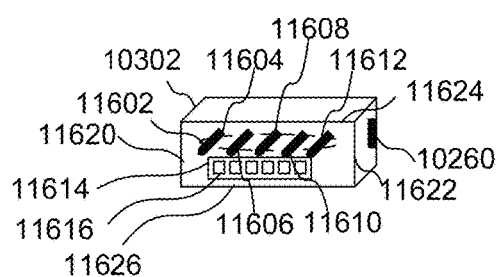
FIG. 116 is a perspective view of a control attachment according to one implementation.

Turning now to FIG. 116, a perspective view of a control attachment according to one implementation is shown. The control attachment 10302 comprises contact elements of one or more electrical interfaces extending from a rear surface of a body portion extending from a rear surface to a front surface as shown, where user interface elements may be positioned on the front surface of the control attachment. The body portion is implemented to fit within the recess of a power adapter. More particularly, an electrical interface 11602 comprises a plurality of contact elements 11604-11612 comprising prongs adapted to be inserted to the corresponding contact elements 10150-10156 and 11406 of the power adapter as shown in FIG. 115. The contact elements 11604-11612 preferably have a shape and dimension to enable the insertion into the corresponding contact elements of the power adapter and to be able to carry sufficient current to apply to a load. For example, the contact elements 11604-11612 could be similar to prongs of a plug that are adapted to be inserted into an outlet. The contact elements 11604-11612 are preferably configured to have a shape and sufficient strength to separate insulating components of a tamper resistance contact, as will be described in more detail below in reference to FIGS. 117 and 118. A second electrical interface 11614 having contact elements 11616, which is configured to connect to the electrical interface 11502 for example, may be implemented. Various edges of the rear wall, including the side edges 11620 and 11622 and front and back edges 11624 and 11616, may be used to enable the control attachment to open a locked barrier, as will be described in more detail in reference to FIGS. 120-125. While the contact elements are shown on the rear surface as shown by way of example, it should be understood that the contact elements for routing power can be positioned on any other surface of the body portion of the control attachment other than the front surface that is exposed to a user and may comprise user interface elements. However, it should be understood that contact elements may positioned on the front surface, such as for a connector accessible by a user (e.g. a USB connector for charging an external device such as a phone or a laptop or a connector for transmitting and receiving data).

Figure 117:
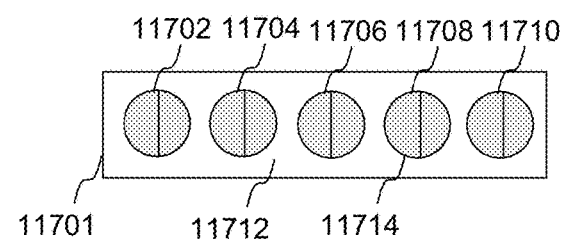
FIG. 117 is a front view of an electrical interface having insulating elements between openings for receiving contact elements of a control attachment and contact elements of the power adapter.

Turning now to FIG. 117, a front view of an electrical interface having insulating elements between openings for receiving contact elements of a control attachment and contact elements of the power adapter is shown. A safety contact block 11701, which may be implemented as a portion of the electrical interface 11402, comprises a plurality of insulating elements adapted to cover corresponding contact elements. According to some implementations, pairs of insulating elements 11702-11710, which are movable within the contact block 11701, may be located behind an outer surface 11712 having openings 11714, shown here by way of example as circular openings to enable a contact element (e.g. a prong) to extend through the opening and separate the insulating element of the pair of insulating elements, as shown and described in reference to FIGS. 118 and 119.

More particularly, FIGS. 118 and 119, which have the outer surface 11712 removed to show the pairs of insulating elements, show the pairs of insulating elements in a closed state (i.e. FIG. 118 when prongs of a control attachment are not inserted) and an open state (i.e. FIG. 119 when prongs of a control attachment are inserted). As shown in FIG. 118, each of the pairs of insulating elements 11702-11710 are movable (e.g. slidable) within rails 11802 and 11804 and between ends 11806 and 11808. Spring elements 11810 may be provided between the pairs of insulating elements and between the first pair of insulating elements 11702 and the end 11806 and the last pair of insulating elements 11710 and the end 11808. As shown in FIG. 119, where contact elements 11604-11612 are inserted into the corresponding pairs of insulators 11702-11710 to make contact to contact elements of the power adapter, the springs are compressed, but return the uncompressed state of FIG. 118 to cover the contact elements of the power adapter when the control attachment is detached from the power adapter.

FIGS. 120-125 show a barrier arrangement providing a tamper resistant feature to prevent inadvertent contact with a contact element of the power adapter. As shown in the implementation of FIGS. 120 and 121, a pair of movable doors 12002 and 12004, which abut one another at an interface 12006, may be opened as shown in FIG. 121. As will be described in more detail in the sequence of FIGS. 122-125, the doors 12002 and 12004 may be in a locked position when closed, and may be unlocked as the control attachment 10302 is inserted into the power adapter.

Figure 122:
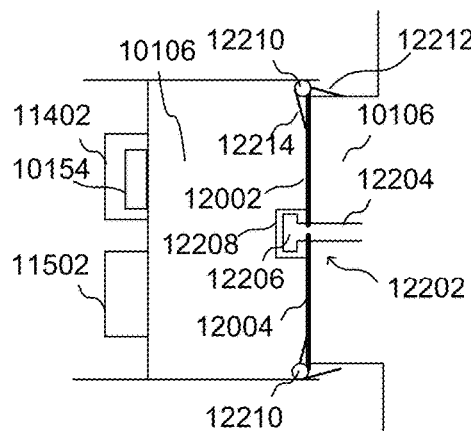

As shown in FIG. 122, a latch element 12202 comprises a spring element, shown here by way of example as a leaf spring 12204 that extends to a flange 12206 which is movable within a recess 12208. Each of the movable doors 12002 and 12004 comprise spring elements 12210 having a first terminal portion 12212 and a second terminal portion 12214. As will be described in reference to FIGS. 123-125, the movable doors 12002 and 12004 may be forced open in response to the control attachment 10302 being inserted into the recess, and return to the closed position as shown in FIG. 122 by the spring elements 12210 when the control attachment is removed from the recess.

Figure 123:
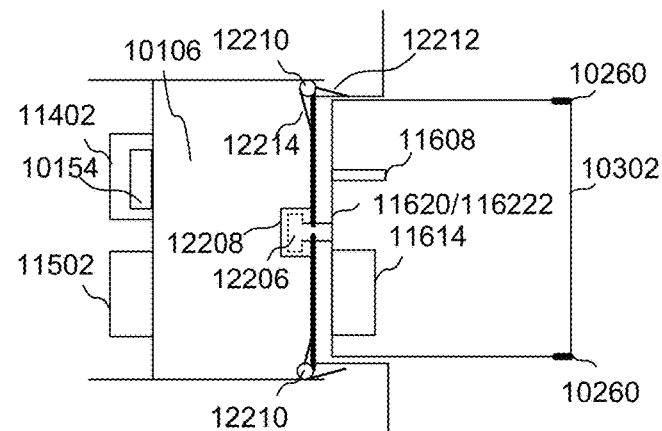
Figure 124:
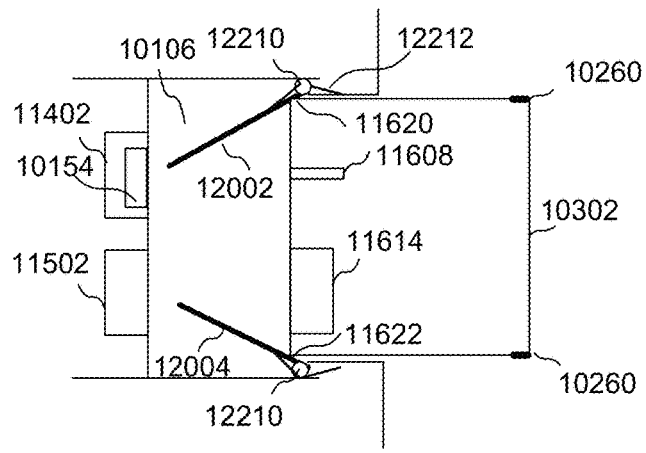
Figure 125:
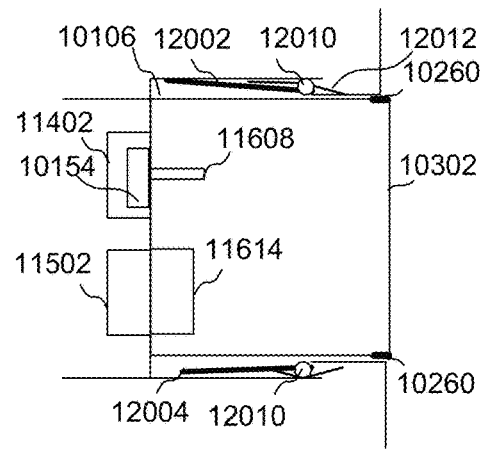

By the time that the control attachment 10302 reaches the doors as it is being inserted into the recess, the side edges 11620 and 11622 of the control attachment cause the flange 12206 to be driven into the recess 11208, enabling the doors 12002 and 12004 to begin to open. That is, the flange 12206, which is provided to enable a tamper resistant feature, will no longer block the doors from opening as a control attachment is being inserted into the recess as shown in FIG. 123. As the control attachment 10302 continues to advance into the recess, the front and back edges 11624 and 11626 drive the doors 12002 and 12004 open as shown in FIG. 124. The control attachment is shown completely inserted into the recess in FIG. 125.

It should be noted that the tamper resistant feature of FIGS. 122-125 could be used alone or in addition to the tamper resistant feature or FIGS. 120-121. It should be noted that the tamper resistant features could be used in a power adapter comprising outlets or implemented as a switch, as will be described in more detail below in reference to FIGS. 127-143.

Figure 126:
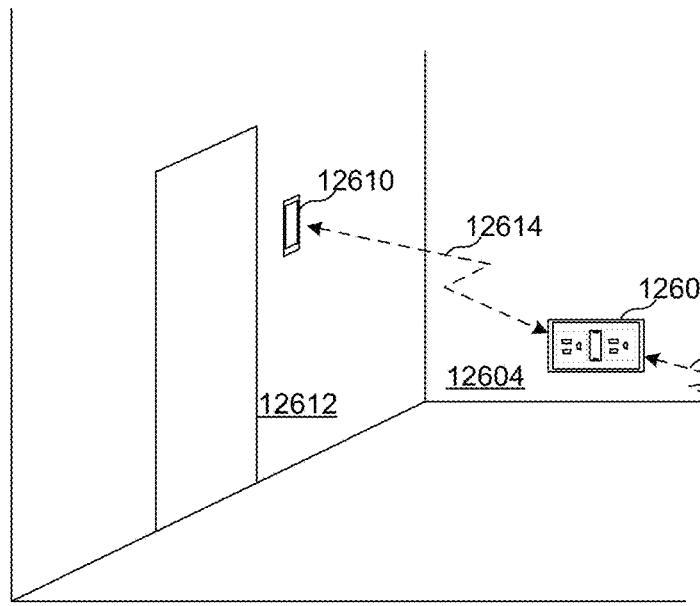

Turning now to FIG. 126, a diagram shows a power adapter arrangement having an outlet that is controllable using 2 wireless communication protocols. The arrangement of elements of a room in FIG. 101 comprises an outlet 12602, such as an outlet having a control attachment as described in FIGS. 90-100 for example or some other suitable outlet, on a wall 12604. The outlet 12602 is adapted to communicate with a first wireless communication device 12606 (which may be a remote computer device such as a smart phone or a tablet for example) by way of a first wireless communication protocol and with a second wireless communication device 12610 (shown here by way of example as a wireless wall switch on a wall 12612) by way of a second wireless communication protocol 12614.

The outlet 12602 may be implemented having a control attachment having 2 wireless communication devices such as described in reference to FIG. 37, where the wireless communication circuit 3748 may be implemented to enable communication with and control one or more outlets (or other user interface elements) of the control attachment. For example, the wireless communication circuit 3748 of the control attachment may be implemented to communicate directly with a remote device, such as by using an RF or a Bluetooth connection, or by indirectly (e.g. through a base station) such as by using a WiFi or Z-wave connection. The second wireless communication device, such as wireless communication device 3752, may implement a second communication protocol to enable a wireless communication link with a corresponding wireless communication device 12610. For example, the wireless communication protocol 12614 may provide a direct wireless communication link, such as an RF communication link or a Bluetooth communication link, or an indirect wireless communication link, such as a WiFi or Z-Wave communication link.

Such an arrangement not only provides convenience to a home owner by enabling multiple devices to control an outlet, but may also reduce the cost to a home builder by reducing the wiring requirements. For example, when an outlet is implemented as a switched outlet (i.e. one of the outlets of the switched outlet can be controlled by a switch that controls the application of power to a load plugged in to the outlet), it is necessary to provide wires from the switch (such as at the location of the wireless communication device 12610) to the outlet 12602. However, by providing a wireless communication device 12610, it is not necessary to provide the conduit and junction box required to wire a switch at the location of the wireless communication device to the outlet 12602. While wireless control of an outlet from a portable remote device (such as a smart phone or tablet) is beneficial, homeowners may also appreciate the convenience of having a wall switch to easily control a switched outlet. Therefore, with the implementation of the outlet 12602 having a wireless communication link between the wireless communication device 12610 and the outlet 12602, the cost of implementing the outlet 12602 can be reduced while still having the convenience of a remote switch.

As with power adapters having outlets that are adapted to receive control attachments configured to control the application of power to a switched outlet as described above in reference to FIGS. 90-126, power adapters having a switch for controlling the application of power applied to a load may also be configured to receive a control attachment to control the application of power to the load, as will be described below in reference to FIGS. 127-143.

Figure 127:
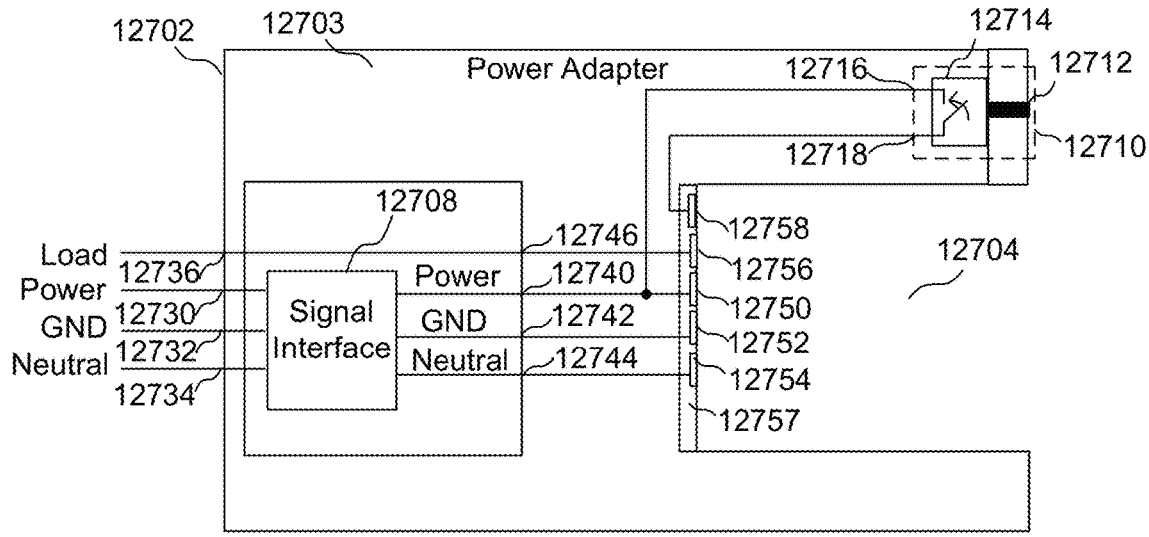

Turning first to FIG. 127, a block diagram of a power adapter having a control switch (such as a toggle switch for toggling power applied to a load) and a recess for receiving a control attachment is shown. A power adapter 12702 comprises a body portion 12703 having a recess 12704 for receiving a control attachment for receiving power from the load and routing the power back to the power adapter to provide power to the load. The power adapter 12702 comprises a signal interface 12708 adapted to be coupled to one or more contact elements of a power adapter, such as contact elements on an external surface of the power adapter as will be described in more detail below, where the signal interface may be implemented to provide signal processing, such as voltage regulation and noise filtering as described above.

The power adapter 12702 also comprises a switch 12710 that is accessible by a user of the power adapter on an outer surface of the power adapter when the power adapter is installed in a junction box. The switch 12710 may comprise a toggle switch for switching power applied to the load. The switch 12710 comprises a switch actuator 12712 coupled to a switch element 12714, where the switch element is adapted to route power from the power adapter to the control attachment by way of contacts of the power adapter and the control attachment. More particularly, a first terminal 12716 of the switch 12710 is coupled to a power signal line of the power adapter and a second terminal 12718 of the switch 12710 is coupled to a contact element of the power adapter (such as a contact element in the recess 12704) that is configured to route a power signal to the control attachment.

The power adapter 12702 comprises a plurality of inputs external to the power adapter, which may be contact elements that are not exposed when the power adapter is attached to a junction box for example, and adapted to be coupled to power signals. For example, the power adapter 12702 may comprise a power input 12730, a ground input 12732, and a neutral input 12734. Signals may be routed on signal lines including a power signal line 12740, a ground signal line 12742, a neutral signal line 12744, and a load signal line 12746. The power signal line 12740 may be coupled to a contact element 12750, the ground signal line 12742 may be coupled to a contact element 12752, the neutral signal line 12744 may be coupled to a contact element 12754, and a load signal line 12746 may be coupled to a contact element 12756. A contact element 12758 is coupled to the terminal 12718 to receive the power signal by way of the power signal line 12740 and the switch 12710. The switch 12710 and the arrangement of contact elements enables the power signal to be routed to the load line 12746 using a control attachment, as will be described in reference to FIGS. 128-130.

Figure 128:
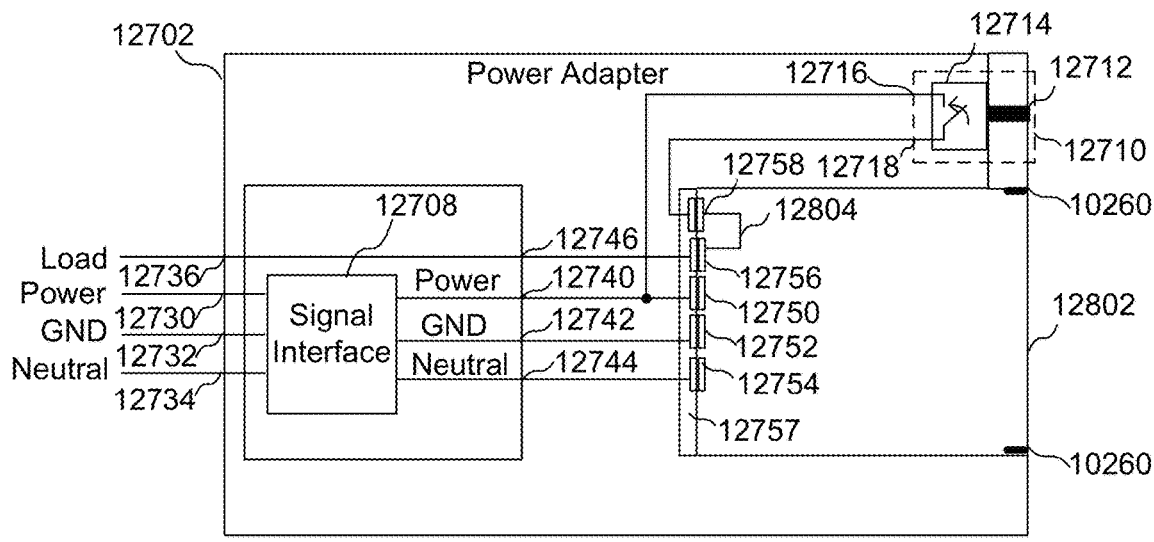

As shown in FIG. 128, a dummy control attachment 12802 may be used to couple the contact element 12756 to the contact element 12758. Therefore, the power adapter arrangement 12800 of FIG. 128 operates as a simple toggle switch, where the switching element 12714 and actuator element 12712 could implement a conventional paddle-type toggle switch for example. That is, when the switch element 12714 is closed, power from the power line 12740 is provided by way of the switch element 12714 to the load line 12746 through the contact element 12804 (e.g. a jumper). When the switch element 12714 is open, power is not provided to the load. As can be seen, a low cost power adapter comprising a switch can be implemented with a simple control attachment having only a contact element 12804. As will be described in more detail below in reference to FIGS. 129 and 130, switches could be provided in the power adapter to enable the power adapter to be implemented with a control attachment (or even without a control attachment), similar to the implementations as described above in reference to FIGS. 107 and 108 for a power adapter having an outlet.

Figure 129:
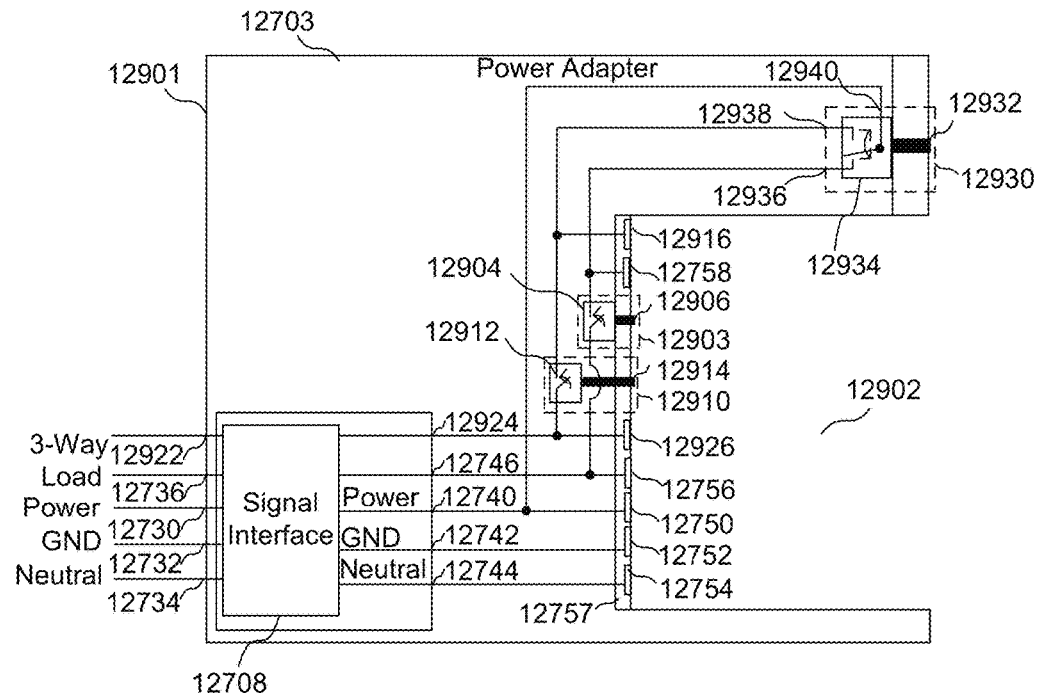
Figure 130:
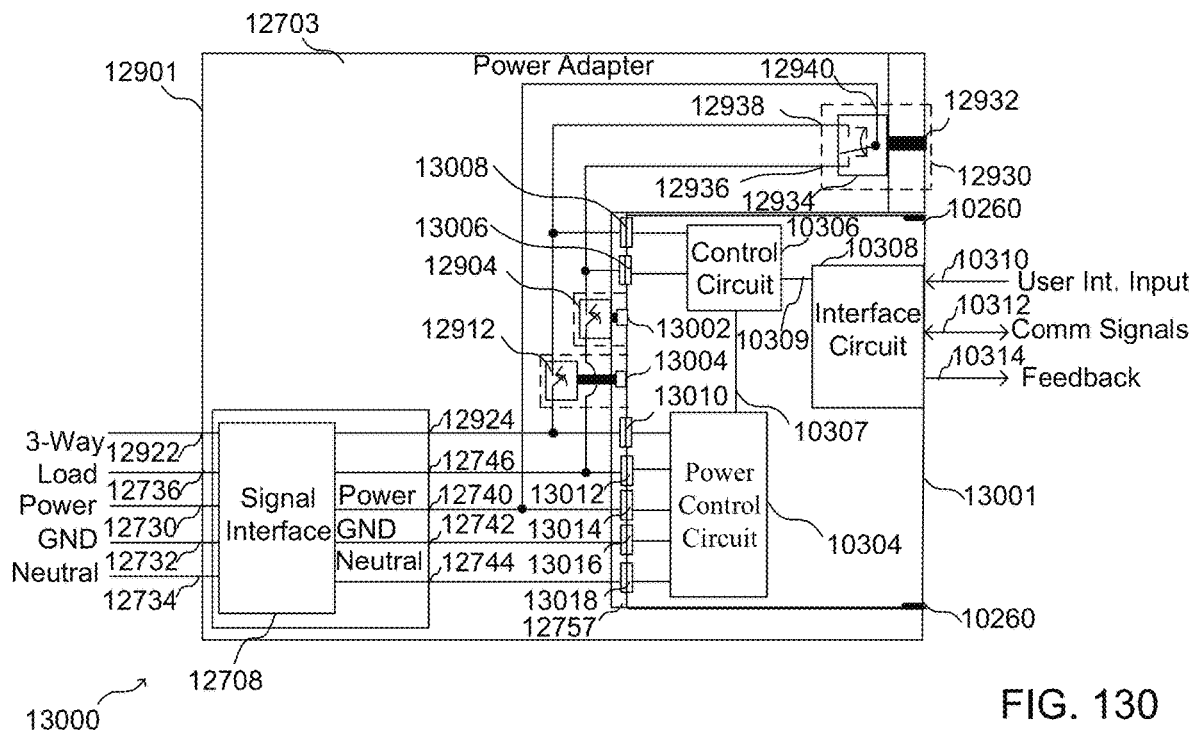

Turning now to FIGS. 129 and 130, a block diagram of a power adapter having a control switch (such as a toggle switch) and enable switches adapted to be coupled to actuator elements of a control attachment is shown. Rather than relying on an element of the control attachment, such as a jumper of the control attachment as described above in reference to FIG. 128, the power adapter 12901, including a body portion having a recess 12902 for receiving a control attachment, comprises one or more switches (which may be considered enable switches) for enabling the use of the power adapter by controlling the routing of a power signal received by the control switch in response to an actuation signal from the control attachment, such as by insertion of the control attachment into the recess of the power adapter. More particularly, a first switch 12903 comprises a switch element 12904 controlling a signal path as shown coupled between the terminal 12936 of the control switch and the load line 12756. The switch 12903 comprises an actuator 12906 that is accessible on a surface of the recess 12902. The power adapter also comprises a second switch 12910 having a switch element 12912 controlling a signal path as shown coupled to the terminal 12938 of the control switch 12930. The switch 12910 also comprises an actuator 12914 that is accessible on a surface of the recess 12902. In addition to the contact element 12758, a contact element 12916 may be coupled to a terminal of the switch 12930. As will be described in reference to FIG. 130, the actuators 12906 and 12914 of a control attachment may be engaged by a corresponding one or more actuator elements of the control attachment to change the state of the switches. The operation of the switches 12903 and 12910 functioning as enable switches and the switch 12930 functioning as a control switch (i.e. toggle switch) will be described in more detail below.

In addition to the inputs 12730-12736, the signal lines 12740-12746 and the contact elements 12750-12756, the power adapter may comprise an input 12922 for receiving a 3-way signal, which may be a contact element on the power adapter for example. A 3-way signal received at the input 12922 is coupled by way of a signal line 12924 to a contact element 12926.

In operation, the control switch 12930, which may function as a toggle switch as described above in reference to FIG. 127, comprises a 3-terminal switch that routes power to one of two outputs. That is, unlike the toggle switch 12710, which provides an open circuit or provides a closed circuit to route a power signal from an input to an output of the toggle switch, the control switch 12930 is adapted to route power to one of two outputs, and may be implemented as a part of a 3-way circuit. The control switch 12930 comprises a switch element 12934 having a first terminal 12936 coupled to the switch 12903 and the contact element 12758 as shown. The switch 12930 also comprises a terminal 12938 coupled to the switch 12910 and the contact element 12916 as shown. The switch 12930 also comprises a power terminal 12940 coupled to the power line 12740, where the switch 12930 is configured to switch the application of power between the terminal 12936 and 12938 to provide the power to contact elements of the power adapter.

The switches 12903 and 12910 enable the power signal to be provided to the load directly or by way of the control attachment. According to one implementation, the switches 12903 and 12910 may be implemented in a closed state (commonly referred to as normally closed or NC), where that application of power to the load is based upon a change of state of the switch 12930. As can be seen in FIG. 129, if the switches 12903 and 12910 are closed, the power signal on the power line 12740 will be coupled to either the load line 12745 (and therefore the load terminal 12736) or the 3-way switch line (and therefore the 3-way switch terminal 12922). If the power adapter is not implemented in a 3-way connection, the switch 12930 will connect the power signal to or disconnect the power signal from the load signal line 12746 in response to a toggling of the actuator element 12932 of the switch 12930. The operation of the power adapter 12901 implemented in a 3-way connection will be described in more detail in reference to FIG. 135.

The switches can be retained in a closed state even when a dummy control attachment is inserted. That is, the dummy control attachment will not engage the actuator elements 12906 and 12914 (e.g. a recess could be provided in the dummy control attachment so that the actuator elements 12906 and 12914 are not depressed when the control attachment is inserted into the recess 12902). However, the switches 12903 and 12910 can be changed to an open state if a control attachment adapted to control the application of power to the load is inserted into the recess 12902. For example, as shown in FIG. 130 having the control attachment 13001 inserted in the recess 12902, an actuator element 13002, such as a prong or other projection, of the control attachment will engage the actuator element 12906, causing the switch element 12904 to change state to an open state. Similarly, an actuator element 13004 of the control attachment will engage the actuator element 12914, causing the switch element 12912 to change state to an open state.

If the switches 12903 and 12910 are open (i.e. preventing a routing of the power signal from the switch 12930 to one of the signal lines 12746 or 12924), the power signal routed by the switch 12934 can be routed to either the contact element 12916 or the contact element 12758, which can be detected as a toggling of the switch 12930 by the control circuit 10306. A signal indicating the toggling of the switch 12930 can be provided from the control circuit 10306 to the power control circuit 10304 by way of the signal line 10307.

The power control circuit 10304 is also coupled to the 3-way signal line 12924, and can detect a change in the signal on the 3-way terminal, and therefore to determine whether to change the application of power to the load terminal 12736 or the 3-way terminal 12922 based upon a toggling of the switch 12930. For example, if a toggle of the switch 12930 is detected, the power control circuit 10304 will change the routing of the power signal from the power signal line 12740 to the load signal line 12646 (if the power is currently routed to the 3-way signal line) or change the routing of the power signal to the 3-way line (if the power is currently routed to the load signal line) as described in reference to FIG. 135 and the flow chart of FIG. 143.

If the power adapter is not implemented in a 3-way circuit connection, the power control will toggle the power on the power signal line 12740 to the load signal line 12746, subject to any toggle signal generated by the interface circuit 10308. That is, the control circuit 10306 may monitor both the switch 12930 and the interface circuit 10308. The interface circuit 10308 is adapted to communicate with the control circuit 10306 by way of a signal line 10309 as described above in reference to FIG. 103, enabling the control circuit 10306 to control the power control circuit 10304 to change the state of the power applied to the load in response to any toggling signal.

Turning now to FIG. 131, a block diagram of a power adapter arrangement 13100 having a switch and user interface elements is shown. As shown in FIG. 131, additional user interface elements 13102 and 13104, which may be actuator elements for example, may be implemented to enable a user to provide input to or control the control attachment. As will be described in more detail below, the user interface elements 13102 and 13104 may comprise dimming control actuators for example. The actuator elements 13102 and 13104 may be coupled to an electrical interface 13106 having corresponding contact elements 13108 and 13110.

As shown in FIG. 132, the power adapter arrangement 13200 having the power adapter of FIG. 131 and a control attachment 13201 is configured to align the electrical interface 13106 with a corresponding electrical interface 13202 having contact elements 13204 and 13206 (adapted to make an electrical connection with contact elements 13108 and 13110 respectively). The control circuit 10306 is adapted to receive signals generated by the user interface elements 13102 and 13104, and may control the application of power to a load based upon signals generated by the user interface elements 13102 and 13104.

Turning now to FIG. 133, a block diagram of a power adapter arrangement having the power adapter of FIG. 131 adapted to receive a removable user interface module and a control attachment is shown. A user interface module 13302, which comprises a user interface similar to the user interface as shown in FIGS. 131 and 132, may also comprise an electrical interface enabling signals associated with the switch 12730 to be routed to the power adapter when the user interface module 13302 inserted into another recess of the power adapter (as will be described in more detail in reference to FIG. 134). More particularly, as shown in FIG. 134, an electrical interface 13304 associated with the body portion 12905 of the power adapter comprises a plurality of contact elements configured to make an electrical contact with corresponding contact elements of the user interface module 13302. A contact element 13306 (coupled to the power signal line 12740) is coupled to a contact element 13307 for providing the power signal to the switch 12730. A contact element 13308 (coupled to the switch 12710) is coupled to a contact element 13309 (for receiving a signal from the switch 12930). A contact element 13310 (coupled to the switch 12903) is coupled to a contact element 13311 (also for receiving a signal from the switch 12730).

According to some implementations, the user interface module 13302 may be configured to be attached and detached to the power adapter body by a user of the power adapter, enabling a user to select a user interface module based upon functionality and/or appearance. According to other implementations, the user interface module 13302 may be configured to be attached to the power adapter body by a manufacturer of the power adapter, providing flexibility in the manufacturing of the power adapter. That is, a manufacturer may insert one type of user interface module for one customer and a second type of user interface module for a second customer, where the user interface module may have the same functionality, but different appearance to differential power adapter products for different customers. According to other implementations, the manufacturer may be able to manufacture different power adapters having different functionality. While the user interface module may be selected by a user for a particular customer, it may be attached to the power adapter in a way that is not removable by the user.

It should be noted that the same control attachments may be used for both the power adapters having outlets as described in reference to FIGS. 101-125 and the power adapters having switches as described in reference to FIGS. 127-131. According to some implementations, power adapters having outlets as described above in reference to FIGS. 101-112 for example and power adapters having switches as described in reference to FIGS. 127-132 could be implemented having the same electrical interfaces (and particularly electrical interfaces having female contact elements adapted to receive male contact elements).

While some of the contact elements of a control attachment may be used for a power adapter having a switch (e.g. a contact element for a 3-way switch input), a power adapter having an outlet may be implemented with a contact element for a 3-way switch input (even if it is not used) to enable a control attachment having a 3-way switch contact element to be used in both types of power adapters. That is, the power adapter having an outlet may be configured with a female contact element (which may not be used) to receive a male contact element of a control attachment adapted to be used with a power adapter having a switch. While the male contact element may be used with the power adapter having a switch, the female contact element of the power adapter having an outlet may not be connected to any circuit of the power adapter and therefore may ignore the signal on the male contact element. However, by providing the female contact element (unused but present to receive the male contact element), the same control attachment may be used for both power adapters having outlets and power adapters having switches.

Specific examples of configurations of a power adapter and a control circuit are shown in FIGS. 134-142. Turning now to FIG. 134, a perspective view of power adapter arrangement 13400 adapted to receive a user interface module (which may be removable or may be fixed during a manufacturing process) and a control attachment is shown. The power adapter arrangement 13400 comprises a plurality of contact elements (such as contact elements 12730-12736 and 12922) on a surface of the power adapter 13402, and flanges 13406 enabling the power adapter to be attached to a junction box and receive a wall plate as described above. The contact elements 12730-12736 and 12922 of the electrical interface 13404 are on an external surface of the power adapter, but may be configured so that they are not exposed when the power adapter is positioned within a junction box. In addition to the recess and electrical interface arrangement for receiving a control attachment 13001 as described above, the power adapter may comprise a second recess 13410 for receiving the user interface module 13302. The user interface module 13302 may comprise an electrical interface 13412 (shown here by way of example as comprising male contact elements) and an electrical interface 13414, both of which are shown in dashed lines as being on a rear surface to make electrical contact with corresponding electrical interfaces of the power adapter. The recess 13410 may comprise an electrical interface 13416 (shown here by way of example as electrical interface similar to electrical interface 11402 for routing high voltage signal as described above) and an electrical interface 13418 (shown here by way of example as an electrical interface for low power signals, such as electrical interface 11502 as described above). While the user interface module 13302 is shown by way of example as being a removable control attachment, it should be understood that the user interface module 13302 could be a fixed control attachment or manufactured as a part of the power adapter (i.e. it is not removable or implemented in a modular arrangement in the manufacturing process). The electrical interfaces of the power adapter that are in the recess are not exposed when a user interface module and a control attachment are inserted into the recess.

Turning now to FIG. 135, a block diagram having 2 power adapter arrangements configured in a 3-way switching arrangement to control a load is shown. The arrangement of 3-way switches 13502 and 13504 is wired to control load 13606. Any of the power adapters adapted to provide 3-way switching as set forth above (e.g. FIGS. 129-133) could be implemented as the 3-way switches 13502 and 13504. As shown in FIG. 135, the power provided to the line input is coupled to be routed by way of the load outputs of both switches 13502 and 13504 and the line terminal of the switch 13504 to the load 13606. If either of the 3-way switches is toggled (e.g. the line terminal is coupled to the 3-way terminal), the power signal will no longer be routed to the load. However, if either of the 3-way terminals is then toggled again, power will again be provided to the load. For example, if the switch 13502 is again toggled, the 3-way switching arrangement will return to the previous state as shown in FIG. 135. However, if the switch 13504 is toggled (after the switch 13502 had been toggled), power will be provided to the load by way of the 3-way terminals of the switches 13502 and 13504 (i.e. both switches 13502 and 13504 will be in the opposite state compared to the state of the switches as shown in FIG. 135).

Various arrangements of a power adapter arrangement comprising a power switch for controlling the application of power to a load and a control attachment are shown. In addition to other user interface elements, the implementations of a power adapter arrangement shown in FIGS. 136-142 provide examples of enabling dimming control and other user interface control for the switch. Turning first to FIG. 136, a front view of a power adapter arrangement having a toggle element and a dimmer control element associated with the power adapter is shown. As shown in FIG. 136, a power adapter arrangement 13602 comprises flanges 13604 as described above for attaching a power adapter to a junction box and a control attachment. The power adapter has a toggle element 13606, shown here by way of example as a paddle-type toggle switch. While a single toggle element is shown, a toggle element having separate on and off toggle elements could be implemented as shown in FIGS. 56-58 for example.

The power adapter arrangement also comprises a control attachment 13608. While the control attachment is shown by way of example below the toggle element, it should be understood that the toggle element and the control attachment could be arranged differently. The control attachment 13608 may include one or more user interface elements 13607, which may be any user interface element as described above in reference to a control attachment, such as a control button (e.g. controlling an on and off toggling of the power to the load), a control actuator, a connector (e.g. a USB connector), a sensor (including any type of sensor as described above), a speaker, a microphone, a status element (e.g. an LED), a display, or any combination of user interface elements as described above.

According to the implementation of FIG. 136, a dimmer control element could be implemented on a front surface of the body portion of the power adapter, and may comprises a guide 13610 adapted to receive a movable dimmer control element 13612. According to other implementations, the dimmer control element implemented in any of the power adapter arrangements of FIGS. 136-142 may comprise separate up and down buttons or a capacitive coupling interface, where the level of dimming may be provided on a level indicator 13614, which may comprise a series of LEDs indicating a dimming level for example.

Turning now to FIG. 137, a front view of a power adapter arrangement having a toggle element associated with the power adapter 13702 and a dimmer control element associated with a control attachment is shown. According to the implementation of FIG. 137, the control attachment 13704 comprises a dimmer control element, shown here by way of example as a guide 13706 and a movable dimmer control element 13708. As shown in the implementation of FIG. 138, the guide 13706 and dimmer control element 13708 is positioned horizontally to provide a greater range of movement of the dimmer control element.

Turning now to FIG. 139, a front view of another power adapter arrangement having a toggle element associated with the power adapter and a capacitive dimmer control element 13902 having a dimming level display 13904 having lighting elements 13906, such as LEDs associated with a control attachment, is shown. The capacitive dimmer control element 13902 will detect the movement of a finger along the dimmer control element to change the dimming level.

Turning now to FIG. 140, a front view of another power adapter arrangement having a toggle element and a dimmer control element associated with the power adapter is shown. According to the implementation of FIG. 140, the power adapter 14002 comprises a push-type toggle element 14004. The toggle element 14004 may have a status indicator 14006 to provide a status of power to the load or a status associated with a function of the control attachment 14012, such as a status of a wireless connection to the control attachment. The power adapter also comprises control elements 14008 and 14010, shown here by way of example as up and down control elements. According to some implementations, the control elements 14008 and 14010 may be providing dimming control.

According to the implementation of the power adapter arrangement of FIG. 141, a power adapter 14102 includes the toggle switch 14004 and a control attachment 14104 having control elements 14106 and 14108 (which may be implemented as described above in reference to FIG. 140 for providing dimming control). By implementing the control elements 14106 and 14108 on the control attachment, it is possible to reduce the cost and complexity of the power adapter, and provide flexibility in the types and function of user interface elements used for the power adapter arrangement. While the control elements 14106 and 14108 may be used for dimming control, they may also be used for other control, such as audio control for a speaker of a control attachment operating as a smart speaker or control of sensor sensitivity for a control attachment having a sensor.

Turning now to 142, a front view of a power adapter arrangement having a multi-element control switch associated with the power adapter is shown. According to the implementation of FIG. 142, a power adapter 14202 is adapted to receive a control attachment 14204. The power adapter comprises a multi-element control switch 14206 having a toggle element 14208 (which may comprise a status indicator 14210, such as an LED). The toggle element may comprise a plurality of selection control elements, including an up key 14212, a right key 14214, a down key 14216, and a left key 14218. The control attachment 14204 may comprise a display 14220, where the multi-element interface may enable navigating through a menu for example, or performing other control functions associated with the control attachment. FIGS. 136-142 could be implemented as shown in FIGS. 128-134 above. While the examples of FIGS. 136-142 show a control attachment that is removable, it should be understood that the examples of FIGS. 136-142 could be implemented with a user interface module that is removable, such as the user interface module 13302 as described above in reference to FIGS. 133 and 134 for example.

Turning now to FIG. 143, a block diagram of a power adapter arrangement having a power adapter configured to authenticate a control attachment is shown. That is, the control attachment can be authenticated by the power adapter in a similar manner as described above in reference to a power adapter having an outlet. More particularly, a control circuit 14302 in the power adapter is configured to control the application of power to a load based upon whether a control attachment is authenticated. The control attachment comprises a signal line 14304 configured to route control signals necessary for the power adapter to authenticate the control attachment, where the control signals may be routed through contact elements 14306 and 14308 as shown. The control circuit 14302 is configured to control a switch 14310 that is adapted to control the power to the load from the power control circuit and a switch 14312 that is adapted to control power to the 3-way terminal as shown. That is, the application of power to the load may be controlled by the switch 12930, but the control circuit may block the application of power through the control attachment using the switches 14310 or 14312. The switches 14310 and 14312 may be a relay for example, which may be open if the control attachment is not authenticated or closed if the control attachment is authenticated. The switches 14310 and 14312 may be placed is other locations to control the application of power to a load, or additional switches may be employed to control the application of power to a load by way of the load terminal or 3-way terminal.

Turning now to FIG. 144, a flow chart shows a method of implementing a power adapter arrangement having a switch and a control attachment. More particularly, it is determined whether a control attachment is received by a power adapter at a block 14402. If not, the power adapter operates in a default condition of a power adapter having no control attachment at a block 14404. For example, the default condition could be that a switch of the power adapter may be used to control the application of power to a load, such as using the power adapters as described above in reference to FIGS. 127-142. Alternatively, the default condition is that the switch of the power adapter does not function when a control attachment is not attached to the power adapter.

If a control attachment is received by the power adapter, it may then be determined whether the control attachment is a "dumb" control attachment (i.e. a control attachment having no circuits for controlling the application of power to a load, also known as a blank attachment) at a block 14406. If so, the power adapter arrangement is operated as a conventional switch, such as a conventional toggle switch, at a block 14408 until the control attachment is removed. If the control attachment is removed at the block 14409, the power adapter operates according to the default condition at the block 14404.

If the control attachment is not a dumb control attachment (i.e. the control attachment comprises circuits for controlling the switching of power applied to a load or any other circuits that may receive power from the power adapter, such as a sensor or any other element of a user interface as described above), it may optionally be determined whether the control attachment is authenticated to operate with the power adapter as described above at a block 14410. If the control attachment is not authenticated, the power adapter may be operated according to the default condition at the block 14404. If the control attachment is authenticated, the control attachment is enabled to control the power adapter at a block 14412, such as the application of power to a load, or communicate signals between the control attachment and the power adapter. For example, the power adapter and control attachment could be operated as described above in reference to FIGS. 127-133.

If the control attachment is not a dumb control attachment and authenticated (if necessary), it may then be determined whether a signal is received from an interface of the control attachment at a block 14414. If not, the power adapter arrangement maintains the state of power to the load at a block 14416. If a signal is received, the state of the power to the load may be changed based upon the received signal, or any other type of operation or communication of signals may be performed based upon the received signal at a block 14418. The control of the application of power to a load may be performed by a control circuit of the control attachment and or the control circuit of the power adapter using a power control circuit having a relay or a TRIAC for example. The control of the application of power may be based upon any inputs received at a user interface circuit of the control attachment (e.g. a user interface circuit associated with the interface circuit 10308, such as where a signal from the user interface circuit is provided to the control circuit using any element of the user interface circuit 10308 as described above. Until the control attachment is removed, the control attachment continues to monitor for received signals at the block 14414. If it is determined that the control attachment is removed at a block 14420, the power adapter is operated in the default condition at the block 14404. The flow chart of FIG. 144 may also be implemented in one or more of the power control circuit 10304 and the control circuit 10306 of the control attachment or the control circuit 11104 of the power adapter (i.e. if authentication is required).

Turning now to FIG. 145, a flow chart shows a method of implementing a power adapter configured to receive a control attachment. A method of configuring a power adapter to provide power to a load is described. The method may comprise configuring a first contact element of a first plurality of contact elements to receive power and a second contact element adapted to be coupled to a load at a block 14502. A surface adapted to receive a control attachment may be provided at a block 14504, wherein the surface comprises a second plurality of contact elements. A third contact element of the second plurality of contact elements may be configured to receive power from the first contact element of the first plurality of contact elements at a block 14506. A fourth contact element of the second plurality of contact elements may be configured to receive power from the control attachment at a block 14508.

According to other implementations, power may be applied to the load by way of the second contact element of the first plurality of contact elements. For example, a surface may comprise providing a second plurality of contact elements comprises providing female contact elements adapted to receive corresponding male contact elements of the control attachment. The method may further comprise receiving a control attachment having a third plurality of contact elements, wherein the third plurality of contact elements is coupled to the second plurality of contact elements on the surface of the power adapter. The control attachment comprises an outlet adapted to receive power by way of the third plurality of contact elements, or may comprise a switch that is accessible on an outer surface of the control attachment for controlling the application of power to a load.

Turning now to FIG. 146, a flow chart shows a method of configuring a control attachment adapted to receive power from a power adapter. A method of controlling a power adapter to provide power to a load is described. A first plurality of contact elements may be configured on an outer surface of the power adapter, the first plurality of contact elements may comprise a first contact element configured to receive power at a block 14602. A recess comprising a second plurality of contact elements and adapted to receive a control attachment may be provided at a block 14604. A second contact element of the second plurality of contact elements may be configured to receive power by way of the first contact element of the first plurality of contact elements at a block 14606. A third contact element of the second plurality of contact elements configured to receive power by way of the control attachment may be provided at a block 14608.

Configuring a second plurality of contact elements of the power adapter may comprise configuring female contact elements adapted to receive corresponding male contact elements of the control attachment. A switch on the power adapter may also be provided for controlling the application of power to a load. A switched outlet may also be provided for controlling the application of power to a load. A control attachment having a third plurality of contact elements coupled to the second plurality of contact elements of the power adapter may also be received by the power adapter. The application of power to a load may be controlled in response to signals received by a control attachment.

While the specification includes claims defining the features of one or more implementations of the invention that are regarded as novel, it is believed that the circuits and methods will be better understood from a consideration of the description in conjunction with the drawings. While various circuits and methods are disclosed, it is to be understood that the circuits and methods are merely exemplary of the inventive arrangements, which can be embodied in various forms. Therefore, specific structural and functional details disclosed within this specification are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting, but rather to provide an understandable description of the circuits and methods.

It can therefore be appreciated that new circuits for, systems for and methods of implementing power adapters have been described. It will be appreciated by those skilled in the art that numerous alternatives and equivalents will be seen to exist that incorporate the disclosed invention. As a result, the invention is not to be limited by the foregoing embodiments, but only by the following claims.

What is claimed is:

1. A control attachment configured to control an application of power to a load, the control attachment comprising:
    a body portion adapted to be received by a power adapter;
    a plurality of contact elements extending from the control attachment, wherein the plurality of contact elements is adapted to be inserted into corresponding contact elements of the power adapter, and comprises a first contact element adapted to receive a first power signal from the power adapter and a second contact element adapted to receive a neutral signal from the power adapter, wherein the first power signal comprises a line power signal from the power adapter;
    an actuator element associated with the body portion, wherein the actuator element is adapted to engage a corresponding switch element of the power adapter; and
    a control circuit adapted to control an application of the first power signal to a third contact element of the plurality of contact elements, wherein the third contact element is adapted to provide the first power signal back to the power adapter.

2. The control attachment of claim 1, further comprising a fourth contact element adapted to receive a second power signal from the power adapter.

3. The control attachment of claim 1, wherein the second power signal comprises a power signal received from a switch of the power adapter.

4. The control attachment of claim 1, wherein the actuator element comprises a projection extending from the control attachment.

5. The control attachment of claim 1, further comprising a wireless communication circuit adapted to implement a wireless communication protocol and to control an application of the first power signal to a load by way of the third contact element based upon signals received by the wireless communication circuit.

6. The control attachment of claim 1, further comprising a sensor, wherein the control circuit controls the application of the first power signal to a load by way of the third contact element based upon an output of the sensor.

7. The control attachment of claim 1, further comprising a user interface on a front portion of the control attachment, wherein the user interface comprises a least one of an input element or an output element.

8. A control attachment configured to control an application of power to a load, the control attachment comprising:
   a body portion adapted to be received by a power adapter;
   a plurality of contact elements extending from the body portion, wherein the plurality of contact elements is adapted to be inserted into corresponding contact elements of the power adapter, and comprises a first contact element adapted to receive a first power signal from the power adapter and a second contact element adapted to receive a neutral signal from the power adapter, wherein the first power signal comprises a line power signal from the power adapter;
   a projection extending from the body portion, wherein the projection is adapted to engage a corresponding switch element of the power adapter; and
   a control circuit adapted to control an application of the first power signal received by the first contact element of the plurality of contact elements to a third contact element of the plurality of contact elements, wherein the third contact element is adapted to provide the first power signal back to the power adapter.

9. The control attachment of claim 8, further comprising a fourth contact element adapted to receive a second power signal from the power adapter.

10. The control attachment of claim 9, wherein second power signal is the same as the first power signal.

11. The control attachment of claim 9, wherein the second power signal comprises a power signal received from a switch of the power adapter.

12. The control attachment of claim 8, wherein the projection breaks a connection between the line power signal and a switch of the power adapter.

13. The control attachment of claim 8, further comprising a fourth contact element adapted to receive the power signal from a switch of the power adapter.

14. A method of implementing a control attachment of a power adapter configured to control an application of power to a load, the method comprising:
   configuring a body portion to be received by the power adapter;
   configuring a plurality of contact elements to extend from the control attachment, wherein the plurality of contact elements is adapted to be inserted into corresponding contact elements of the power adapter, and comprises a first contact element adapted to receive a first power signal comprising a line power signal from the power adapter, a second contact element adapted to receive a neutral signal from the power adapter;
   providing an actuator element that is associated with the body portion, wherein the actuator element is adapted to engage a corresponding switch element of the power adapter; and
   controlling, using a control circuit, an application of the first power signal to a load by way of a third contact element.

15. The method of claim 14, further comprising receiving a second power signal from the power adapter at a fourth contact element.

16. The method of claim 15, wherein the second power signal comprises a power signal received from a switch of the power adapter.

17. The method of claim 14, wherein the control circuit is adapted to control an application of the first power signal received by the first contact element of the plurality of contact elements to a fourth contact element of the plurality of contact elements, and the fourth contact element is adapted to provide the first power signal back to the power adapter.

18. The method of claim 17, further comprising implementing in the control attachment a wireless communication circuit adapted to implement a wireless communication protocol and to control the application of the first power signal to a load by way of the fourth contact element based upon signals received by the wireless communication circuit.

19. The method of claim 14, further comprising implementing a sensor in the control attachment, wherein the control circuit controls the application of the first power signal to a load by way of a fourth contact element based upon an output of the sensor.

20. The method of claim 14, further comprising implementing a user interface on a front portion of the control attachment, wherein the user interface comprises a least one of an input element or an output element.

* * * * *